US007333939B1

(12) United States Patent
Stender et al.

(10) Patent No.: US 7,333,939 B1
(45) Date of Patent: Feb. 19, 2008

(54) METHOD FOR PROVIDING WEB-BASED INSURANCE DATA PROCESSING SERVICES TO USERS

(75) Inventors: Mark J. Stender, Avon, CT (US); Marcia Hendrick, South Hampton, MA (US)

(73) Assignee: Travelers Property Casualty Corp., Hartford, CT (US)

( * ) Notice: Subject to any disclaimer, the term of this patent is extended or adjusted under 35 U.S.C. 154(b) by 1006 days.

(21) Appl. No.: 09/909,866

(22) Filed: Jul. 23, 2001

Related U.S. Application Data

(60) Provisional application No. 60/219,622, filed on Jul. 21, 2000.

(51) Int. Cl.
*G06Q 40/00* (2006.01)

(52) U.S. Cl. .......................................................... 705/4

(58) Field of Classification Search .................... 705/4; 600/300
See application file for complete search history.

(56) References Cited

U.S. PATENT DOCUMENTS

| | | | | |
|---|---|---|---|---|
| 4,831,526 A * | 5/1989 | Luchs et al. | 705/4 |
| 5,182,705 A | 1/1993 | Barr et al. | |
| 5,191,522 A * | 3/1993 | Bosco et al. | 705/4 |
| 5,262,940 A | 11/1993 | Sussman | |
| 5,493,105 A | 2/1996 | Desai | |
| 5,523,942 A * | 6/1996 | Tyler et al. | 705/4 |
| 5,655,085 A | 8/1997 | Ryan et al. | |
| 5,701,451 A | 12/1997 | Rogers et al. | 395/600 |
| 5,754,830 A | 5/1998 | Butts et al. | 395/500 |
| 5,768,578 A | 6/1998 | Kirk et al. | |
| 5,793,964 A | 8/1998 | Rogers et al. | 395/200.32 |
| 5,796,932 A * | 8/1998 | Fox et al. | 707/104.1 |
| 5,870,719 A | 2/1999 | Maritzen et al. | |
| 5,873,066 A | 2/1999 | Underwood et al. | |
| 5,893,072 A | 4/1999 | Zizzamia | |
| 5,926,817 A | 7/1999 | Christeson et al. | |
| 5,956,691 A | 9/1999 | Powers | |
| 5,974,430 A | 10/1999 | Mutschler et al. | 707/505 |
| 5,978,799 A | 11/1999 | Hirsch | |
| 5,987,434 A | 11/1999 | Libman | |

(Continued)

FOREIGN PATENT DOCUMENTS

JP 04054666 A * 2/1992

OTHER PUBLICATIONS www.netquote.com.*

(Continued)

*Primary Examiner*—Jeffrey A. Smith
*Assistant Examiner*—Russell Shay Glass
(74) *Attorney, Agent, or Firm*—Irah H. Donner; Wilmer Cutler Pickering Hale and Dorr LLP

(57) ABSTRACT

The present invention relates to a system and method for providing a web-based graphical user interface to a legacy insurance data process system to increase the functionality and ease of use in quoting and issuing insurance quotes and policies, providing insurance information and other insurance related services. The system and method integrate use of Internet technology in business work flows, provide dynamic data entry for insurance coverage packages and pricing programs, offer easy access to value-added products and services, and enable local printing of professional insurance applications, proposals and forms to facilitate immediate delivery of professional-quality proposals to customers.

24 Claims, 73 Drawing Sheets

U.S. PATENT DOCUMENTS

| | | | | |
|---|---|---|---|---|
| 6,078,890 | A | 6/2000 | Mangin et al. | |
| 6,122,632 | A | 9/2000 | Botts et al. | 707/10 |
| 6,144,944 | A | 11/2000 | Kurtzman, II et al. | |
| 6,144,990 | A | 11/2000 | Brandt et al. | 709/203 |
| 6,175,831 | B1 | 1/2001 | Weinreich et al. | |
| 6,330,551 | B1 | 12/2001 | Burchetta et al. | |
| 6,587,836 | B1 | 7/2003 | Ahlberg et al. | |
| 6,615,253 | B1 * | 9/2003 | Bowman-Amuah | 709/219 |
| 6,615,258 | B1 | 9/2003 | Barry et al. | |
| 6,682,421 | B1 | 1/2004 | Rowe et al. | |
| 6,922,720 | B2 * | 7/2005 | Cianciarulo et al. | 709/217 |
| 2002/0002475 | A1 | 1/2002 | Freedman et al | |
| 2002/0024537 | A1 * | 2/2002 | Jones et al. | 345/763 |
| 2002/0026334 | A1 | 2/2002 | Igoe | |
| 2002/0042763 | A1 | 4/2002 | Pillay et al. | |
| 2002/0091550 | A1 | 7/2002 | White et al. | |
| 2002/0111725 | A1 | 8/2002 | Burge | |
| 2002/0111835 | A1 | 8/2002 | Hele et al. | |
| 2002/0116228 | A1 | 8/2002 | Bauer et al. | |
| 2002/0188484 | A1 | 12/2002 | Grover et al. | |
| 2003/0093302 | A1 | 5/2003 | Quido et al. | |
| 2003/0144884 | A1 * | 7/2003 | Mayaud | 705/3 |

OTHER PUBLICATIONS www.prudential.com.* www.ehealthinsurance.com.* www.insureme.com.*

NetQuote.com, located at<http://web.archive.org/web/19991013070035/http://netquote.com>.*

"Finding Intranet Solutions at Comdex," *Communications Week*, No. 638, pp. 95(7), Nov. 18, 1996.

"Solect Launches IAF 2.5, A Comprehensive Billing and Customer Care Solution; Software Infrastructure Enables Service Providers to Grow Their Internet Business," *Business Wire*, p. 3090284, Mar. 9, 1998.

"SiteBridge Corporation Launches CustomerNow for Real-Time Customer Service on the Web," *Business Wire*, p. 4271173, Apr. 27, 1998.

"MATRAnet Addresses Gap in Customer Relations, Enabling Companies to Maximize Web Sales," *M2 Presswire*, Jun. 9, 1999.

Microsoft Press, Microsoft Corporation, Microsoft Press Computer Dictionary, 3rd Edition, c. 1997, pp. 268 and 305.

A Powerful Offering. Distribution Management Briefing (Mar. 2000).

Anthem Health of New York Brings Group Health Insurance To The Web; Anthem Site Gives Employers and Brokers Immediate Group Quotes Online. Business Wire (Apr. 8, 1999).

CitX Announces New Internet-Based E Commerce Platform for Insurance Companies to Automate Marketing, Underwriting, and Distribution of Insurance Products. PR Newswire (Sep. 21, 1998).

Commonwealth Bank Takes Net Honors. Retail Banker International. (Apr. 22, 1999).

Grigonis, Richard. App Gens: More Than Just IVR. Computer Telephony. 7:9, 54 (Sep. 1999).

HomeCom and Progressive Auto Insurance Delivering Online Insurance: Automobile and Motorcycle Insurance Will be Available Using the Internet. Business Editors. Business Wire. pp. 1-3 (May 14, 1999).

Insure.com Announces October Launch of CARS(SM) by PR Newswire. pp. 1-3. New York (Sep. 28, 1999).

Money-Go-Round: Driving a Deal On-Line: The Internet Offers Cheap Quotes for Car Insurance. Daily Telegraph (Jul. 11, 1998).

New Opportunities To Sell Insurance Products (Emerge For Banks). Bank Marketing. 32:10 (Oct. 2000).

Savage, Terry. Web site lets you compare car insurance quotes. Chicago Sun-Times, Chicago, IL, p. 49 (Jul. 18, 1999).

Shopping For Car Insurance Online Doesn't Kill the Pain. Mixed Results: Digging For Quotes Can Be Frustrating, But It Beats Phone Tag With Agents. Atlanta Constitution (Feb. 7, 2000).

Technology Update. American Agent & Broker. 71:7 (Jul. 1999).

Yen, J. et al. Collaborative and Scalable Financial Analysis with Multi-Agent Technology. Proceedings of the 32nd Hawaii International Conference on System Sciences. (Mar. 1999).

Grigonis, Richard, "App Gens: More Than Just IVR," *Computer Telephony*, vol. 7, No. 9, p. 54, Sep. 1999.

Yen, Jerome, et al., "Collaborative and Scalable Financial Analysis With Multi-Agent Technology," Proceedings of the 32nd Hawaii International Conference on System Sciences. Mar. 1999.

* cited by examiner

Figure 3B:
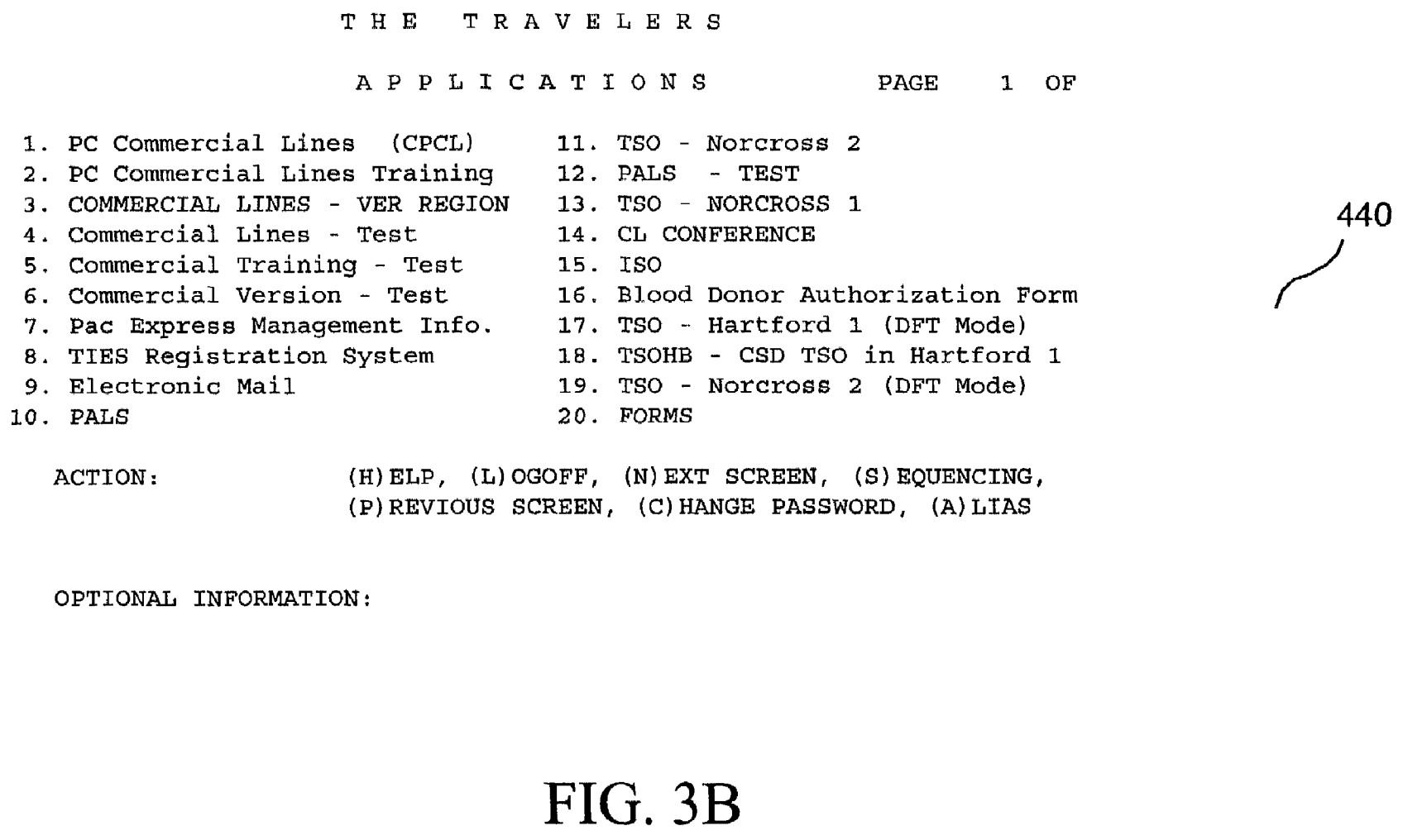

440

T H E   T R A V E L E R S

A P P L I C A T I O N S   PAGE 1 OF

| | |
|---|---|
| 1. PC Commercial Lines (CPCL) | 11. TSO - Norcross 2 |
| 2. PC Commercial Lines Training | 12. PALS - TEST |
| 3. COMMERCIAL LINES - VER REGION | 13. TSO - NORCROSS 1 |
| 4. Commercial Lines - Test | 14. CL CONFERENCE |
| 5. Commercial Training - Test | 15. ISO |
| 6. Commercial Version - Test | 16. Blood Donor Authorization Form |
| 7. Pac Express Management Info. | 17. TSO - Hartford 1 (DFT Mode) |
| 8. TIES Registration System | 18. TSOHB - CSD TSO in Hartford 1 |
| 9. Electronic Mail | 19. TSO - Norcross 2 (DFT Mode) |
| 10. PALS | 20. FORMS |

ACTION: (H)ELP, (L)OGOFF, (N)EXT SCREEN, (S)EQUENCING,
(P)REVIOUS SCREEN, (C)HANGE PASSWORD, (A)LIAS

OPTIONAL INFORMATION:

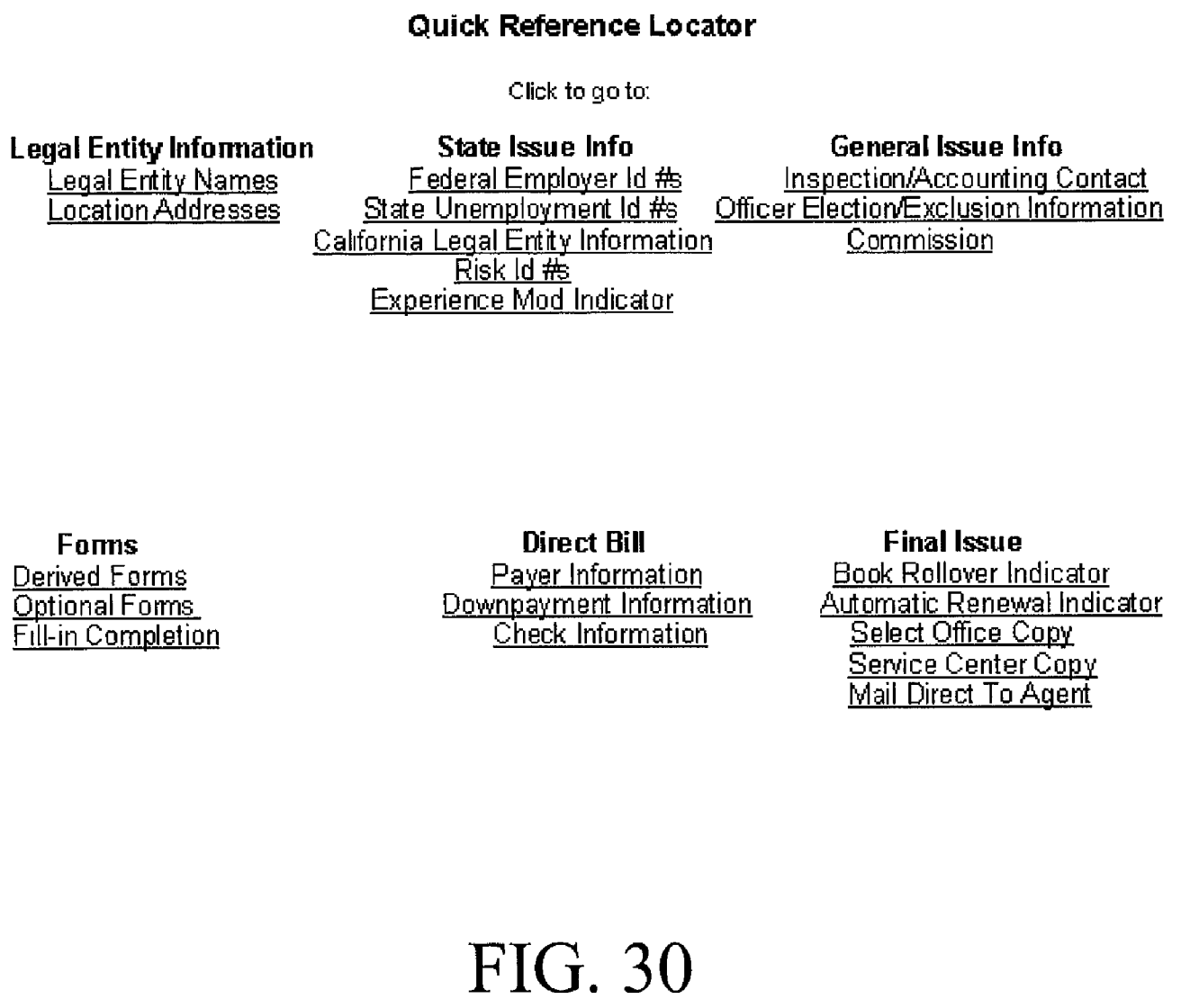

Quick Reference Locator

Click to go to:

Legal Entity Information
Legal Entity Names
Location Addresses

State Issue Info
Federal Employer Id #s
State Unemployment Id #s
California Legal Entity Information
Risk Id #s
Experience Mod Indicator

General Issue Info
Inspection/Accounting Contact
Officer Election/Exclusion Information
Commission

Forms
Derived Forms
Optional Forms
Fill-in Completion

Direct Bill
Payer Information
Downpayment Information
Check Information

Final Issue
Book Rollover Indicator
Automatic Renewal Indicator
Select Office Copy
Service Center Copy
Mail Direct To Agent

FIG. 30

| | A | B | C |
|---|---|---|---|
| Question: | **Business Experience** | **Driver info** | **MVR** |
| Answers: | 1) 5 or more years | 1)licensed for 3 or more years | 1)DWI or DUI |
| | 2) 3 or more years | 2)10% drivers, licensed > 3yrs | 2)Reckless Driving |
| | 3) 1 or more years | 3) have a license | 3)Criminal type conviction |
| | 4) some | | 4)Speed - 25MPH over speed limit |
| | | | 5)Past 3 yrs < 2 accidents/moving violations |
| | | | 6)Past yr < 1 at fault accident /moving violation |
| | | | 7)None with the above. |

| Pricing Company | Pricing Track | Answer combinations that derive pricing track |
|---|---|---|
| TIL-B Travelers Ind of Il | Super High Discount | A=1, B=1, C=7, D=1 |
| TCT-B Traveler Ind of CT | High Discount | A=2, B=2, C=7, D=2 |
| TIL-A Travelers Ind of Il | Standard Discount | A=3, B=2, C=7, D=2 |
| TCT-A Travelers Ind of CT | Standard | A=4, B=3, C=NA, D=NA |

| | A | B | C |
|---|---|---|---|
| Questions: | **Business Experience** | **Driver info** | **MVR** |
| Answers: | 1) 5 or more years | 1)licensed for 3 or more years | 1)DWI or DUI |
| | 2) 3 or more years | 2)10% drivers, licensed > 3yrs | 2)Reckless Driving |
| | 3) 1 or more years | 3) have a license | 3)Criminal type conviction |
| | 4) some | | 4)Speed - 25MPH over speed limit |
| | | | 5)Past 3 yrs < 2 accidents/moving violations |
| | | | 6)Past yr < 1 at fault accident /moving violation |
| | | | 7)None with the above. |

| Pricing Company | Pricing Track | Answer combinations that derive pricing track |
|---|---|---|
| TIL-B Travelers Ind of Il | Super High Discount | A=1, B=1, C=7, D=1 |
| TCT-B Traveler Ind of CT | High Discount | A=2, B=2, C=7, D=2 |
| TIL-A Travelers Ind of Il | Standard Discount | A=3, B=2, C=7, D=3 |
| TCT-A Travelers Ind of CT | Standard | A=4, B=3, C=NA, D=NA |

FIG. 38

METHOD FOR PROVIDING WEB-BASED INSURANCE DATA PROCESSING SERVICES TO USERS

This application claims the benefit of U.S. Provisional Application No. 60/219,622 titled "SYSTEM AND METHOD FOR PROVIDING WEB-BASED DATA PROCESSING SERVICES TO INSURANCE AGENTS AND CUSTOMER SERVICE REPRESENTATIVES," filed Jul. 21, 2000, which is herein incorporated by reference in its entirety. This application is also related to U.S. patent application Ser. No. 09/843,841 titled "SYSTEM AND METHOD FOR PROVIDING WEB-BASED USER INTERFACE TO LEGACY, PERSONAL-LINES INSURANCE APPLICATIONS," filed Apr. 30, 2001.

BACKGROUND OF THE INVENTION

1. Field of the Invention

The present invention relates to a system and method for providing web-based data processing services to insurance agents and customer service representatives. More specifically, the present invention relates to a system and method for providing a web-based interface to an insurance data processing system to increase the functionality and ease of use in providing information about commercial-lines insurance policies to users, issuing commercial-lines insurance quotes and policies, modifying policies, etc. As referred to herein, commercial-lines insurance policies relate to insurance policies for commercial and/or business needs, as opposed to individuals' needs. Examples of commercial-lines insurance include, but are not limited to: business owners insurance policy (e.g., Travelers' MasterPac policy); automobile insurance coverage for a business auto fleet; workers compensation (WC) insurance; and umbrella insurance coverage.

2. Description of the Related Art

Insurance companies have traditionally used large, centralized data processing systems that run on mainframe computers. Because of the large amounts of data that must be handled and because of the criticality of the system, mainframes have provided an economical way to provide the necessary performance and reliability. As insurance companies become more competitive, it is imperative that insurance agents be provided an easy-to-use, user-friendly interface with which to view policy information, issue insurance quotes and policies, and so on.

Since many insurance agents have the ability to issue policies from more than one insurance company, it is often ease-of-use that makes the sale when prices are relatively similar. Additionally, insurance companies have invested significant resources into legacy mainframe applications. It would be very costly to completely rewrite mainframe applications for another computing environment.

BRIEF SUMMARY OF THE INVENTION

There is a need for a web-based insurance data processing system and method that provide the necessary reliability, performance, and ease-of-use. There is also a need for a system and method that can provide a modern, user-friendly interface to a legacy insurance system, such as a mainframe system, to provide information about insurance policies such as commercial-lines insurance policies to users, issue commercial-lines insurance quotes and policies, modify policies, etc.

Accordingly, the preferred embodiments of the present invention provide a system and method for a web-based graphical user interface (GUI) to an insurance data processing system (insurance system) that is fast and simple to navigate.

The preferred embodiments of the present invention also provide a system and method for a user-friendly interface to an insurance system that requires minimal training, increases productivity, and saves money.

The preferred embodiments of the present invention further provide a system and method for a web-based interface to an insurance system that integrates use of Internet technology in business work flows, provides dynamic data entry for insurance coverage packages and pricing programs that are most often used, and offers easy access to value-added products and services.

The preferred embodiments of the present invention also provide a system and method for a web-based interface to an insurance system that enables local printing of insurance applications, proposals and forms to facilitate immediate delivery of professional-quality proposals to customers and on-demand printing of applications, forms and binders.

The preferred embodiments of the present invention additionally provide a system and method for a web-based interface to an insurance system that includes intuitive graphical features such as trees, buttons, hyperlinks, navigation bars, drop-down boxes, and dynamic screen painting.

The preferred embodiments of the present invention also provide a system and method for a web-based interface to an insurance system that continues process flow based on data capture, prompts only for pertinent questions, and displays specific coverage and deductible options that apply to form, jurisdiction and market.

BRIEF DESCRIPTION OF THE DRAWINGS

The preferred embodiments are illustrated by way of example and not limited in the following figures, in which:

FIGS. 3A-B depict screens for activation of a new ID and password for the host insurance applications, in accordance with an embodiment of the present invention;

FIG. 1*l* depicts a Quick Reference Locator screen for a MasterPac issue, in accordance with an embodiment of the present invention;

FIG. 30 shows the Quick Reference Locator (QRL) screen for WC Issue in accordance to an embodiment of the present invention in accordance with an embodiment of the present invention;

FIG. 38 shows a list of factors affecting the Pricing of an Automobile quote in accordance with an embodiment of the present invention;

DETAILED DESCRIPTION OF THE INVENTION

The present invention provides users with web-based access to an insurance data processing system (insurance system), such as a legacy insurance mainframe system, for insurance information about insurance policies to users, issuance of insurance quotes and policies, modification of policies, etc. For example, an insurance agent at a remote location using a web browser such as Netscape Communicator or Microsoft Internet Explorer can access the insurance system via a web server across a public communication network such as the Internet or a private communication network. One private communication network commonly used by insurance agents is the Insurance Value Added Network (IVAN). One feature of this approach is that all remote locations can have access to a central system and uniform graphical experience without the need to distribute software to each and every individual remote location.

The present invention also provides a mechanism for building a Web-based graphical user interface (GUI) to legacy systems while leveraging the legacy applications by "wrapping" each legacy application in a web-based GUI and then hiding the legacy application behind that interface. According to one embodiment of the present invention, the web-based GUI comprises at least one website that is provided by one or more web server groups or farms, each including one or more web servers. Any web-based development platform, such as the Microsoft Windows Distributed Internet Architecture (WINDNA), may be used to build and deploy the web-based GUI. In other words, the GUI applications may be hosted by an Internet information server (IIS), such as the Microsoft IIS, and utilize a teleprocessing or transaction processing monitor (TP monitor), such as the Microsoft Transaction Server (MTS) to provide the web-based GUI and its website(s). The deployment of the web-based GUI of the present invention also includes server site replication to ensure that the server farms contain identical applications and information. Thus, legacy applications of the insurance system are hidden behind the web-based GUI, and users can access those legacy applications via the GUI and its website(s). The term "users" used throughout the present disclosure refers to insurance agents using the web-based GUI and insurance system to serve their insurance customers. Users can also refer to insurance customers themselves who are authorized to access the GUI website and the retrievable insurance applications therein. For website security, the GUI web servers can authenticate users with traditional Microsoft Windows-based authentication mechanisms such as lightweight directory access protocol (LDAP) or Active Directory. The GUI web server farms and their web servers therein can then communicate with the insurance system using message queue (MQ) over transmission control protocol/Internet protocol (TCP/IP).

Figure 1A:
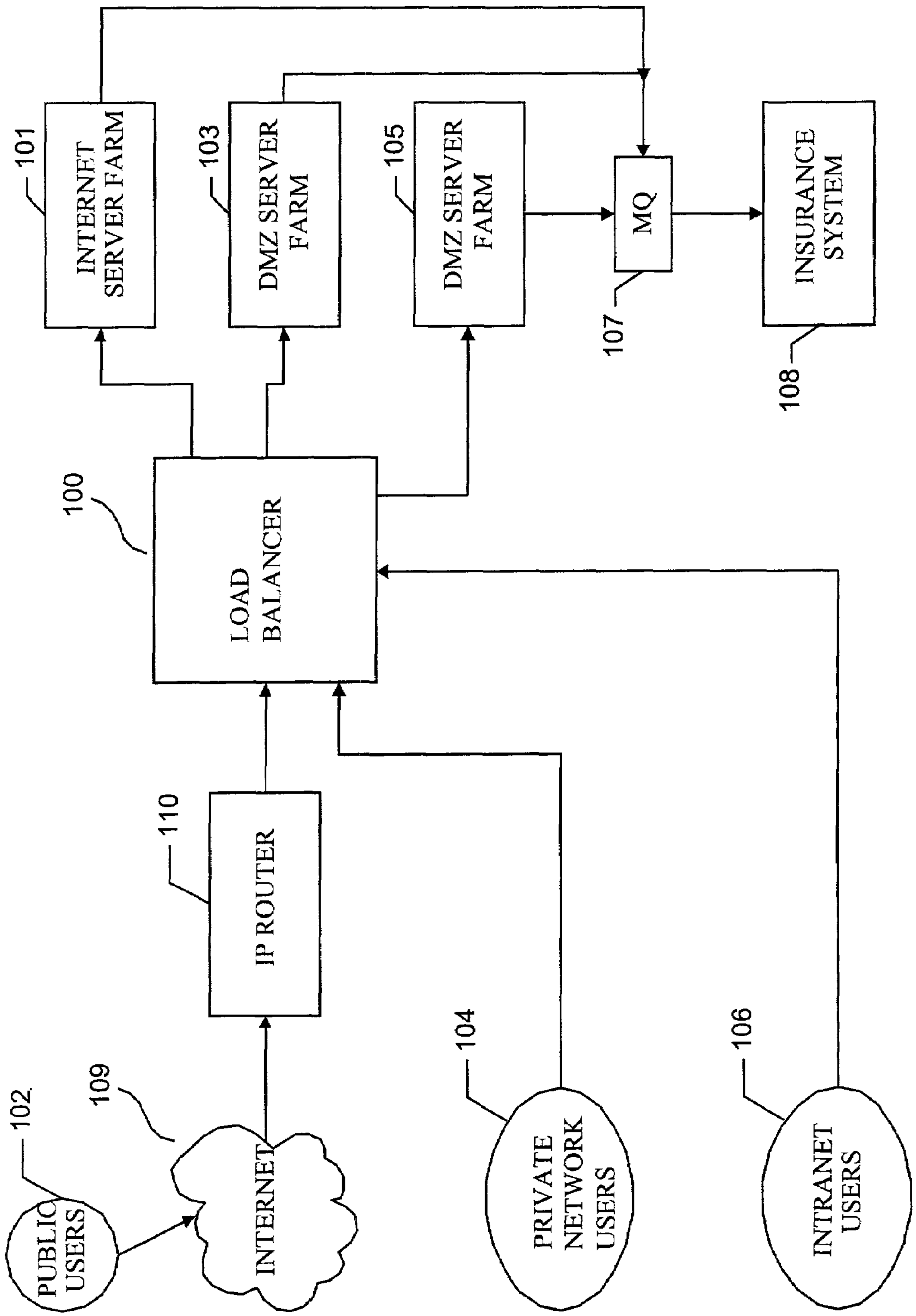
FIG. 1A depicts a high level architecture for a web-based graphical user interface (GUI) to a host insurance data processing system (insurance system) and its insurance applications, in accordance with an embodiment of the present invention.

According to one embodiment of the present invention, there are provided three server farms for the web-based GUI to the insurance system as shown in FIG. 1A. One server farm 101 may be virtually set up at a public Internet hosting site and can be accessed by users 102 through the Internet 109 and IP router 110. Another server farm 103 may be virtually set up in a demilitarized zone (DMZ), i.e., a barrier between the intranet and the Internet, and can be accessed by users 104 through private networks such as the IVAN. The third server farm 105 may be virtually set up within an insurance host internal network and can be accessed by users 106 through the intranet of the internal network. The users 102, 104, and 106 all use the web-based GUI to access the various server farms. These server farms are in turn connected to the host insurance system 108, which is also located within the host internal network, via the MQ 107. Security features such as data encryption, user authentication, and firewalls are used with the server farms in the appropriate manner to define their virtual set-ups, even though they may be physically located in one location, to prevent unauthorized use of the GUI and its web servers and entry into the host insurance system 108.

According to an embodiment of the present invention, a software or hardware load balancer 100 such as the Cisco LocalDirector can be used to load balance between the web server farms 101, 103, and 105, with each web server in the server farms running, for example, Windows 2000. The LocalDirector 100 load balances between the server farms 101, 103, and 105. If one server farm goes down, the user's state is maintained and his or her session can be continued on one of the remaining server farms. Thus, the server farms back up one another. Likewise, as mentioned earlier, there may be provided more than one server per server farm; thus, if one server goes down, the user's state is maintained and his or her session can also be continued on another server in the same server farm.

Some legacy applications of the insurance system embed business logic into their legacy screen programs for data entry. Because the web-based GUI of the present invention replaces those legacy screen programs, new code for the web-based GUI may be created to ask users the appropriate questions and to make sure that appropriate answers are given under the various circumstances of insurance. Some of these circumstances include the various jurisdictions or states for which the insurance products are requested, the various insurance products available to users from the insurance host and its system, the various insurance filings, etc. For instance, in an insurance quote transaction, the web-based GUI of the present invention can collect the necessary information from a user and then route such information to the insurance rating engines within the insurance system to generate an insurance quote for the user. If the user is interested in the quote, the insurance sale process continues whereby the GUI will prompt the user for additional information, such as billing information and other information pertinent to the insurance policy of interest. The additional information is then sent back to the issue engines of the insurance system where premium breakdowns are analyzed, statistical feeds and feeds for the general ledger and advanced function printing are created, etc.

Figure 1B:
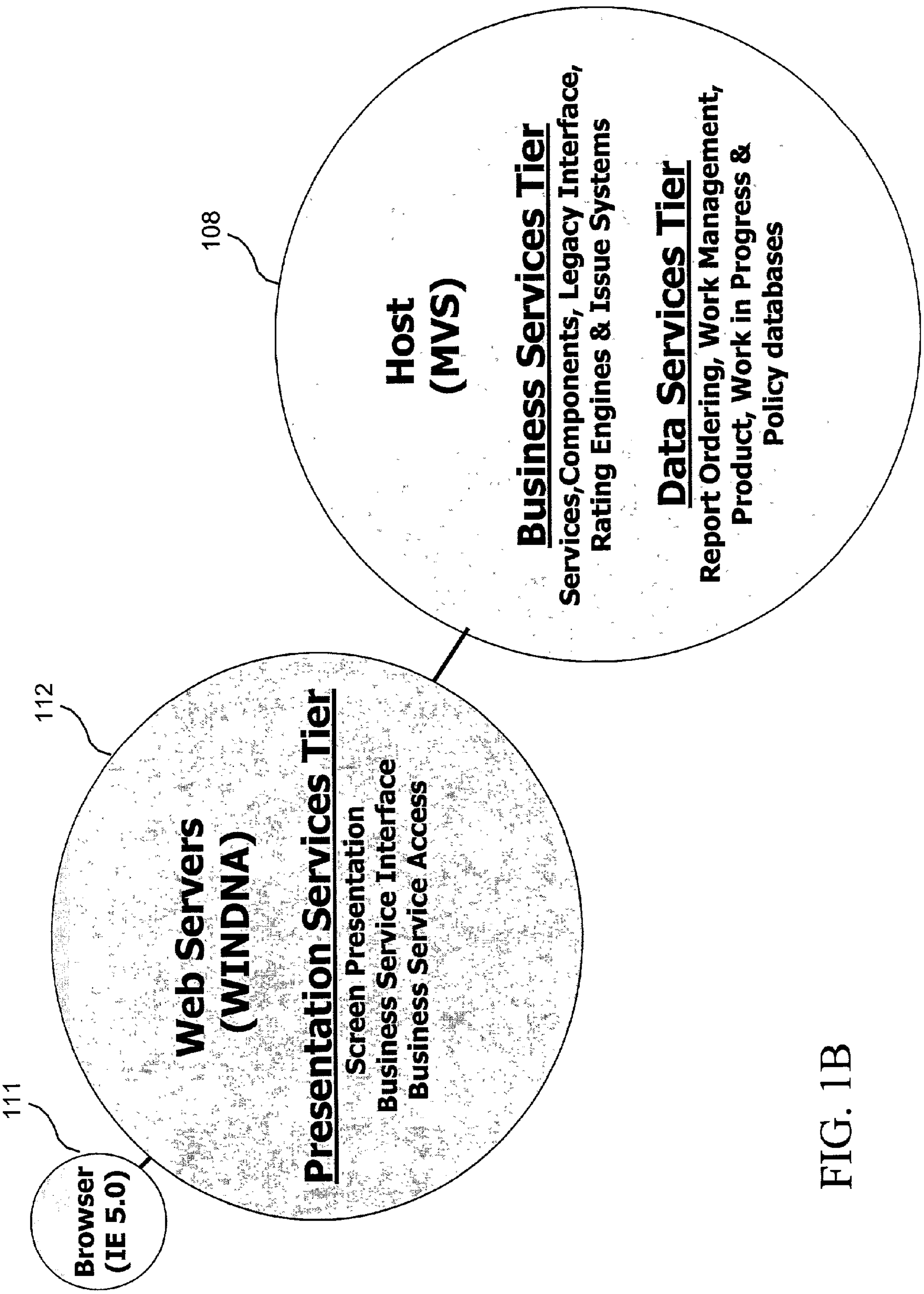
FIG. 1B depicts an application architecture showing a tier diagram for a web-based GUI to an insurance system and its insurance applications, in accordance with an embodiment of the present invention.

FIG. 1B shows an application architecture and a tier diagram for accessing the insurance system and its insurance applications via a web-based GUI of the present invention. The web-based GUI includes the web browser 111, such as Internet Explorer or Netscape Navigator/Communicator, that users 102, 104, and 106 (FIG. 1A) use to access the host insurance system 108. As mentioned earlier, the web-based GUI also includes web servers 112, which are located in the server farms 101, 103, and 105 (FIG. 1A) and built and deployed by, for example, WINDNA. The web servers 112 provide a presentation service tier. The host insurance system 108 provides a business services tier and a data services tier. The presentation service tier of the web browsers 112 includes a screen presentation, a business service interface, and a business service access for: gathering information from the users by using an interview engine to guide them to relevant questions and allowable answers; sending users' information to the business services for processing; receiving the results of the business services processing; and presenting those results to the users. The business services tier of the host 108 includes services, components, a legacy interface, rating engines, and issue systems for: receiving input from the presentation services tier; interacting with the data services tier to perform the business operations that were designed to be automated (e.g., report ordering, issue processing, rating, etc.); and sending the processed results to the presentation services tier. The data services tier of the host 108 includes report ordering, work management, product, work in progress (WIP), and policy databases for: storing data; retrieving data; maintaining data; and assuring the integrity of data.

Figure 1C:
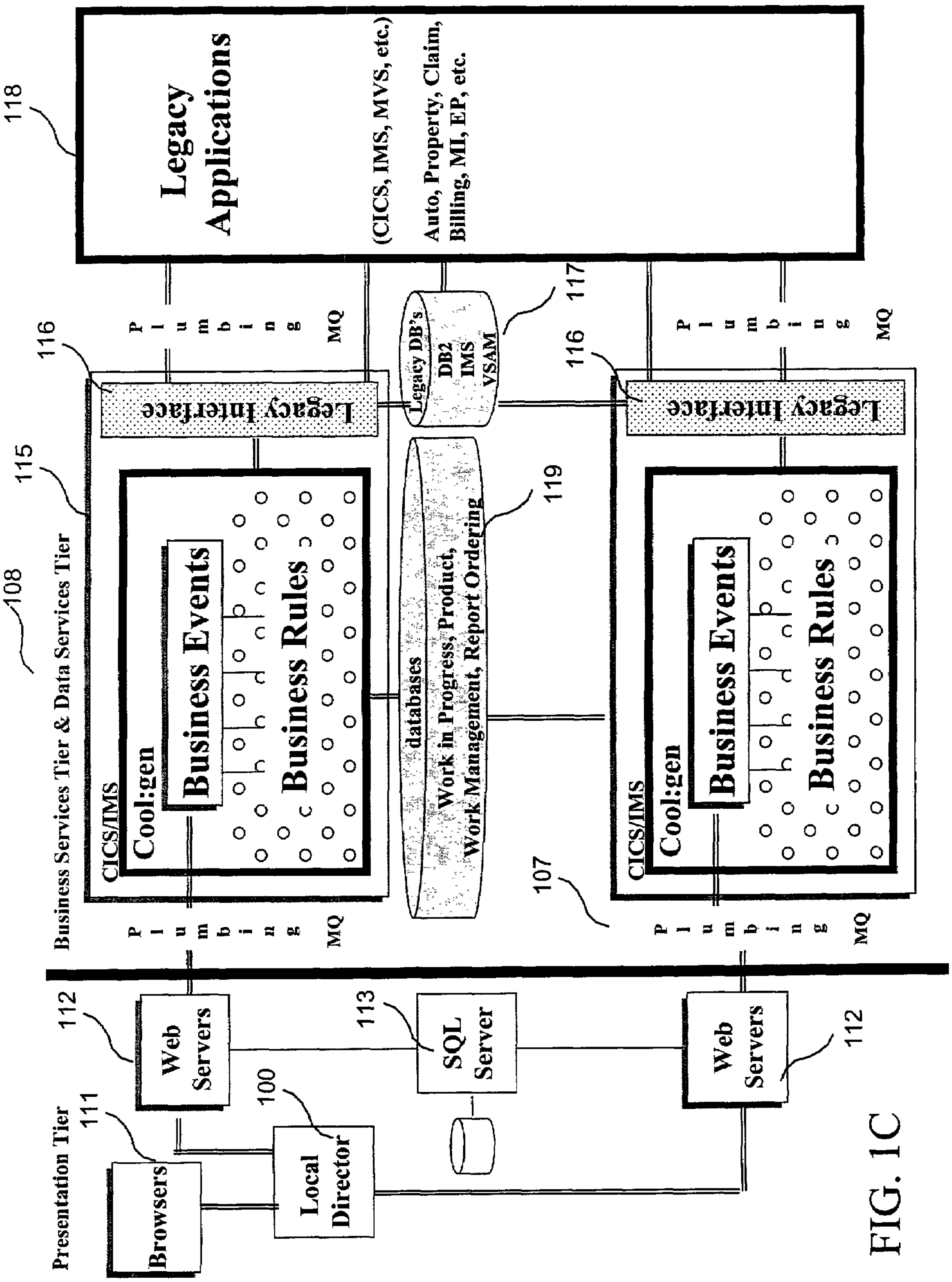
FIG. 1C depicts a technical architecture, with reference to FIG. 1A, of the application architecture and tier diagram shown in FIG. 1B, in accordance with an embodiment of the present invention.

FIG. 1C provides a technical architecture, with reference to FIG. 1A, of the application architecture and tier diagram shown in FIG. 1B, wherein like elements are labeled with like numbers. As shown, the presentation services tier includes the web browsers 111, the load balancer or local director 100, the web servers 112 with an associated structured query language (SQL) server 113 for maintaining the users' states in the web servers 112. Just as shown in FIG. 1A, FIG. 1C shows that the web servers 112 communicate with the host 108 using the MQ 107. The business services tier and the data services tier at the host 108 include: the business events and business rules for the business services tier and the various aforementioned databases 119 for the data services tier. The host 108 further includes legacy interfaces 116 and legacy database 117 for providing access to the legacy insurance applications 118.

According to one embodiment of the present invention, the application code for the business rules and events for the business services tier can be developed using Computer Associates Cool:Gen, which is a modeling tool and application generator. This product provides a mechanism for developing platform independent source code for the web-based system. Once an application code is developed in Cool:Gen, it can be deployed in Unix, Windows 2000, or other operating systems. In this instance, the application code for the business rules and events is deployed in a Customer Information Control System and/or Information Management System (CICS/IMS) environment at the host 108.

Figure 1D:
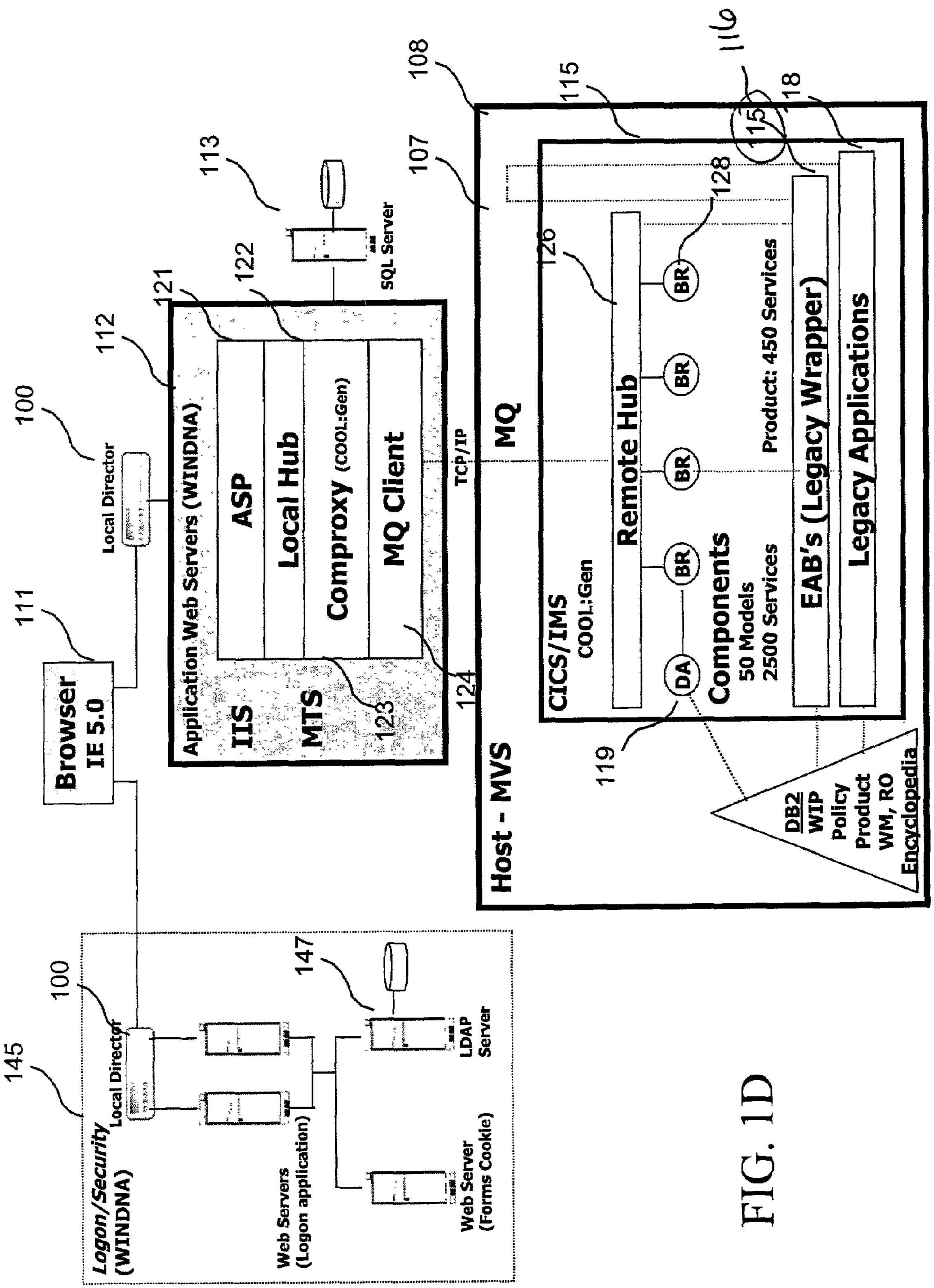
FIG. 1D depicts an infrastructure of the technical architecture shown in FIG. 1C, in accordance with an embodiment of the present invention.

FIG. 1D shows the infrastructure of the technical architecture in FIG. 1C, in accordance with one embodiment of the present invention, with like elements labeled with like numbers. As mentioned earlier, each web server 112 is built and deployed by WINDNA, which includes the IIS and the MTS. As is known in the art, the IIS provides the HTTP processing for the web server 112 and supports Active Server Pages (ASPs) 121 for dynamic processing of content from databases. The ASPs 121 retrieve functions through a local hub 122 at each web server 112. The local hub 112 provides a layer through which functions from the host insurance system or anywhere can be retrieved and used by the ASPs 121. The web server 112 further includes a Comproxy 123 developed through Cool:Gen, which is used to handle communication between the web server 112 and the host insurance system 108 by running the MQ client 124 for connection to the MQ 107 at the host insurance system 108. As mentioned earlier, the web server 112 provides the screen presentation of the presentation services tier. It also allows user personalization and customization of the screen presentation and implements business rules when applicable.

As mentioned earlier, user authentication and security for the web-based GUI of the present invention are provided to the web servers 112 using traditional Microsoft Windows-based authentication mechanisms such as lightweight directory access protocol (LDAP) or Active Directory. According to one embodiment of the present invention, authentication and security features are set up in at least one server farm 145, with an LDAP server 147, separate from the web servers 112. Again, where the authentication and security features are set up depend on whether the features are designed for users accessing the web-based GUI of the present invention via the Internet, Intranet, or a private data network.

According to one embodiment of the present invention, the host 108 comprises a multiple virtual storage (MVS) mainframe with the CICS/IMS environment 115. There is provided a remote hub 126 in the CICS/IMS 115 for accessing the business events and business rules (BR) functions 128 for the business services tier and the databases 119 for the data services tier. Like the local hub 122 in the web servers 112, the remote hub 126 provides a layer through which functions from the host insurance system or anywhere can be accessed by the web servers 112 and/or the host insurance system 108. Together, the business events and business rules 128 and the databases 119 trigger access to the legacy applications via an External Action Block (EAB) 116, which is the legacy wrapper or legacy interface. Thus, the CICS/IMS 115 implements the business rules, manage inventory of the business rules, extend the business rules to the web server 112, manage inventory of services, and provide wrapping of legacy applications.

According to one embodiment of the present invention, the business events and rules are set up in a component and services architecture, wherein each component comprises one or more services. Each component represents an insurance subject or product made available to the users by the host insurance system; whereas, each service corresponds to an action that a user can perform for a particular component. For example, FIG. 1G shows a components and services framework with components classified in eight different groups: references, product type, quotes, customers, activity type, correspondence type, activities, and correspondence. Descriptions of the components are found in Table 1, with the current number of public operations representing examples of the number of services for each of the components.

TABLE 1

| |
|---|
| Acceptance Package: This component holds information on the WIP needed for interface with the Electronic Publication application for a quote.<br>Current number of public operations: 5 |
| Actions: This component holds data on the WIP relating to Underwriter Actions and Notations on a Quote.<br>Current number of public operations: 11 |
| Additional Interests (Policy Participant): This component holds data on the WIP relating to various third parties associated with a quote.<br>Current number of public operations: 10 |
| Agent: This component has services that wrap legacy programs for interfacing with the Agency Database. |

TABLE 1-continued

| |
|---|
| Current number of public operations: 3 |
| Common: This component has services that are common routines for such things as parsing names and addresses. |
| Current number of public operations: 8 |
| Convert Score: This component has services having to do with the manipulation of credit scores, including the conversion between numeric and alpha scores. Some of the services wrap legacy programs. |
| Current number of public operations: 7 |
| Coverage: This component holds data on the WIP about the coverages on a policy quote. |
| Current number of public operations: 23 |
| Credit Surcharge Type: This component holds the product rules governing credits and surcharges that can be applied to policies. Used mainly by the Boat product. |
| Current number of public operations: 21 |
| Customer: This component has services that wrap legacy programs for interfacing with the Personal Lines customer files. |
| Current number of public operations: 9 |
| Endorsement: This component holds data on the WIP about the endorsements on a policy quote. |
| Current number of public operations: 11 |
| Event: This component holds information about an event/activity entered into the Contact Management application |
| Current number of public operations: 6 |
| Event Type: This component holds information about the types of events/activities that can be entered in the Contract Management application. |
| Current number of public operations: 2 |
| Installment Schedule: This component has services that wrap a legacy program for calculating installment payments. |
| Current number of public operations: 1 |
| Location: This component holds data on states, and also has services for directly accessing the TAP City Database and PPC Table. |
| Current number of public operations: 5 |
| Lookup: This component holds data for a myriad of different reference lookups. |
| Current number of public operations: 7 |
| Loss: This component holds data on the WIP about losses, accidents, convictions, etc., associated with a quote. |
| Current number of public operations: 22 |
| Outside Report: This component hold information in the Warehouse about requests for outside reports and the reports themselves that are received. |
| Current number of public operations: 31 |
| Outside Report Type: This component holds information that defines the formats of outside report requests and outside report results. |
| Current number of public operations: 9 |
| Personnel/Staff Member: This component holds data about personnel and organizations in the business service offices that are used for the contact management and work management applications. |
| Current number of public operations: 2 |
| Policy: This component holds Policy/Quote level data on the WIP. |
| Current number of public operations: 80 |
| Policy Subject: This component holds data on the WIP about the persons and things that are insured by a policy quote. |
| Current number of public operations: 27 |
| Premium: This component holds information on the WIP about the premium charges for a quote, including credits and surcharges. |
| Current number of public operations: 11 |
| Premium Type: This component holds the product rules governing premium charges for policies. Used only by the Boat product. |
| Current number of public operations: 20 |
| Pricing Options: This component holds the product rules governing premium levels, pricing tracks and writing companies. |
| Current number of public operations: 4 |
| Pricing Option TRV: This component has Travelers written services relating to Pricing Options. |
| Current number of public operations: 1 |
| Problem Log: This component holds a log of error messages related to a quote on the WIP. |
| Current number of public operations: 5 |
| Product Rules: This component contains product rules about Policy Types, Coverage Grant Options (Coverage and Endorsement Types), Coverage Dependencies, Limit Types, Deductible Types and Subject Types. |
| Current number of public operations: 33 |
| Rate Type: This component holds product rules governing premium rates. Used only by the Boat product. |
| Current number of public operations: 20 |
| Rating Results: This component holds data on the WIP that is returned from the policy rating systems when a quote is rated. |

TABLE 1-continued

| |
|---|
| Current number of public operations: 3 |
| Reinsurance Type: This component holds the product rules governing premium charges for reinsurance on policies. Used only by the Boat product. |
| Current number of public operations: 18 |
| Script: This component holds script questions and answers for use in building dynamic facet screens. |
| Current number of public operations: 24 |
| Symbol: This component has services that wrap legacy programs for accessing the Automobile symbol database. |
| Current number of public operations: 3 |
| Template: This component holds information about Templates, which are Quotes on the WIP that are not real customer quotes, but rather are contain default data used to create a new quote. |
| Current number of public operations: 4 |
| Transaction Log: This component hold information on the WIP relating to transactions sent to the policy rating and issue applications for quotes on the WIP. |
| Current number of public operations: 11 |
| Transaction Type: This component holds data that defines the allowable transaction and subtransaction type combinations by line of business, policy status and call type. |
| Current number of public operations: 3 |

Figure 1E:
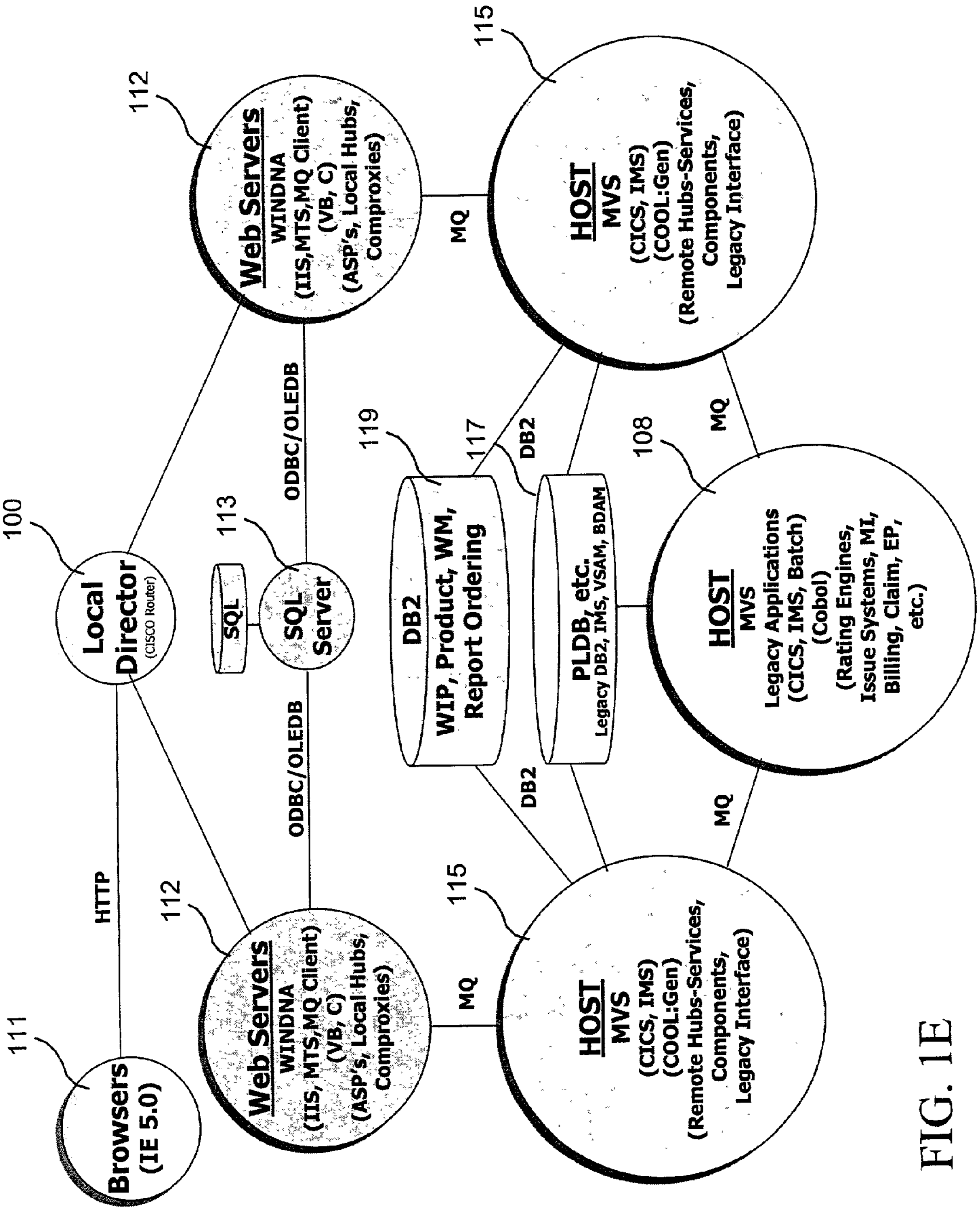
FIG. 1E depicts in general a redundancy aspect of the technical architecture shown in FIGS. 1B-D, in accordance with an embodiment of the present invention.

FIG. 1E shows in general the redundancy aspect of the technical architecture depicted in FIGS. 1B-D, with like elements labeled with like numbers. As explained earlier with reference to FIG. 1A, there are web servers 112 located at different locations or server farms with a load balancer such as a LocalDirector 100 to load balance between the server farms. The web server sites 112 are identical to one another through server site replication, and the states of the web server sites 112 are maintained by the SQL server 113 through open database connectivity/OLE database (ODBC/OLEDB). Thus, the web server sites are redundantly provided to serve as backups to one another as mentioned earlier. The web server sites 112 communicate with the host insurance system 108 using MQ to access legacy insurance applications such as rating engines, issue systems, billing, and claim. As shown in FIG. 1D, there is a CICS/IMS environment 115, complete with remote hubs for providing services and components and a legacy interface to the legacy insurance applications, corresponding to each of the web servers site 112. Because the web server sites 112 are replicated, their corresponding CICS/IMS environments are also replicated.

Figure 1F:
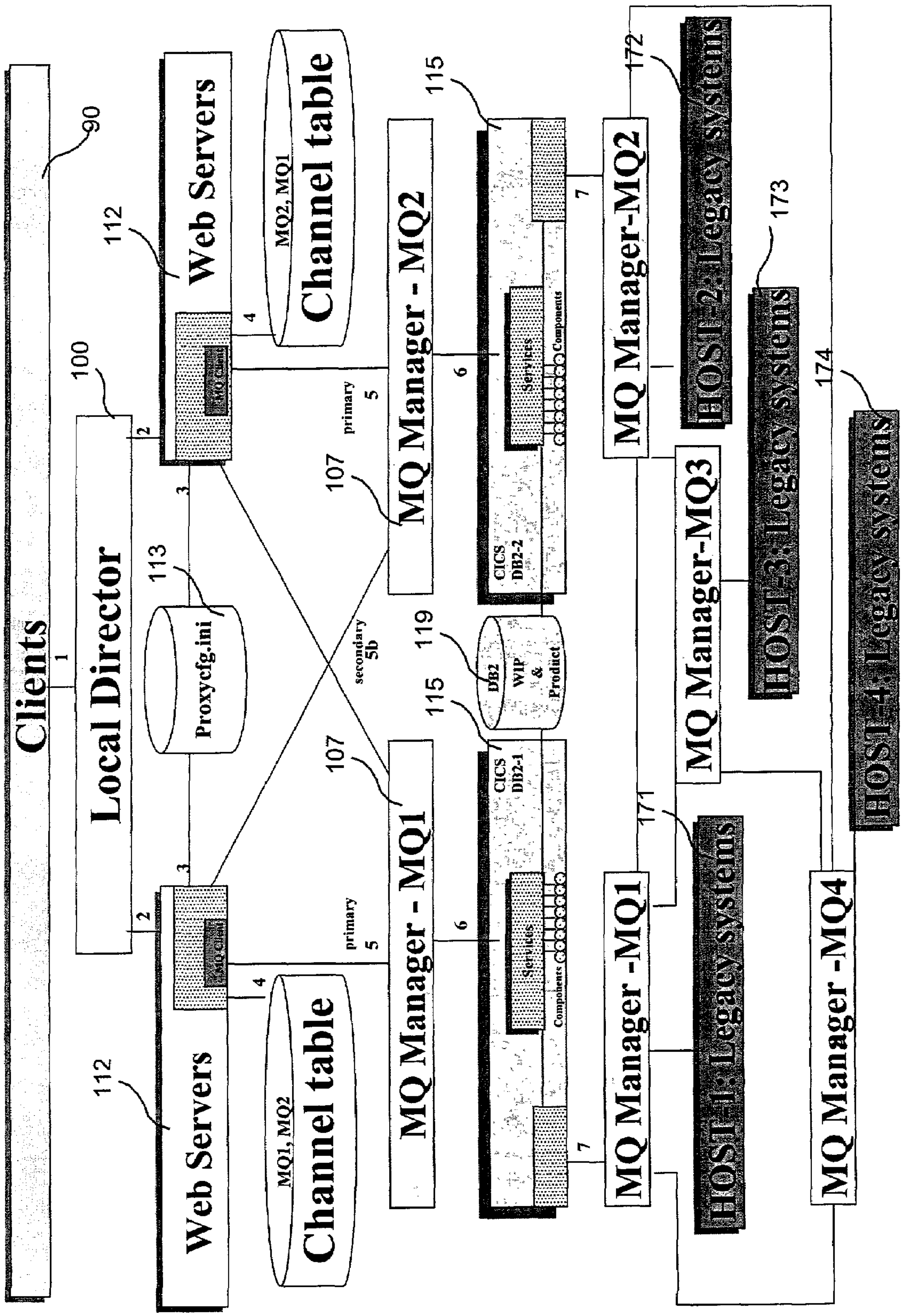
FIG. 1F depicts a particular redundancy architecture of FIG. 1E, in accordance with an embodiment of the present invention.
Figure 1G:
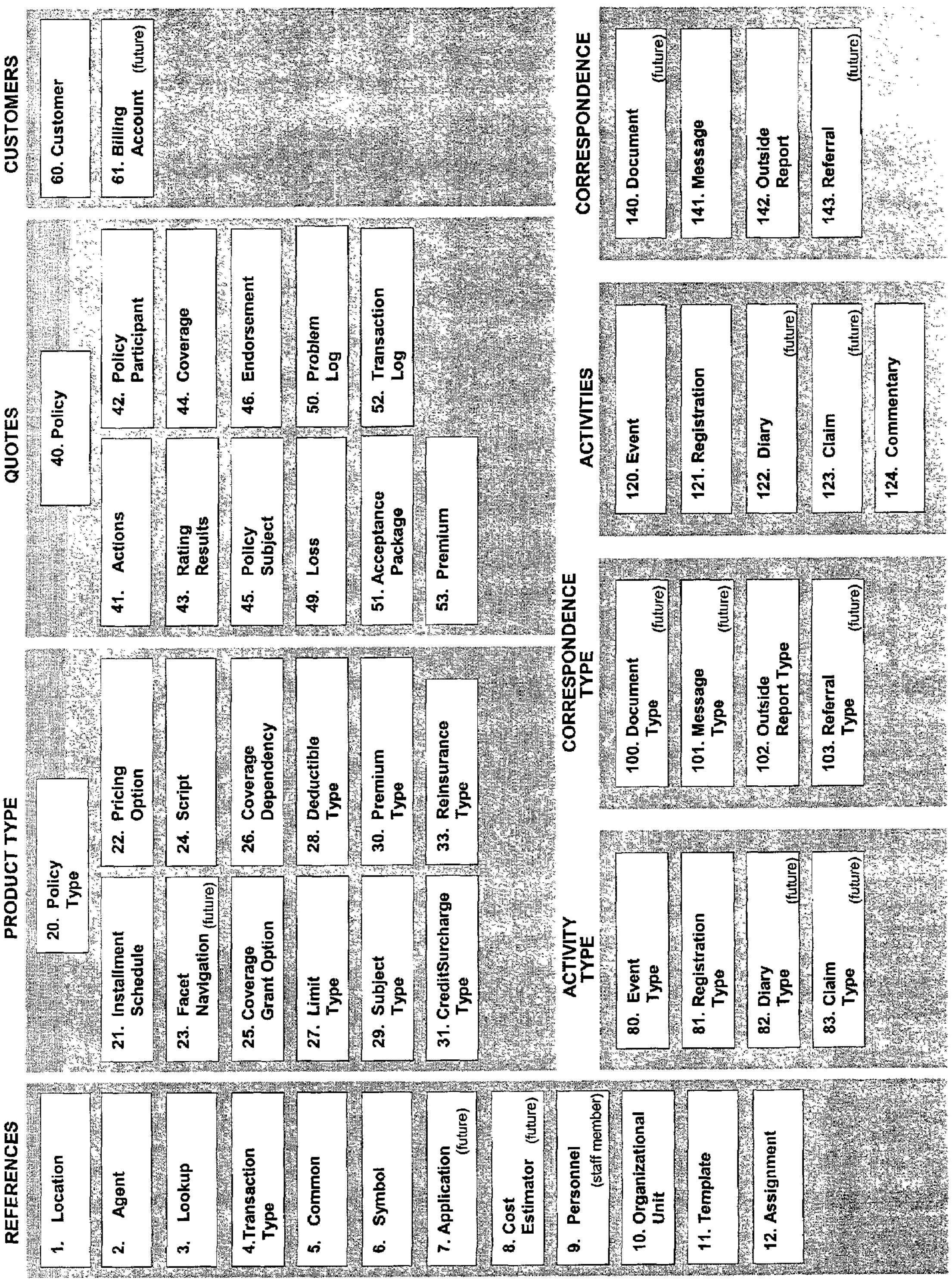
FIG. 1G depicts a components and services framework in accordance with an embodiment of the present invention.

FIG. 1F shows a particular redundancy architecture of FIG. 1E in accordance with an embodiment of the present invention, wherein like elements are labeled with like numbers. A user wishing to access the web-based GUI to the host insurance system must first access the web browser on his or her machine 90. The user's machine 90 then communicates to the load balancer or LocalDirector 100, which load balances user requests across multiple web servers sites 112. Which ever site 112 is selected to receive a user request from the LocalDirector 100 then accesses a proxycfg.ini file to determine the transmission type (i.e., MQ) and location (i.e., MQ name). Next, the selected web server site 112 accesses a channel table to determine an MQ Manager 107, based on the determined transmission type and location, to communicate with the host insurance system. Both the channel table and the proxycfg.ini reside in each web servers site 112. The first entry in the channel table is designated the primary, and the second entry in the channel table is designated a secondary for fail over. The selected web server 112 then communicates to the host insurance system via MQ, which triggers a host transaction or service from the CICS/IMS 115. If the service requires information from another application, MQ is utilized as the communication interface. In this embodiment there are multiple legacy systems 171-174 which MQ can access via additional MQ managers.

Figure 2A:
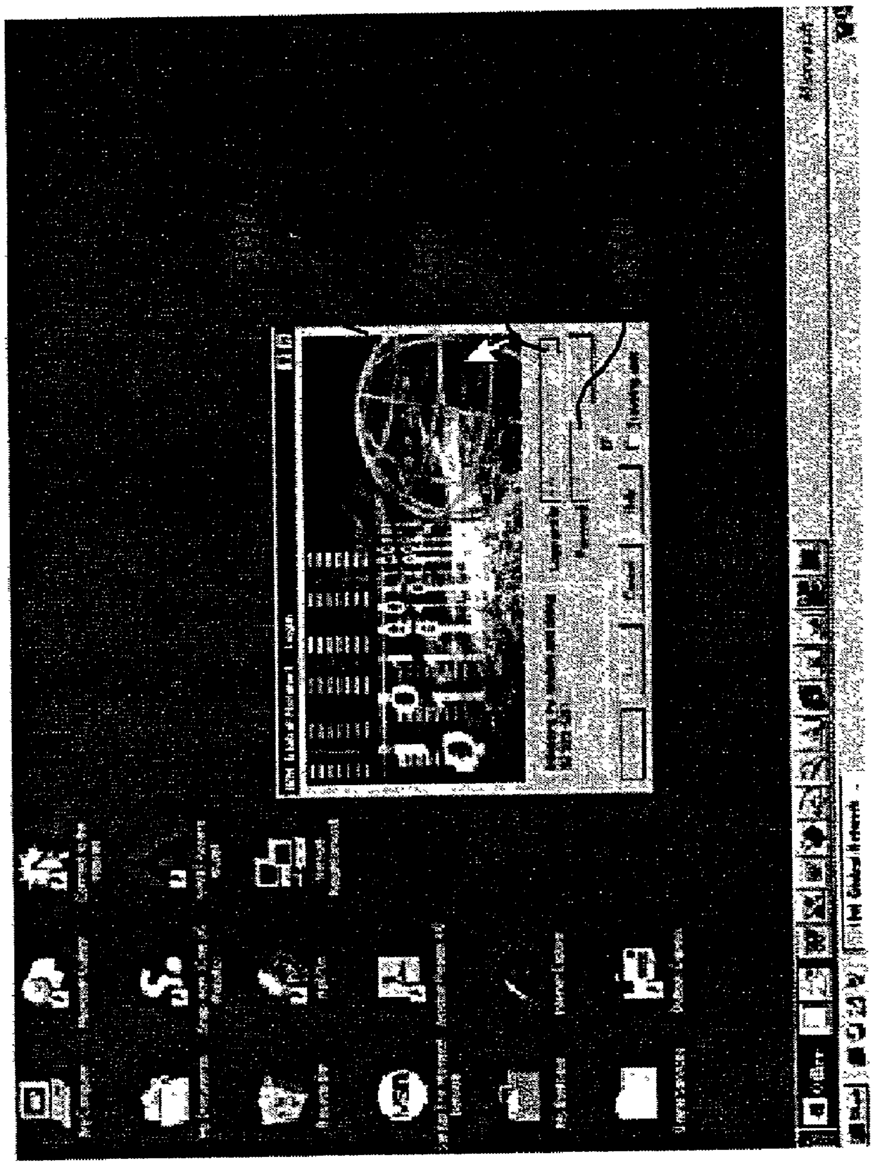
FIG. 2A depicts a user's desktop screen with a window opened for accessing a private network to gain entry to the GUI and insurance system, in accordance with an embodiment of the present invention.
Figure 2B:
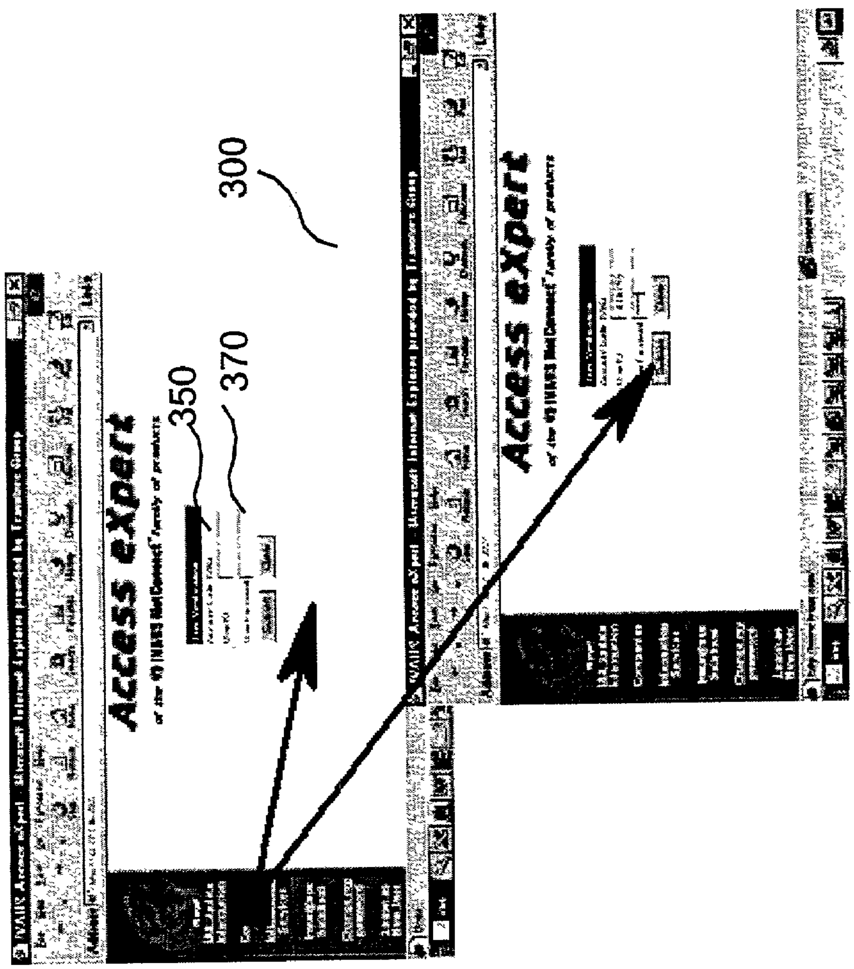
FIG. 2B depicts a screen for verifying the user login identification and password for the private network accessed by the screen in FIG. 2A, in accordance with an embodiment of the present invention.
Figure 2C:
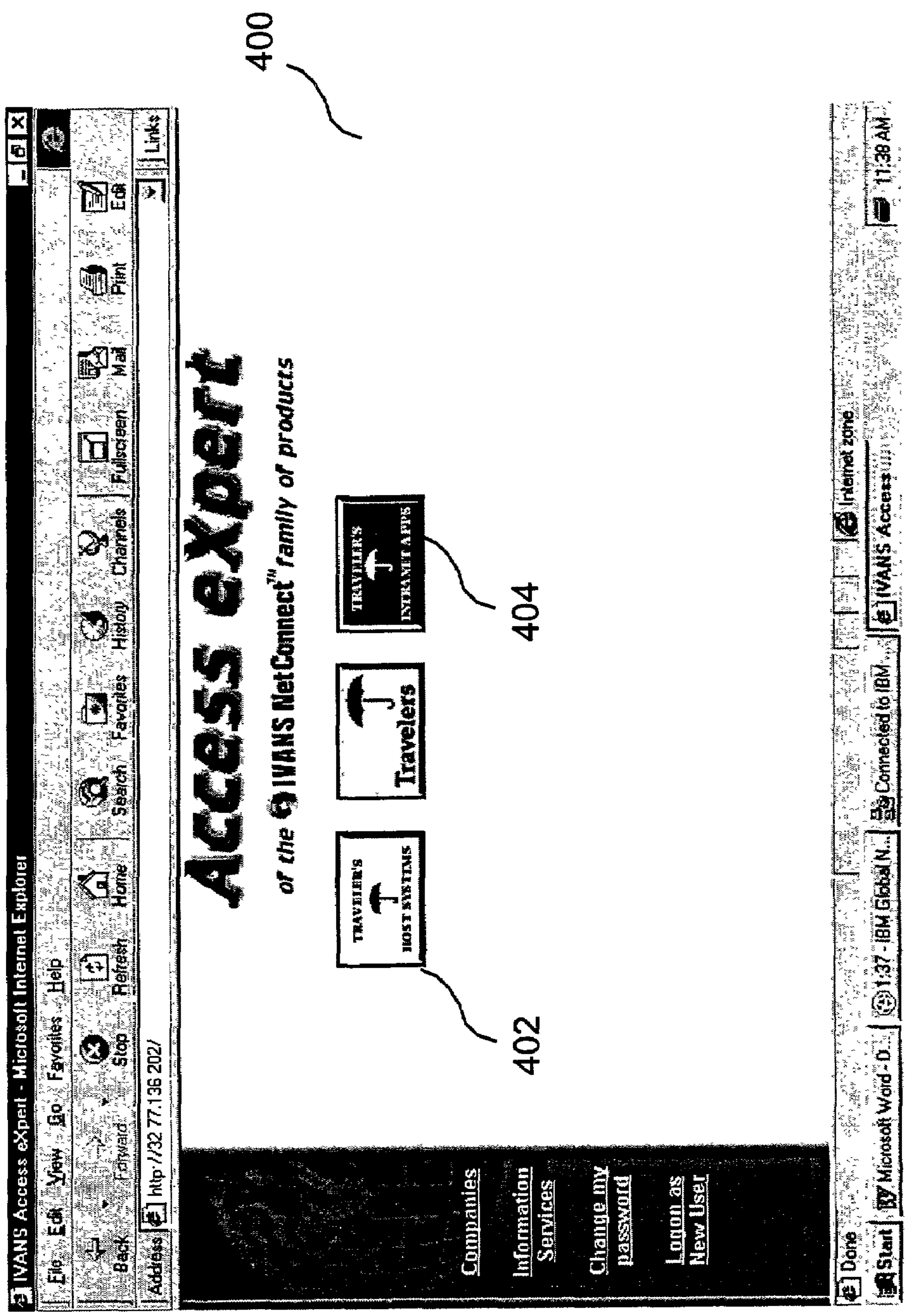
FIG. 2C depicts a screen for user selection of a web site for a desired insurance system after a successful logon to the private network, in accordance with an embodiment of the present invention.

Explanation is now made with regard to users accessing the insurance system and legacy insurance applications with the web-based GUI of the present invention. FIG. 2A shows an access of the insurance system with the GUI via a private communication network such as IVAN, in accordance with an embodiment of the present invention. Here, the user must first access his or her private network account by opening up the logon screen 200 for such network, wherein the logon screen 200 is made possible by the IVAN product software installed on the user's machine. The "screen", as it is referred to throughout the present disclosure, displays any one of the web pages residing at the website of the web-based GUI. At the logon screen 200, the user must enter his or her login identification (ID) in the login profile box 250 and a password in the password box 270, wherein the login ID and the password are those required for access to the private data network. Once the user is successfully connected to the private network, the user may also be required to validate the login ID and password again in the input fields 350 and 370 of screen 300, as shown in FIG. 2B. Once the user's ID and password for IVAN are validated, a screen 400 is displayed, shown in FIG. 2C. Here, the user can choose to access the host insurance systems, such as the Traveler's host systems, by clicking on button 402 and the host insurance applications, such as Traveler's intranet applications, by clicking on button 404. Thus, the private communication network software on the user's machine enables the user to access both the host insurance systems and the host insurance applications with one common connection and ID. The end result is that the user can easily "toggle" between the two choices seamlessly.

Figure 3A:
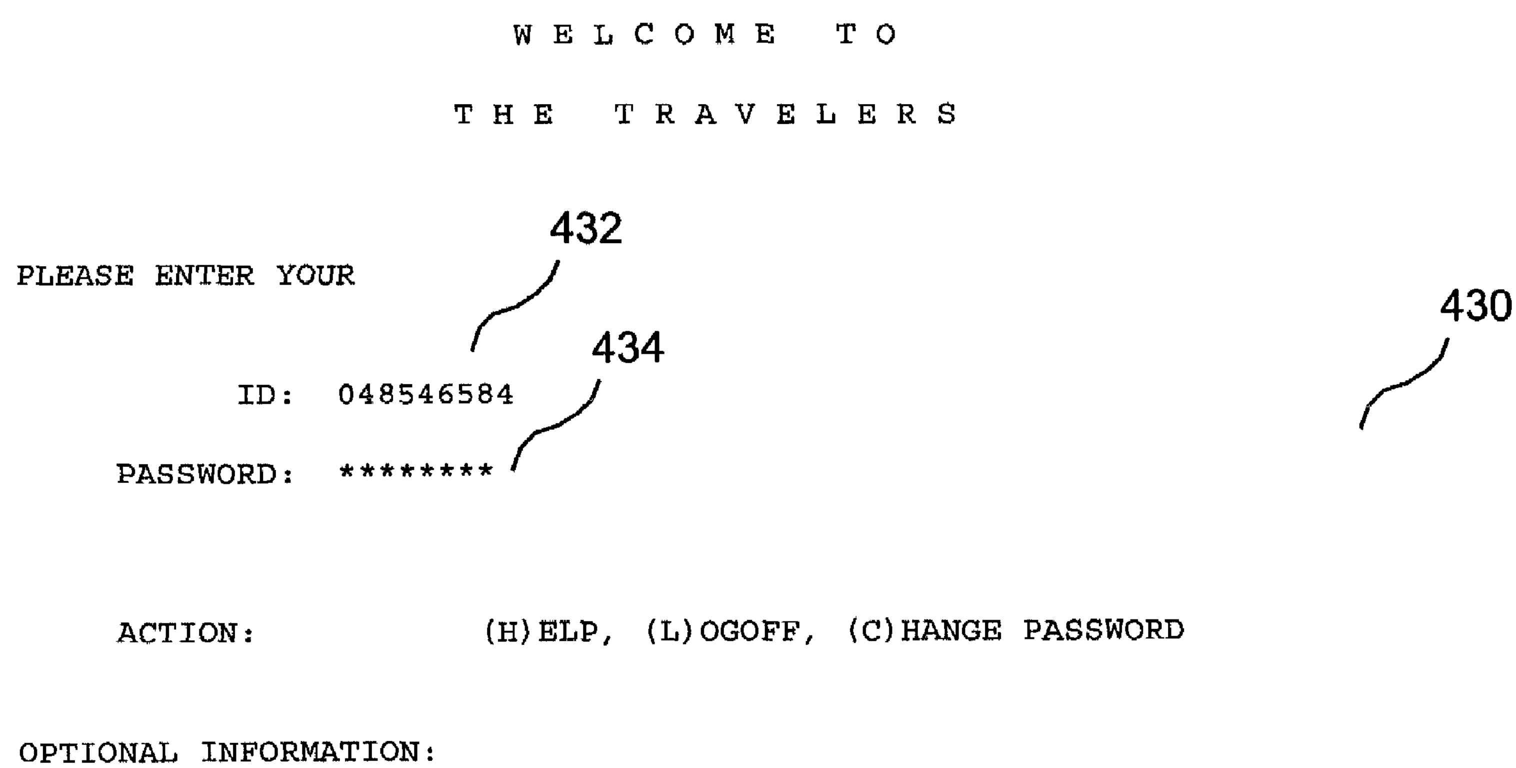

To access the host insurance applications, the user must have another ID and password for such applications. As is known in the art, the user obtains such ID and password upon developing a business relationship, such as a principal/agent relationship, with the host insurance company. When the user is set up with a new ID, it is necessary to activate the ID by accessing the host insurance systems 404 of FIG. 2C. The ID must be activated in the environment the user will be accessing the host insurance applications (i.e., Production and/or Training). FIG. 3A shows the ID activation screen 430 upon accessing the host insurance systems. Here, the user is prompted to enter the new ID at 432 (e.g., "048546584") and password at 434 and to press <Enter> upon completion. As shown in the figure, each character of the password is denoted by an asterisk to prevent unwanted viewing of the user's typed-in password.

FIG. 3B shows an Applications menu 440 that is next displayed on the user's machine. Here, the user can select a Training or Production environment and press <Enter>. For instance, to activate the new ID and password for the commercial lines insurance applications, the user can select 1 for PC Commercial Lines in the Applications menu 440. A Commercial Lines menu will then appear (not shown), and the user can select a particular commercial-lines insurance application from that menu and press <Enter> through the Special Message screens (as described later) until the user arrives at the main menu for the selected insurance application (as described later). That is all the user needs to activate the user's ID for use with the selected insurance application. The user can now log off the host insurance systems and subsequently log straight into the logon screen of the selected insurance application using the activated ID and password without going through the host insurance systems for ID activation again.

If the user is one of the Intranet users 106 (see FIG. 1A) of the insurance system, he or she will have icons on his or her desktop which allows direct access to the host insurance systems and host insurance applications. When the Intranet user is set up with a new ID, he or she must go through the same ID activation process as explained earlier. Likewise, if the user is one of the Internet users 102 (see FIG. 1A), he or she may be provided an Internet address, such as a uniform resource locator (URL), to access a designated website with choices for the host insurance systems and host insurance applications. Again, when the Internet user is set up with a new ID, he or she must go through the same ID activation process as explained earlier. Furthermore, the Internet user may be provided with an Internet address for direct logon to a specific host insurance application, wherein the user can enter the activated ID and password and then select an application, such as the commercial-lines insurance application.

Figure 4:
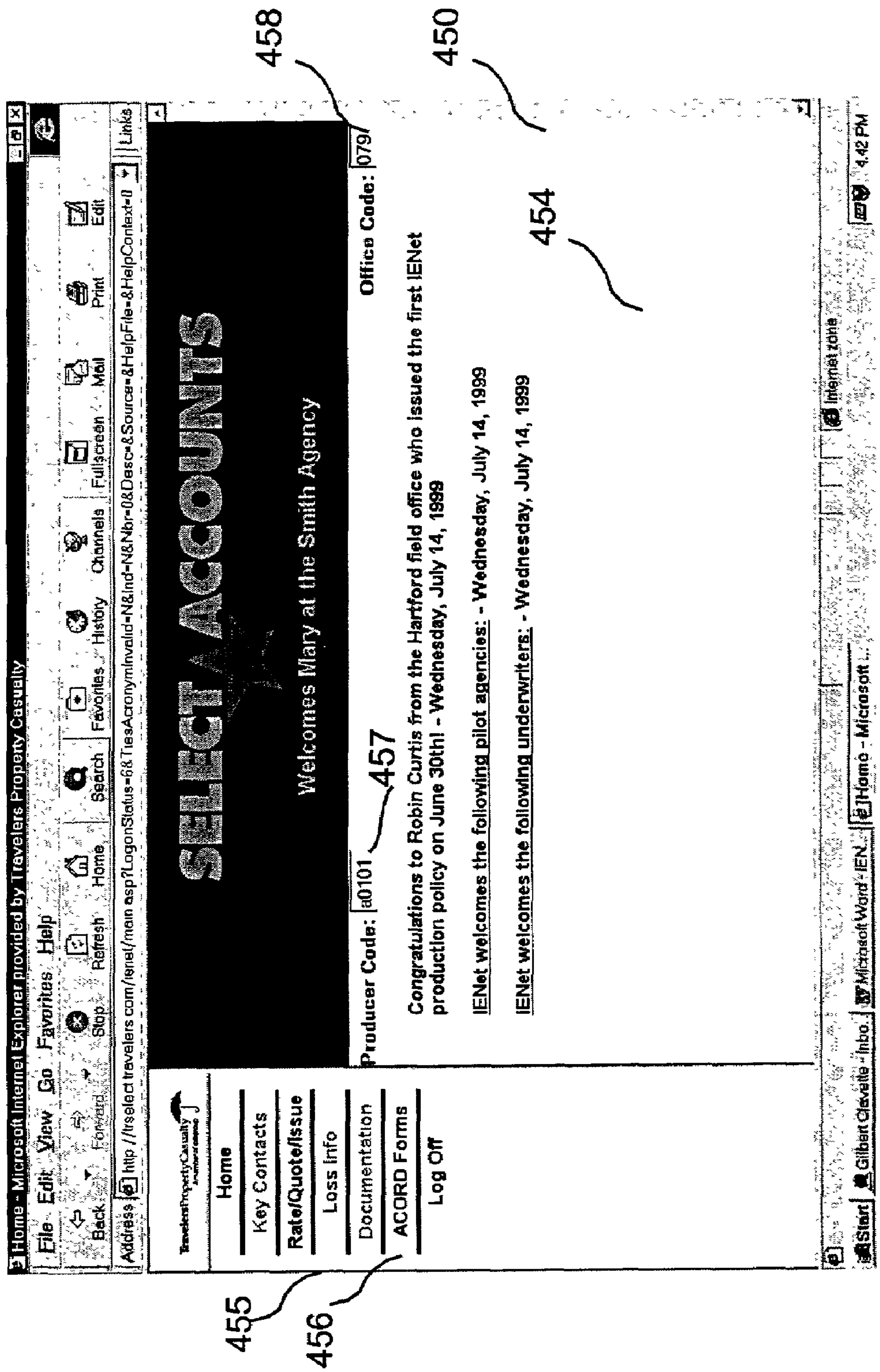
FIG. 4 depicts a splash screen upon accessing a commercial-lines insurance application from the host insurance company, in accordance with an embodiment of the present invention.

After the ID activation and selection of the commercial-lines insurance application, whether from a private communication network, the Internet, or an Intranet, the user is shown the Issue Express Net "splash screen" or Welcome screen 450 in FIG. 4. According to one embodiment of the present invention, the layouts of the GUI screens for the hyperlink pages are the same throughout. Each screen includes a navigation tree or Navigator 455 and an action area or section 454. The Navigator is provided to help users move through the insurance quote and issue process. Within each category shown in the Navigator there may be additional subcategories. At the top screen portion of the action area 454, the user is greeted with a friendly, customized name that the user or his/her office has defined (e.g., no more cryptic "Smith/J/A/Agency, Inc"). There is a name table in the host insurance systems that drives the customized display. If the name table has not been updated with a custom name, then no welcome message will display at all. The user is prompted to enter a Producer Code at field 457 and a Report Office at field 458 to further identify the user and his/her affiliation. After the user has entered the Producer Code and the Report Office, the user can press <Enter> and marketing messages may be displayed at screen portion 454. These messages can be targeted to the user and/or any other targeted users. The messages can be added, changed or removed. Alternatively, the message can be set to expire automatically on a predetermined date. As shown in FIG. 4, the splash screen 450 offers a pick 456 for insurance-industry-standard ACORD forms that allows the user to print blank ACORD forms. To continue, the user can click on the Rate/Quote/Issue link in the Navigator frame to begin the Account Establishment/Policy Issuance Process Alternatively, after typing in the Producer Code and Report Office but prior to submitting this information (e.g., instead of pressing <Enter>), the user can directly click on Rate/Quote/Issue link to bypass the marketing messages shown at the lower portion of the action area 454.

Figure 5:
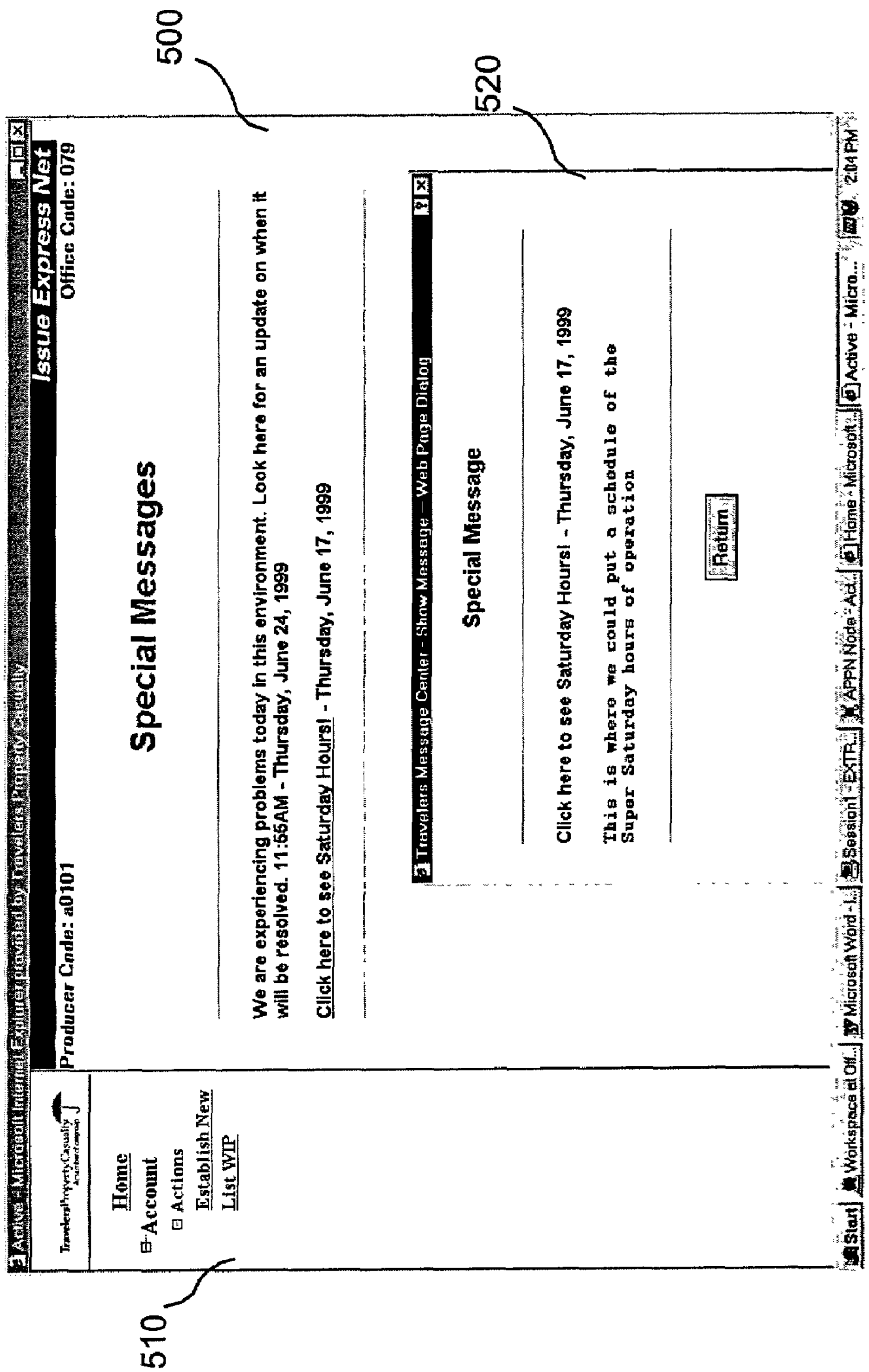
FIG. 5 depicts a Special Message screen, in accordance with an embodiment of the present invention.
Figure 6:
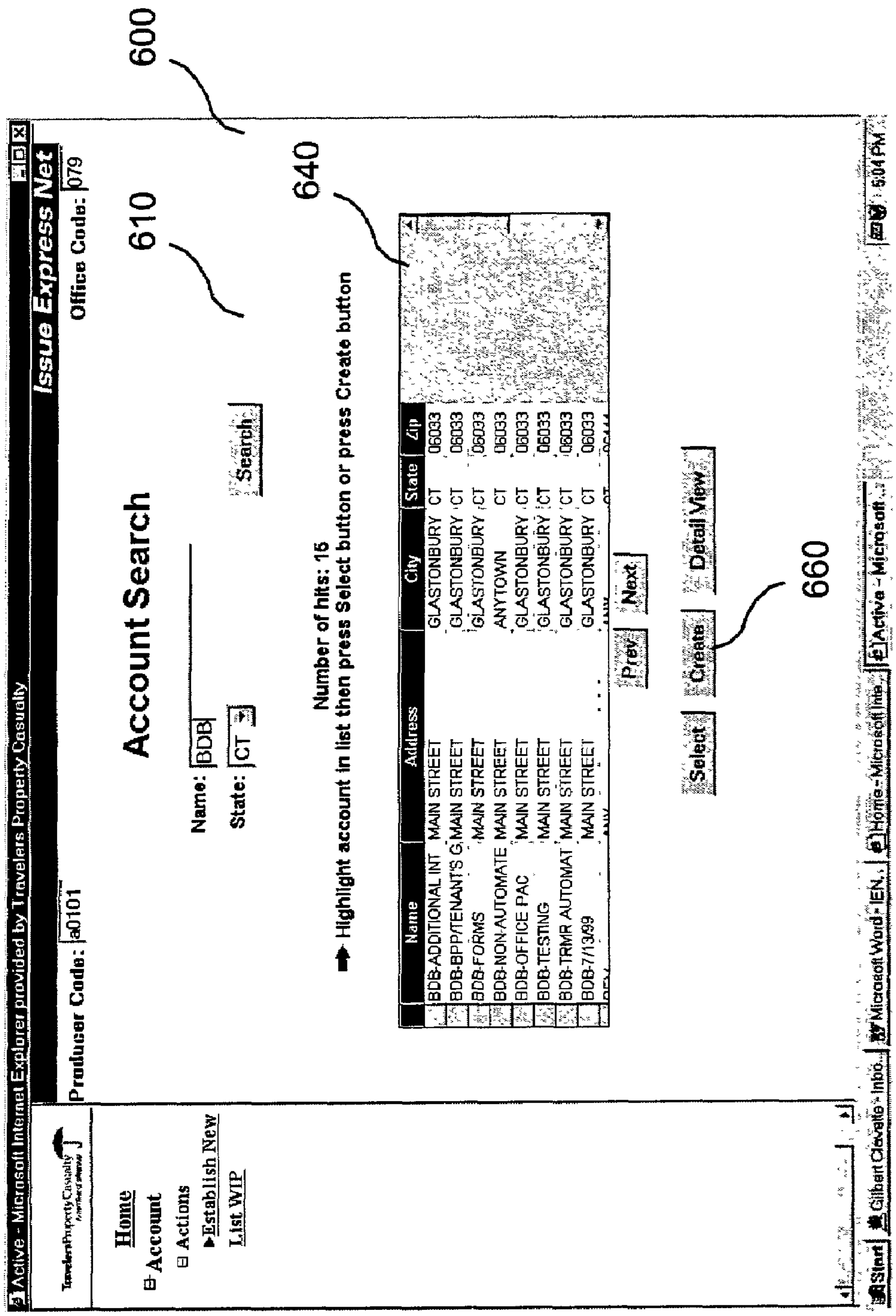
FIG. 6 depicts an Account Search/Account Clearing screen, in accordance with an embodiment of the present invention.

Once the Rate/Quote/Issue link is accessed, a Special Message screen 500 as shown in FIG. 5 will be displayed with a "news headline" approach. If the user wants more information about the headline, then the underlined hot-link, such as the Click here to see Saturday hours link, can be clicked to view a pop-up window 520 of the detailed message. These special messages may be authored by the user's home office or local system administrator. If it not the first time that the user accesses the insurance application, and the user wishes to continue with an existing account establishment already in progress, the user can click on the List WIP link in the Navigator 510. The user will then be shown a list of works in progress in an Account Summary screen, from which the user can choose one to continue work. The Account Summary screen will be described later with reference to FIG. 9. If the user accesses an insurance application, such as a commercial-lines insurance application, for the first time, the user must choose Establish New from the Navigator 510 for the Account Establishment/Policy Issuance process. According to an embodiment of the present invention, a DOS-type window may appear on the screen. This is cleaning off old files. The user may also see some "File Not Found" messages flashing through, which can be ignored. This "DOS" window closes without user intervention. The user may then receive a window asking permission to download some files. The user grants the download permission and the download runs fully. Once the download is completed, another download-related pop-up window will appear asking if the user wants to now install and run the CAB files. The user clicks YES to this window and allow the files to unpack and install themselves. When the pop-up window disappears, an account search screen 600 as shown in FIG. 6 appears, wherein the user can proceed with an account search. If the user is an Internet user, he or she may receive a security warning about sending information over the Internet, whereby the user can click on the "Don't Display this Message in the Future" checkbox so as not to be bothered with that message in the future. According to an embodiment of the present invention, the user may run through another file download pop-up window on a deeper screen, whereby the user can proceed according to the instructions above for facilitating the download and installation. Once these two downloads have processed, the user will not need to run through this on the same user's machine again. However, if the user uses another machine to access the legacy insurance application via the web-based GUI of the invention, the user will need to run through the CAB download process again for that other machine. Likewise, the user should also run through the process if a new version of the CAB files are released.

Referring now to FIG. 6, the Account Search page 600 is used to screen the existing set of accounts written or currently being quoted with the host insurance company. The search is against the Customer Information File (CIF) maintained by the host insurance company in its host insurance system. The user can search for a new account by typing in account name and principle state at the Name field and the State field, respectively. Once such information is entered, the user can click the "Search" button in the action area 610 to scan the CIF for any records matching, or closely matching, the user's search criteria. From the list developed by the search, as shown by the grid 640, the user can scan the names and addresses to see whether there is a current record of the risk (i.e., the insured). If the user has located the record for the risk in question, he/she can click on the grid 640 to highlight the row and then click the "Select" button to begin the account establishment (see FIG. 8). If the risk selected is currently in use by another agency, an informational message will appear indicating such use. Select field offices may click a Detail View button to display account level information such as the account full name and address, agency owning the account, etc. . . . to help with Broker of Record issues. Note that if the user is an agent, as shown here, he/she does not have access to this button. If the risk the user is quoting does not appear, the user can click on the "Create" button 660 to begin establishing the account (see FIG. 8).

The Account Name search runs a sophisticated search against the CIF for names that match or closely match the user's search name input. Punctuation and "noise" words such as 'the,' 'and,' 'company,' inc.,' 'city of' or 'town of' are ignored during the search process. Capitalization is also ignored. From the resulting significant words, a search is run against the first two significant words within the database of account names. The search engine will also manage potential misspellings in the key words. If names are found that match or closely match your search name, then the results are displayed and further searching stops. If no hits are found, then the search engine switches the order of the significant words and runs the search again. If matches or near matches are found, then the results are displayed and further searching stops. If no hits are found after this second search, then the system will display results that "sound like" (Dictionary Search) the user's search text. For the best results, two or three words should be used in the user's search. It is important to make multiple search attempts prior to creating a new account. The user may wish to run a search for the legally filed named insured as well as separate searches for DBA or TA names. If the user's risk includes a listing of partners, then individual searches should be run for each partner name. If the user gets blocked on his or her own account, this is probably a result of the user having multiple Producer Codes. The user should change the Producer Code and re-run the search to open the account for their access.

Figure 8:
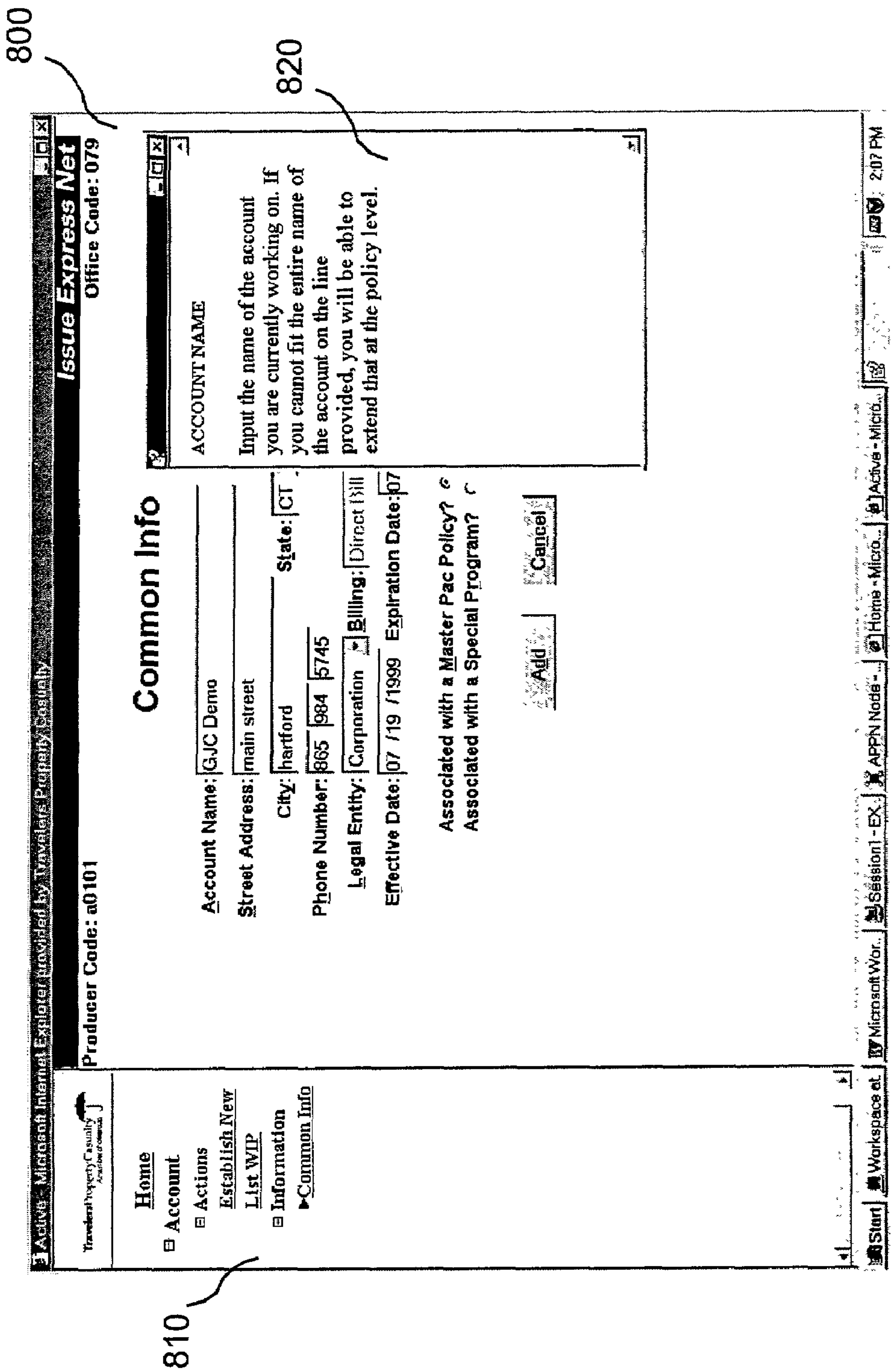
FIG. 8 depicts a Common Information screen for account establishment, in accordance with an embodiment of the present invention.

FIG. 8 shows the resulting Common Information screen 800 for account establishment after the account search or account creation. To modify information on an existing account, the user can modify the information already contained in the various entry fields of screen 800. To create an account, the user can enter information into those entry fields which initially will be blank. The phone number is captured in screen 800 during account establishment so that the chosen insurance application, such as a commercial-lines insurance application, can interact with the host insurance system for effective phone number blocking. On the insurance application side, users are blocked from selecting an account that they don't own. A benefit of using the CIF is that the "Select" button of FIG. 6 can recognize the existence of accounts that are written by other business units.

Figure 7:
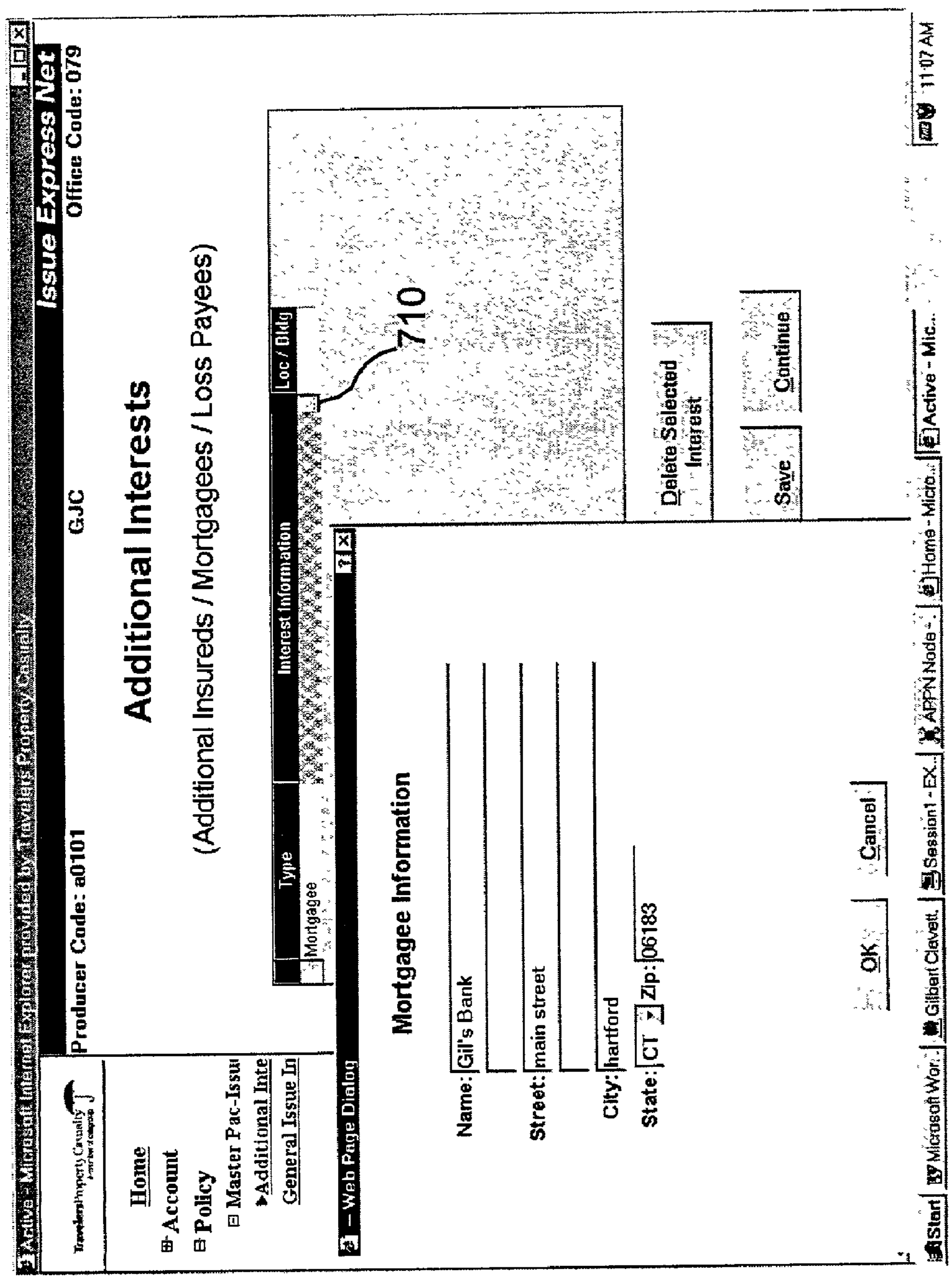
FIG. 7 depicts a screen having an ellipse button, in accordance with an embodiment of the present invention.

As shown in FIG. 6, the web-based GUI of the present invention uses grids extensively to collect policy data. Some key features include a question mark button, an ellipse button, selecting a row, and sorting grids. The question mark button in a cell is for running, for example, Help Wizards on some items. The ellipse button is used to indicate that additional information for the cell exists or needs to be input. FIG. 7 shows examples of these key features. The ellipse button 710 in the Interest Information cell, is used to access a pop-up window that collects the interest information such as full name and address. For selecting a row, in many instances the user can select a row in a grid to take action on that row, such as delete. The easiest way to select a row is to click on the small colored (e.g., gray) block to the left of the row. For sorting grids, some grid headings can be used to trigger a sort of that column. This feature is useful on the List WIP page.

As shown in FIG. 8, the web-based GUI also offers extensive help. Users are encouraged to use this help to get an orientation of the screen and to find out particulars of a specific prompt. To get help for a specific field, the user can click once in the field in question and then press the 23 key on the keyboard. This will present a help pop-up, such as the pop-up window 820, discussing that data entry field. A click on the close button will remove the help pop-up. To get help about the screen overall, the user can click once anywhere in the page body other than in an input field, then press 23. A pop-up window will appear discussing the overall screen usage and the screen buttons. This help window also provides a listing of all the screen fields as well as hot-links to the individual help topics. Help for grids and fill-in forms is available via the full screen help window.

As shown in previous figures, the Navigator of the web-based GUI of the present invention displays a listing of actions and screens that the user can access. Depending on where the user is located and what the policy status is, the Navigator expands and contracts dynamically. In other words, the Navigator shows only the selections that make logical sense based on where the user is located and what the user is doing. Some Navigator labels are shown preceded with a "+" or "−" sign. These hot-spots can be used to collapse or expand the selections. The Navigator can be used to 'jump' back to previously visited screens.

Figure 9:
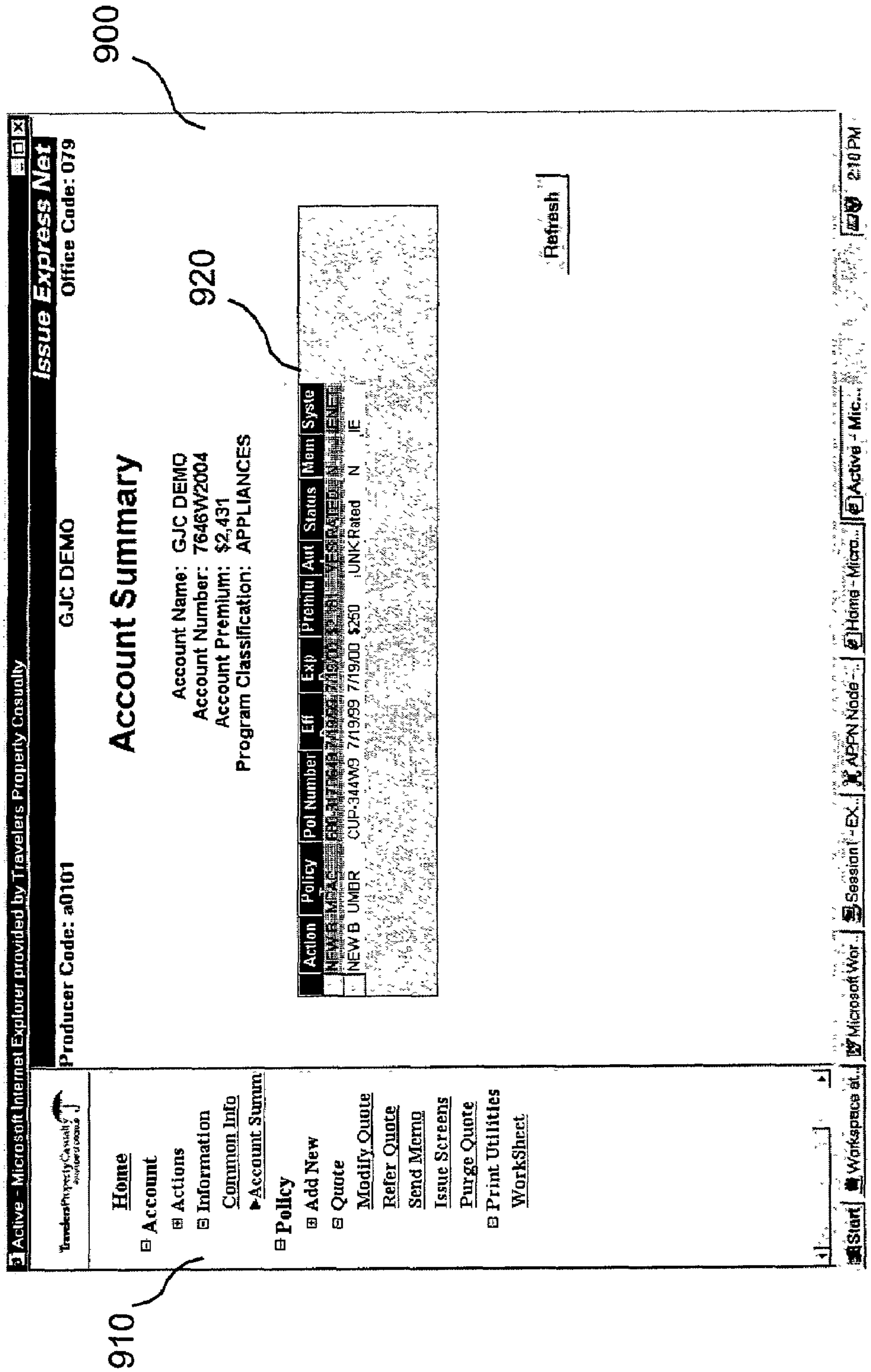
FIG. 9 depicts an Account Summary screen, in accordance with an embodiment of the present invention.

As will be shown in the later figures, the web-based GUI may include the use of screen buttons in the action area of a screen. Some of these buttons include the "Continue" button, the "Previous" button, the "Refresh" button, the "Update the policy status and see the rated premium" button, the "Save" button, the "Return to Account Summary" button. The "Continue" button is used to proceed from one screen to the next logical screen in the flow. Some screens offer a "Previous" button to page back a screen in the web-based GUI of the present invention. The user can also use the Navigator to jump to previous screens. The Account Summary page (FIG. 9) offers a "Refresh" button to update the policies and statuses in view. The "Update the policy status and see the rated premium" updates the Net Account Summary screen with the latest information from the host insurance system. Some screens offer a "Save" button to force a save of the user's keyed data while on a screen. The user can use this while keying long schedules of Additional Interests, for example. For Workers Compensation (WC) insurance applications, the "Save" button is used to save optional State Plan data. The user can click this button when applying state rating plans prior to hitting the "Rate" button; the user's rating will not include the state plan data. The Scorecard, Worksheet and Policy Output pages offer a "Return to Account Summary" button. The user can use this button to quickly navigate out of the these pages back to the common Account Summary page (FIG. 9). One letter within the label of each button is underlined. The user can press "Alt" plus the underlined letter to trigger that button. For instance, the user can use "Alt+C" to Continue rather then scrolling the page and clicking with the mouse on the user's machine.

Figure 15:
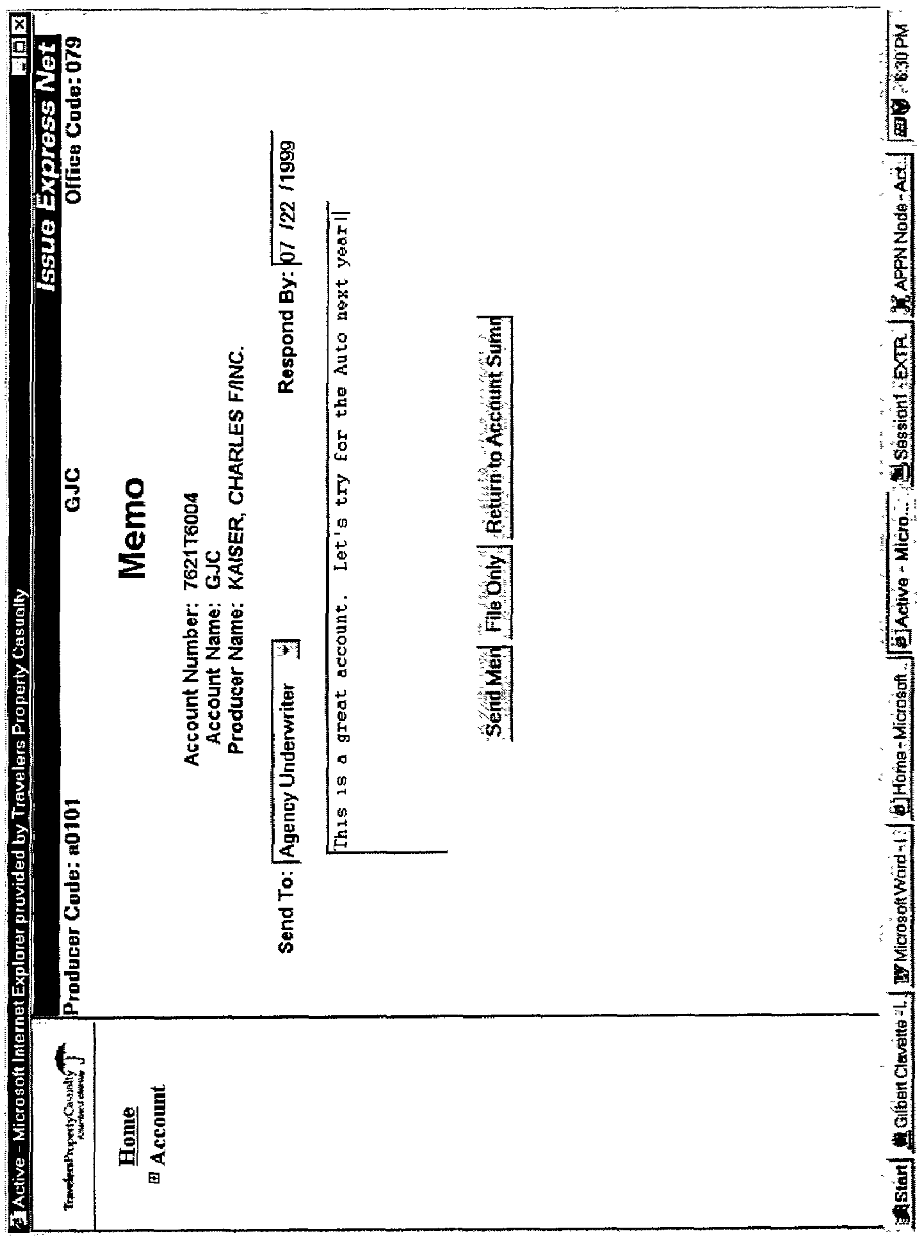
FIG. 15 depicts a Memo screen in accordance with an embodiment of the present invention.

Once an account is established either by a successful search of the CIF or a creation of a new account in FIG. 8, and the user clicks on the Add button on screen 800, an Account Summary link will appear under the Common Info link in the Navigator 810. A click on the Account Summary link will display the Account Summary screen 900 shown in FIG. 9. Additional links will also appear under the "Policy" folder in the Navigator 910. The screen 900 shows a grid 920 listing of the insurance policies available in the established account. The user then can click on the "Quote" option to open up a number of links, including: "Modify Quote" for modifying the quote of a particular policy listed; "Refer Quote" for referring the quote; "Send memo" for sending messages, as shown in FIG. 15 discussed below; "Issue Screens" for proceeding to issue screens for the particular quote, and "Purge Quote" for deleting a quote already of record. The "Send Memo" link allows messages to be sent.

Figure 14:
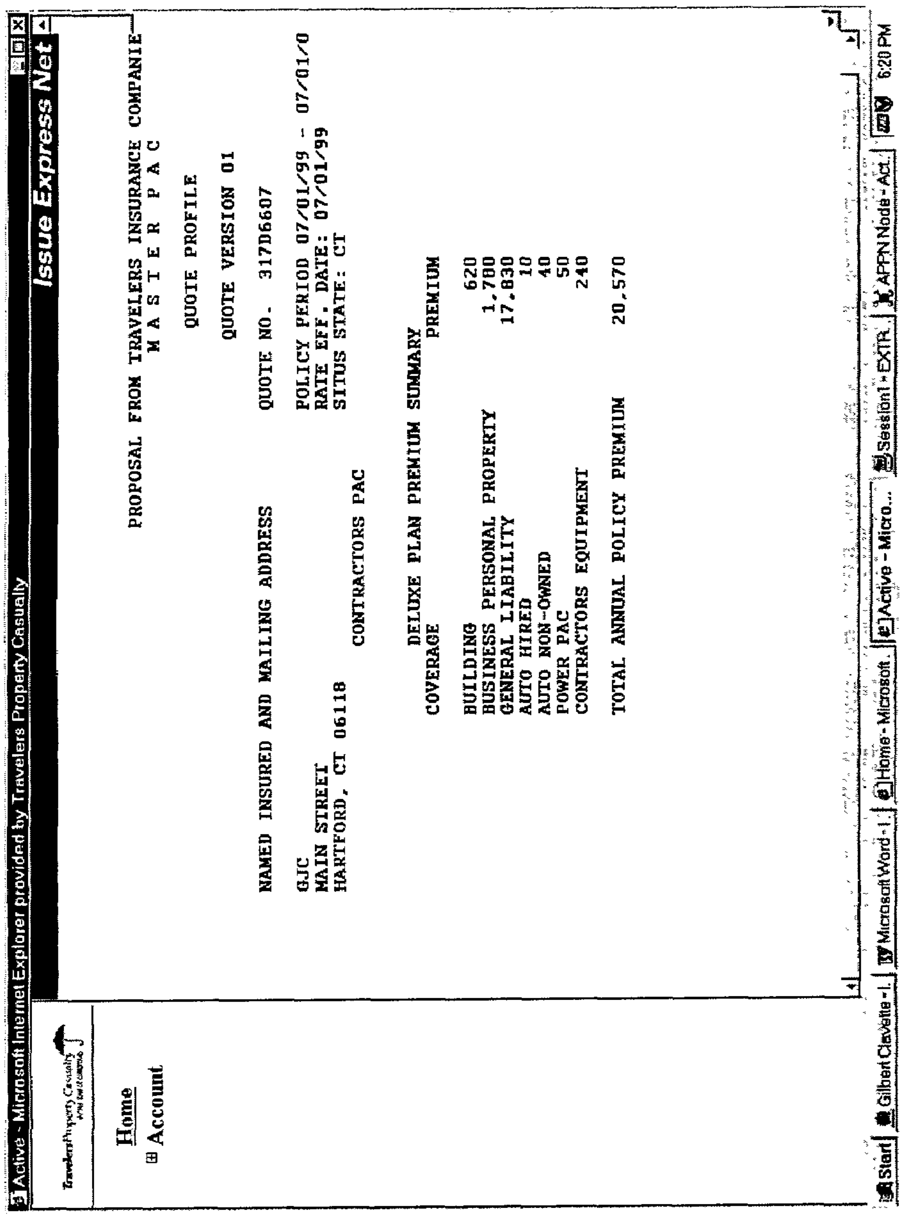
FIG. 14 depicts a Worksheet screen in accordance with an embodiment of the present invention.

Furthermore, under the "Print Utilities" option, the user can click on the "WorkSheet" link, which presents the worksheet image for the policy highlighted in the policy grid shown in FIG. 9. FIG. 14 shows an example of the worksheet image. The user can scroll or page down to the bottom of the worksheet page and choose the Print Worksheet button (not shown) or the Return to Account Summary button (not shown).

The user also has the ability to add a new quote by clicking on the "Add New" option under the "Policy" folder in the Navigator 910 of FIG. 9. The user can then add a new quote for an insurance policy, such as a business owner's policy, Automobile insurance coverage, workers compensation insurance, umbrella insurance coverage, etc. If the established account is a newly created account, the user does not have the aforementioned "Quote" option, but only the "Add New" option under the Policy folder to add a new quote.

Figure 10:
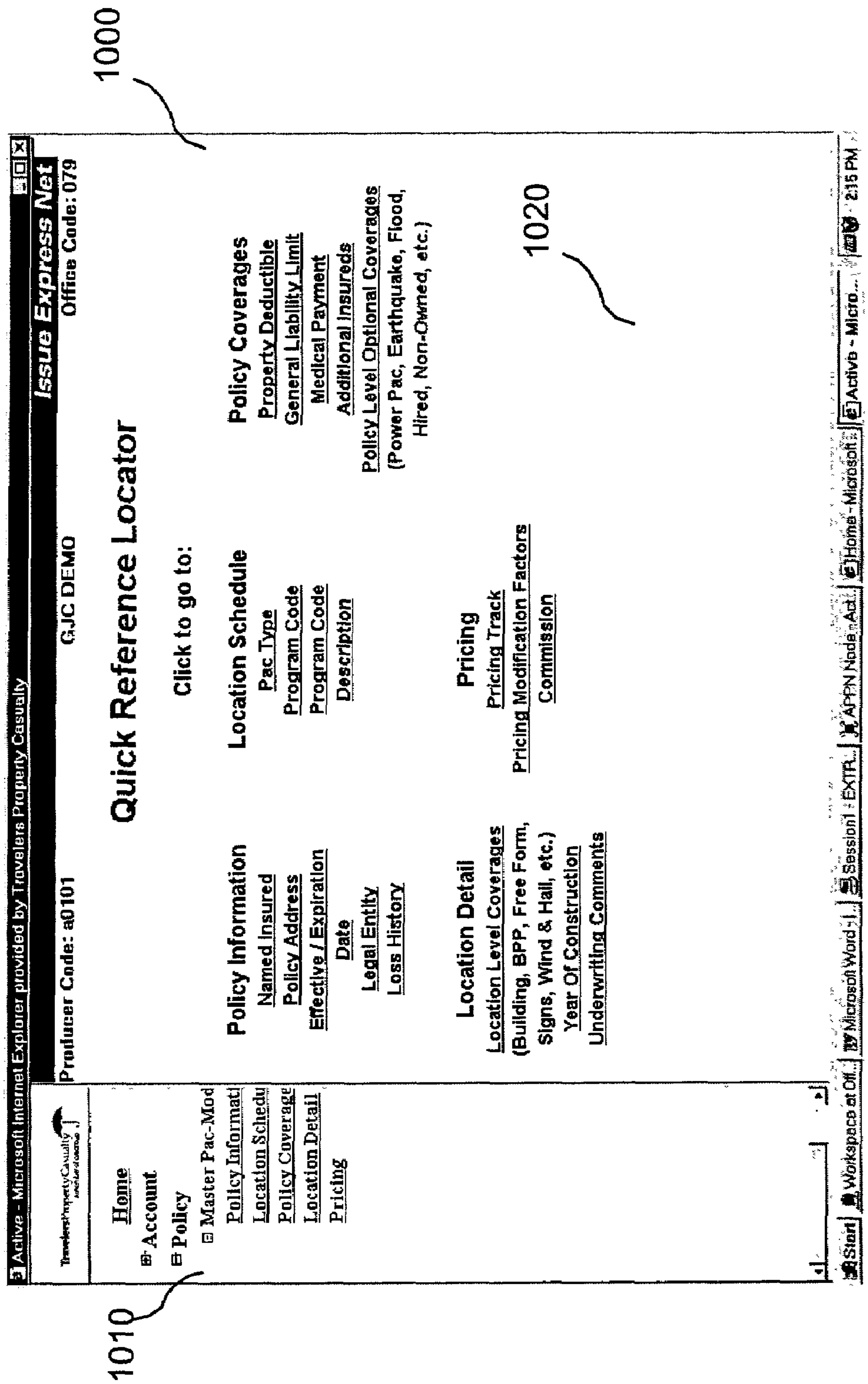
FIG. 10 depicts a Quick Reference Locator screen for a MasterPac quote, in accordance with an embodiment of the present invention.

When modifying a quote by clicking on the "Modify Quote" link, a Quick Reference Locator (QRL) screen will appear for the selected policy in the grid 920. FIG. 10 shows a sample QRL screen 1000 for a Travelers MasterPac quote for a business owners policy. The QRL provides a directory of and direct access to the available screens for a particular policy quote or issuance of an insurance policy. This locator also lists the prompts and the screen to which they belong. A click on the prompt label will move the user to the specific screen to which the prompt belongs and into a specific field of the screen to which the prompt is associated. For instance, if the user clicks on the Named Insured link under Policy Information in the action area 1020, the user will be shown a Policy Information screen for the MasterPac quote, with the cursor in the "Named Insured" field.

This locator page builds dynamically based on which screen the user has accessed. If the user keyed just the Policy Information link and the Location Schedules link in the Navigator 1010, for instance, then the user will only have the prompts for those two screens listed in the action area 1020. If the user modifies items that normally impact or cause derivations on subsequent screens, (e.g. Policy Effective Date) then the user may not want to make the change then jump directly to a subsequent screen that requires information from all previous intervening screens. For example, when changing the effective date, there might be impacts to factors in screens between the effective date screen and pricing screen that affect pricing. Thus, the "Continue" button should be used to page through the screens so that any new items can be derived and any new data items collected. Changing items that do not cause derivations on subsequent screens, like the Named Insured, will support the user jumping right to the Pricing screen.

Figure 11:
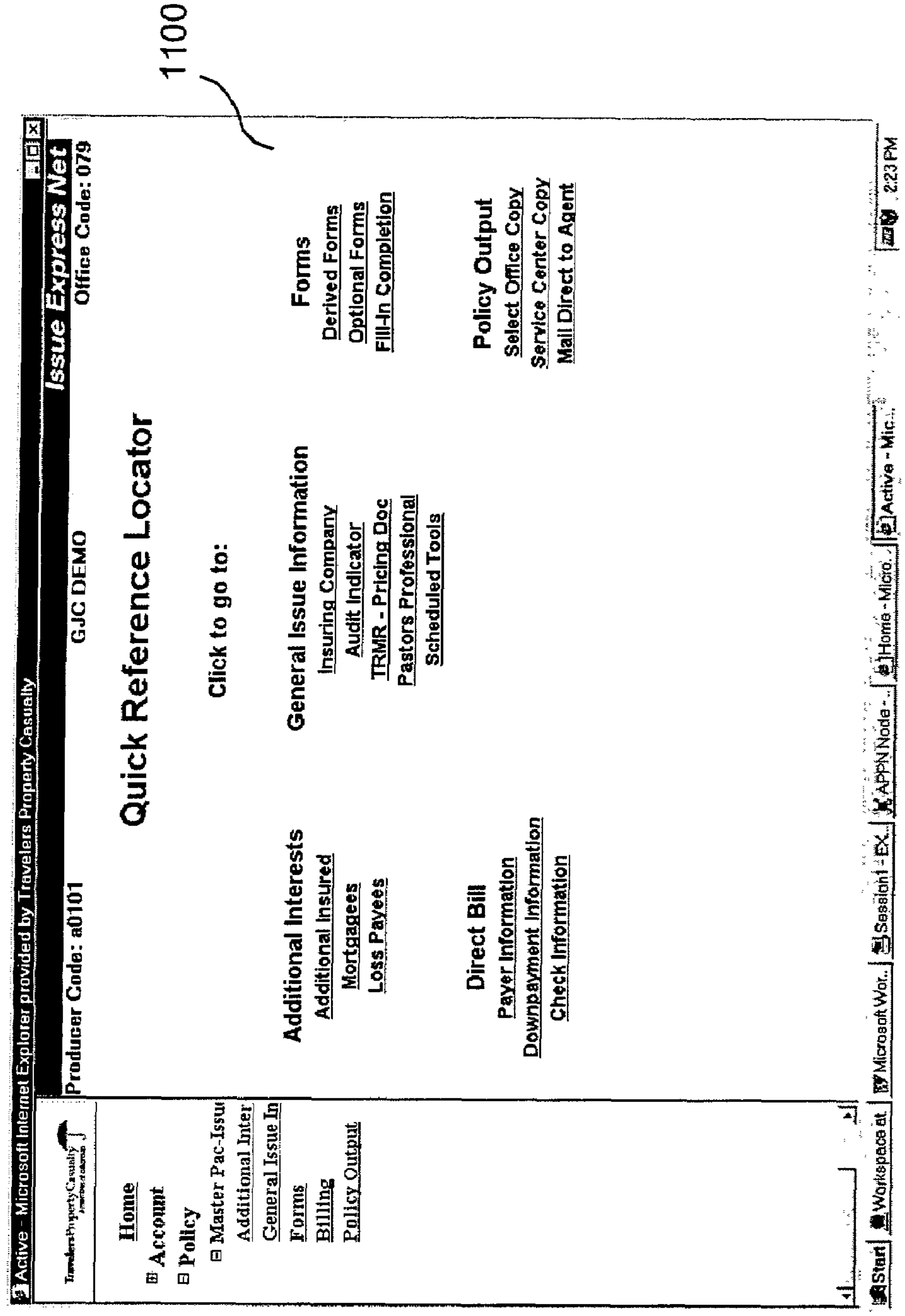

When issuing a quoted policy by clicking on the "Issue Screens" link shown in FIG. 9, a QRL for the Issue screens of the insurance policy highlighted in grid 920 will appear. FIG. 11 shows a sample QRL screen 1100 for the Travelers MasterPac issue insurance application. Like the quote locator, the Issue locator of FIG. 11 builds dynamically to just the screens that the user has previously accessed. For the screen 1100, the Additional Interests and General Issue Information picks will always appear on this screen. If the user has no additional insured, mortgage or loss payees, then the user can go right to the General Issue Information page to continue with the policy issuance.

Figure 12:
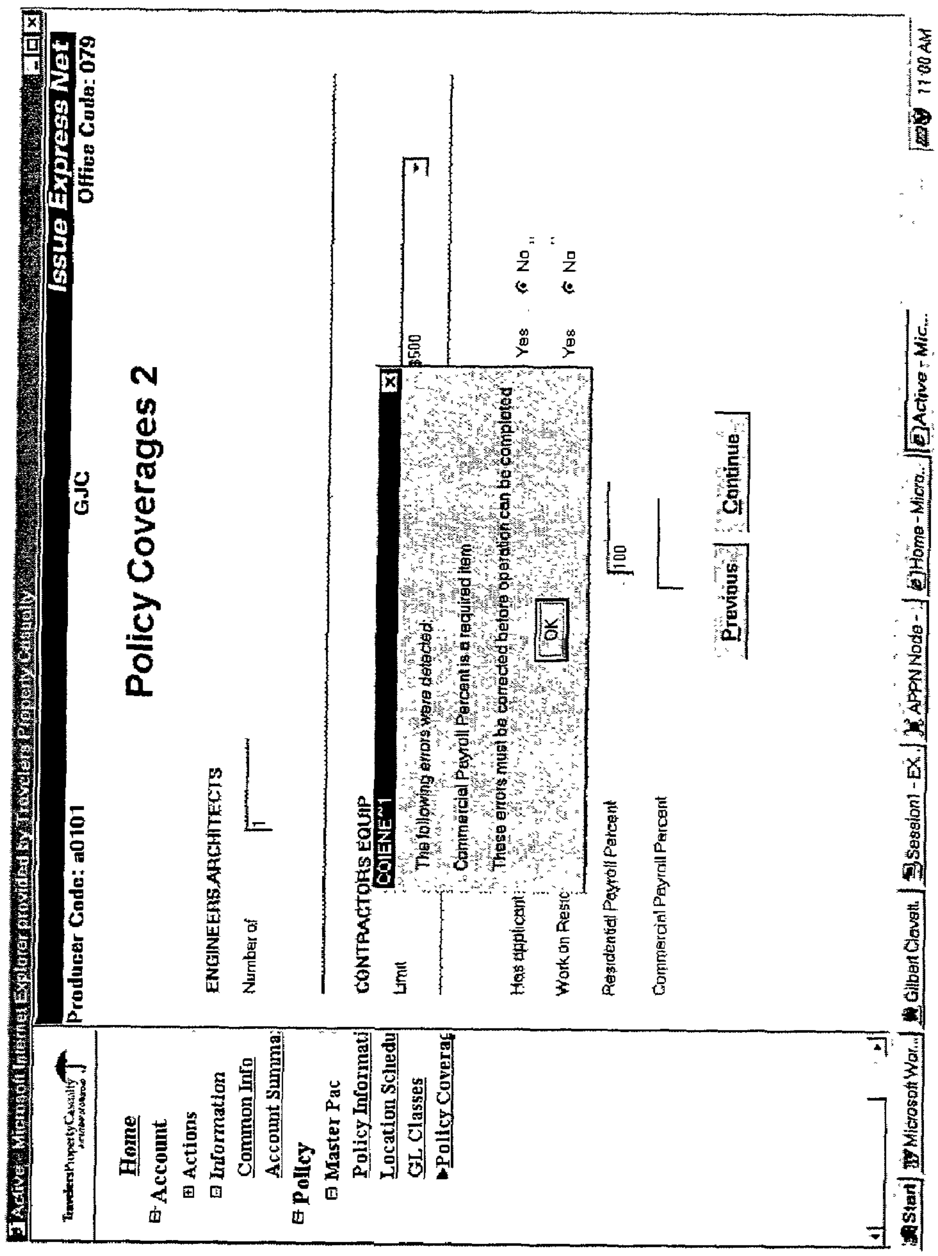
FIG. 12 depicts a prompt-related error messaging pop-up in accordance with an embodiment of the present invention.
Figure 13:
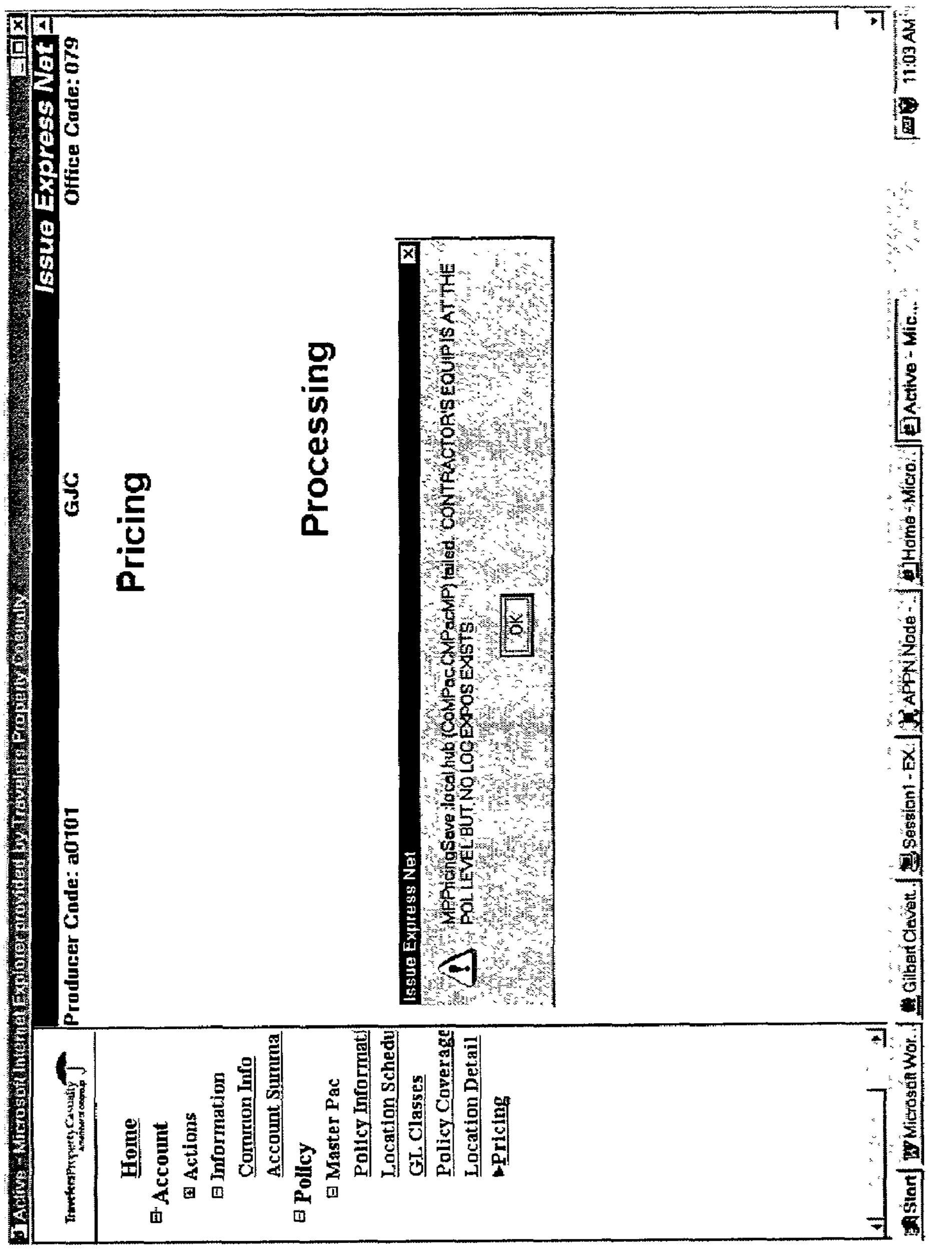
FIG. 13 depicts a cross-screen error messaging pop-up in accordance with an embodiment of the present invention.

Error messages can occur on individual screens and during the rating process. These errors may pertain to a required prompt being left blank. Alternatively, the error may suggest a conflict between items on multiple screens or on the same screen. The error messages provide a clear enough indication of the problem. Some error messages are technical in nature and cannot be fixed by the user. When these errors occur, the error message will indicate that the user should call a designated helpdesk or hotline for resolution. When Rating Errors occur, the user can use the Rate Error pick from the Navigator to view the error details in most cases. FIG. 12 shows an example of a prompt-related error message. FIG. 13 shows an example of a cross-screen error message.

Figure 16:
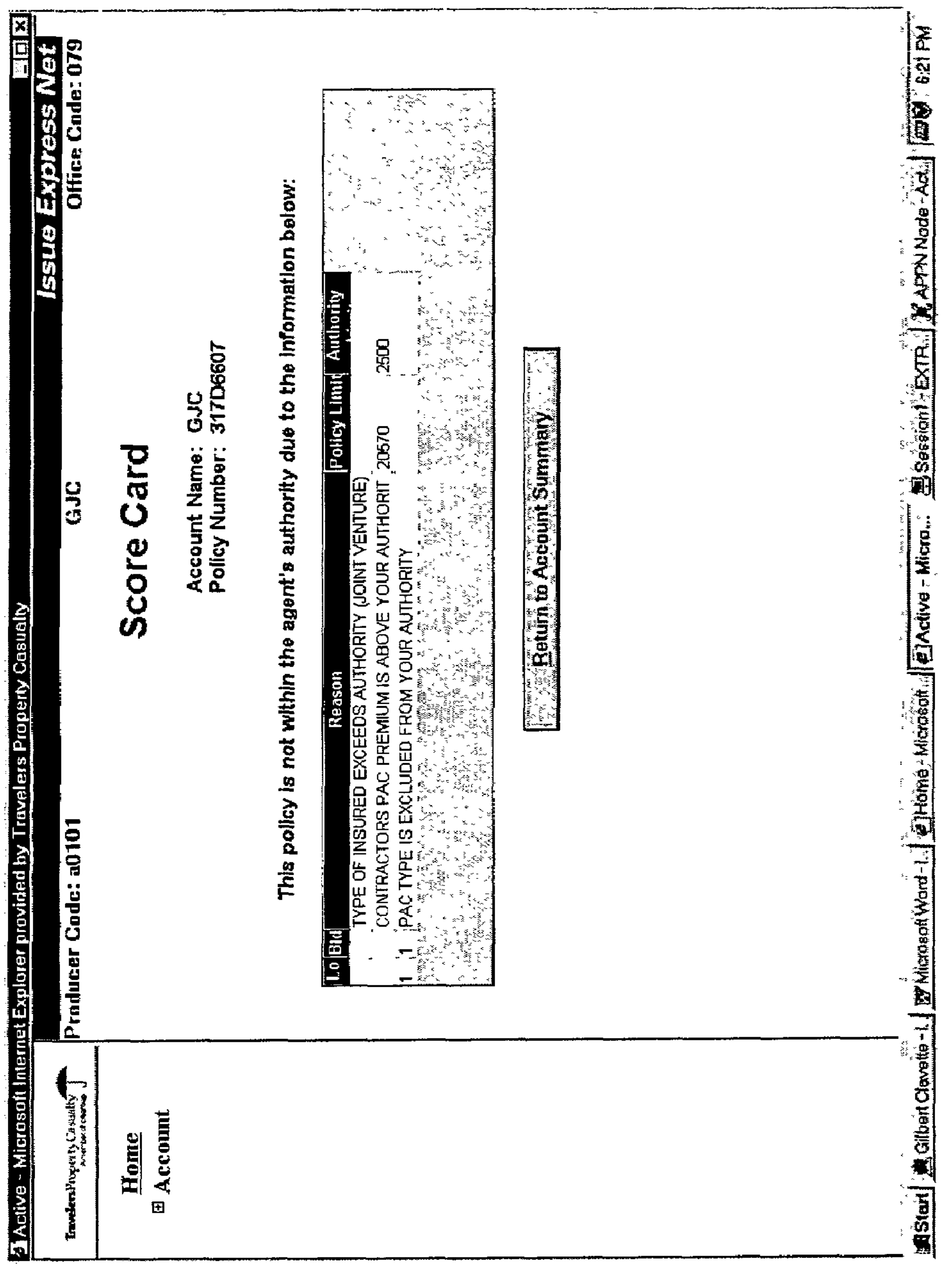
FIG. 16 depicts a Scorecard screen in accordance with an embodiment of the present invention.

If the policy chosen in the Account Summary screen (FIG. 9) is out of the user's authority, a Scorecard screen as shown in FIG. 16 will appear in the Navigator. The user can then click "Return to Account Summary" button to get out of the Scorecard and back to the Account Summary screen, where the user can click on the Refer Quote link, as described earlier.

Users, who include insurance agents, can also refer policies voluntarily by using the Refer Quote link shown in FIG. 9. Policies can also be referred when the user selects Issue from the Policy Output screen to issue a policy that is out of the user's authority. Like memos, referrals are delivered to the host insurance system via the Mailbox.

Figure 17:
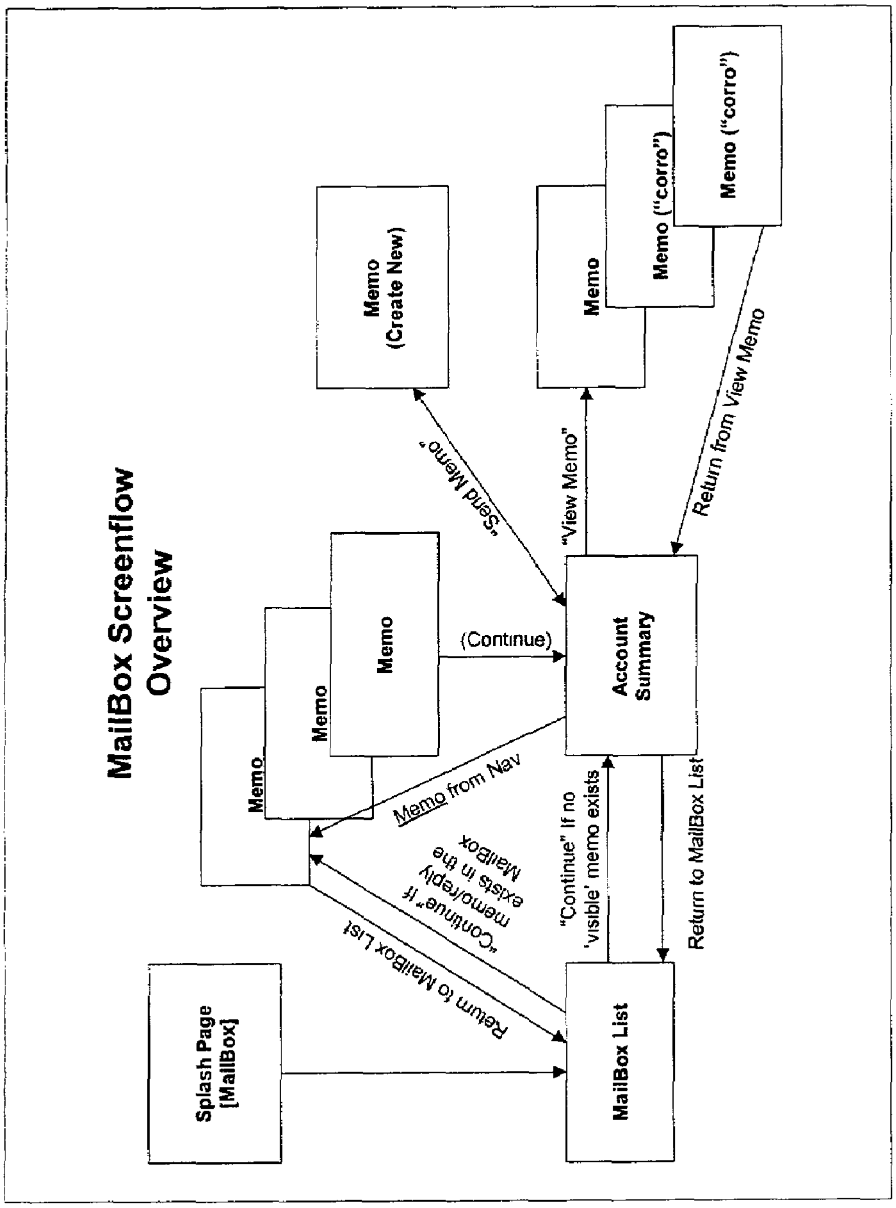
FIG. 17 shows an overview of a Mailbox screen flow in accordance with an embodiment of the present invention.

FIG. 17 shows an overview of a Mailbox screen flow. The MailBox List screen provides a means for agents and field offices to correspond with one another regarding a specific policy. In other words, the MailBox is not a free-form e-mail system. The design of the MailBox List is intended to replicate some of the functionality and ease of use found in today's e-mail systems. This includes a lists of new and old items, a way to branch off and view the message, a method of replying to the sender, and a method for managing the mail list itself. The MailBox List, rolls up the content of existing host Mailbox buckets or New Business. For agents, the MailBox List screen includes referral responses and incoming correspondence. For field offices, the Mailbox List screen includes incoming referrals and incoming correspondence.

The MailBox list screen or page appears when: 1) MailBox is clicked from the Welcome Page (FIG. 4). Clicking MailBox from the Welcome page launches the second browser—the same browser as would launch when the Rate/Quote/Issue link is clicked (as described later). 2) MailBox List link, subordinate to the new MailBox heading, is clicked from the Navigator. 3) "Return" is clicked from the Memo page (FIG. 15, as described earlier) and the user had gotten to that Memo screen via the MailBox List page. When on the MailBox List page, a MailBox List link subordinate to the MailBox heading will appear in the Navigator and will have a red 'current location' marker in front of it. If the user clicks on MailBox from the Welcome page of FIG. 4 or clicks on MailBox List from the Navigator, and there are no messages to display in the list, then the MailBox List page will be displayed with the message "There are no items currently in your MailBox" in the page. When the user moves from the MailBox List directly to the Account Summary page, the policy Key is preserved, and that policy is highlighted on the Account Summary page with appropriate Navigator items displayed.

At initial display, the MailBox List presents a listing of both new and old messages. Various business events/facet manipulations are used to accomplish the following:

1) Contain the 'day one' deliverable to New Business only. However, this limiter is easily switchable to incorporate additional lines of business by function type; for example, turn on MasterPac Change and Automobile Renewals into the MailBox process.

2) The list is sorted by Date Sent with the most recent items listed at the top (considerate of Date/Time-Stamp).

3) New, unopened items may be presented in a visually stimulating font with open, read messages presented in a contrasting font. The host insurance system has indicators/switches that acknowledge new versus old items.

4) If a specific policy key (e.g., policy form/policy number/policy effective date) has more than one MailBox item relative to it, then present the policy key (e.g., policy form/policy number/policy effective date) only once on the list.

5) List Sorting Manipulations: For mixed types under one policy key, present the one type literal that is most 'important.' The displayed literal should be the highest of: Declination(±)/Approval(+) (most important), Referral(+), Reply (+), Memo (leased important). Display a "+" immediately following the literal if the policy contains multiple items (i.e. additional memos) subordinate to it.

6) Display the From and Regarding of the newest item (the one that drove the sorting).

7) Use the Date/Timestamp of the most recent item as the determinant in ordering the policy in the list (newest at top, oldest at bottom).

8) If any of the items within the mixed policy row is unread, then present the row in Red.

9) Show approximately 15 rows in the grid prior to going into scroll. Maximize the content of the grid given available page real estate.

According to an embodiment of the present invention, the MailBox List grid includes column headings that can be scaled. The user may drag the border between the heading and expand or contract that column. All column headings may be 'clickable' to launch a re-sort of the grid based on the column heading clicked. For the "Delete ?" column, if its heading is clicked, it is sorted such that the list with the unprotected cells are at the top, and the protected cells at the bottom. For the "Type" column, if it is clicked, then the grid is sorted in ascending alphabetical order. A second click returns the list to the original sort order. For the "From" column, if it is clicked, the grid is sorted in ascending alphabetical order. A second click returns the list to the original sort order. For the "Regarding" column, if it is clicked, then the grid is sorted in ascending alphabetical order. A second click should return the list to the original sort order. For the "Line" column, if it is clicked, then the grid is sorted in ascending alphabetical order. A second click returns the list to the original sort order. For the "Latest Action" column, if Latest Action is clicked, then the list is switched to ascending order (oldest at the top, newest at the bottom). A second click returns the list to the original default sort order.

Regarding cross-screen impacts of the Mailbox List screen, from the Welcome page of FIG. 4, field users are not required to collect a Reporting Office and Producer Code prior to successfully launching the MailBox. If Recall Referral is chosen from the Navigator, then the user should move the original referral items from the mailbox (both the outgoing referral and the incoming referral). The Appendix shows the parameters and explanations for the page prompts/fields, page buttons, screen tabbing order, and warning messaging of the Mailbox List screen.

Referring back to FIG. 15 for the Memo screen, this screen is used to collect information for the sending of a memo or reply including the content of the message as well as an indication of where the message should be sent. The Memo page may display from the MailBox List, from a View Memo link or a Send Memo link on the Account Summary Navigator, or via "Send A Memo" pop-up windows during the policy issuance process. The policy key is preserved so that that such particular policy can be highlighted on the Account Summary grid when the Account Summary page is accessed. When accessing via the View Memo link, the memos shown will be any memo associated with that policy. In other words, there is no sensitivity or filtering based on type-of-work.

As shown in FIG. 15, the Memo screen displays fields and buttons conditionally according to at least the specifics documented in the present invention. Memos that have been sent back and forth between field office employees cannot be viewed by Agents. Further, memos that have been Sent To File by field office employees cannot be viewed by agents. The Help for the memo screen is specific to the display path that the Memo page was accessed from. Since the majority of the page display paths are static (with the exception of sending or replying to a memo), the help distinctions in terms of content will be at the page level. The distinct paths that would have separate Helps are: 1) Memo via Send Memo on the Account Summary (sending a new memo); 2) Memo via View Memo on the Account Summary (reviewing Historical correspondence); and 3) Memo via the MailBox List process, or 'Memo' from the Account Summary Navigator (different access paths, but same Help content). The Appendix shows the parameters and explanations for the page prompts/fields, page buttons, screen tabbing order, and messaging for the Memo screen.

Explanation is now made with regard to the quote/issuance process for a sample number of insurance policies and some of the web-based GUI screens a user may encounter during processing.

For a business insurance policy such as the Travelers MasterPac insurance policy, the general screen flow from account establishment to MasterPac quote to MasterPac issue includes the following screens: 1) Common Information (to establish the Account); 2) Account Summary (to add the MasterPac policy); 3) Policy Information; 3) Location Schedule; 4) General Liability (GL) Classes (Contractors only); 5) Policy Coverage; 6) Policy Coverages—2 (as shown in FIG. 12); 7) Location Detail; 8) Location Detail—2; 8) Pricing; 9) Account Summary (for Rating and to signal Policy Issuance); 10) Additional Interests; 11) General Issue Information (TRMR); 12) Forms (Search for Form); 13) Direct Bill; 14) Policy Output; 15) Account Summary (to view Issued status). Not all of these screens will need to be accessed on every policy.

Figure 18:
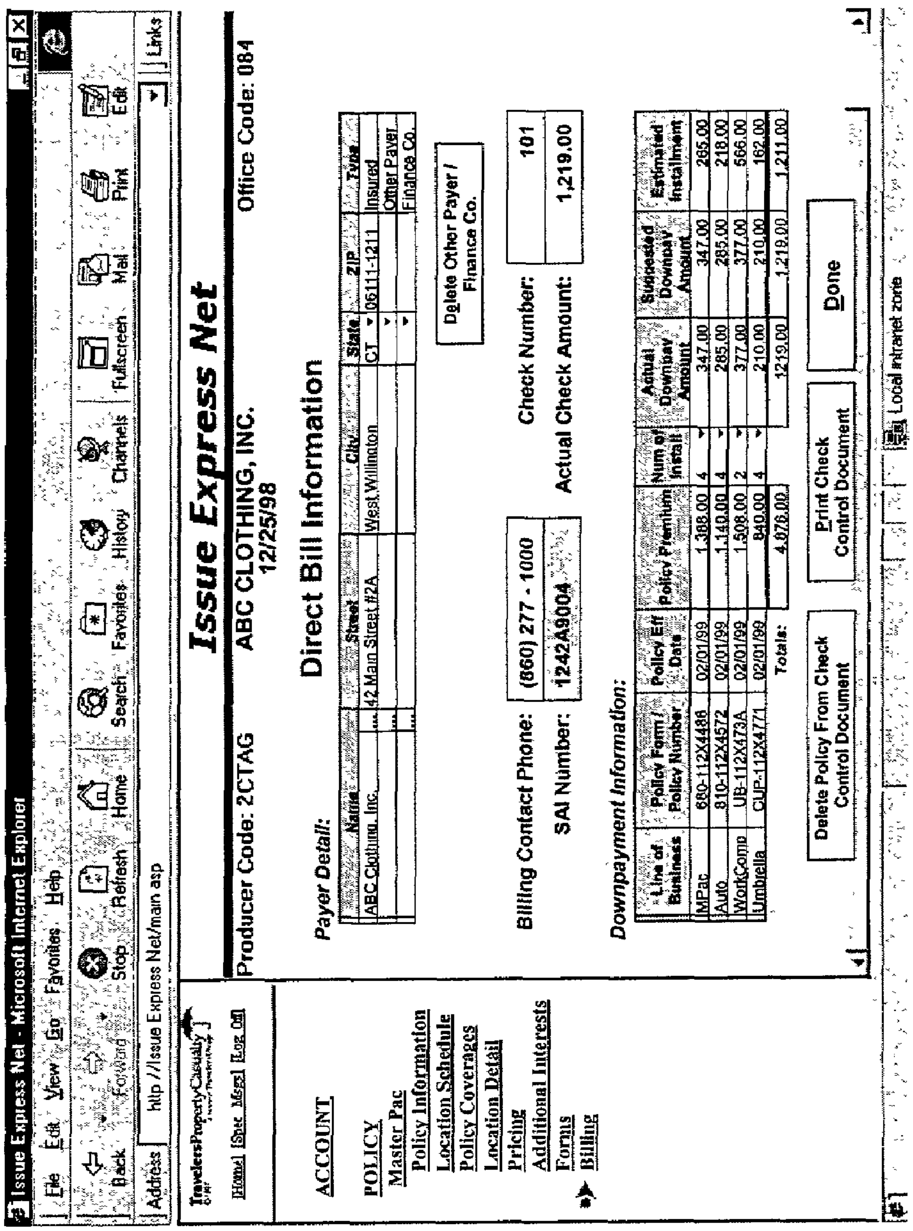
FIG. 18 shows the Direct Bill Information screen of the MasterPac issue in accordance with an embodiment of the present invention.

The Common Information screen and Account Summary screen have been described earlier with reference to FIGS. 8 and 9, respectively. FIG. 18 shows the Direct Bill Information screen of the MasterPac Issue. This screen displays as part of the full Issue Policy screen flow after the Forms screen and prior to the Policy Output screen. It can be directly accessed from the Navigator as the Billing link. This screen collects billing information such as billing name and address, installment plan and deposit information. The Payer Detail sections of the screen defaults to one record of the Insured and two blank rows for the potential capture of Other Payer and/or Finance Company. All other information on the page is prefilled/displayed with the exception of Check Number and Number of Installments.

The Payer Detail grid of the Direct Bill Information screen allows for the specification of the payers name and address. Usually, this is the Insured. This information is pulled from Direct Bill if an account record already exists and can be updated via changes to this grid. The Downpayment Information Grid of the screen provides a worksheet for the user to develop the appropriate downpayment premium. The grid displays the lines of business, policy form/policy number, policy effective dates, current policy premium from the host insurance systems, an installment plan per policy, the actual downpay amount, the suggested downpay amount, and an estimated installment column. On initial screen display, given the Payer State and Policy Premium, a Downpayment Amount will be calculated as a percentage of the total policy premium, e.g., either 20% if billing mailing address is Texas or 25% if anywhere else, and prefilled into the grid for each policy, then totaled. The Actual Downpay total back-fills into the Actual Check Amount field. If the user overrides the Actual Downpay total or the Actual Check Amount fields, the revised amount will be portioned over each line-of-business (determine what percentage the total check is against the total account premium, then use that percentage against each policy premium to determine the revised per-policy downpay amount). If the user types into the individual line-of-business Downpay Amount fields, then the downpay amounts will be added and displayed in the Total Downpay Amount and Check Amount fields. The display of policies in the Downpay Information Grid is pulled from the host insurance system and its insurance applications for the MasterPac policy. If the host insurance policy contains premium and is not Agency Billed and is not Direct Billed Off Account, then the policy record should be reflected in the grid. The Appendix shows the parameters and explanations for the page prompts/fields, modal windows, page buttons, screen tabbing order, and error messaging of the Direct Bill Information screen for a MasterPac issue. Because other screens of the MasterPac quote and issue are similar to those of other insurance policies, they will be discussed with reference to such policies later.

Another legacy insurance application that the web-based GUI of the present invention can be used to access is the quote and issue process for a Workers Compensation (WC) insurance policy. The general screen flow from account establishment to WC quote to WC issue includes the following screens: 1) Common Information (to establish the Account); 2) Account Summary (to add WC policy); 3) Policy Information; 4) State/Class Code; 5) State Plans/Pricing; 4) Account Summary (to obtain premium and to transfer to host insurance system).

Figure 19:
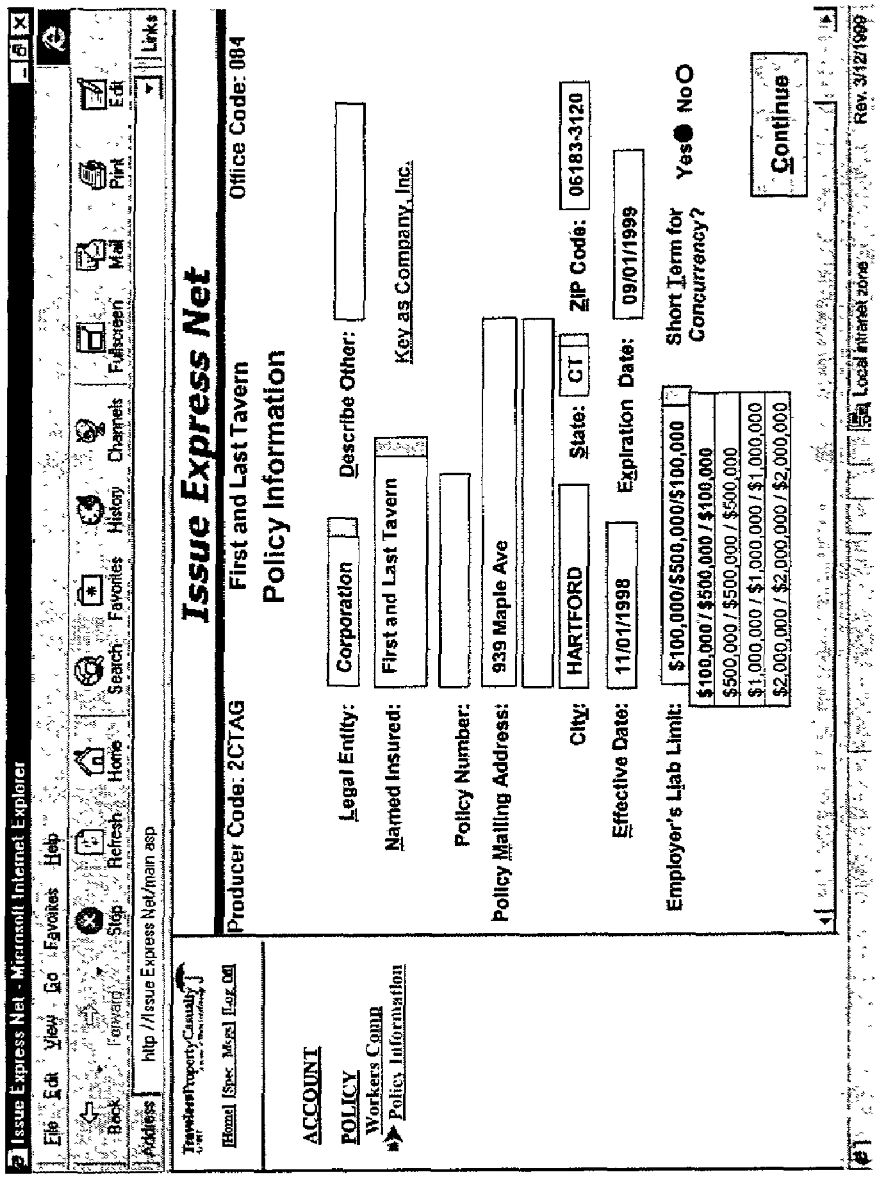
FIG. 19 shows the Policy Information screen of a workers compensation (WC) quote in accordance with an embodiment of the present invention.

The Common Information screen and the Account Summary screen have been described earlier with reference to FIGS. 8 and 9, respectively. FIG. 19 shows the Policy Information screen of the WC quote. This screen is a re-use of the Policy Information screen designed for the MasterPac policy. Minor changes have been made including the addition of two new prompts. The purpose of the screen is to collect data needed for the establishment of the WC policy on the host insurance systems as well as for one policy-level rating data element. The Policy Information screen in FIG. 19 displays as the first screen in the quoting of a WC policy and appears when the user has chosen Add New/Work Comp from the Navigator of the Account Summary screen (FIG. 9). The initial display of the screen presents some information from the submission level and a defaulted Employer's liability (EL) Limit. The screen contains a dynamic prompt when the policy term is short-term. When the Policy Information screen is displayed, the Navigator shows the Policy Information link under the Work Comp heading for workers compensation (WC). The link appears when the page is displayed and also after the screen has been completed so that the user can re-access the screen. The Appendix shows the parameters and explanations for the page prompts/fields, page buttons, screen tabbing order, and error messaging of the Policy Information screen for a WC quote.

Figure 20:
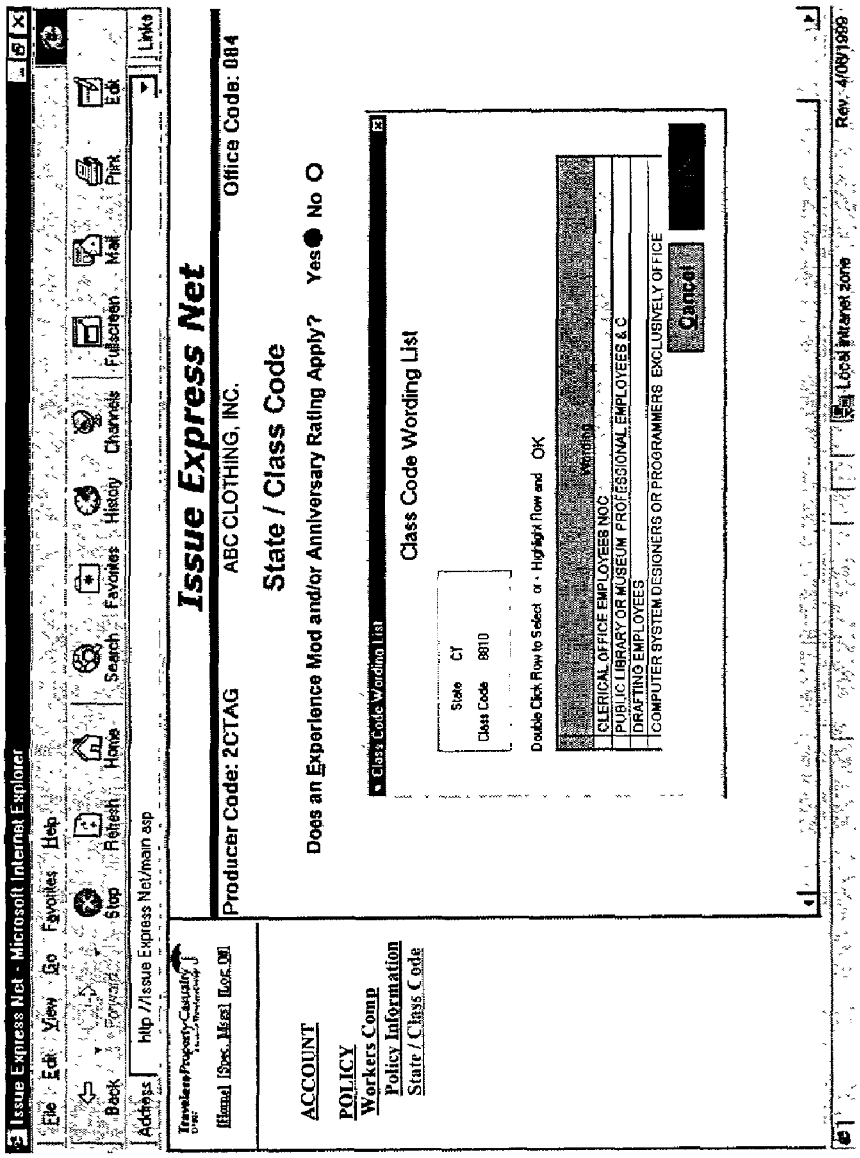
FIGS. 20-22 shows the State/Class Code screen of the WC quote in accordance with an embodiment of the present invention.
Figure 21:
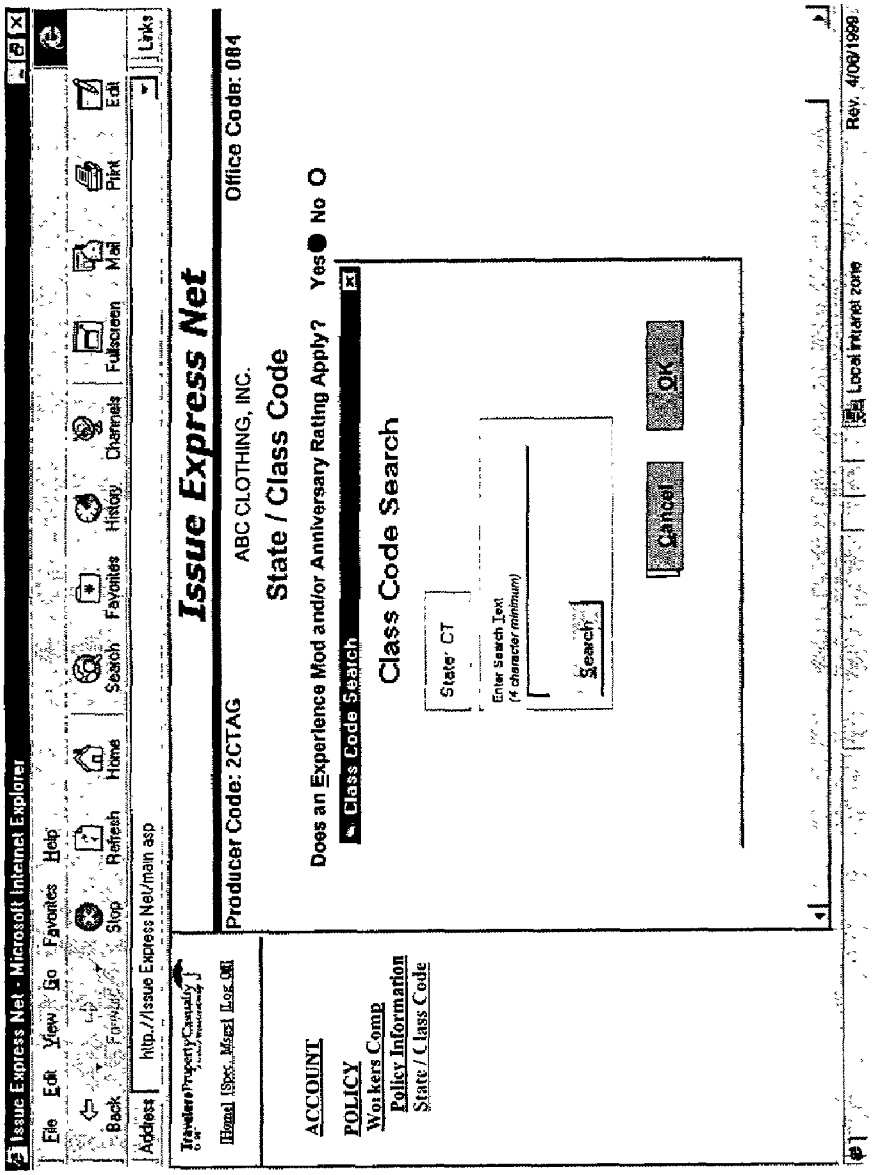
Figure 22:
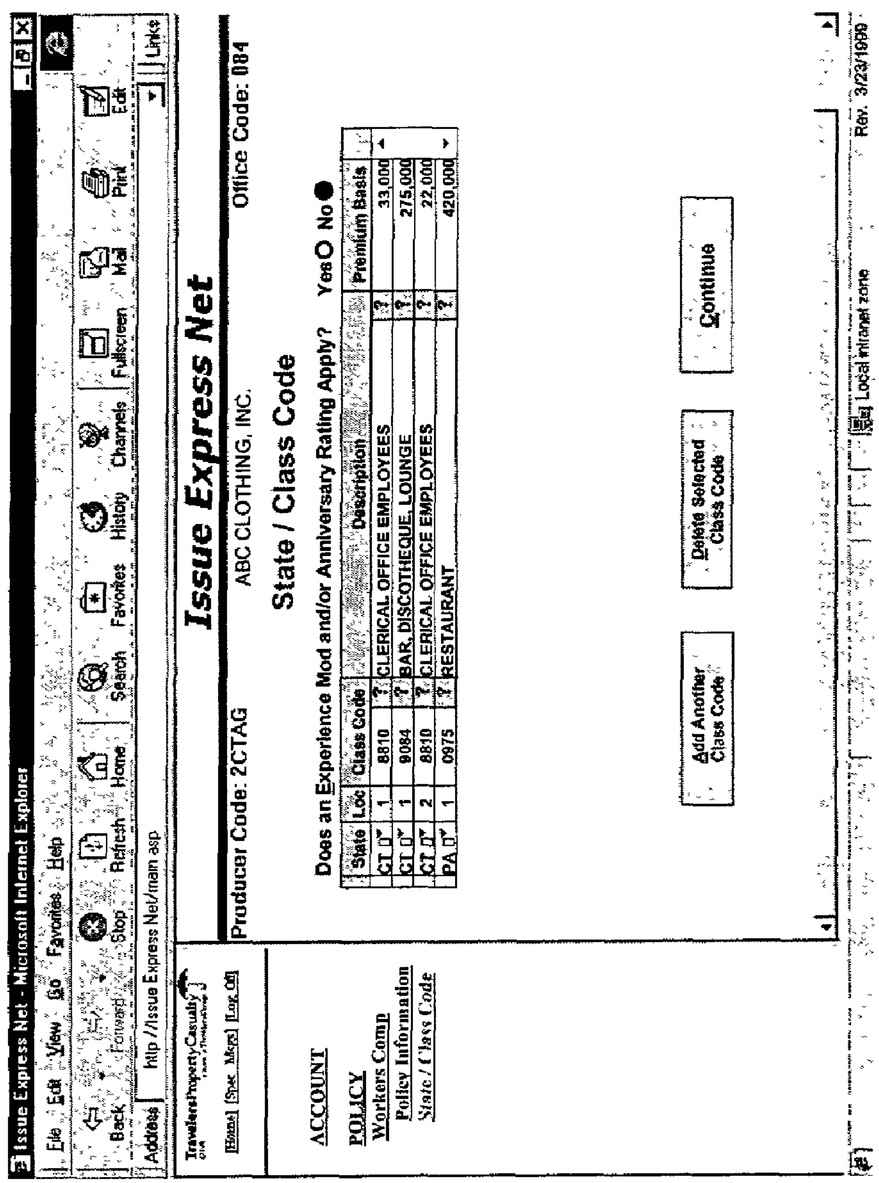

FIG. 20 shows the State/Class Code screen of the WC quote. Here, the user can select the state and the class code for the employees to be quoted under the WC policy. FIG. 21 shows that the user can also conduct a class code search instead of scrolling the grid in FIG. 20 to obtain the proper class code. FIG. 22 shows the resulting grid of the chosen states and class codes for the WC quote.

Figure 23:
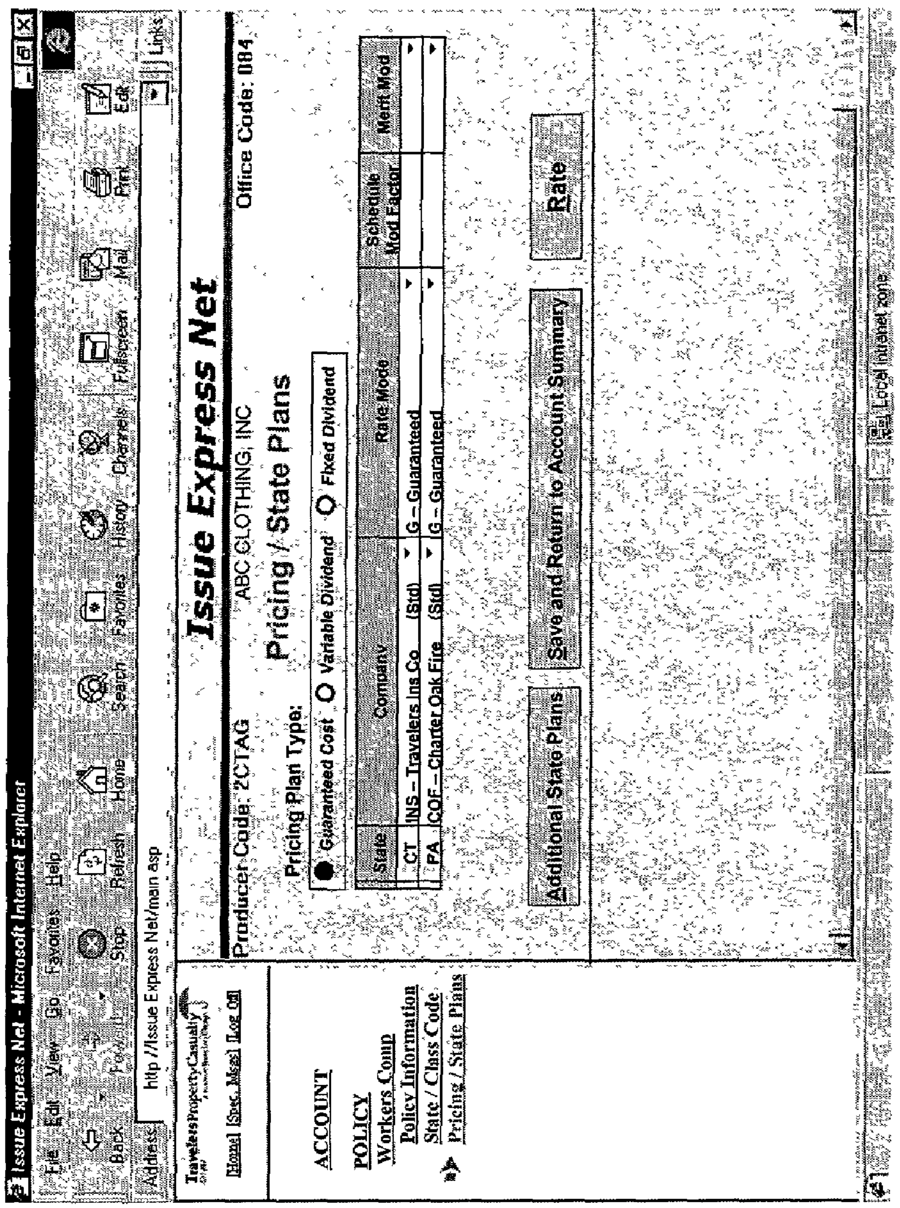
FIG. 23 shows the Pricing/State Plans screen of the WC quote in accordance with an embodiment of the present invention.

FIG. 23 shows the Pricing/State Plans screen of the WC quote. This screen displays automatically after the State/Class Code screen has been successfully completed or by selecting the Pricing/State Plans link from the Navigator. The Navigator always shows the Pricing/State Plans link whenever the page is open and whenever the page has been completed. The Pricing/State Plans screen initially displays prefilled with the states and a default company and rate mode for each state. The screen has no modal windows. It is used to collect pricing information and state-specific rating options (programs). A grid is displayed, one row for each state, to capture the individual pricing Company, Rate Mode, Schedule Modification (Mod) and Merit Mod. The state grid itself can become scrollable if more than a predetermined number of states are on the policy. If additional states plans are selected, then the bottom portion of the screen expands, scrollable if needed, to present and collect the additional programs.

If no change is needed for the pricing method, pricing company or rate mode, and no additional rating elements are needed, then the user can click on the "Rate" button to proceed to the Account Summary screen to get the quoted premium. According to an embodiment of the present invention, all defaults on this screen are appropriate and complete. Knowing the states on the policy, the screen can dynamically present only the combinable companies and rate modes for the various pricing methods for each state. Once the grid is completed, the user may, if needed, select a state row and click Additional State Plans. Only one state detail section will be presented at one time. Knowing the state, class code conditions and pricing grid selections, a dynamic list of optional state rating programs can be presented on the lower section of the page, using the scrollable screen. The user may add values into the additional state programs to indicate their inclusion on the policy. With regard to cross-screen impacts, if states are added via the State/Class Code screen, then this screen will re-display. The Appendix shows the parameters and explanations for the page prompts/fields, page buttons, and screen tabbing order of the Pricing/State Plans screen of the WC quote.

Figure 24:
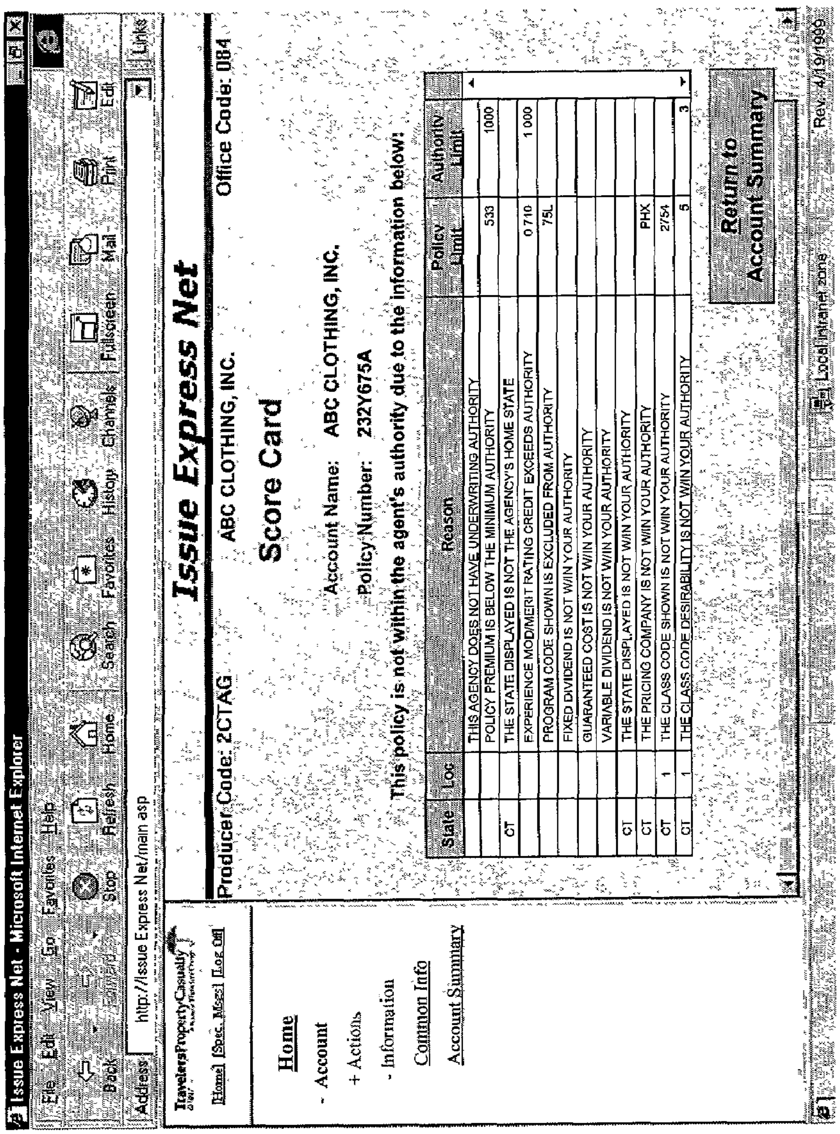
FIG. 24 shows the ScoreCard screen for the WC quote in accordance with an embodiment of the present invention.

FIG. 24 shows the ScoreCard screen for the WC quote. As explained earlier with reference to FIG. 16, this screen displays the authority assessment (when Agency Authority=NO) of the WC policy. The ScoreCard link to this screen is available from the Navigator when a policy on the Account Summary screen is highlighted and contains an Authority=NO status. It serves to indicate the reasons a particular policy is out of a user's authority. The ScoreCard screen displays the Account Name, Policy Number, Policy Form and a Detailed Information grid detailing the reasons for the out-of-authority determination. The specific reasons for no authority are displayed based on hard-coded authority conditions and profiled authority levels relative to the data collected on the quote/issue screens. The grid will move into a scroll mode when there are more than a set number of rows in the Detailed Information grid.

The WC ScoreCard screen is a re-use of the MasterPac scorecard. Like most other screens of the web-based GUI of the present invention, the heading contains the Producer Code, Policy Name and Reporting Office. The Active Server Page (ASP) for the ScoreCard screen is coded to sense the incoming line of business and displays appropriate headings pertinent to the LOB. While the MasterPac scorecard shows Loc/Building/Reason/Policy Limit/Authority Limit, the WC scorecard shows State/Loc/Reason/Policy Limit/Authority Limit, as shown in FIG. 24. The WC Score Card screen displays as a Navigator pick (ScoreCard) when a policy has been highlighted on the Account Summary screen. The Score Card screen does not display as part of any flow. It is an informational display page. Once the user has used the content of the ScoreCard page, the user can move from the page by using the "Return to Account Summary" button or by making another Navigator menu selection. The Appendix shows the parameters and explanations for the page prompts/fields, page buttons, and screen tabbing order of the Score Card screen of the WC quote. There are no warning messages or modal windows for this screen.

Figure 25:
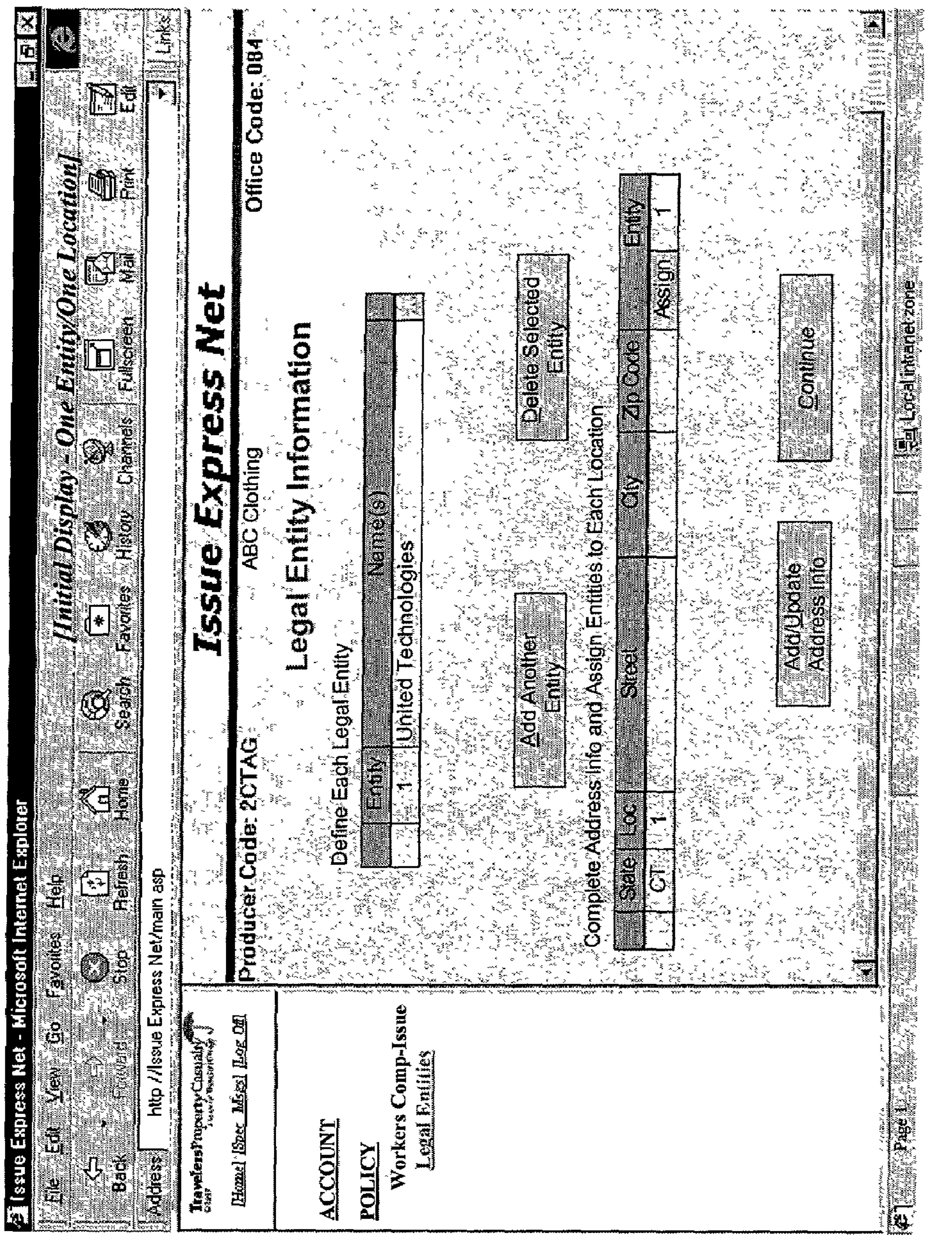
FIG. 25 shows the Legal Entity Information screen, which displays first in the WC issue screen flow in accordance with an embodiment of the present invention.

FIG. 25 shows the Legal Entity Information screen, which displays first in the WC issue screen flow. The Navigator references this page as a Legal Entities link, which is displayed in the Navigator whenever the page is presented and whenever the page has been completed. Thus, this screen can be accessed from the Navigator. This screen displays after the Account Summary screen and before the Identification Numbers screen. The screen features three potential modal windows for the entering of Legal Entity Names and location addresses and for the assignment of legal entities for each location. Clicking on the "Continue" button from this screen moves the user to the next screen, the State Issue Information screen (FIG. 26), which will be described later. As shown in FIG. 25, this screen contains two grids, the "Define Each Legal Entity" grid and the "Complete Address Info and Assign Entities to Each Location" grid. The "Define Each Legal Entity" grid displays on the initial presentation of the screen. The Name(s) field for Entity 1 is prefilled with the first line of the policy Named Insured. The user can then enter any additional names for Entity 1 as well as any other legal entities and their associated names. The grid can display up to a predetermined number of legal entities. Beyond that number, when an additional entity is added, the grid goes into a scroll mode. However, the action buttons remain visible on the page at all times. None of the column headings can be used to sort the grid. The grid also contains a 'nub' on the left where the user can select an entire row from the grid by clicking on the 'nub' (e.g. for deleting an entity). The user can use the 'Add Another Entity' button to add additional rows to the table until all the legal entities on the policy are entered. If it is necessary to delete legal entities previously added, the user can highlight the selected entity and clicking on the 'Delete Selected Entity' button. This option is active when there is more than one entity. If only one entity exists, this button is not active.

With regard to the "Complete Address Info and Assign Entities to Each Location" grid, it displays on the initial presentation of the Legal Entity Information screen with state and location columns prefilled from the information collected on the State/Class Code screen. It has two functions: collecting address information for each location on the policy and allowing the user to assign each location to a legal entity on the policy. With regard to the first function, the state and location columns are prefilled with the information collected on the State/Class Code screen previously shown in FIG. 20. The remaining fields on the grid are entered by the user (Address, City, Zip Code) using the address modal window. The grid displays up to, for example, 3 state/location rows. When the $4^{th}$ row is added, the grid goes into a scroll mode. The action buttons remain visible on the page at all times. None of the column headings can be used to sort the grid. With regard to the second function, upon initial display of the screen, all locations are assigned to Entity 1. However, if the user adds additional entities, the default is removed. The user can then assign each location to a legal entity by clicking on the "Assign" button in that row and choosing the appropriate legal entity from the list in a modal window. A location may be assigned to more than one legal entity. A new row is created for each entity assigned. Even though there are separate rows, modification of address information for the state/location combination needs to be performed only once. The changed information is then displayed in all affected rows of the grid. When multiple entities are assigned to the same location, the additional rows created should display together on the grid. (All rows for each location should display together) To delete the entity/location relationship, the user can click on the "Assign" button and remove the 'check' next to the given entity. The row is then deleted on the grid, unless it is the only row for that location. If that is the case, the row re-displays with the entity field blank.

The Full Screen Help features help on the Legal Entity Information screen, which provides that the screen collects the necessary legal entity information to be forwarded to WC state authorities. Names for each legal entity and their associated addresses are captured on this screen. It is critical to ensure accuracy of this information in order for the insured to avoid fines for failure to secure WC coverage. In addition, The host insurance company may be subjected to unnecessary claim exposure when this information is inaccurate. The Appendix shows the parameters and explanations for the page prompts/fields, modal windows, page buttons, screen tabbing order, and error messaging of the Legal Entity Information screen for the WC Issue process.

Figure 26:
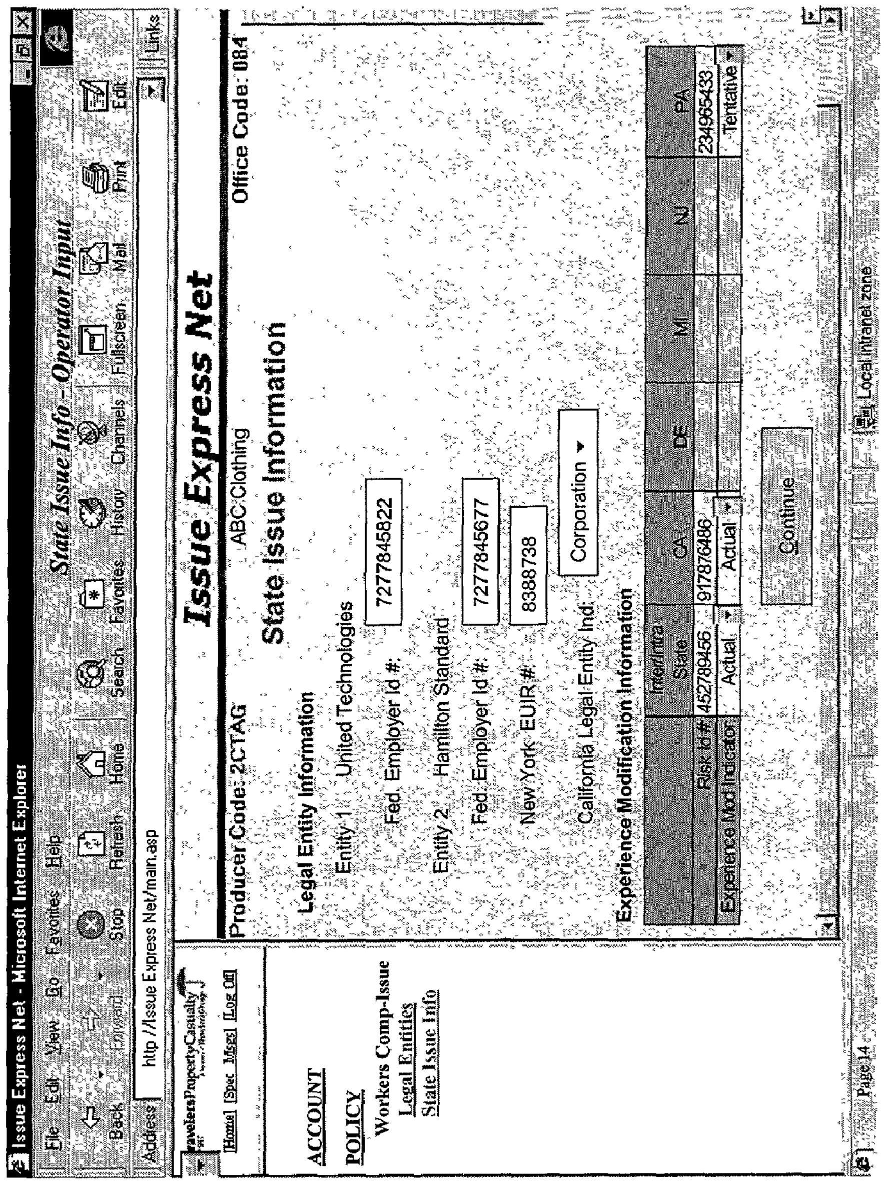
FIG. 26 shows the State Issue Information screen of the WC Issue in accordance with an embodiment of the present invention.

FIG. 26 shows the State Issue Information screen of the WC Issue. It displays after the Legal Entity Information screen and before the General Issue Information screen in the issue flow. Selecting the "Continue" button from this screen moves the user to the General Issue Information screen. This screen may also be accessed by choosing the State Issue Info link from the Navigator. It is used to collect all the identification numbers for every legal entity entered as well as the California Legal Entity indicator, when necessary. In addition, when experience is rated, the risk ID numbers and Experience Modification Indicator will also be collected. Also collected on this screen is information related to the experience modification, if one is applied. The risk ID number and the Experience Mod Indicator are both required when an experience modification was input (YES) on the State/Class Code screen as shown in FIG. 20.

Upon initial screen display, all fields are blank in the State Issue Information screen of FIG. 26. The screen contains one grid, the Experience Modification Grid, which is displayed only if there is a value in any of the Experience Mod fields on the State/Class Code screen. Upon initial display, the state columns not applicable to the policy are colored out and cannot be accessed. This grid has two functions: 1) collecting the insured's risk ID numbers assigned by the various rating bureaus; and 2) collecting the Experience Modification Indicator for the Experience Modification input during the rating process. If the experience modification on the State/Class Code screen is deleted after data is entered on this grid and saved, the grid will display with the entered data. This is true until the data on the grid is deleted, at which time, upon re-entry to the screen, the grid will not display. Depending on the number of legal entities and state ID numbers listed on the screen, the screen could potentially scroll downward. The Navigator references this page as the State Issue Info link, which is displayed in the Navigator whenever the page is presented and whenever the page has been completed.

The State Issue Information screen collects state-specific information necessary for issuance of the policy. For every legal entity input on the Legal Entity Information screen, there are federal and state ID number fields (i.e. New York EUIR #) displayed that must be input. Because this information is transmitted to WC state authorities, it is critical that it is entered accurately to ensure that the insured is not fined for failure to secure WC coverage. In addition, The host insurance company may be subject to unnecessary claim exposure when this information is inaccurate. The Appendix shows the parameters and explanations for the page prompts/fields, page buttons, screen tabbing order, and error messaging of the State Issue Information screen of the WC Issue.

Figure 27:
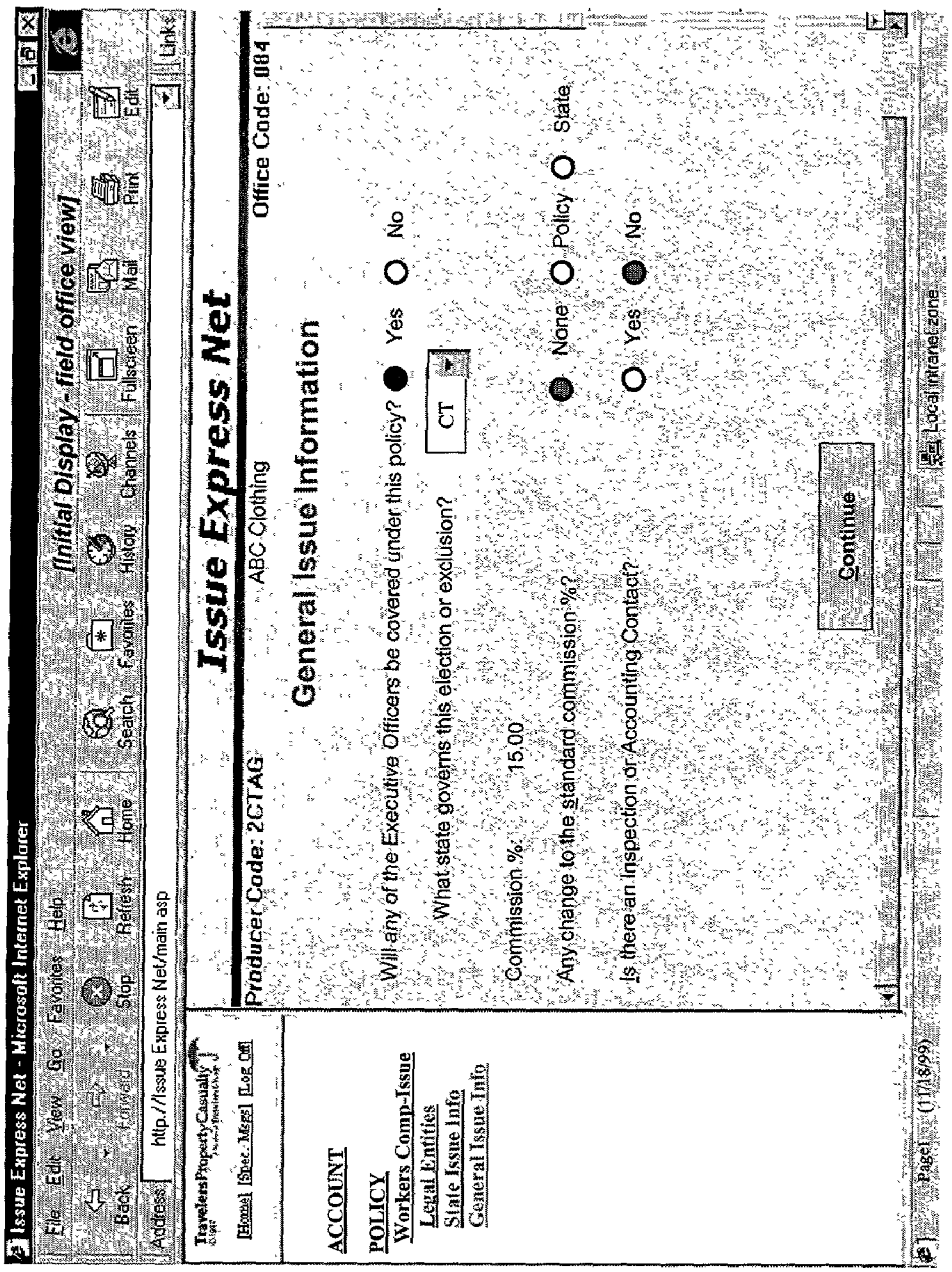
FIG. 27 shows the General Issue Information screen for WC issue in accordance with an embodiment of the present invention.

FIG. 27 shows the General Issue Information screen for WC issue. The screen appears after the State Issue Information screen in the WC issue screen-flow. It is available from the Navigator as the General Issue Info link. Clicking on the "Continue" button from this screen takes the user to the Forms screen. This General Issue Information screen is used to capture and display miscellaneous information needed for issuance of a WC policy. It initially displays with certain information having already been derived (e.g., information on commission), while the remaining fields initially display with default values. Depending on the role code of the user, some fields either display or are hidden from the presentation layer. The screen also features a question regarding the election of executive officers/partners etc. Depending on the answer and the law of the governing state, a form that is usually requested by users will be automatically derived. The General Issue Information screen features one grid, the "State Negotiated Commission" grid (not shown), which displays when the user chooses "State" for the question "Any change to the standard rate of commission?" The grid displays the derived commission for all of the states on the policy with a separate cell for each state to input any negotiated commission. The grid displays up to a predetermined number of states, such as three. If there are more than three states, the grid will go into a scroll mode to view the remaining states. The screen features a scroll bar to accommodate for the varying length of the screen, depending on the need to input additional information.

The Full Screen Help for the General Issue Information screen is used to capture and display miscellaneous information needed for issuance of the WC policy. In addition to displaying commission percentage, this screen also features the ability to automatically derive the appropriate election or exclusion form based on the type of legal entity and the law of the governing state. The Appendix shows the parameters and explanations for the page prompts/fields, page buttons, screen tabbing order, and error messaging of the Final Issue Information screen of the WC Issue.

Figure 28:
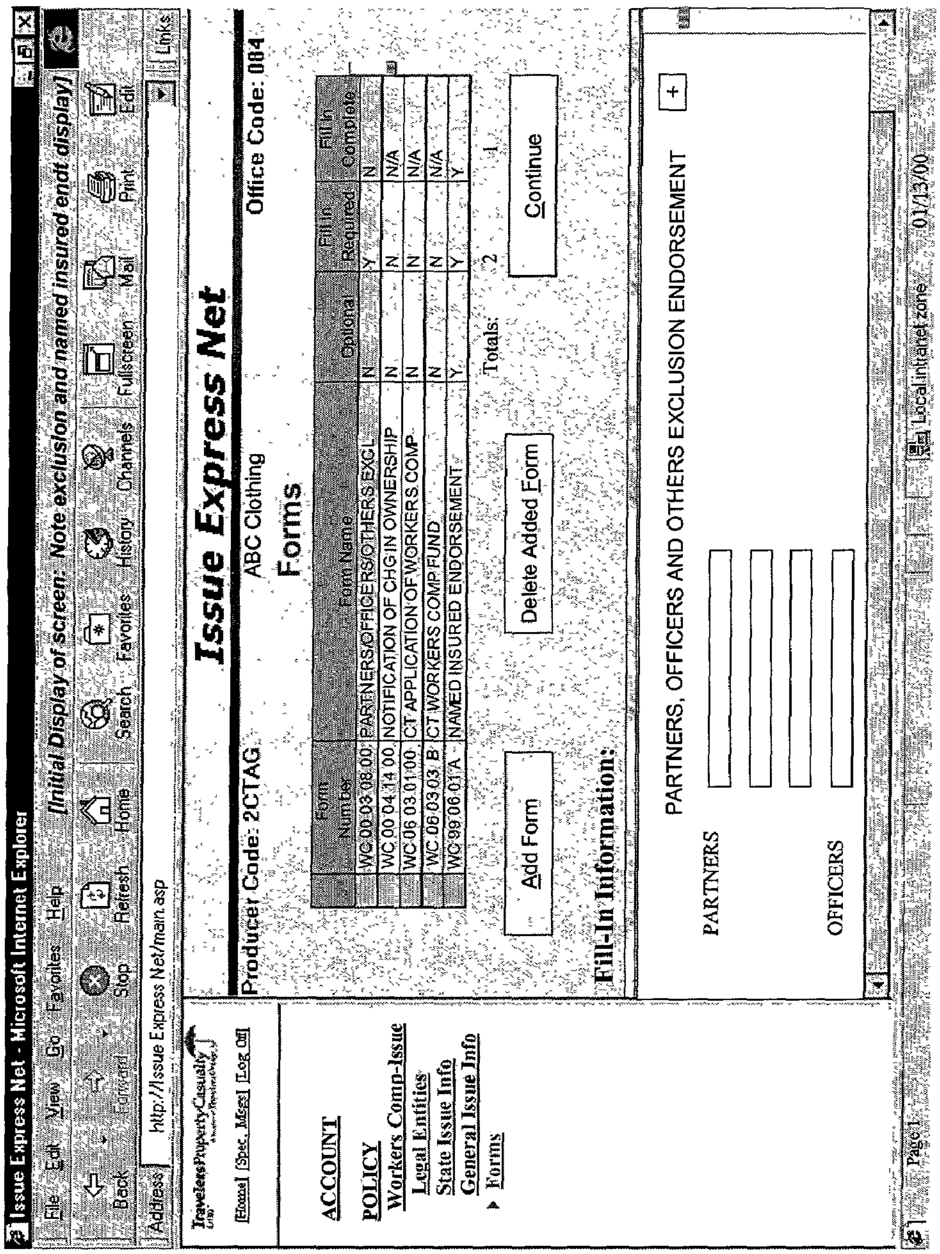
FIG. 28 shows the forms screen for WC Issue in accordance with an embodiment of the present invention.

FIG. 28 shows the forms screen for WC Issue. This screen provides the forms that are for a particular WC policy ready for issue, with the option to add or delete any of the listed forms in the forms grid of the screen.

Figure 29:
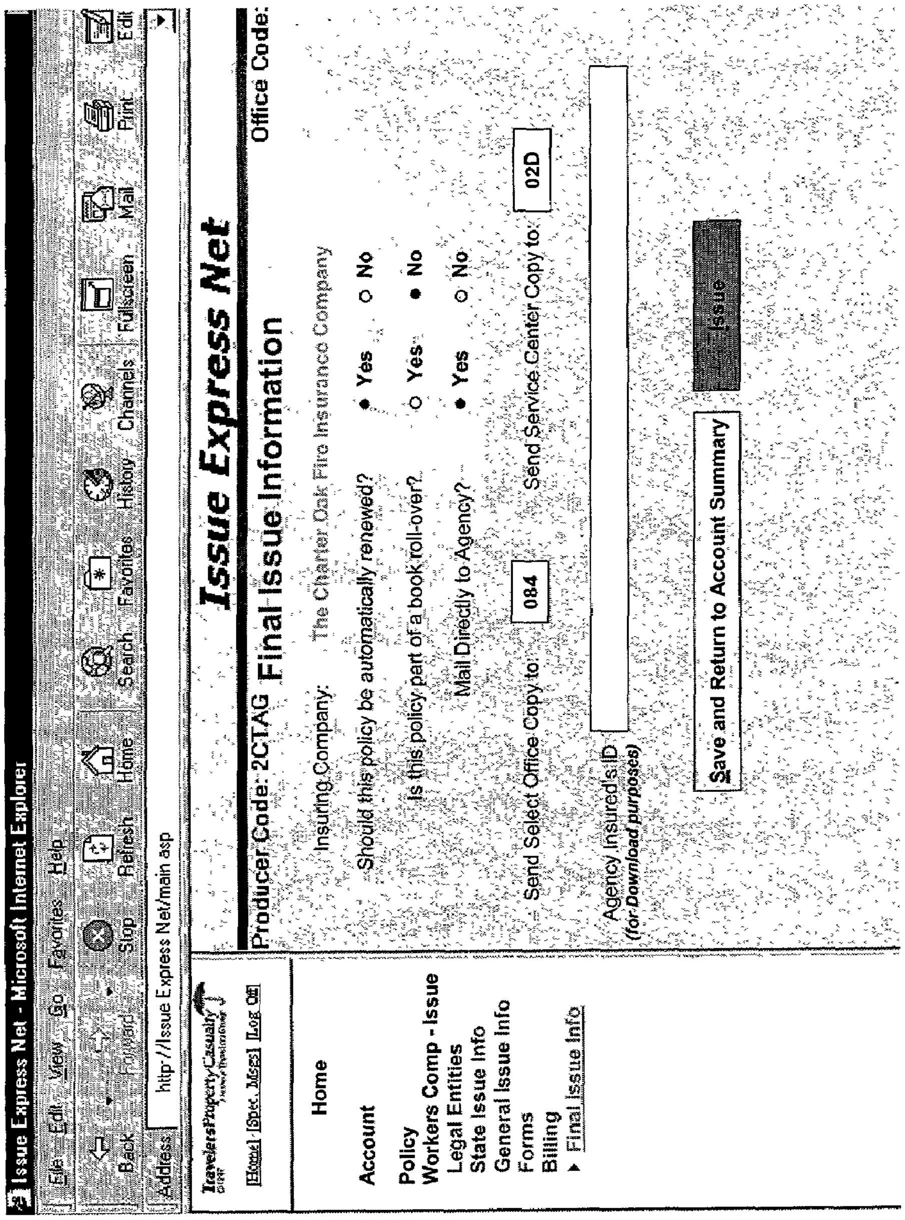
FIG. 29 shows the Final Issue Information screen for WC issue in accordance with an embodiment of the present invention.

FIG. 29 shows the Final Issue Information screen for WC issue. This screen displays as the last screen in the final issuance process for a WC policy and is available from the Navigator as the Final Issue Info link. The screen appears after the Billing screen and prior to presentation of the Account Summary screen. The Billing screen is similar to that of the MasterPac issue shown in FIG. 18. The Final Issue Information screen offers many features including the ability to stop the policy from going through the automatic renewal process. It also derives and displays some information that will be helpful to the user such as the name of the 'Insuring Company'.

The purpose of the Final Issue Information screen is to capture and display miscellaneous information needed for issue. There are variances in what prompts will display and what will be hidden from the presentation layer. Those variances are based largely on role code—whether or not the user is an Agent, Home Office or Field Office Employee. The screen is also used to collect output information such as the "Send Select Office Copy to" and "Send Service Center Copy to" as well as a Mail Directly to Agency choice. The screen is initially displayed with certain information having already been derived. The Appendix shows the parameters and explanations for the page prompts/fields, page buttons, screen tabbing order, and error messaging of the Final Issue Information screen of the WC Issue.

FIG. 30 shows the QRL screen for WC Issue in accordance with an embodiment of the present invention. The functionality of this screen mirrors the existing functionality of the Account and MasterPac issue QRL screen. As explained earlier, the Navigator reflects the various options and links shown in the QRL. The Navigator selections are as follows in the order that they appear: Legal Entities, State Issue Info, General Issue Info, Forms, Billing, and Final Issue Info. Thus, many of the menu choices are WC-specific, but the functionality is almost identical to that of MasterPac processing with the following few changes.

There are three rules that guide the functionality of the QRL and Navigator for WC Issue: 1) The first time through the issue screens, the user must be led through each screen to ensure proper processing. The initial display of the Navigator collapses, showing only the Legal Entities reference as the first screen in the issue process. As the user moves through the screen-flow the Navigator builds, displaying the next screen in the flow. The Quick Reference Location is opposite of the Navigator, this screen displays menu choices of screens already processed. Therefore, it is not accessible until after the Legal Entity Information screen is processed. Like the Navigator, it too would build as subsequent screens are processed. 2) If the user utilizes the QRL or Navigator to re-access and modify an issue screen, he/she must re-access all of the subsequent issue screens. In this case, the Navigator is collapsed, viewing only the next screen in the flow; whereas, the QRL displays only those screens that display prior to the modified screen. The user can click on the "Continue" button or use the Navigator to access the next logical screen. 3) If the user modifies the quote, he/she is forced to re-access all of the issue screens. Here, as in the first time through the issue path, the Navigator displays only the Legal Entities reference. As the user moves through the screen-flow the Navigator builds, displaying the next screen in the flow. As for the QRL, again, it is not accessible until after the Legal Entity Information screen is processed. Like the Navigator, it too would build as subsequent screens are processed. Note that on numbers 2 and 3, these processing constraints are due to the dependencies on almost every issue screen with the quote data and dependencies between several of the issue screens themselves. This is particularly true for the forms information. Despite what the Data Exists indicator is, when the quote is modified the Forms Derivation indicator must be reset and the user must re-access the Forms screen.

Figure 31:
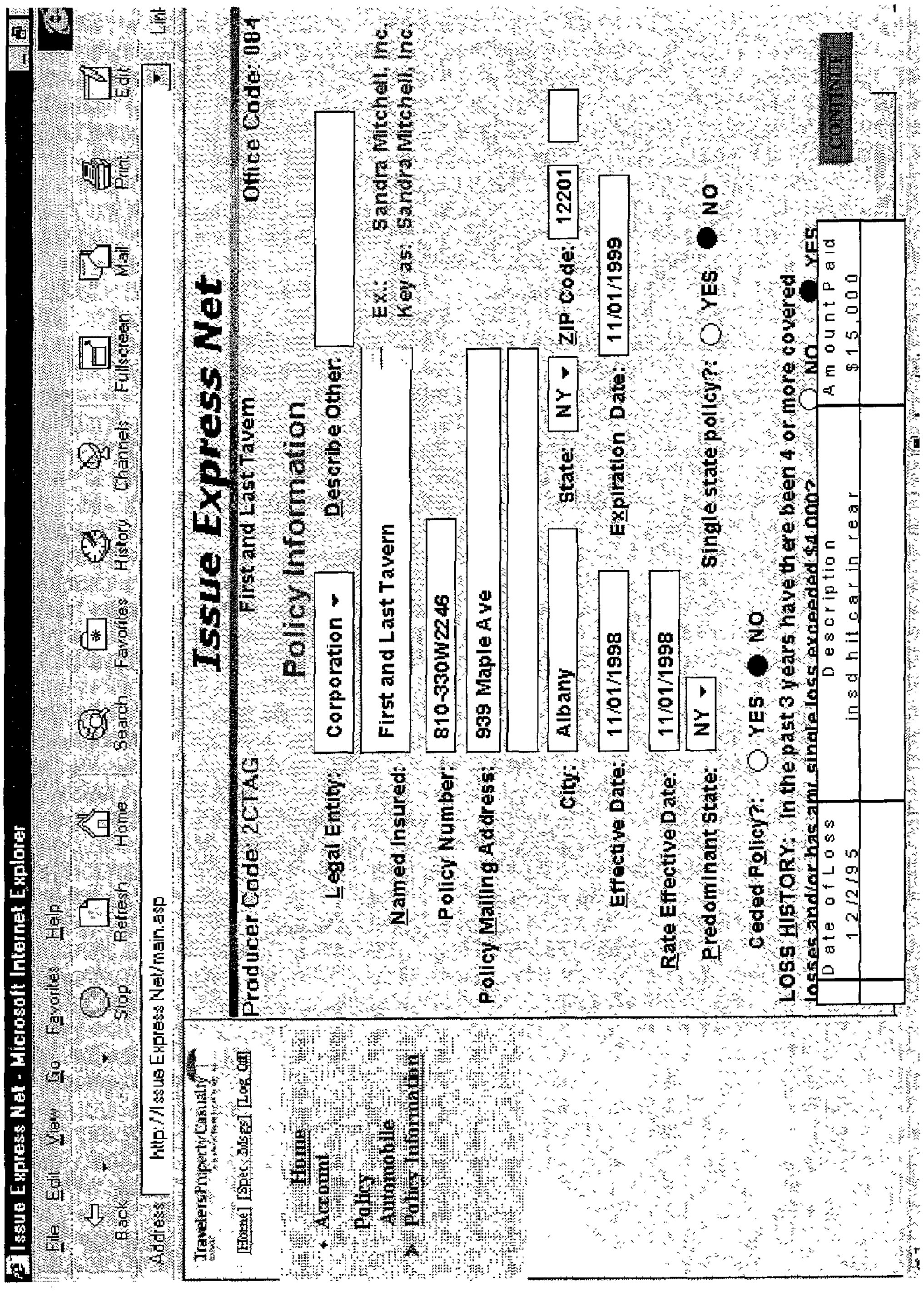
FIG. 31 shows a Policy Information screen for the Automobile quote process in accordance with an embodiment of the present invention.

FIG. 31 shows a Policy Information screen for the Automobile quote process. This screen is a re-use of the Policy Information screen designed for MasterPac. Minor changes have been made including the addition of some new prompts (depending on State). The Policy Information screen displays as the first screen of the Quote process. It is available from the Navigator as the Policy Information link. It will be displayed after Add New/Automobile is selected from the Account Summary screen (FIG. 9). When this page is displayed, the Navigator will show the Policy Information link under the Automobile heading. The link appears when the page is displayed and also after the screen has been completed so that the user can re-access the screen.

When the Policy Information screen is completed, the user will be brought to the Policy Coverage screen. The purpose of the Policy Information screen is to collect data needed for the establishment of the Automobile policy on the host insurance system. The screen is preset with the legal entity, Named Insured, mailing info effective and expiration dates from the Submission level. The screen header will include the producer code, Account name and office code. The predominant state will be prefilled with the mailing address state. Single state prompt will default to YES and Loss History prompt will not have a default. The functionality of the Legal Entity, Named Insured, Mailing Info, Effective/Expiration dates and Loss History will work similar to those in the MasterPac quote process. All of these, with the exception of the Loss History, will be prefilled from the submission level but can be changed. New prompts are added primarily to aid in driving screen flow. They are as follows: 1.) Rate Effective Date has been added to capture what rates and coverages should be used on the policy. 2) Predominant State is needed to drive Auto screen flow and forms. 3) A Multi-State vs. Single State question was added to allow very tailored screen flow processing if Single State. This will allow only coverages, and options available in that state to be shown. If Multi-State, greater flexibility of coverages and options must be given. And 4) For certain states only (e.g., Massachusett), inquiring on whether the policy is Ceded or Voluntary to determine the processing.

Regarding the cross-screen impacts of the Policy Information screen for Automobile quote, if changes are made to the Automobile policy information screen they will not update the submission level. The Appendix shows the parameters and explanations for the page prompts/fields, page buttons, modal windows, screen tabbing order, warning messaging, and error messaging of the Policy Information screen for the Automobile quote process.

Figure 32A:
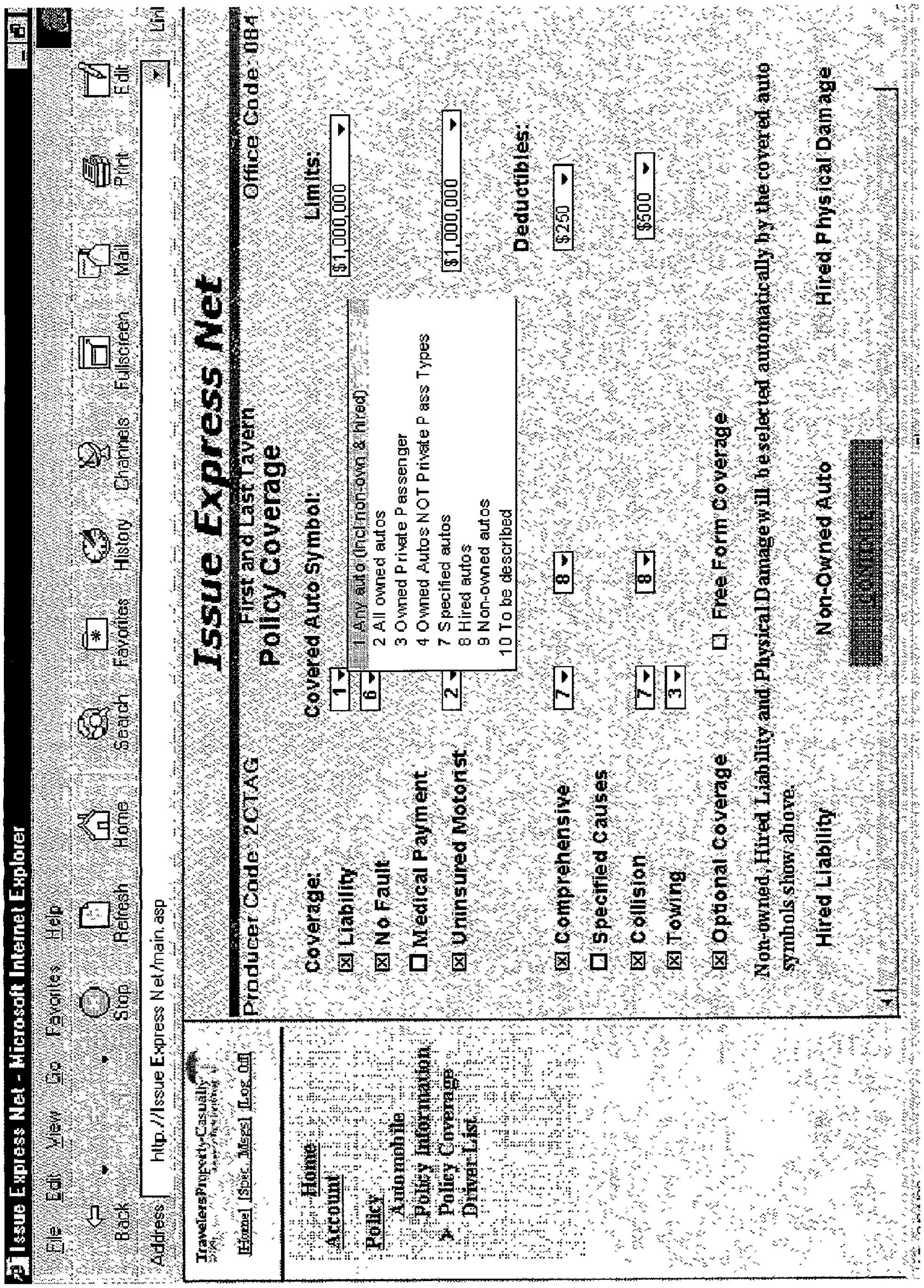
FIGS. 32A-32C show a Policy Coverage screen, as it is scrolled down, of the Automobile quote process in accordance with an embodiment of the present invention.
Figure 32B:
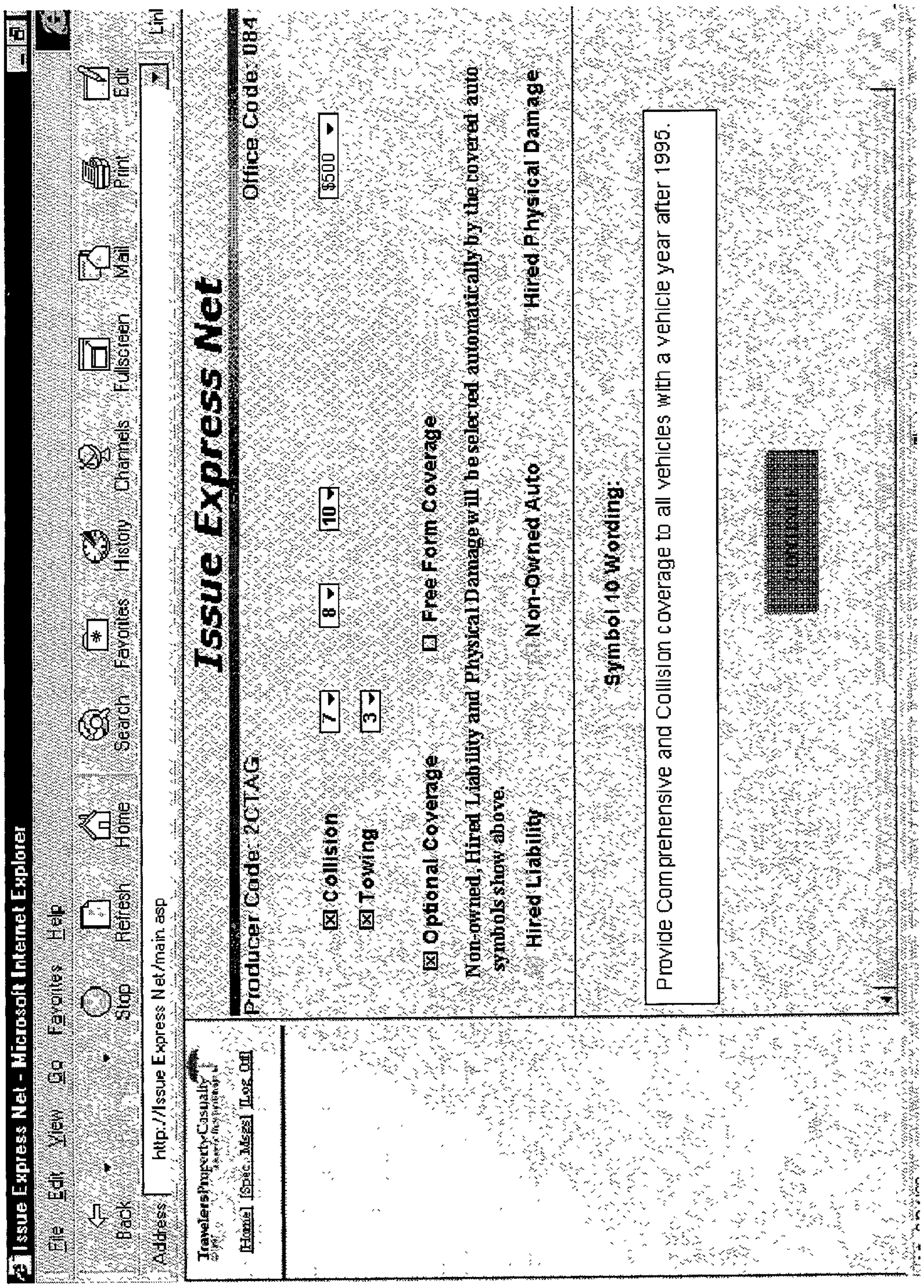
Figure 32C:
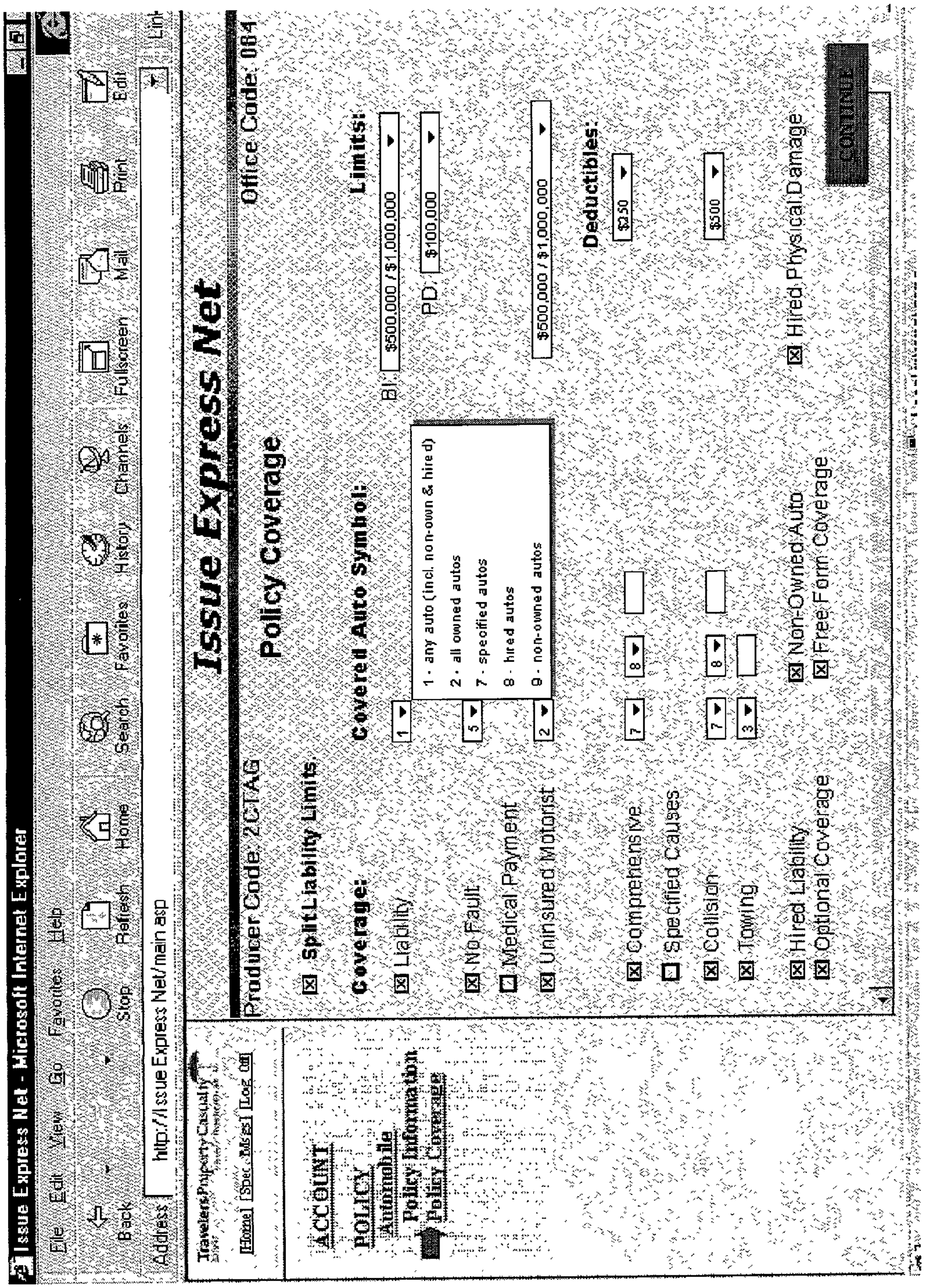
Figure 33A:
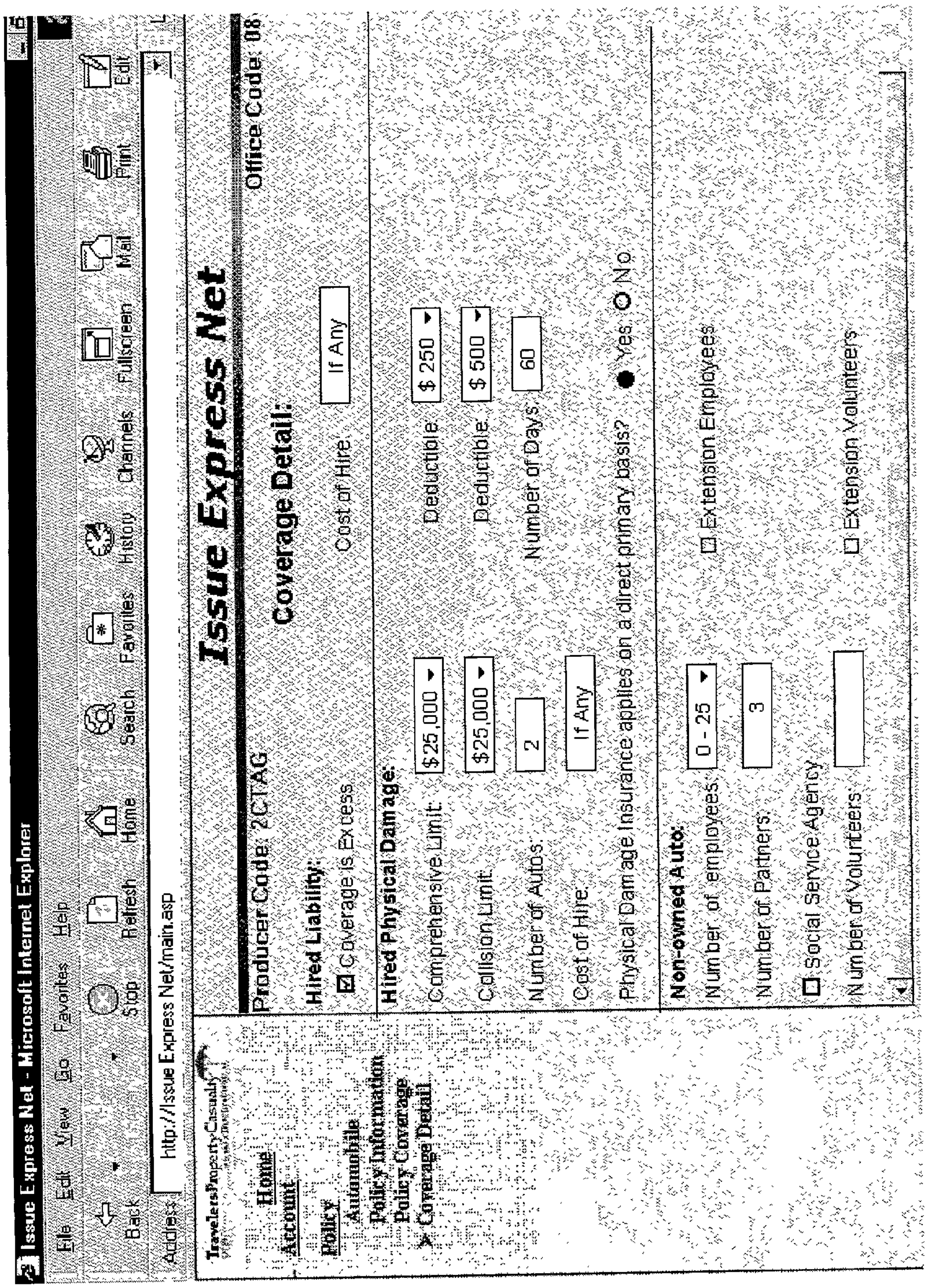
FIGS. 33A-33C show the Coverage Detail screen, as it is scrolled down, of the Automobile quote process in accordance with an embodiment of the present invention.
Figure 33B:
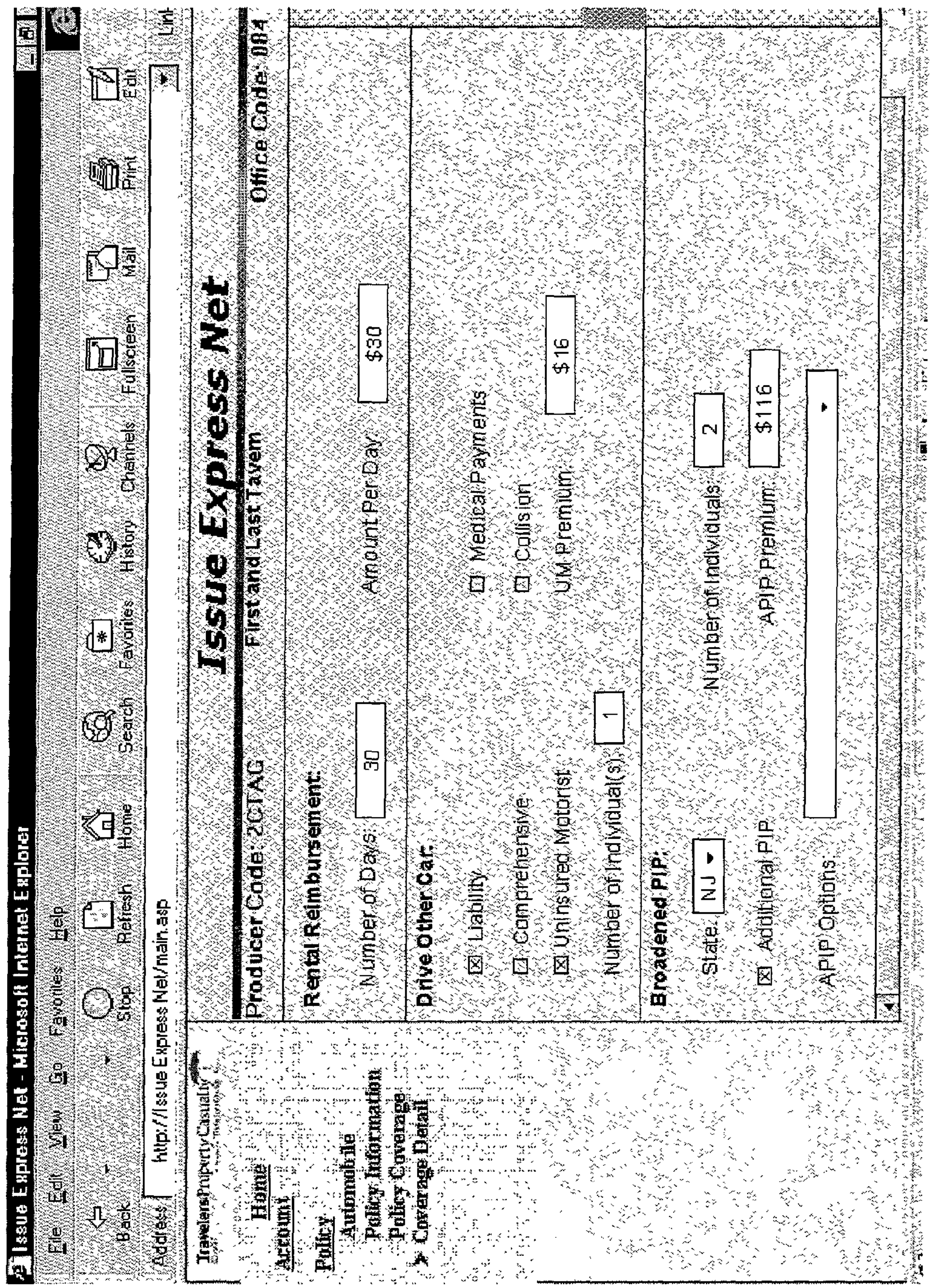
Figure 33C:
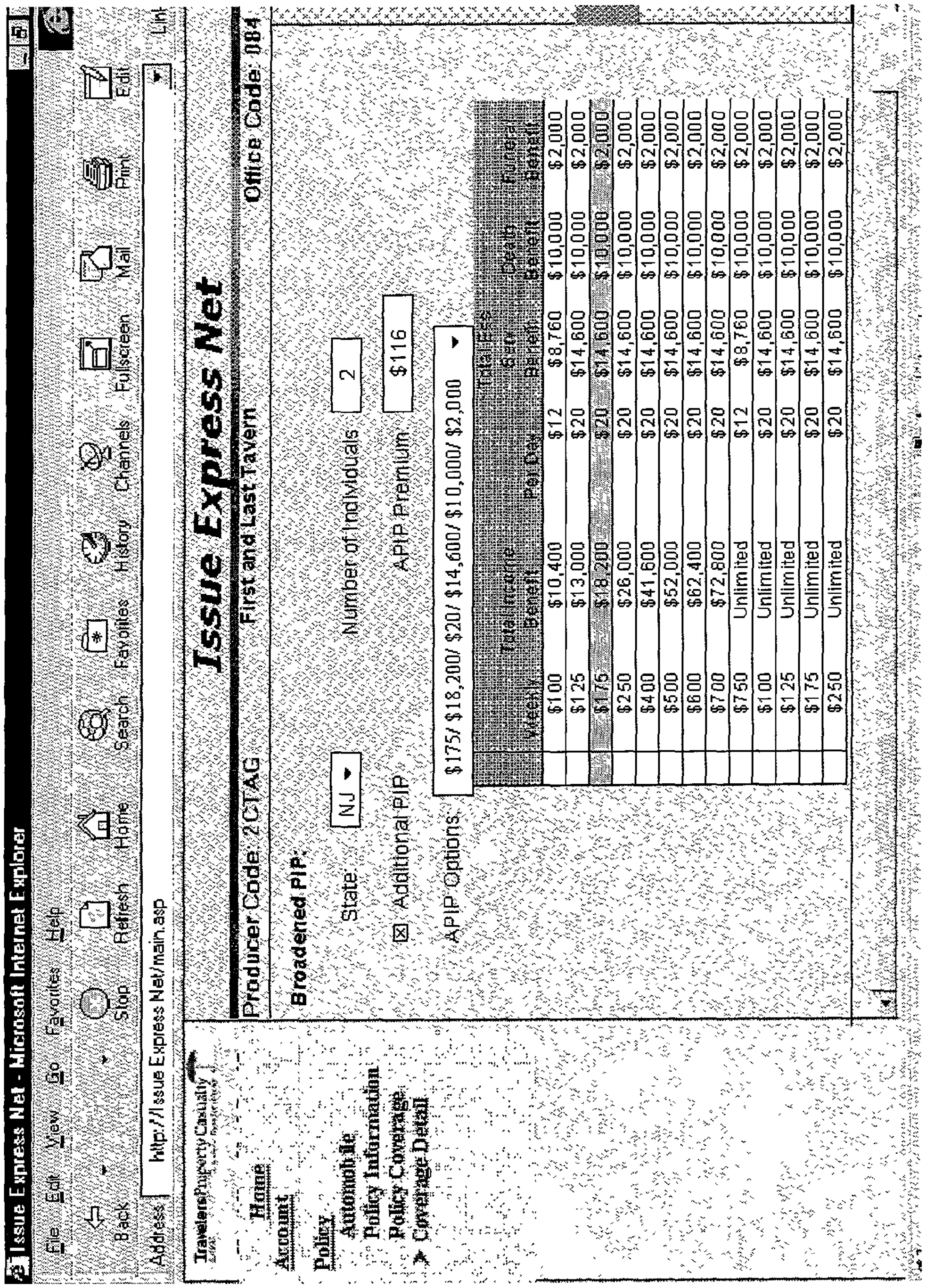

FIGS. 32A-32C show a Policy Coverage screen, as it is scrolled down, of the Automobile quote process. This screen comes after the Policy Information screen is completed. This screen is used for the collection of all coverage information about the Automobile policy being quoted. FIGS. 33A-33C show the Coverage Detail screen, as it is scrolled down, of the Automobile quote process. This screen comes after the Policy Coverage screen shown in FIGS. 32A-32C. The purpose of the Coverage Detail screen is to collect specific insurance coverage information of the Automobile policy being quoted. Both the Policy Coverage screen and the Coverage Detail screen may be accessed from the Navigator via the Policy Coverage link and the Coverage Detail link.

Figure 34A:
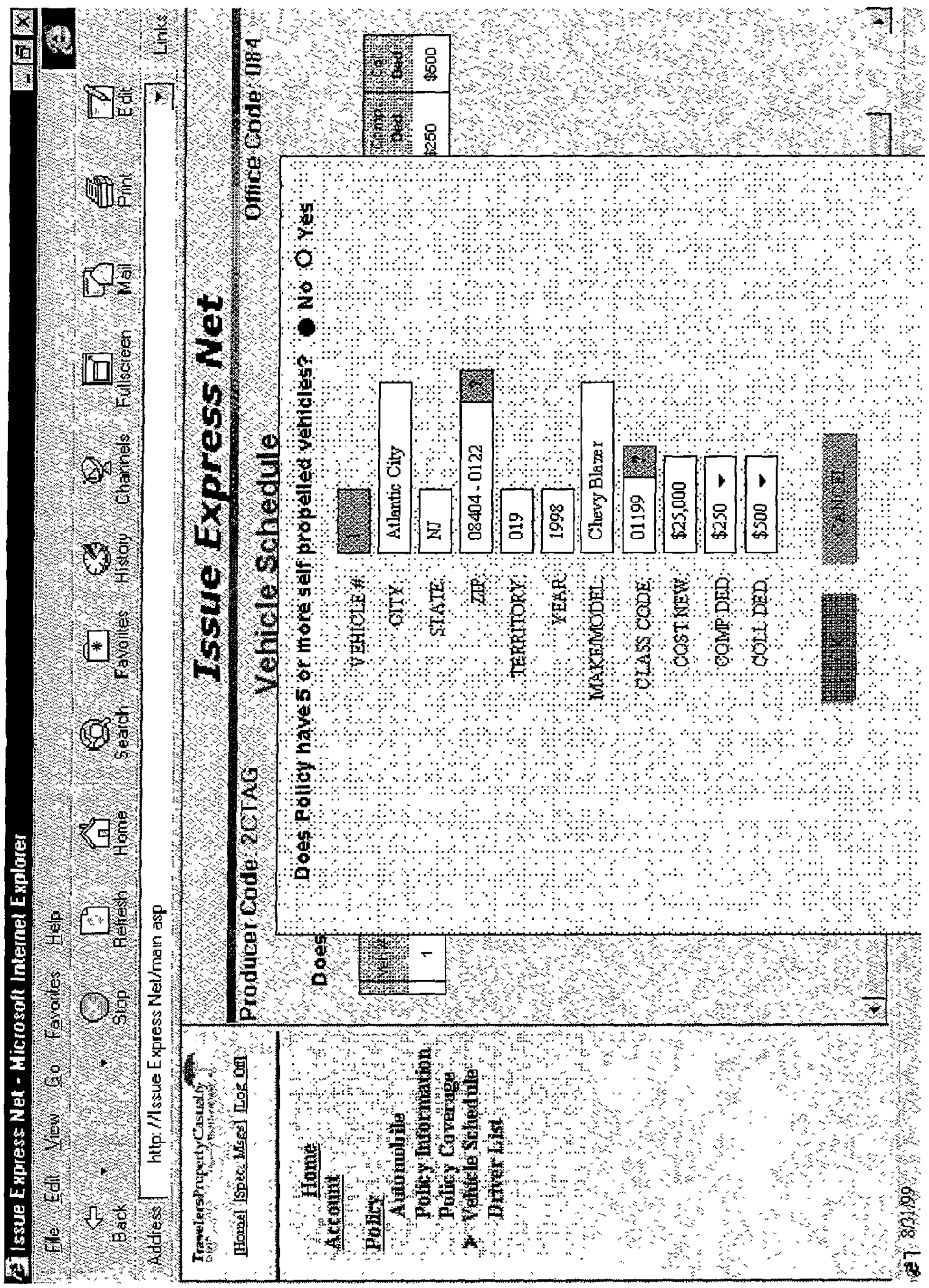
FIGS. 34A-34C show a Vehicle Schedule or Information screen for an Automobile quote in accordance with an embodiment of the present invention.
Figure 34B:
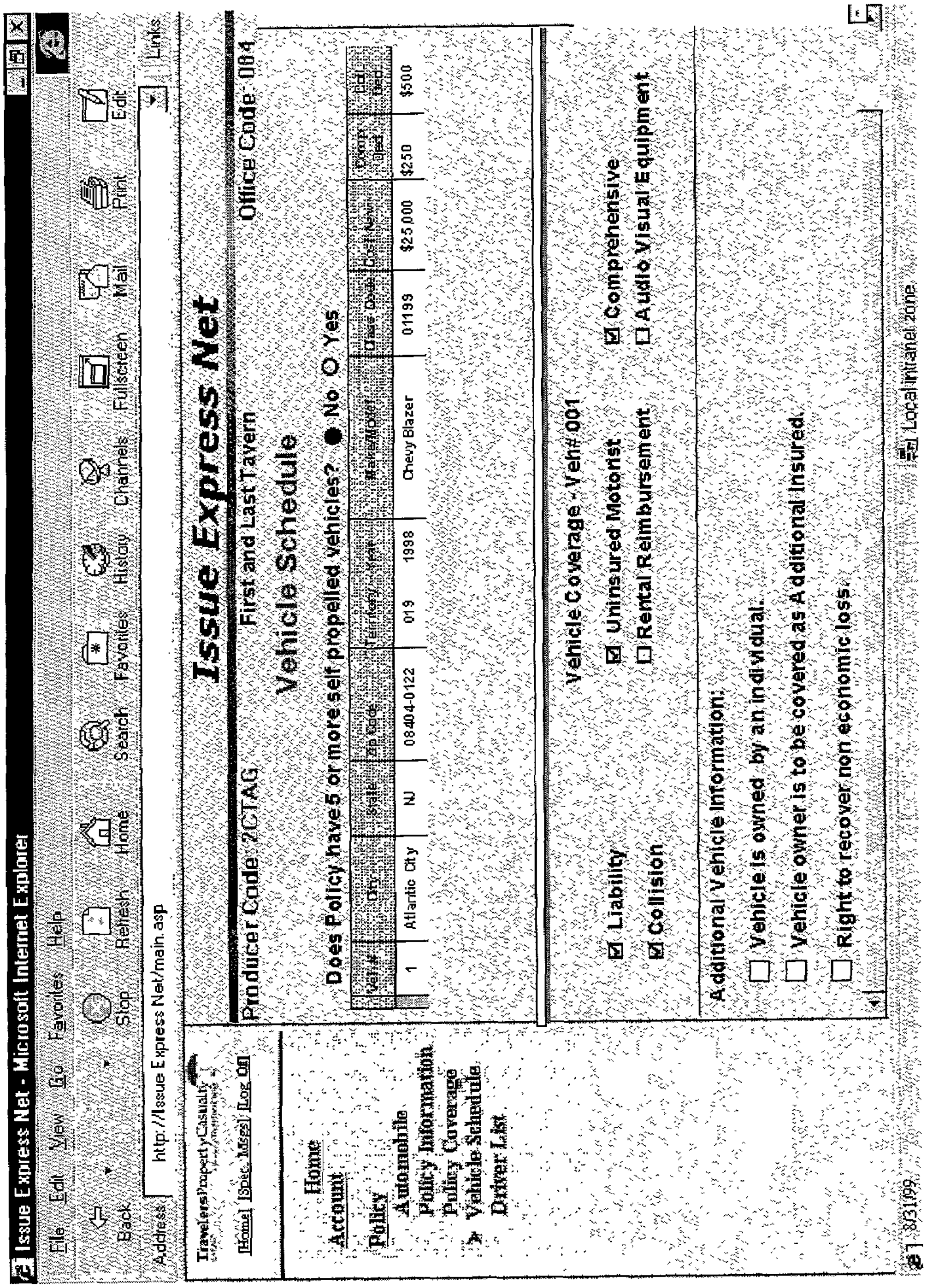
Figure 34C:
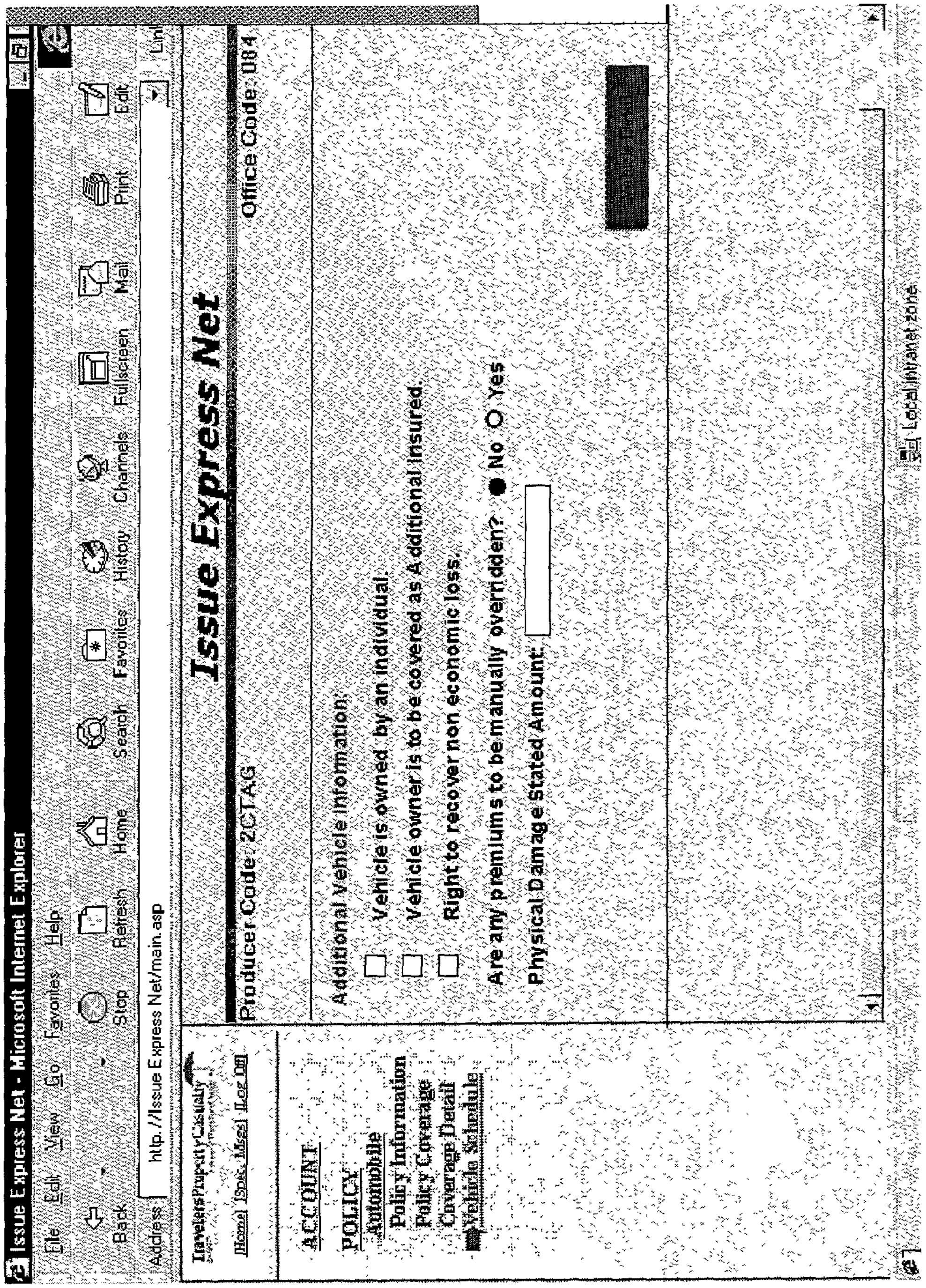

FIGS. 34A-34C show a Vehicle Schedule or Information screen for an Automobile insurance policy quote. This screen is used for the collection of all information about each and every vehicle that is to be covered under the Automobile insurance policy being quoted. After the vehicle information has been entered, the user can proceed to the Pricing screen by clicking a "Pricing" button on the screen (not shown) for a price quote on the policy.

Figure 35A:
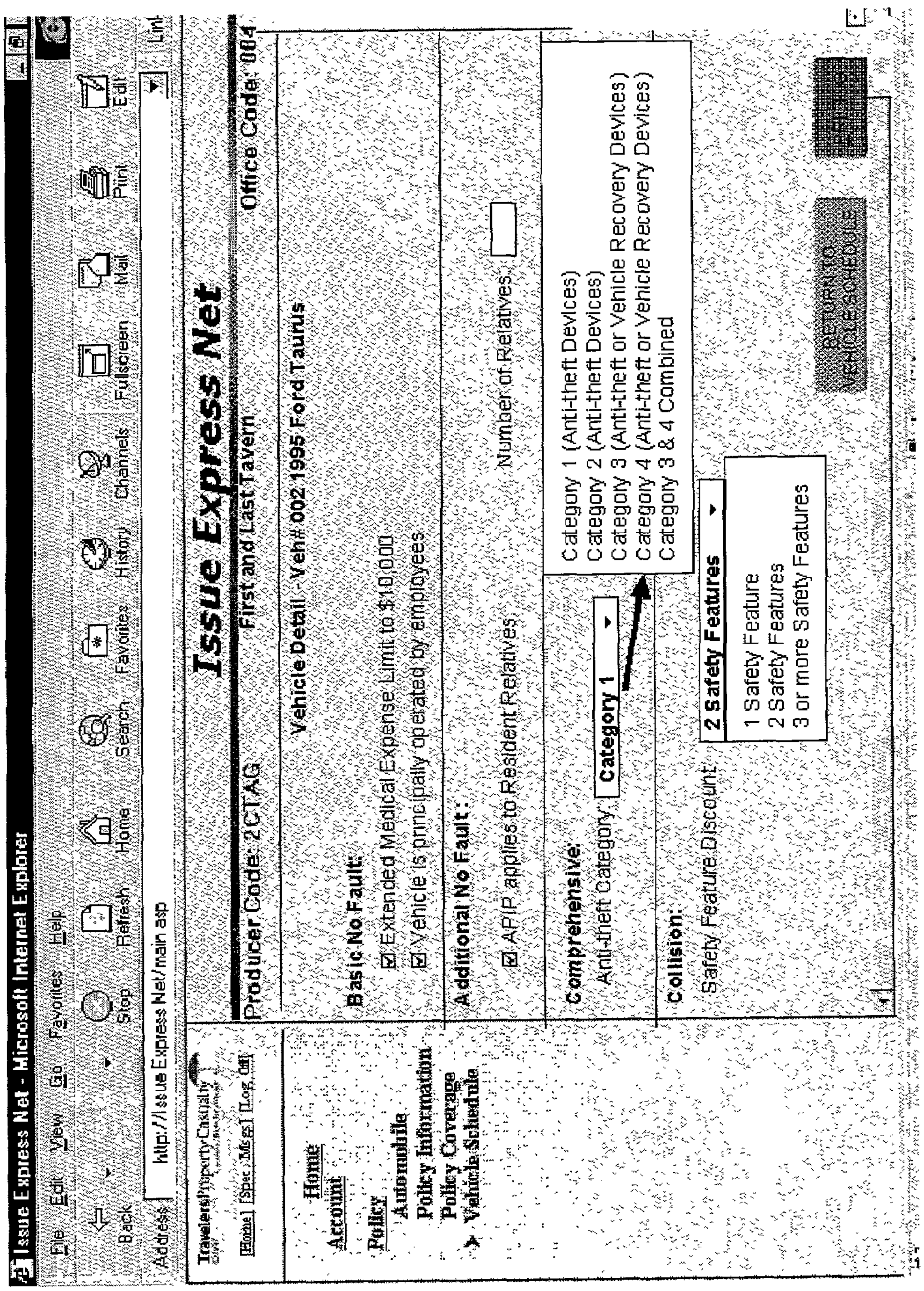
FIGS. 35A-35B show the Vehicle Coverage Detail screen for an Automobile quote in accordance with an embodiment of the present invention.
Figure 35B:
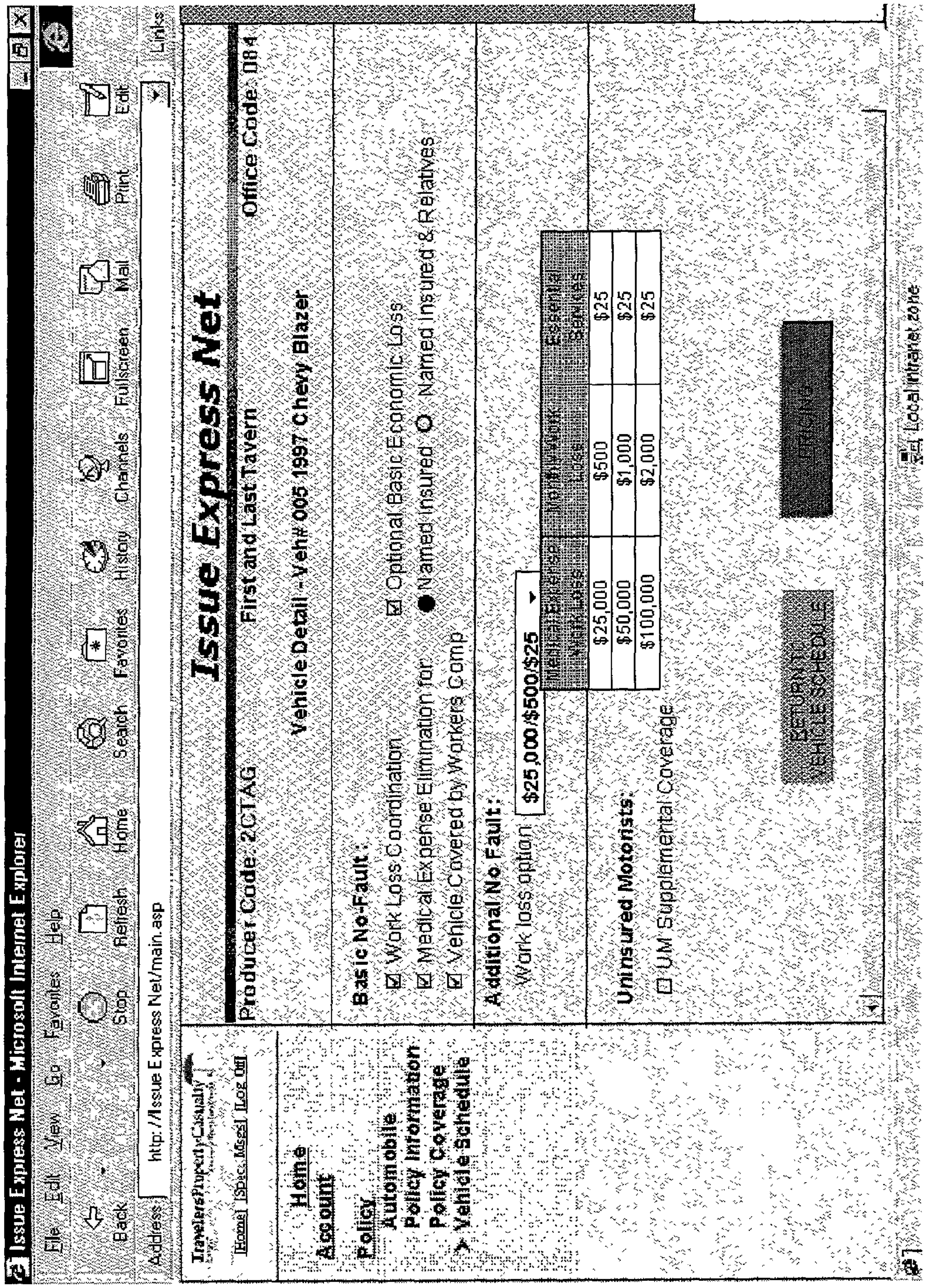

The Vehicle Schedule screen displays as part of a new business Automobile quote screen flow and can be accessed from the Navigator as the Vehicle Schedule link. The Vehicle Coverage Detail screen in FIGS. 35A and 35B, accessible by clicking on the "Vehicle Detail" button in the Vehicle Schedule screen, will collect specific coverage information. This information is needed to rate the policy. Depending on the policy coverage selected and the state, applicable questions for those coverages will be shown. Liability, Medical Payments or Uninsured Motorist limits will not be different from the policy declaration (the exception is for Hawaii and NC vehicles, in which case the applicable split limit for uninsured motorist coverage will be inquired from screen prompts). States that allow the Underinsured Motorist (UM) coverage limit to be different from the uninsured motorist limit, we will show an input box defaulted to a set UM limit. A drop down of the applicable limits will be shown with the following options: 1) For no-fault states, the additional no-fault option will be displayed; 2) The Comprehensive option will state specific questions such as glass buy-back, anti-theft options, etc.; 3) The Specified Causes of Loss option will display if this coverage was selected and if any state specific questions apply; The Collision option will state specific questions such as Waiver of collision, limited collision, etc.; 4) If Audio Visual Equipment option is selected, an input box will display for the cost new to be filled in. If the Manual Premium override was selected then a question will appear for all coverages that were selected to allow the user to input the premium to be charged for that coverage. When done answering coverage questions, the user can click on the "Return to Vehicle Schedule" button to add more vehicles or click on the "Pricing" button to go to the Pricing screen.

When the Vehicle Schedule screen is displayed, the Navigator will show the Vehicle Schedule link under the Automobile heading. The link appears when the page is displayed and also after the page has been completed so that the user can re-access the screen. The Appendix shows the parameters and explanations for the page prompts/fields, page buttons, and screen tabbing order of the Vehicle Schedule screen for the Automobile quote process.

Figure 36A:
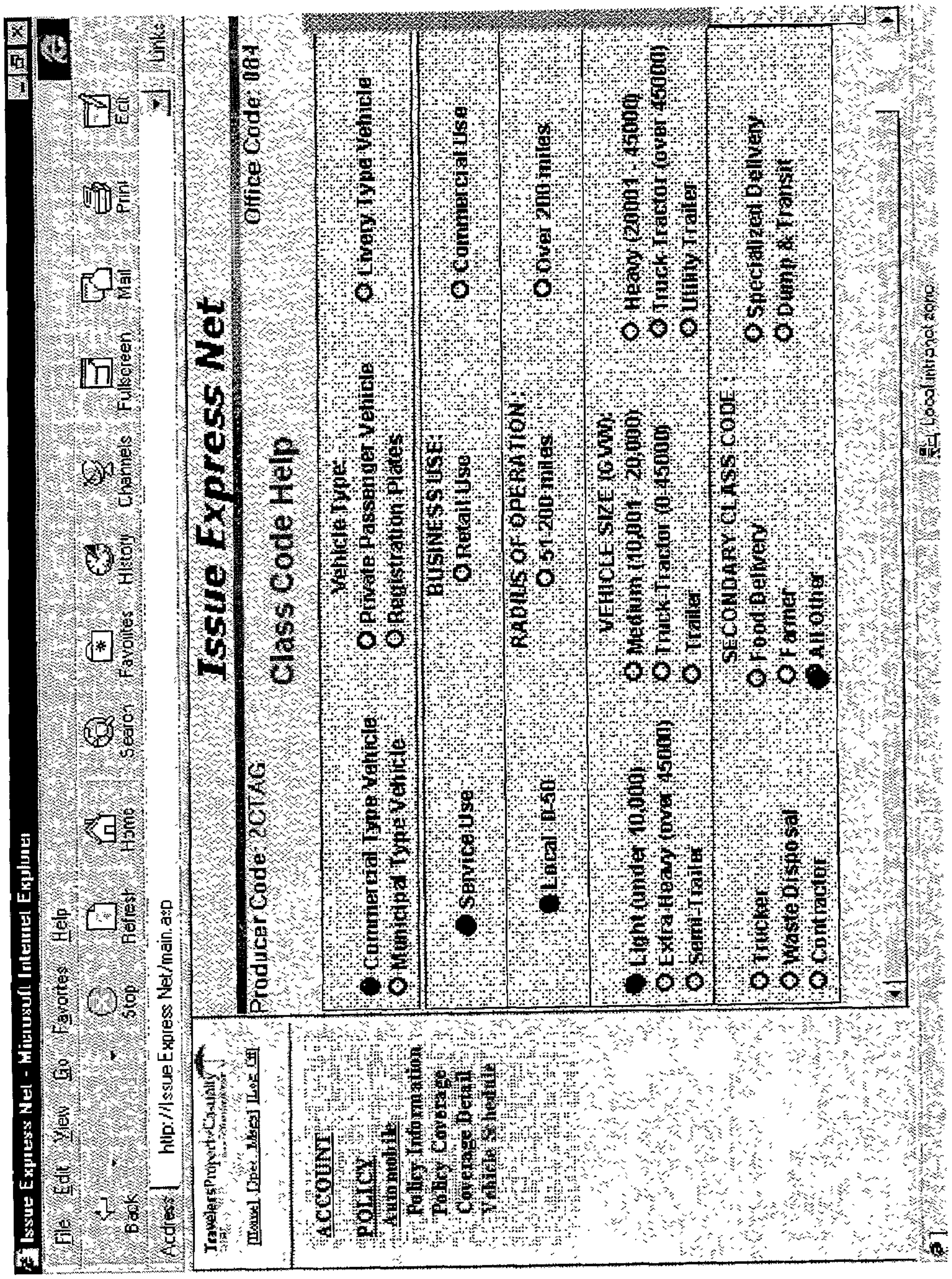
FIGS. 36A and 36B together show the Class Code Help screen for the Automobile quote in accordance with an embodiment of the present invention.
Figure 36B:
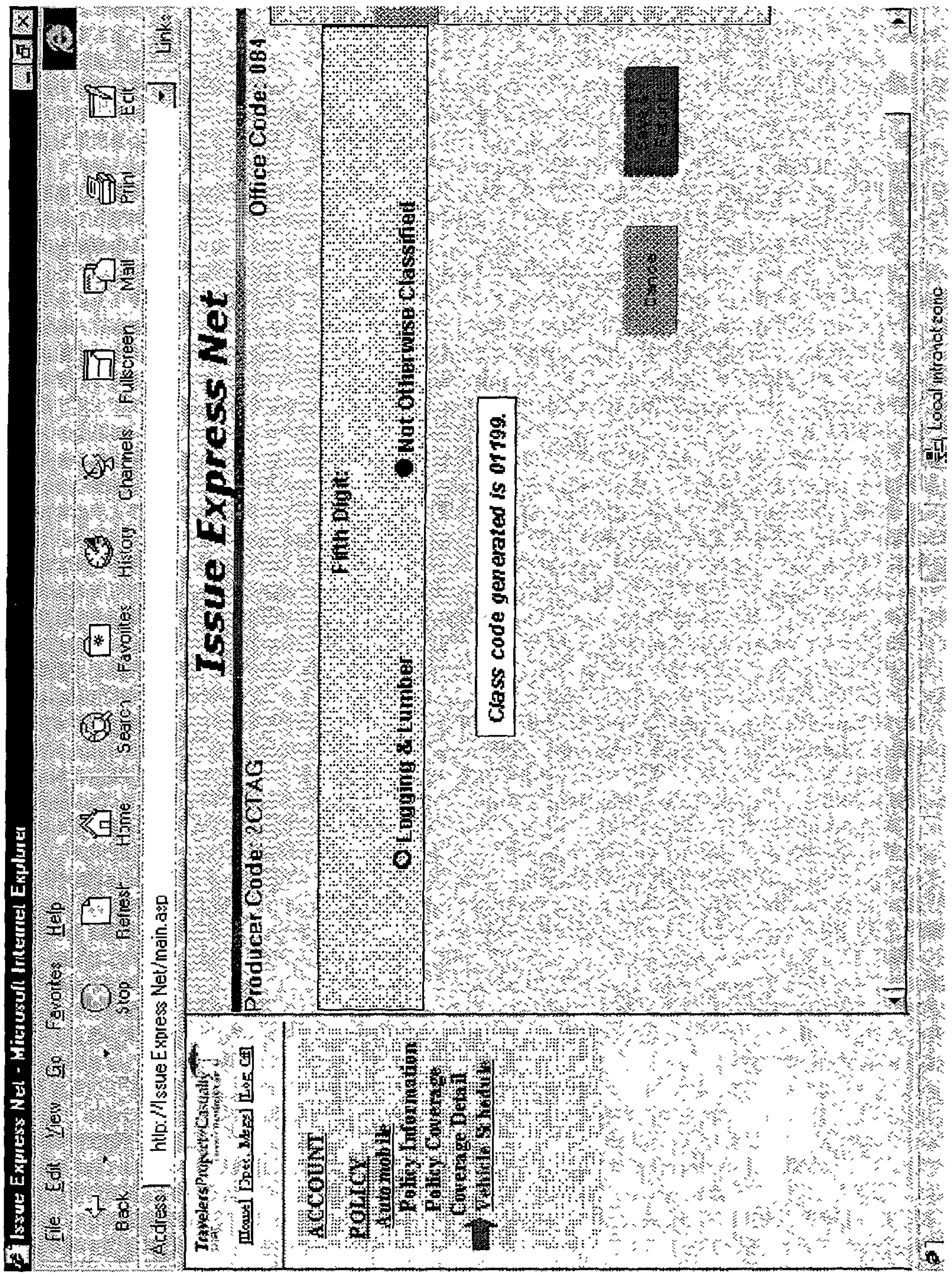

FIGS. 36A and 36B together show the Class Code Help screen for the Automobile quote process. The Class Code Help screen is used to capture information about the vehicle being added to the schedule so that the class code can be derived. This screen can be displayed from the Vehicle Schedule screen if the user clicks on the question mark (?) in the grid. When this page is displayed, the Navigator will show the link Vehicle Schedule under the Automobile heading. The link appears when the page is displayed and also after the page has been completed so that the user can re-access the screen. There is not a link on the Navigator for Class Code Help.

As shown in FIGS. 36A and 36B, the vehicle group types are displayed at the top of the action area of the Class Code Help screen, initially all blank, so that the user can select one. After the vehicle group is selected, the questions for that group are brought up. The screen collects each piece of the necessary information to determine the correct classification for each of the five vehicle group types. Each group will bring up the corresponding questions to derive the proper classification. When all questions have been answered, the generated class code will appear on the screen. If the code is correct, the user can then save it and return to the Vehicle Schedule screen by clicking on the "Save & Return" button. If it is not correct, the user can try again.

With regard to cross-screen impacts, the Class Code Help screen will impact the Vehicle Schedule screen. The classification that is derived from this screen will be fed back to the Vehicle Schedule screen. The Appendix shows the parameters and explanations for the page prompts/fields, page buttons, and screen tabbing order of the Class Code Help screen.

Figure 37A:
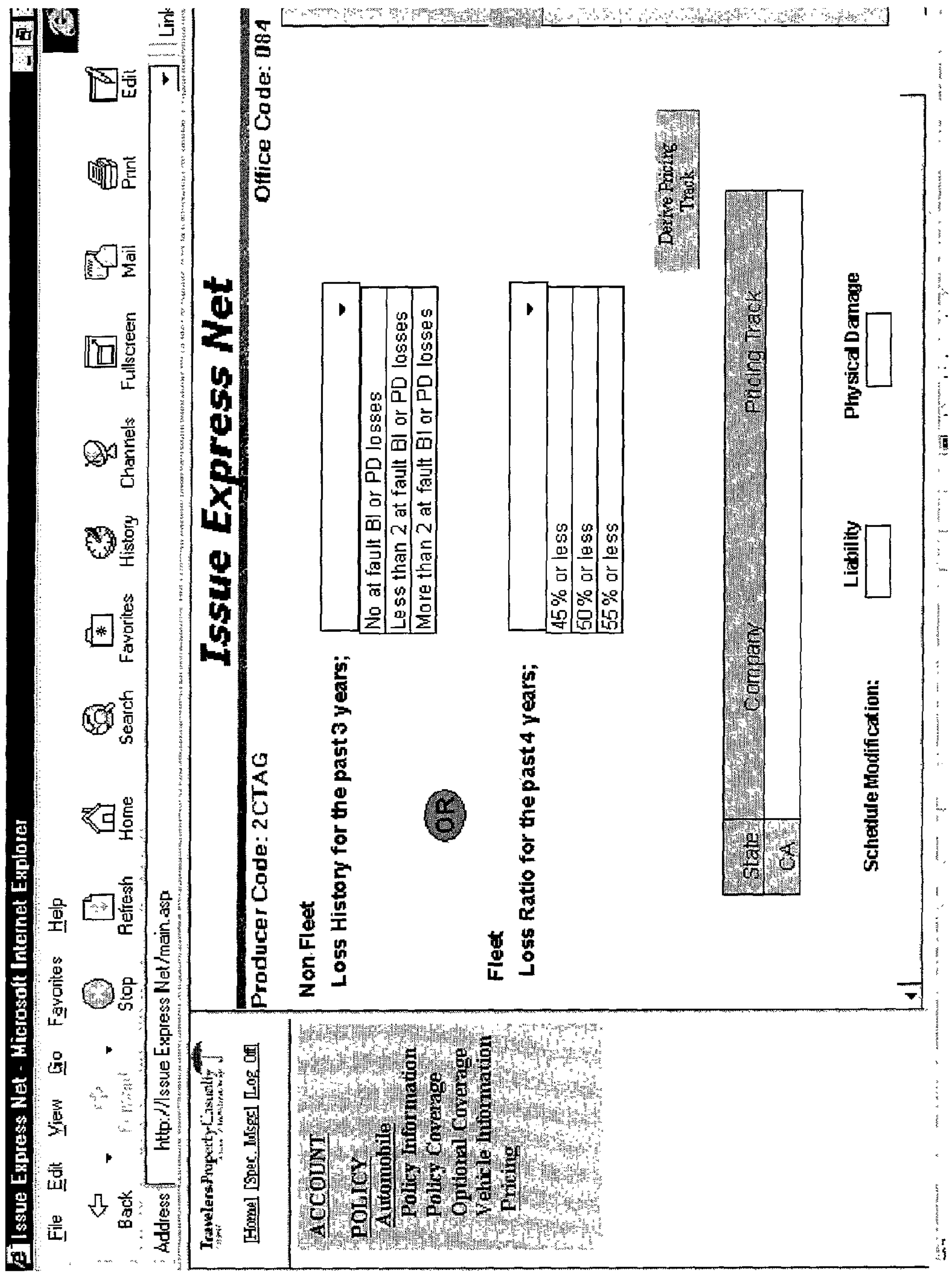
FIGS. 37A-37D show the Pricing screen for an Automobile quote in accordance with an embodiment of the present invention.
Figure 37B:
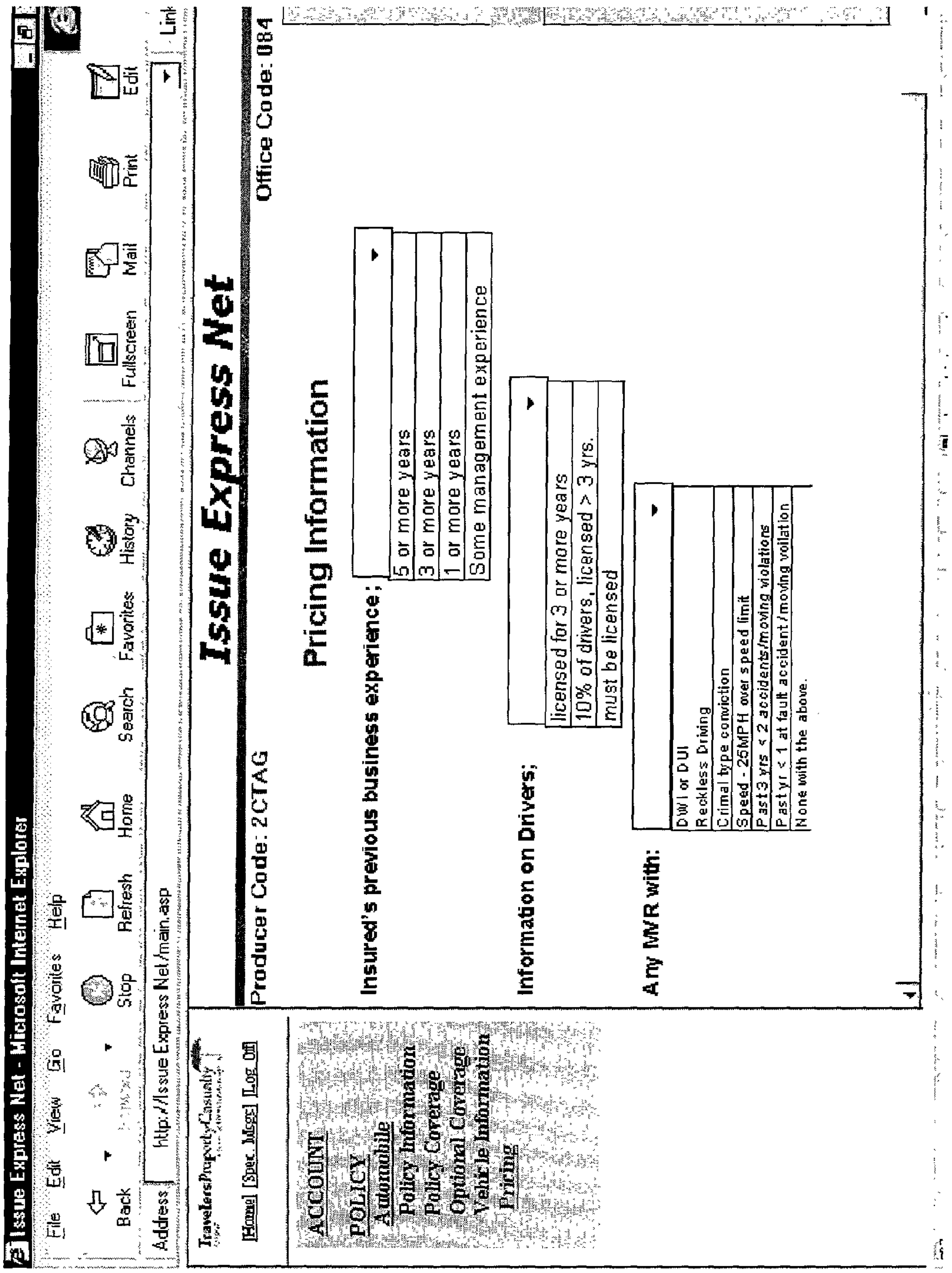
Figure 37C:
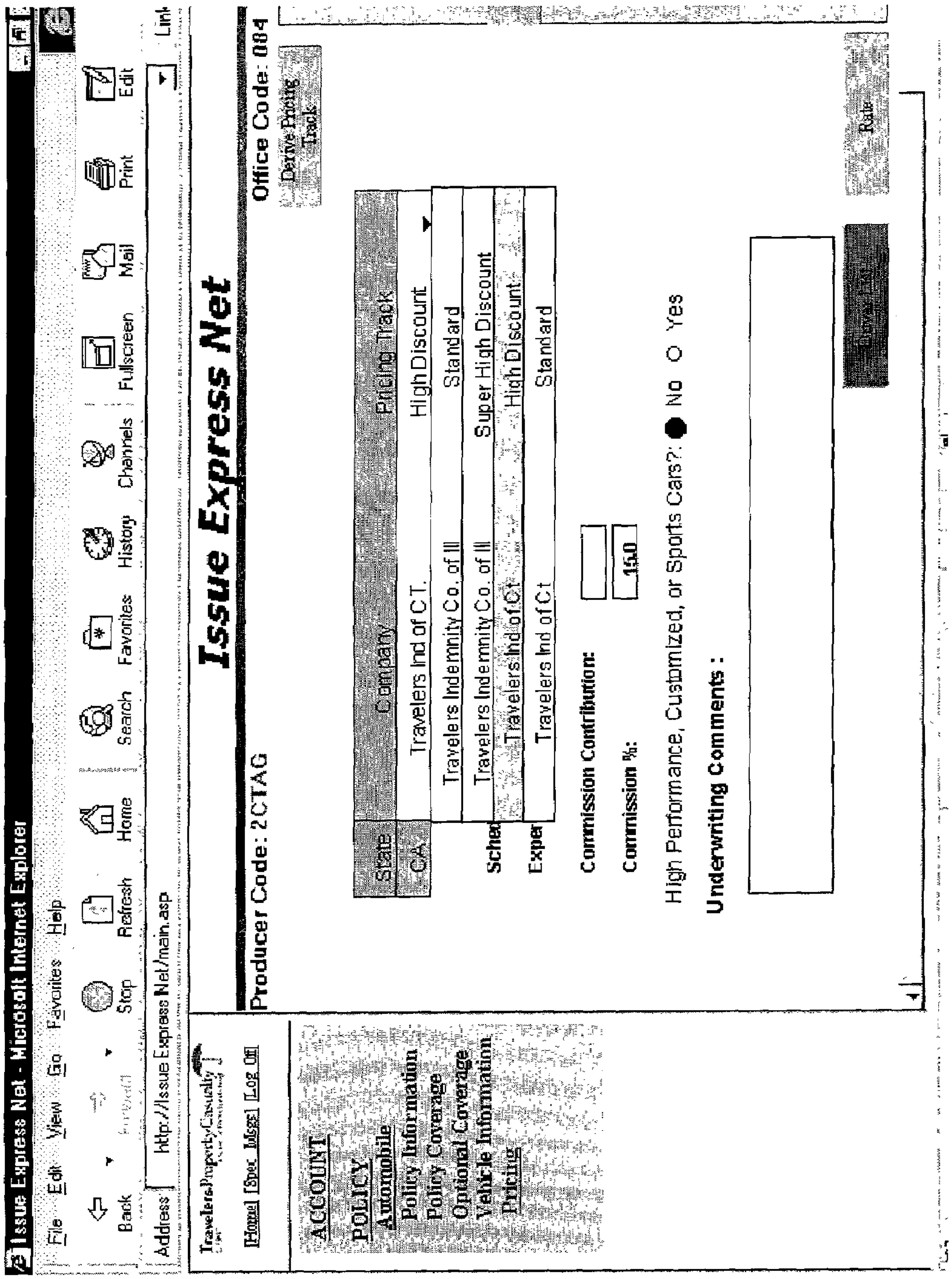
Figure 37D:
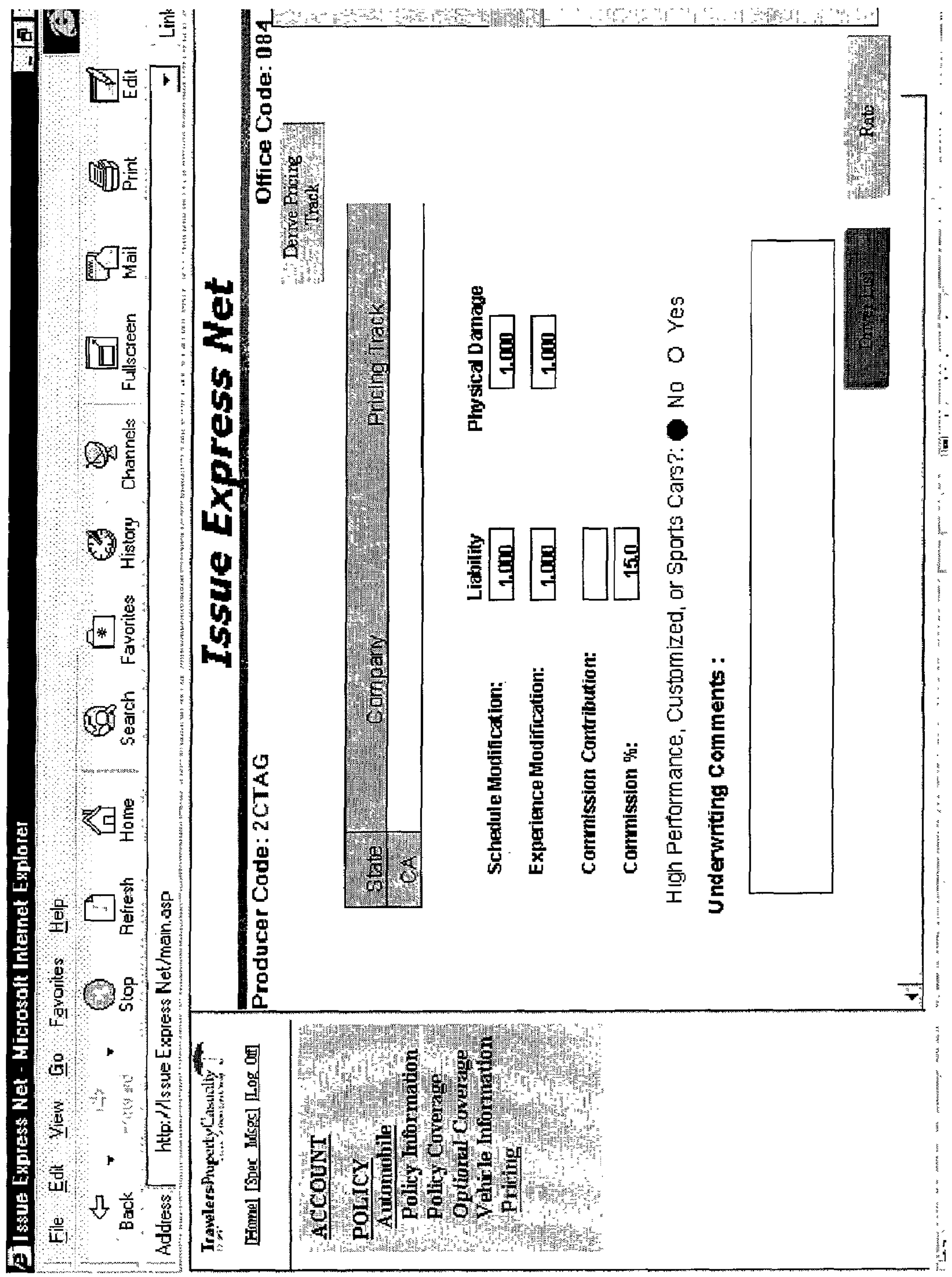
Figure 39:
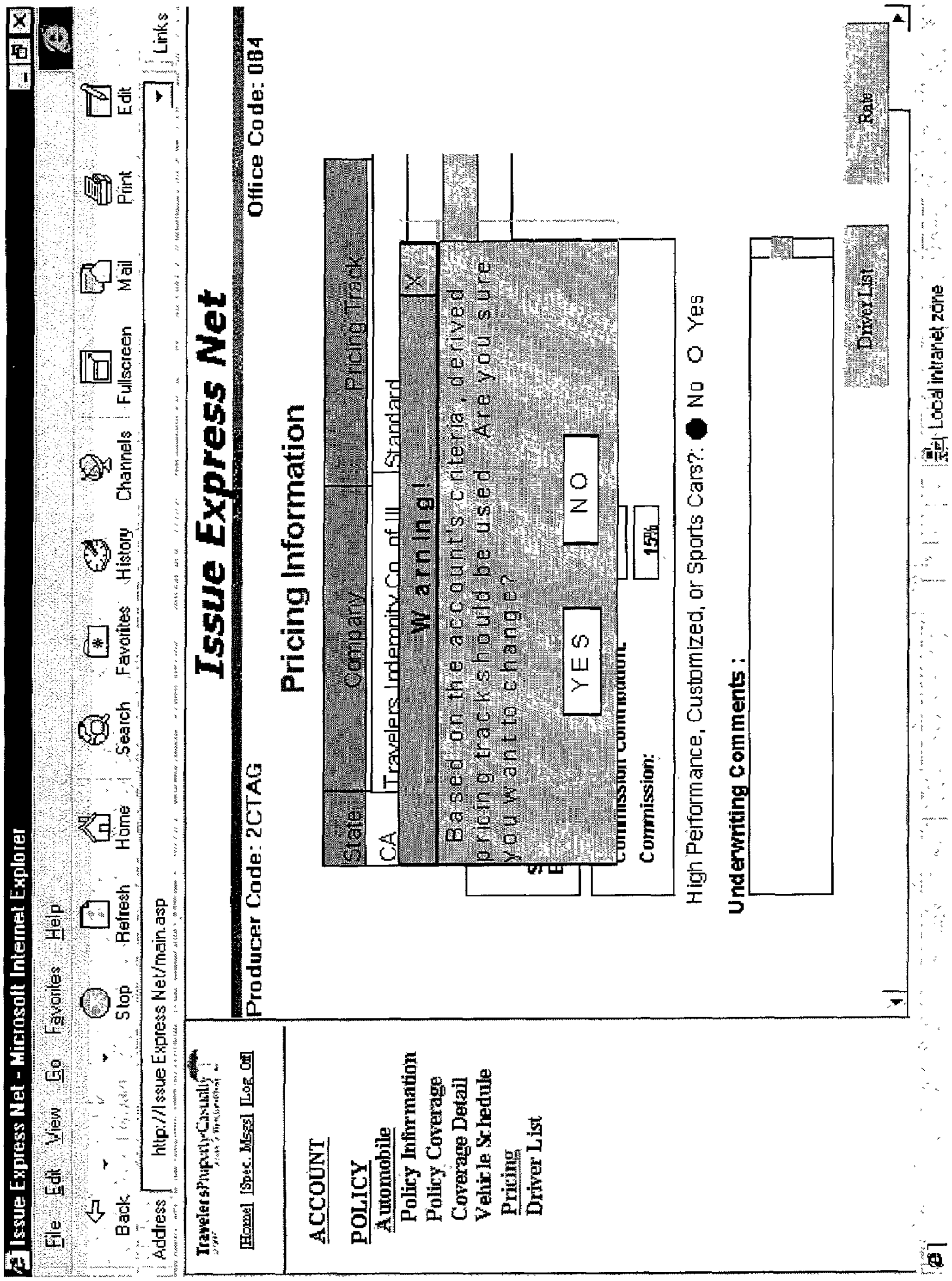
FIG. 39 shows a warning pop-up window for the Pricing screen of FIGS. 37A-37D in accordance with an embodiment of the present invention.

FIGS. 37A-37D show the Pricing screen for an Automobile quote. This screen is accessed next, via the Vehicle Schedule or Information screen. As shown, there are a number of factors that affect the price for an Automobile insurance coverage. Thus, the Pricing screen includes a number of fields associated with those factors for user's entry of information. FIG. 38 shows a list of such factors and the possible entries for each factor. Once the user has entered the pricing information in the Pricing Screen, the user can calculate the pricing track by clicking on the "Derive Pricing Track" button in the Pricing screen. The pricing track is then derived based on the possible combinations of entries into the fields of the Pricing screen, in accordance with the pricing track shown in FIG. 38. The derived pricing track is then displayed in a grid in the Pricing screen, as shown in FIG. 37D, whereby the user can modify the resulting pricing track via a drop-down menu in the same grid. If the modification is different from the derived pricing track, a warning pop-up window as shown in FIG. 39 will appear to verify that the user wishes to change the result of the pricing track. The user can then click on the "Driver List" button to proceed to the Driver List screen. Alternatively, the user can click on the "Rate" list to proceed to the Rate screen for a price quote of the desired Automobile insurance coverage based on the information entered in the Pricing screen and the derived/modified pricing track.

Figure 40:
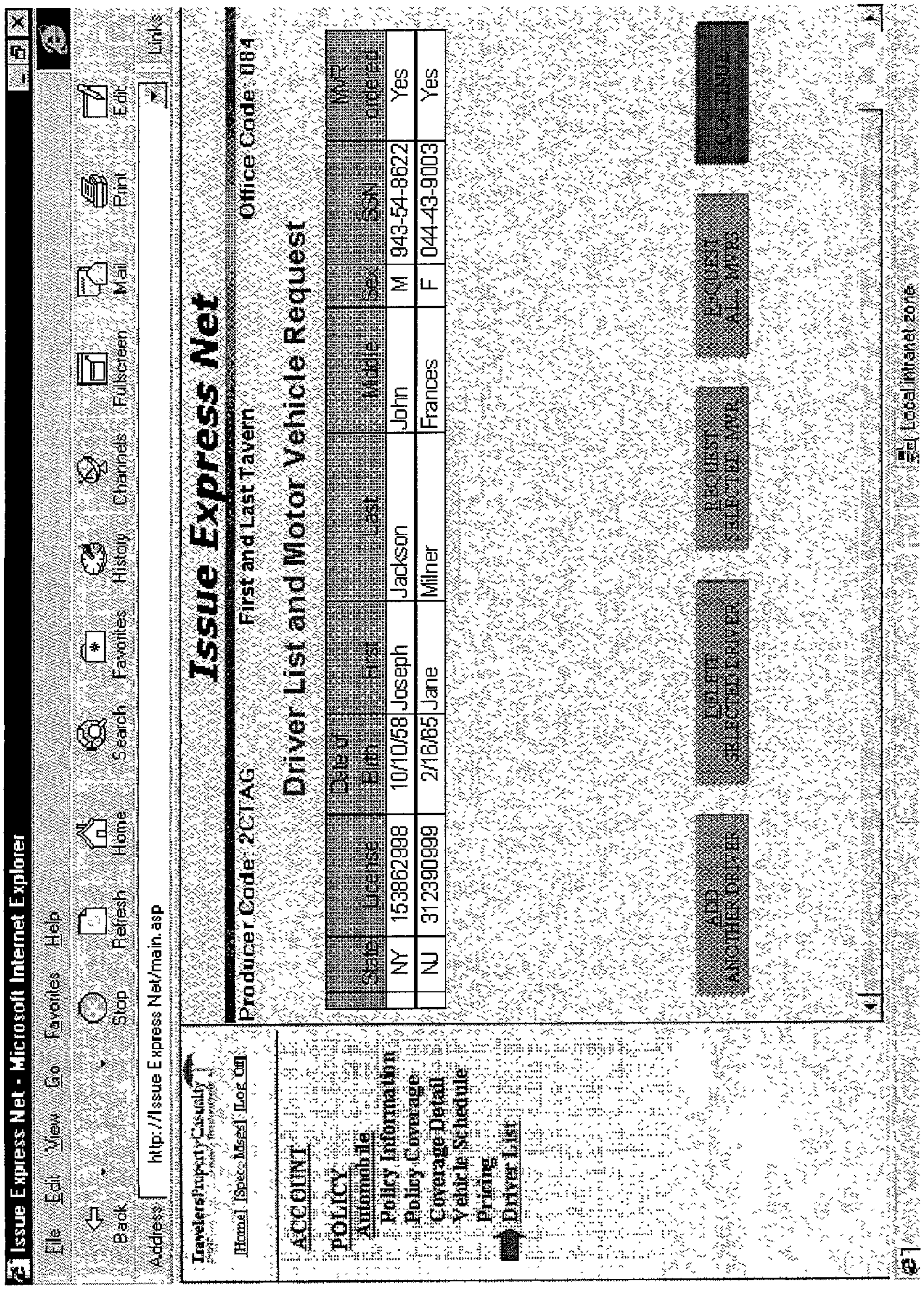
FIG. 40 shows the Driver List screen for an Automobile quote in accordance with an embodiment of the present invention.

FIG. 40 shows the Driver List screen that results from clicking on the "Driver List" button in the Pricing screen, once the latter is completed. This Driver List and Motor Vehicle Report Request screen will allow the user to both enter Driver Information to be printed on the Driver List as well as request Motor Vehicle Reports (MVRs) for a specific driver or all of the drivers on the list. Information input is necessary to order MWRs. This screen will be used to print the drivers' list with a new business when the automobile policy is issued. When this screen is displayed, the Navigator will show the Driver List link under the Automobile heading. The link appears when the screen is displayed and also after the screen has been completed so that the user can re-access the screen. The screen will initially display with one blank row on the grid. When the Driver List has been completed the user will be brought back to the Pricing Information screen. The Appendix shows the parameters and explanations for the page prompts/fields, page buttons, and screen tabbing order of the Driver List screen.

Figure 41:
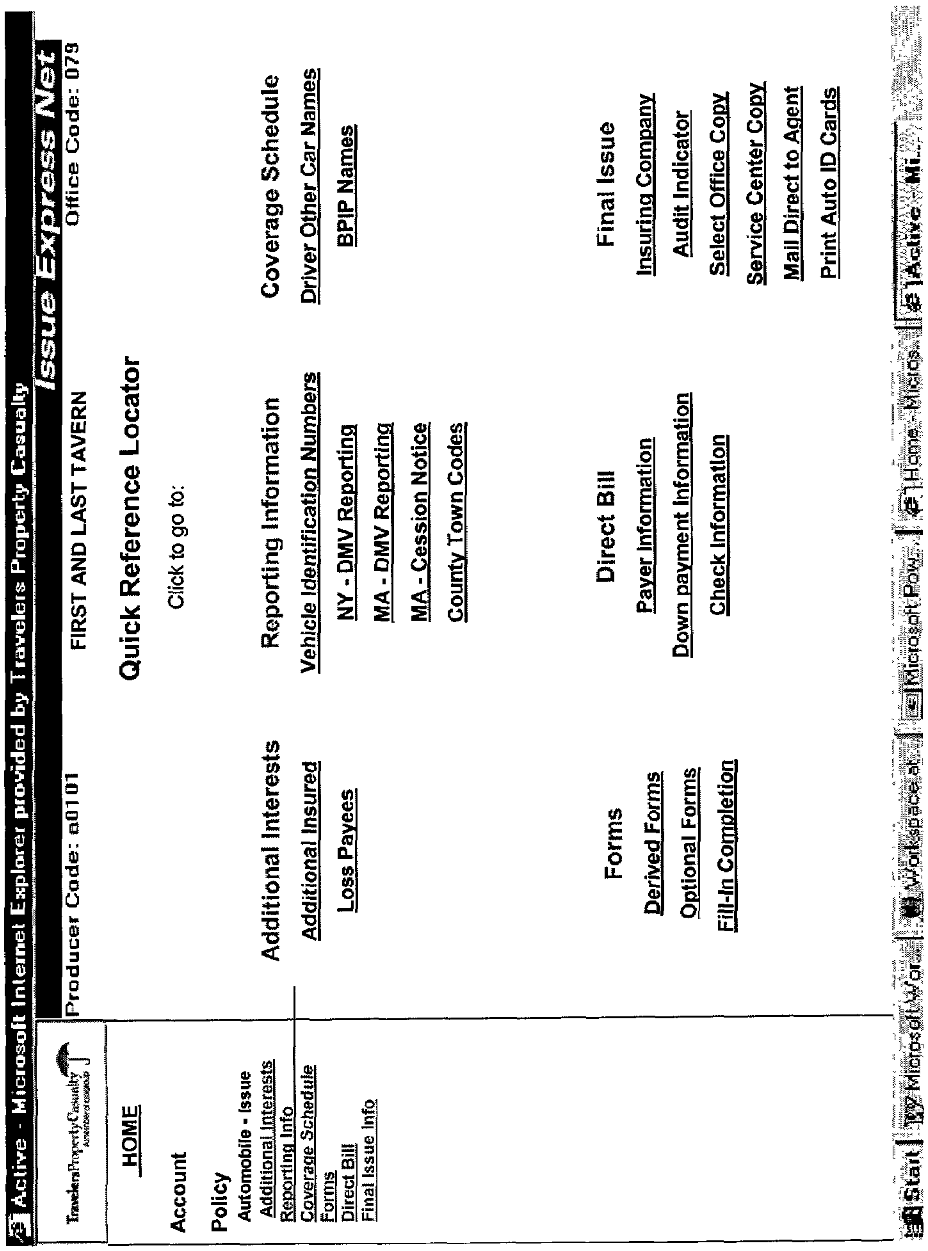
FIG. 41 shows the QRL screen for Automobile issue in accordance with an embodiment of the present invention.
Figure 42:
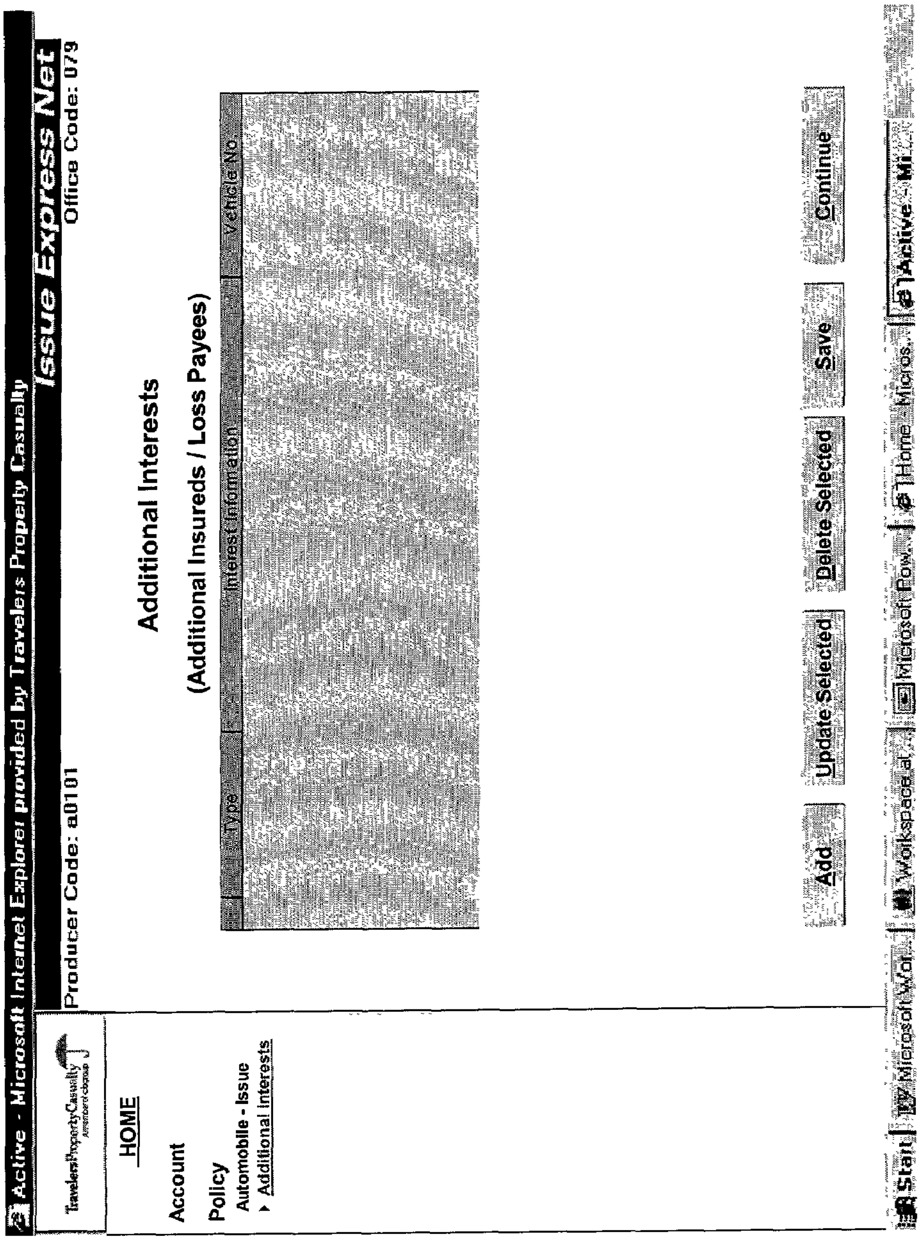
FIG. 42 shows the Additional Interests screen in accordance with an embodiment of the present invention.

FIG. 41 shows the QRL screen for Automobile issue. FIG. 42 shows the Additional Interests screen, which is the first screen in the screen flow for Automobile issuance. The Appendix provides the parameters and explanations of the requirements for the screen, along with explanations of the various links, including the Additional Interest link, in the Navigator for screens in the screen flow of the Automobile issue.

Figure 43:
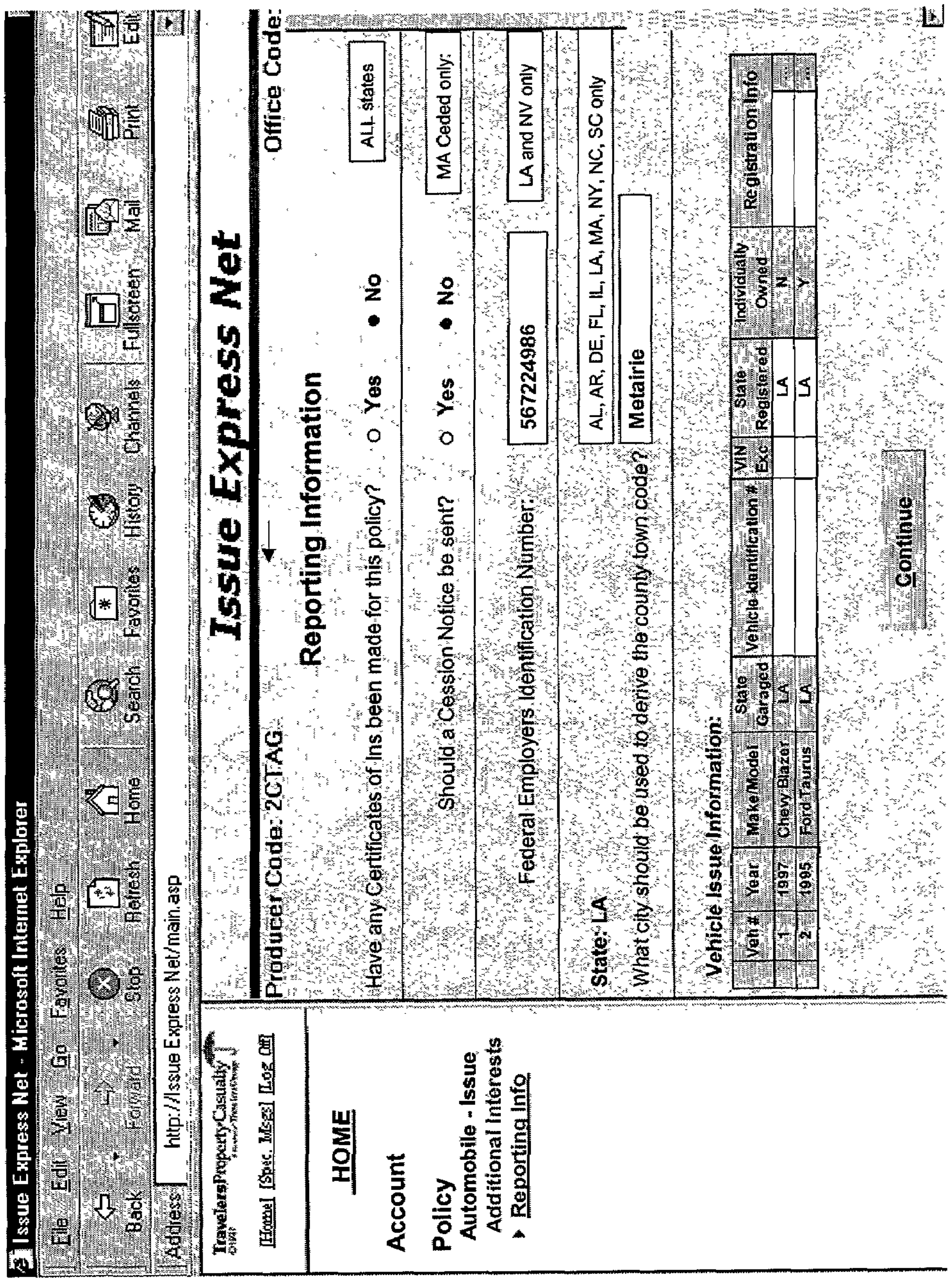
FIG. 43 shows the Reporting Information screen for Automobile issue in accordance with an embodiment of the present invention.

FIG. 43 shows the Reporting Information screen for Automobile issue. It displays as the second screen in the final issuance process for an Automobile insurance policy.

This screen appears after the Additional Interest screen shown in FIG. 41. The purpose of the Reporting Information screen is to collect policy and vehicle information needed to issue. As shown in FIG. 43, the screen is initially displayed with some information having already been derived. For instance, a grid is displayed with all of the vehicles from the vehicle schedule. Vehicle Identification number is also captured, along with verification of legal ownership of the vehicle and for some states the registration information. Some other state specific questions, such as Federal employer identification number, county town code for optional coverage's, any certificates of Insurance or cession notice are also captured in this screen. Regarding the cross-screen impacts for this screen, because some of the information that is brought to this screen comes from the Automobile quote, if a vehicle is added, changed, or deleted, it may affect any information already entered on this screen.

When the Reporting Information screen is displayed, the Navigator will show the Reporting Info link under the Automobile-Issue and Additional Interest headings. The link appears when the screen is displayed and also after the screen has been completed so that the user can re-access the screen. The Appendix shows the parameters and explanations for the page prompts/fields, modal windows, page buttons, screen tabbing order or sequence, and warning messages of the Reporting Information screen for Automobile issue.

Figure 44:
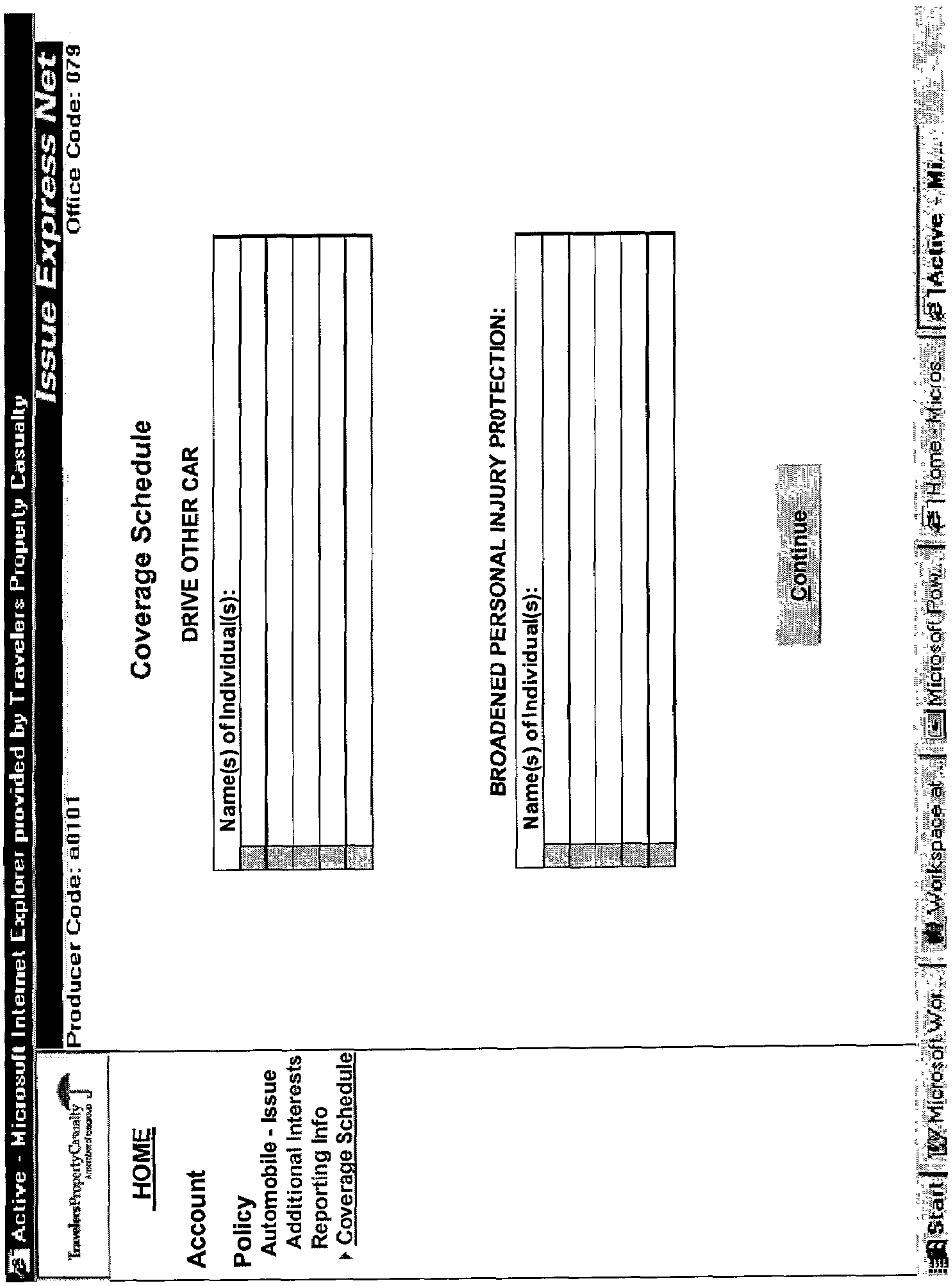
FIG. 44 shows the Coverage Schedule screen for Automobile issue in accordance with an embodiment of the present invention.

FIG. 44 shows another one of the screens in the screen flow for Automobile issue, the Coverage Schedule screen. This screen appears after the Reporting Information screen and is part of the Issue Screen flow. It is available from the Navigator as Coverage Schedule link. This screen is used to capture scheduled item information in a table. Names needed due to optional coverages at the policy level will need to be typed into the table(s). The display of this portion of the screen is based on whether or not certain optional coverages were selected as part of the quote (see Appendix). The Scheduled Item section of the screen is dynamic based on the optional coverages selected during quote. The table size for these items will come from the database. This will be discussed in detail later. The table(s) in this section is(are) empty upon the initialization of the screen. The scheduled item table(s) allows the user to itemize information more specifically than what was needed for rating during the quote process. Cross editing is performed on this screen based on information collected during rating.

Regarding cross-screen impacts of the Coverage Schedule screen, as mentioned above, there is cross editing that is performed on this screen based on information keyed as part of the quote path. In general, rows should total an amount used during rating. The database is accessed during this process to compare information already stored on the program information file (PIF) against what the total is for a particular table. The Appendix shows the parameters and explanations for the page prompts/fields, page buttons, screen tabbing order, warning messages, error messaging of the Coverage Schedule screen for Automobile issue.

Figure 45:
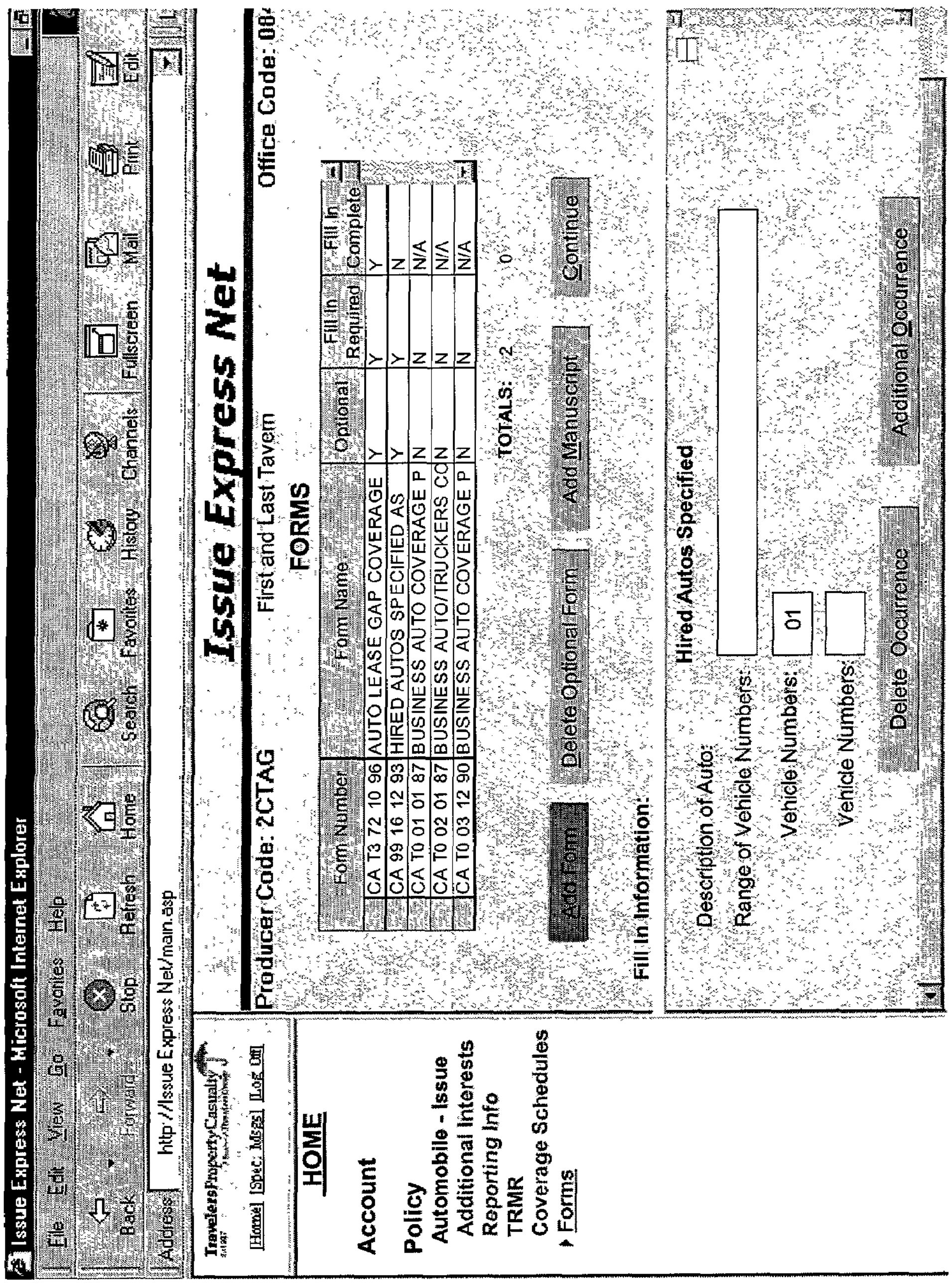
FIG. 45 shows the Forms screen for Automobile issue in accordance with an embodiment of the present invention.

FIG. 45 shows the Forms screen for Automobile issue. The screen appears either after the coverage schedule screen or TRMR screen. If neither of these screens are on the policy then it will appear after the Reporting Information Screen and will be part of the Issue screen flow. It is available from the Navigator as a Forms link. This screen offers the ability to view all of the forms on a policy, both system-derived (including mandatory and optional) and user-added optional forms. The Forms screen will initially show a list of derived forms on the policy in a grid format. If optional forms are added then on re-visit to the screen these forms should be included as part of the grid. The lower portion of the screen allows for the collection of fill-in information in a window that is scrollable. Buttons may be used to add forms or delete optional forms that were not derived through forms derivation. Users have the ability to add optional forms or manuscript endorsements. They also have the ability to delete any user-added optional forms. The grid should allow sorting based on double clicking any column heading.

As shown in FIG. 45, the Forms screen initially displays with a grid populated with system-derived Form Names, Form Numbers, and three indicators that include an 'Optional' Indicator, 'Fill-In Required' Indicator, and 'Fill-In Complete' Indicator. The grid can display a set number of rows and may be scrollable so that all of the forms on the policy may be reviewed. The grid also contains a 'nub' on the left where the user can select the entire row by clicking on the 'nub'. The 'Fill-In Complete' Indicator will initially be set to 'N' upon the first visit of the screen, with two exceptions to be discussed later in this document. The same is true of the 'Optional' Indicator. A bar separates the grid from "fill-in" data collection.

Regarding the cross-screen impacts of the Forms screen, accessing the Modify Quote link in the Account Summary screen (FIG. 9) will re-set the Derive Forms indicator back to 'Yes'. Changes to the Additional Interest screen could impact forms derivation. The Appendix provides the parameters and explanations for the page prompts/fields, page buttons, screen tabbing order, warning messages, error messaging of the Forms screen for Automobile issue. The Appendix further provides a description, parameters, and explanations of the Optional Forms list that appear when the user clicks on the "Add Form" button in FIG. 45.

Figure 46:
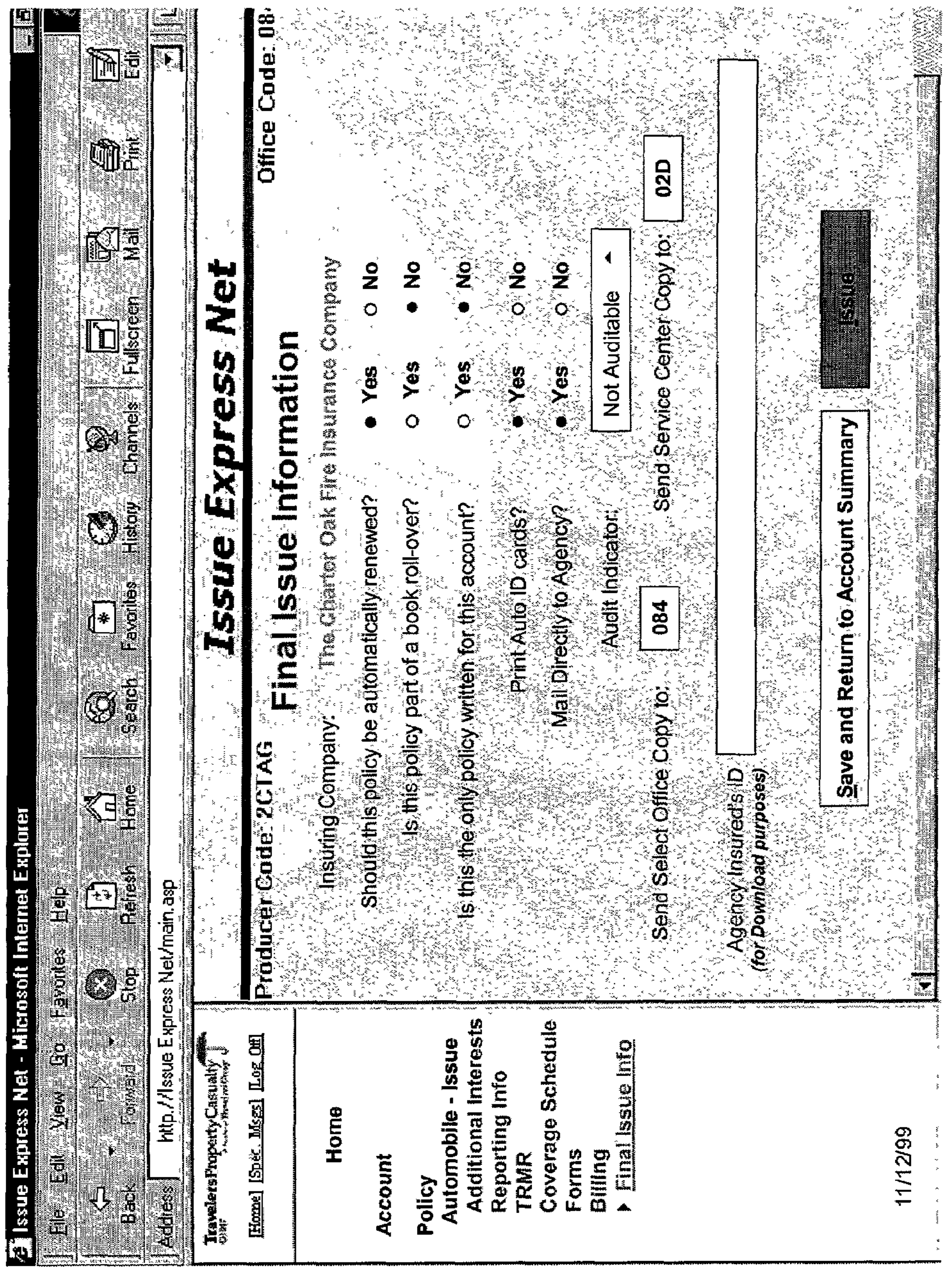
FIG. 46 shows the Final Issue Information screen for Automobile issue in accordance with an embodiment of the present invention.

FIG. 46 shows the Final Issue Information screen for an insurance application to issue an Automobile coverage. This screen displays as the last screen in the final issuance process and is available from the Navigator as a Final Issue Info link. It appears after the Billing screen and prior to presentation of the Account Summary screen. The purpose of the screen is to capture and display miscellaneous information needed for issue. The Final Issue Information screen offers many features including the ability to stop the policy from going through the automatic renewal process. It also displays some information that will be helpful to the user such as the 'Audit Indicator', which is used to identify whether or not the policy is subject to audit upon expiration and the name of the 'Insuring Company'. There are variances in what prompts will display and what will be hidden from the presentation layer. Those variances are based largely on role code—whether or not the user is an Agent, Home Office or Field Office Employee. The screen is also used to collect output information such as the "Send Select Office Copy to" and "Send Service Center Copy to" as well as a Mail Directly to Agent choice. For Automobile, it collects information as to whether the Automobile identification cards should be printed with the policy.

As shown in FIG. 46, the Final Issue Information screen is initially displayed with certain information having already been derived. These are the items that are contained in the first display group, which really have no specific heading. For example, the 'Audit Indicator' and 'Insuring Company' (which are part of this group) are derived and displayed on the screen. For Automobile, the "Print Auto ID cards?" defaults from the producer profile. The Appendix shows the parameters and explanations for the page prompts/fields, page buttons, screen tabbing order, and error messaging of the Class Code Help screen.

As with other insurance applications mentioned earlier, the Umbrella quote includes the Policy Information Screen as the first screen within the quote path of Umbrella. It is available from the Navigator bar as the Policy Information link. It is displayed after Add New/Umbrella is selected off the Navigator from the Account Summary screen. It is also available if data exists on the screen and this policy information is being modified. As is known to one skilled in the art, an umbrella insurance coverage provides excess liability protection. A business needs this coverage for a number of reasons, including: providing excess coverage over the underlying liability insurance the business carries; providing coverage for all other liability exposures, except for a few specifically excluded exposures; and providing automatic replacement coverage for underlying policies that have been reduced or exhausted by loss.

When the Policy Information screen of the Umbrella quote is completed, the user will be brought to the second and main page for the Umbrella quote process, the Umbrella Detail screen (FIGS. 47A-47B), which will be described later. The purpose of the Policy Information screen is to collect data about the insured that is needed for the establishment of the Umbrella policy on the host insurance systems. The screen initially displays with the Named Insured and mailing address information defaulted from the account. Legal Entity, Policy Effective, and Policy Expiration are defaulted from the submission level. Rate Effective Date will be set based on the predominant state or jurisdiction. The functionality of the Policy Information screen remains the same as what has already been built for the other lines. There are no cross screen impacts, i.e., no cross screen error like that shown in FIG. 13. Changes made to any data item on this screen does not impact the account or submission levels. When the Policy Information screen or page of Umbrella quote is displayed, the Navigator will show the "Policy Information" link under the Umbrella heading. The link will appear when the Policy Information screen is displayed and also after the page has been completed so that the user can re-access the screen. The Appendix shows the parameters and explanations for the page prompts/fields and the modal windows, along with the page buttons and screen tabbing order of the Policy Information screen.

Figure 47A:
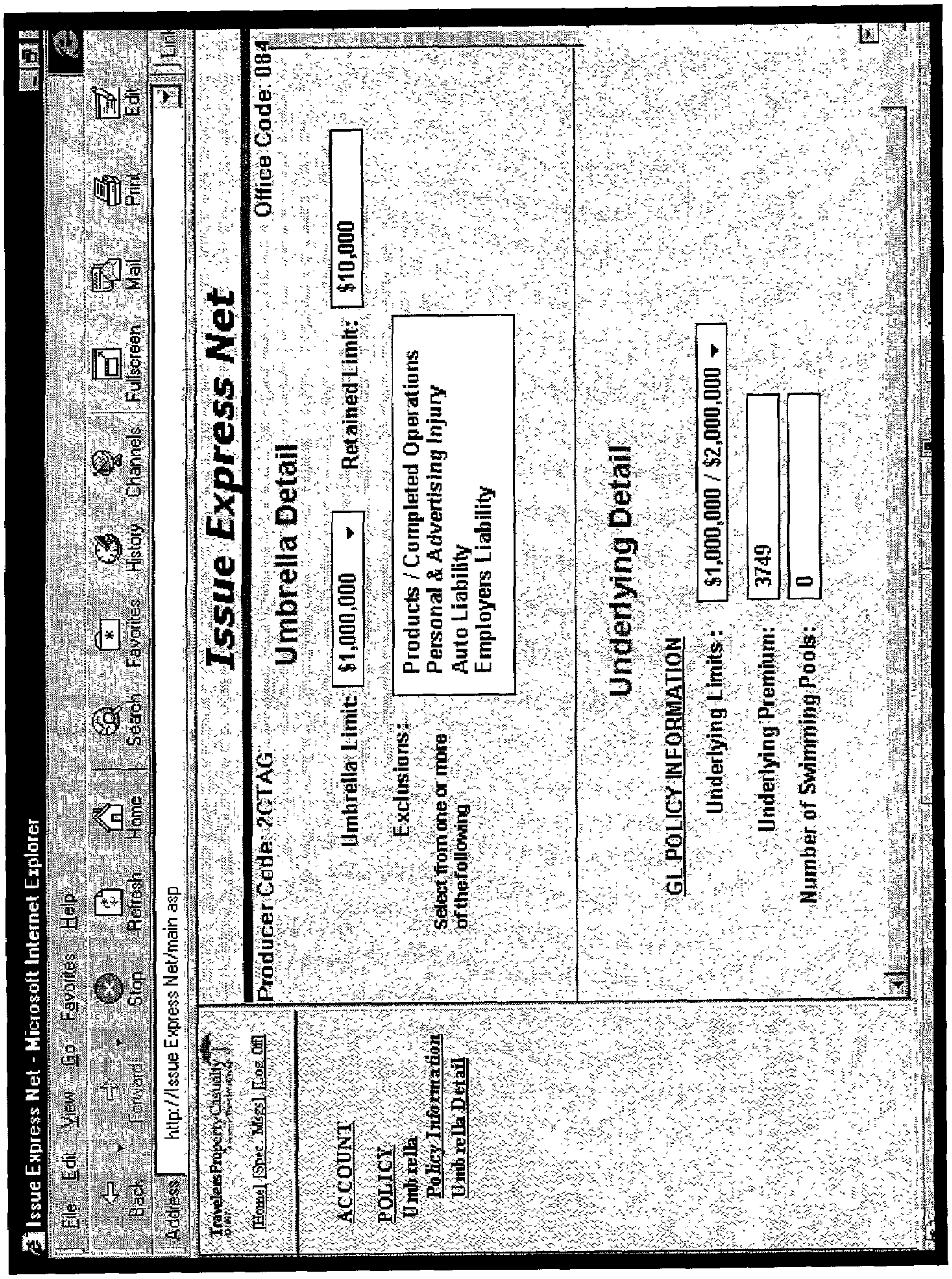
FIGS. 47A-47B depict the Umbrella Detail screen for an Umbrella quote in accordance with an embodiment of the present invention.
Figure 47B:
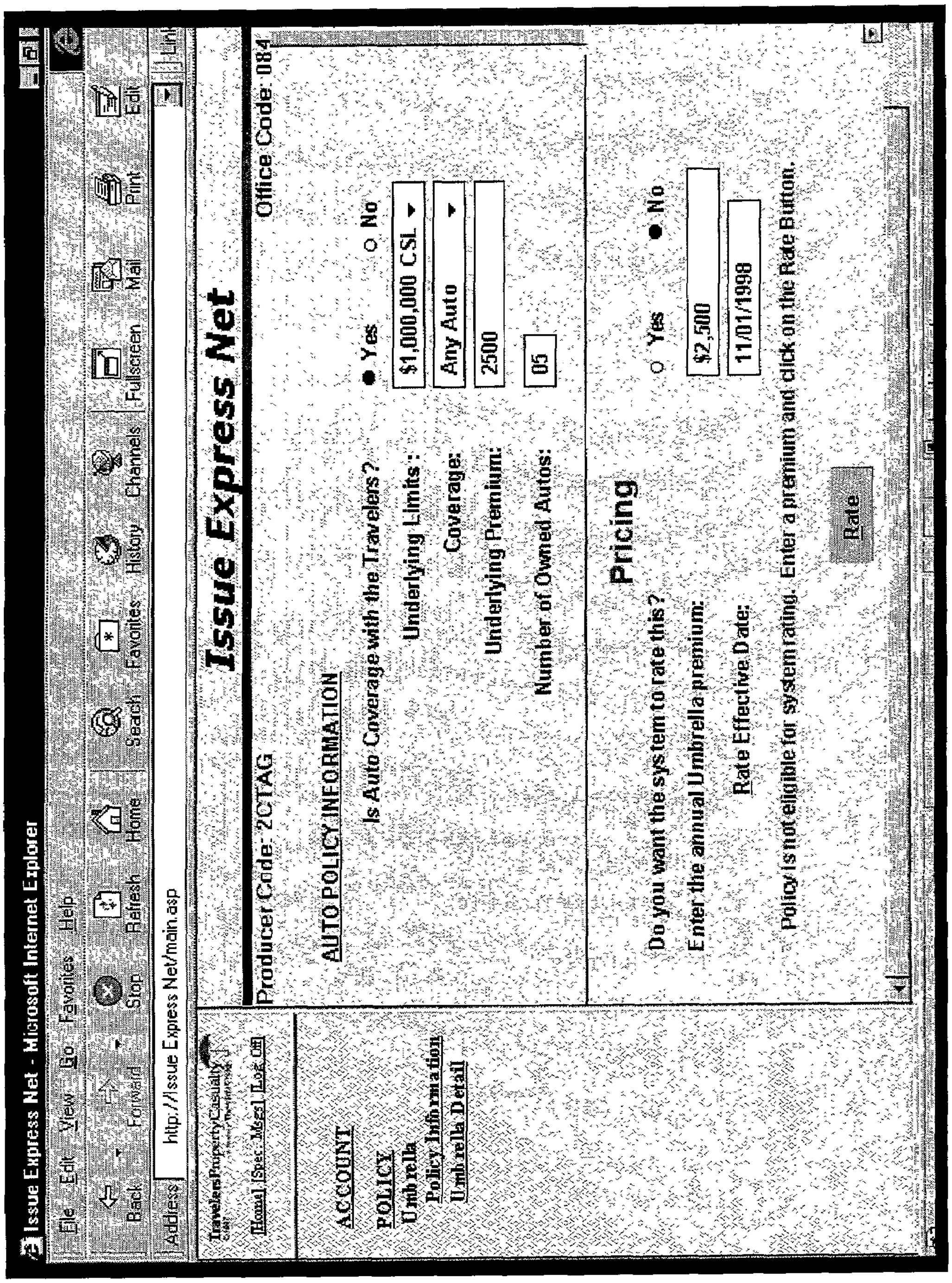

FIGS. 47A-47B depict the Umbrella Detail screen, which is displayed after the Policy Information page. It is the second, last, and main data collection screen in the Umbrella quote screen flow. This screen is used for the collection of all data necessary to quote an Umbrella policy. It includes limit information, exclusionary information, as well as pertinent coverage, exposure, and premium information from underlying policies. As shown in FIGS. 47A and 47B, the Umbrella Detail screen is split into three sections: Umbrella Detail, Underlying Detail, and Pricing. The third section contains the question "Do you want the system to rate this?" with "Yes" and "No" radio buttons. "Enter the Umbrella premium" is a supplemental question that may appear under this section as well. This is explained in the Appendix.

According to one embodiment of the present invention, the Umbrella Detail screen is initially displayed with most information defaulted, either through defined defaults in regards to the Umbrella Detail section or from underlying policy information in reference to the Underlying Detail section. The three sections may be collapsed based on user selections or from information pulled from underlying policies. With regard to cross-screen impacts, the Predominant State changes from the Policy Information screen may have an impact on allowable answer values. The Appendix shows the parameters and explanations for the page prompts/fields, page buttons, screen tabbing order, and error messaging of the Umbrella Detail screen for the Umbrella quote process.

Figure 48:
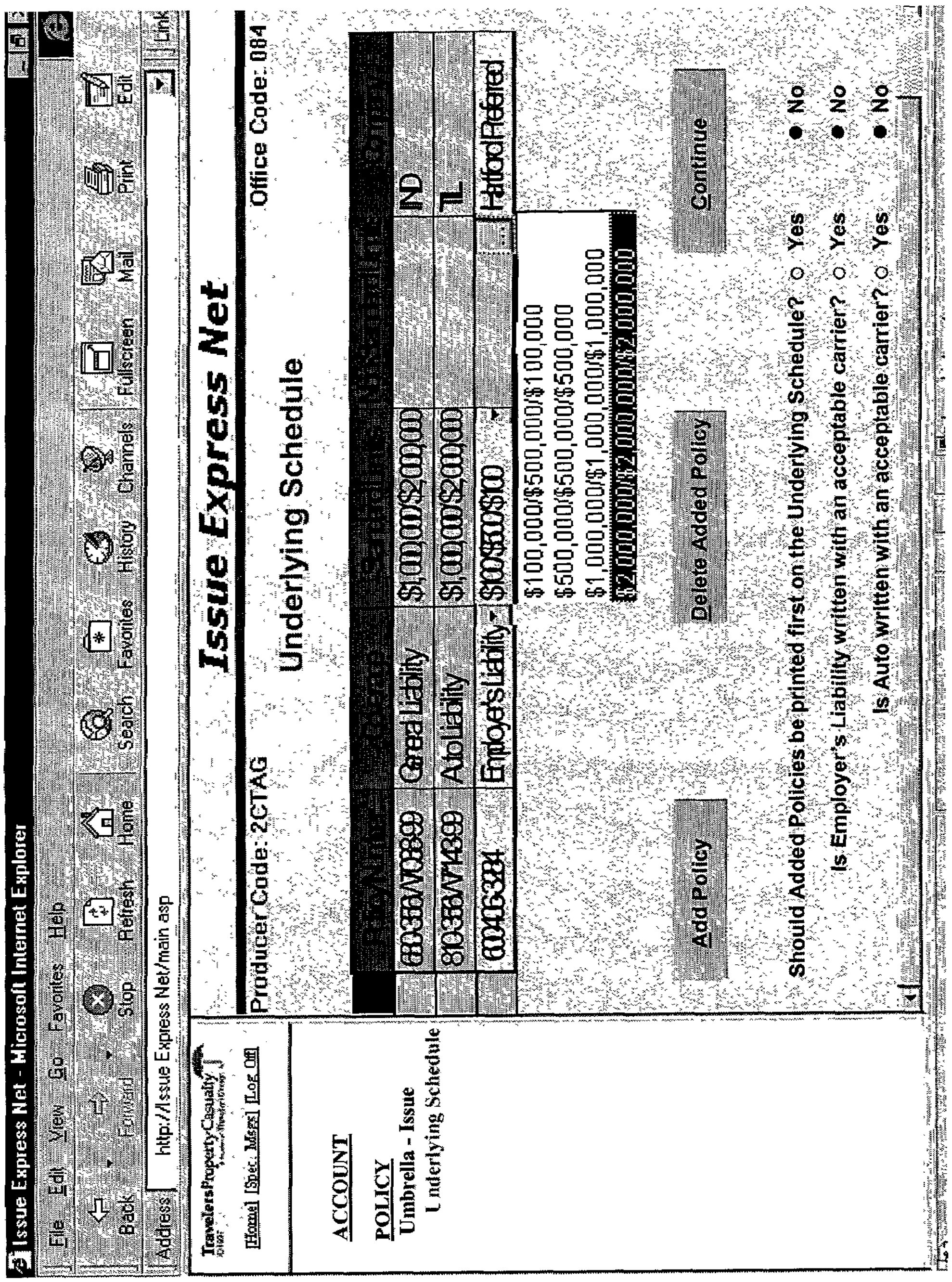
FIG. 48 shows an example of an Underlying Schedule screen for an Umbrella issue process, in accordance with an embodiment of the present invention.

FIG. 48 shows an example of an Underlying Schedule screen for an umbrella issue process, in accordance with an embodiment of the present invention. This is the first screen within the Issue Screens for the Umbrella policy. It is available as a Navigator selection titled Underlying Schedule. It is used to collect underlying policy information for which the Umbrella policy provides excess liability. Such underlying policy information is provided for both the host insurance system and its insurance applications, as well as for policies issued outside of Issue Express and/or outside of the host insurance company. The information collected on this screen will be printed as part of the Policy Declarations or on a separate form. This screen allows the user to review the host insurance policy information as well as add rows to collect policy information pertaining to other policies that either were issued outside of the host insurance systems, or were issued by another company, other than the host insurance company.

As shown in FIG. 48, the Underlying Schedule screen initially displays with policy information from both the host insurance system and its insurance applications displayed as part of the grid. Those policies which have been either purged or declined are filtered out of the list. The grid is initially sized to be as big as the number of policies returned, so that if three policies are returned, for example, then the grid would contain three rows upon its initial display. It is acceptable that if, through the addition of user added rows (or any other way), that the grid be scrollable vertically. The preference is to not have the grid scrollable horizontally. However, if information within the cells needs to be abbreviated and the abbreviation is unacceptable, it may be acceptable to have the grid scroll horizontally.

Regarding the cross-screen impacts of the Underlying Schedule screen of the Umbrella issue process, if Auto Liability is excluded, there is no entry within the grid pertaining to any auto policy. If Employers Liability is excluded, there is no entry within the grid pertaining to any WC policy. Additionally, if while within the Issue Screens, the user goes into either system and adds an additional policy to the same account, that policy will automatically be added to the schedule upon final issuance of the policy. The Appendix shows the parameters and explanations for the page prompts/fields, modal windows, page buttons, screen tabbing order, and error messaging of the A-Rate Submission screen.

Figure 49:
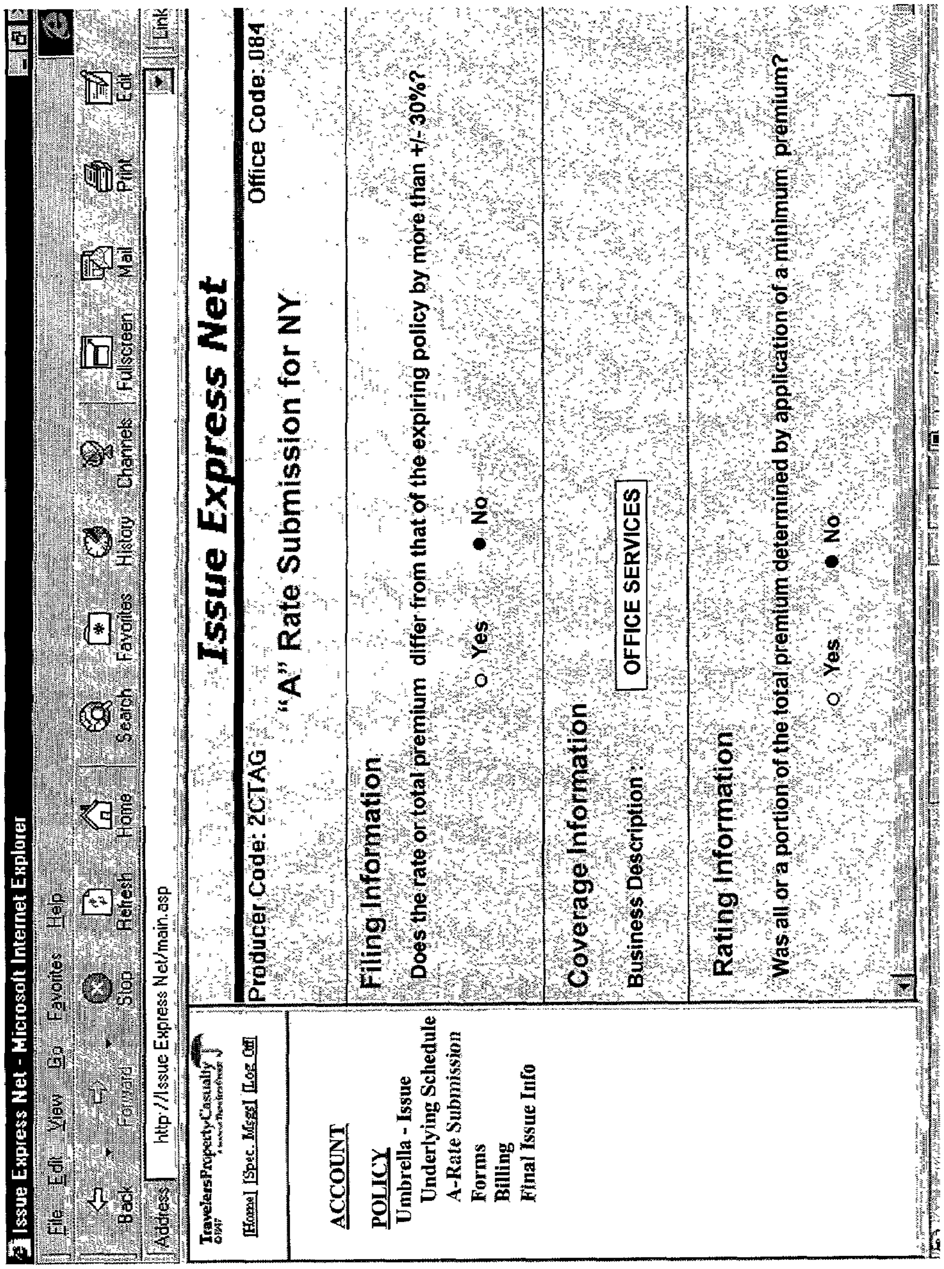
FIG. 49 shows an "A" Rate Submission screen for a state for an Umbrella issue in accordance with an embodiment of the present invention.

FIG. 49 shows a possible second screen for the issuance of an umbrella policy, an example of an "A" Rate Submission screen for a state—in this case, New York—as part of the screen flow for issuance of an umbrella policy. The screen displays when the 'Predominant State' is NY and is used to collect data necessary for the completion of certain forms for the state. In other words, the purpose of the screen is to collect the data necessary for the completion of a number of forms which are required by the state of NY to be maintained in the underwriting file in support of the rate selection of the host insurance company. The screen can be accessed from the Navigator via the "A-Rate Submission" link. The "Files Office" (which is collected on the host screen) is set based on the "Send Select Office Copy to" answer collected on the Final Issue screen. The default for this prompt ("Send Select Office Copy to") can be changed by the user while on the Final Issue Screen. It is the user-selected answer that may be used to determine the 'Files Office'.

Figure 50:
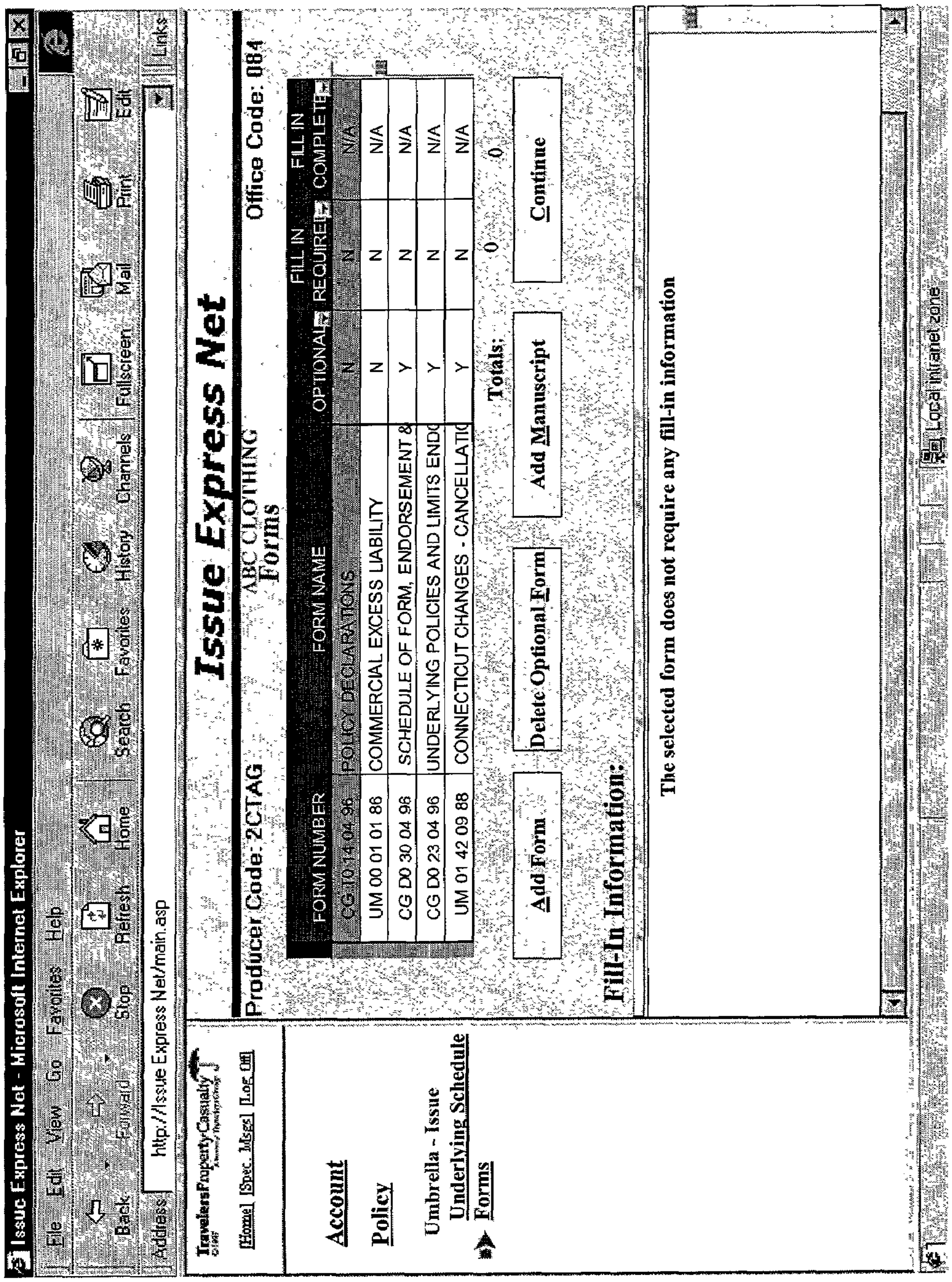
FIG. 50 shows an example of a Forms screen for Umbrella issue, in accordance with an embodiment of the present invention.

As shown in FIG. 49, The A-Rate screen is the next screen following the Underlying Schedule when the Predominant State is NY. Otherwise, if the predominant state is other than NY, a Forms screen as shown in FIG. 50, as described later, would follow. As understood, if another state has the same requirements as New York, then an A-Rate screen would also appear. The various questions of the A-Rate screen are split into sections grouped under the following headings: Filing Information, Coverage Information, Rating Information, and Underlying Information (not shown). The screen initially displays with some of the data already having been derived through existing CUP (Company Umbrella Policy) logic. The portion of data that is derived is contingent on how far the user has progressed through the screens on the underlying policies. The Underlying Information section contains a grid similar to the Lost History grid that Master Pac uses to allow direct entry into the grid cell by the user. There are no drop downs or any special formatting that is needed within the grid. The grid may be scrollable and the user may be able to view all keyed data within a cell without having to scroll within the cell itself. The user can select a row from the grid using the "nub" and hit the delete key to clear data. Cross-screen impacts include: a change to Predominant State collected on Policy Information; additional policies being added to the account have an impact; and the "system rate" answer impacts the defaulted answer to "Describe and explain each significant element of judgment employed . . . " The Appendix shows the parameters and explanations for the page prompts/fields, page buttons, screen tabbing order, and error messaging of the A-Rate Submission screen.

FIG. 50 shows an example of a Forms screen for Umbrella issue, in accordance with an embodiment of the present invention. This screen appears after the Underlying Schedule screen of FIG. 48 and is part of the screen flow for an insurance application to issue an Umbrella policy. The derived Forms screen will initially show a list of derived forms on the policy in a grid format. The lower portion of the screen allows for the collection of side-door information in a window that is scrollable. Buttons may be used to add forms (including manuscript endorsements) or delete optional forms.

As shown in FIG. 50, the screen initially displays with a grid populated with system-derived Form Names, Form Numbers, and three indicators that include an Optional Forms Indicator, Fill-In Required Indicator, and Fill-In Complete Indicator. The grid is static in its display of five rows; however, the grid may be scrollable so that all forms attached to the policy may be reviewed. The grid also contains a 'nub' on the left where the user can select an entire row from the grid by clicking on the 'nub'. The facet can sort forms in the grid that have a Fill-In Required Indicator equal to 'Y' before those forms that have a Fill-In Required Indicator equal to 'N'. Since Fill-In forms are sorted first, the first occurrence of a side-door image should appear in the scrollable window on the bottom of the screen. A bar separates the grid from side door data collection. The Forms screen offers the ability to view the forms list, both system derived (including mandatory and optional) and user added optional forms. The screen also offers the ability to add additional optional forms, including manuscript endorsements. Optional forms may be deleted by the user. The grid allows sorting by double clicking any column heading.

The cross-screen impacts of the Forms screen include: modifying the quote should re-set the Derive Forms indicator back to Yes; changes to the Underlying Schedule could impact forms derivation; more specifically, answering 'Yes' to either "acceptable carrier" question generates a retained limit endorsement. The Appendix shows the parameters and explanations for the page prompts/fields, manuscript forms, page buttons, screen tabbing order, informational messaging, and error messaging of the Forms screen and its optional forms list.

Figure 51:
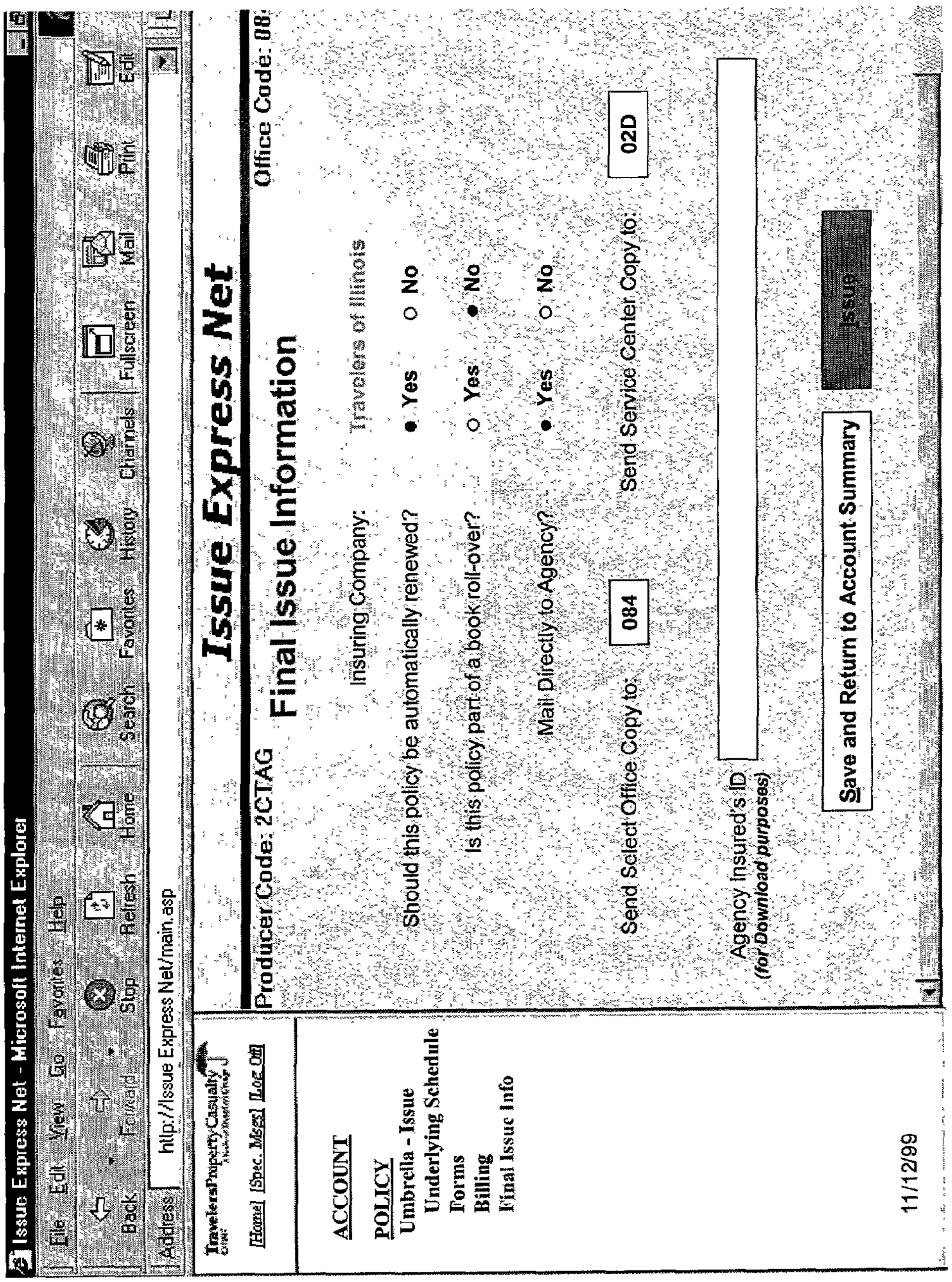
FIG. 51 shows the Final Issue Information screen for Umbrella issue in accordance with an embodiment of the present invention.

FIG. 51 shows the Final Issue Information screen for Umbrella issue. This screen displays as the last screen in the final issuance process for an umbrella policy and is available from the Navigator as the Final Issue Info link. The Final Issue Information screen appears after the Billing screen and prior to presentation of the Account Summary screen. The purpose of the screen is to capture and display miscellaneous information needed for issue. This screen will allow the user to stop the policy from moving through the automatic renewal process, view the insuring company, and re-direct the print, if necessary. There are variances in what prompts will display and what will be hidden from the presentation layer. Those variances are based largely on role code—whether or not the user is an Agent, Home Office or Field Office Employee. The screen is also used to collect output information such as the "Send Select Office Copy to" and "Send Service Center Copy to" as well as a Mail Directly to Agent choice. The screen is initially displayed with the insuring company already derived and a series of radio button questions, all of which have a defaulted answer associated with them. The Appendix shows the parameters and explanations for the page prompts/fields, page buttons, screen tabbing order, and error messaging of the Forms screen for the Umbrella issue.

Figure 52:
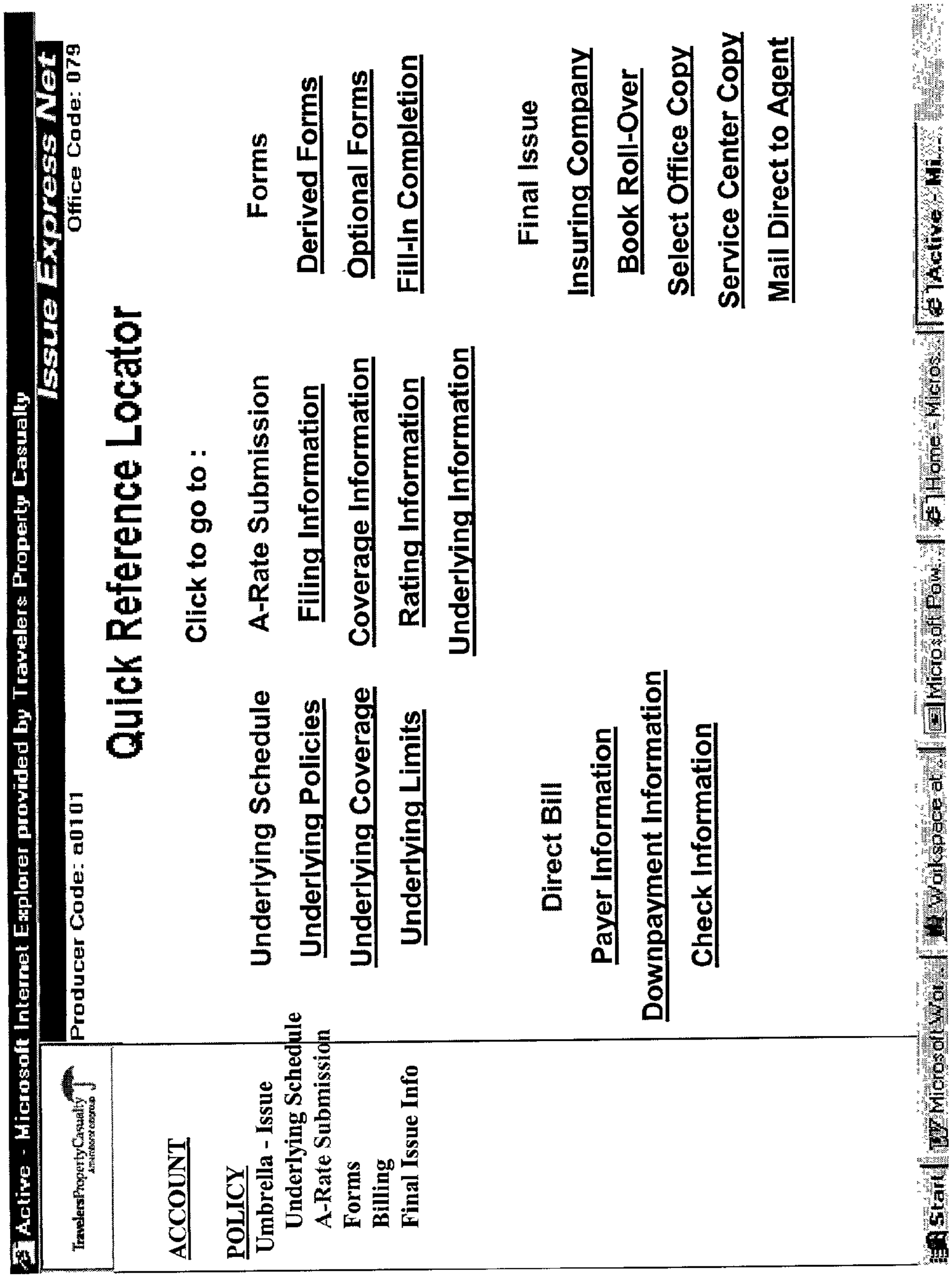
FIG. 52 shows the Quick Reference or Access Locator screen for an Umbrella issue in accordance with an embodiment of the present invention.

FIG. 52 shows the Quick Reference or Access Locator screen for an Umbrella issue. As explained earlier, this screen is used for easy access to the different screens available in the screen flow for an Umbrella issuance application. The Appendix provides the various parameters and explanations for the screen.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

APPENDIX

Policy Information

Umbrella Quote

PAGE PROMPTS / FIELDS

*Legal Entity: (Alt & L)*

Initial Display

The legal entity should default the selection made at the submission level, although other entity selections may be made. An informational message should appear to the left of the multi-select list box worded as follows:

Select from one or more of the following with respect to the Named Insured

Note: Please refer to the PowerPoint presentation for formatting of this message. The message should be formatted as close to the PowerPoint presentation as possible in accordance with our look and feel standards.

Prompt Type / Length

The legal entity is different for Umbrella than the other lines and represents a multi select list box. The list box should contain the following values in this order: Corporation, Individual, Joint Venture, Partnership, and Other. If Other is one of the selections made, then a supplemental question should display asking for a description of other. The supplemental question behavior is copy of what has been built already for the other lines. The field length for Other description is 20 characters.

Protection

Selections made are not protected and can be changed or deleted. There must, however, always be at least one selection made.

Available Inputs

The only available selections are: Corporation, Individual, Joint Venture, Partnership, and Other. At least one selection is mandatory.

Changes Allowed

Changes are allowed. One selection choice is mandatory. Changes made to the legal entity should not update submission information or underlying policy information either.

Required / Optional

This is a required field.

Functional Notes

- The chosen answer value(s) should be saved on a subsequent redisplay of the screen.
- The informational message that appears to the right of the 'Named Insured' (i.e. Key as Company.inc.) should only appear when only one legal entity selection has been made. In cases where multiple answers are given for legal entity, do not return the message Prompt Text Help LEGAL ENTITY - The legal entity selection is defaulted based on information from the Common Information screen. If this policy is to be excess over underlying policies where the legal entities vary by policy, make sure to select all appropriate legal entities. The selections made here print on the policy declarations and limit "Who is an Insured" under Section II of the policy.

*Named Insured: (Alt & N)*

Initial Display

The Named Insured should be defaulted based on the name stored at the submission level. If the submission name is not available, then the Account Name should be pulled and used as the default.

Prompt Type / Length

Entry box, 30 characters exactly. An ellipse button (...) to the right of the entry box should open up a modal window. See section on 'Modal Window' below for details.

Protection

This field is not protected

Available Inputs

Any freeform text keyed by the operator

Changes Allowed

Changes are allowed, however, changes to this field should not update submission or account names. Additionally, changes should not change any underlying policy names either.

Required / Optional

This is a required field

Functional Notes

The informational message that appears to the right of the 'Named Insured' (i.e. Key as Company.inc.) should only appear when only one legal entity selection has been made. In cases where multiple answers are given for legal entity, do not return the message.

Prompt Text Help

NAMED INSURED – Key in the legal name of the insured. If more room is needed, click on the ellipse button to open a window. This window will allow you to type the entire named insured. Remember to include all named insureds that should be covered under this policy. When the named insured is over two lines, CG D0 74 will automatically be derived and be filled with information contained within the window. Although not visible on the screen, the Policy Declarations page will fill with the first line from the window and the second line will contain the wording "and as per CG D0 74" . When you have completed the named insured information, click on DONE to save the information or CANCEL to return to the Policy Information screen with no changes made.

*Policy Number (No Alt key assigned)*

Initial Display

This field should default from 'M684718A', otherwise it should be blank.

Prompt Type / Length

Informational display based on previously established standards.

Protection

Field should be protected except for Home Office IDs.

Available Inputs

The policy number is derived however, pre-determined policy numbers may be used for Home Office IDs. An operator with a log-on office of '992' or '996' should be able to enter a policy number when a quote is first being established. This is in lieu of using a system generated policy number. Upon a re-display of the Policy Information screen, the Policy Number should behave the same as if it were a system generated policy number, that is, it should be protected.

Changes Allowed

No, except for Home Office IDs. See 'Available Inputs' above.

Required / Optional

This field is required, but derivation is automatic, therefore, no input is necessary. As explained above, Home Office IDs may input data into this field.

Functional Notes

Prompt Text Help

POLICY NUMBER – The Policy Number will initially be blank. Once you click on the CONTINUE button, a policy number will automatically be derived. You may then, return to the screen at any point by clicking on 'Policy Information' using the navigator, to see what the policy number is. The policy number also appears as part of the Account Summary screen. You will automatically be returned to the Account Summary screen after rating.

*Policy Mailing Address (Alt & A):*

Initial Display

The Policy Mailing Address displays as two lines of text based on currently established Master Pac standards. It is prefilled and unprotected with information gathered from the submission level.

Prompt Type / Length 2 entry boxes based on previously established Master Pac standards. X055 allows two lines of 30 characters (3270).

Protection

This field is not protected. Changes to this field should not update submission information nor any underlying policies.

Available Inputs

Any freeform text keyed by the operator is allowed.

Changes Allowed

Yes

Required / Optional

At least one character typed into the first line is required.

Functional Notes

Prompt Text Help

POLICY MAILING ADDRESS - If the policy mailing address needs to be amended, overtype the information defaulted with the correct mailing address. If more room is required, you may tab to the second line to complete the remainder of the street address.

*City (ALT & t):*

Initial Display

The city should default based on information gathered from the submission level.

Prompt Type / Length
Entry box based on Master Pac standards. X055 currently allows up to 24 characters to be keyed.

Protection
No

Available Inputs
Freeform text

Changes Allowed
Yes

Required / Optional
This is a required field.

Functional Notes
Changes made to this field should not update submission information nor should any underlying policy information be amended.

Prompt Text Help
CITY – If the city name needs to be amended, overtype this field with the correct city name. Be careful to spell the city name correctly and that the zip code is associated with the city and state.

*State (Alt & S):*

Initial Display
The state should be defaulted based on the submission mailing state.

Prompt Type / Length
Single Drop based on Master Pac standards.

Protection
Field is not protected

Available Inputs
All states

Changes Allowed
Yes

Required / Optional
Required

Functional Notes

Changes made to this field should not update submission information nor should any underlying policy information be amended.

Prompt Text Help

STATE - If the defaulted state needs to be amended, click on the drop down here and scroll through the list to find the appropriate state. You may also key the first letter of state you are searching for. Clicking on the first letter of the state multiple times, will alphabetically scroll you through all the states beginning with that letter.

*Zip Code (ALT & Z):*

Initial Display

The zip code should default based on information gathered from the submission level.

Prompt Type / Length

Two entry boxes, Zip 5 and Zip 4, based on Master Pac established standards.

Protection

This field is not protected.

Available Inputs

Numeric only. Cross validation against city, state, and zip should be performed when the CONTINUE button is pressed.

Changes Allowed

Changes are allowed

Required / Optional

Required

Functional Notes

Zip code help should be implemented based on what has already been built for Master Pac (Location Schedule).

Prompt Text Help

ZIP CODE – If the zip code needs to be amended from what has been defaulted, you may overtype information in either or both entry boxes. If the zip code is not know, click on the question mark (?) for help.

*Effective Date (ALT & E):*

Initial Display

The effective date should default based on information returned from 'M684718A'. If 'M684718A' does not return the date than collect the date from the submission level.

Prompt Type / Length

Entry box that contains two forward slashes (/) based on MasterPac established standards.

Protection

This field is not protected.

Available Inputs

Numeric only.

Changes Allowed

Changes are allowed

Required / Optional

Required

Functional Notes

Prompt Text Help

EFFECTIVE DATE - Our company position is to establish concurrency with the underlying policies. There should not be a need to amend the effective date unless this policy is being added mid-term to the account. As such, Umbrella policies should be written on a one-year basis, except when establishing policy period concurrency with primary insurance.

*Expiration Date (ALT & X):*

Initial Display

The expiration date should default based on information returned from 'M684718A'. If 'M684718A' does not return the date than collect the date from the submission level. In this case, if a 3 year term is found, then default the expiration date based on an annual term.

Prompt Type / Length

Entry box that contains two forward slashes (/) based on MasterPac established standards.

Protection

This field is not protected.

Available Inputs

Numeric only and valid calendar dates. 3 year terms are not allowed.

Changes Allowed

Changes are allowed

Required / Optional

Required

Functional Notes

Cross validation should occur to check that the expiration date cannot be less than the effective date Prompt Text Help EXPIRATION DATE - Our company position is to establish concurrency with the underlying policies. There should not be a need to amend the expiration date unless this policy is being added mid-term to the account. As such, Umbrella policies should be written on a one-year basis, except when establishing policy period concurrency with primary insurance.

*Predominant State (alt & p):*

Initial Display

The state should be defaulted based on what is returned from 'M684718A'. If nothing is returned, then the default should be based on the account mailing state with the following exception. If the mailing state that is returned in this instance is not included on the product group list of states, then the default should be blank. Predominant State could potentially trigger a supplemental question if the state either selected, or defaulted, is a county town code state.

Prompt Type / Length

Single Drop based on Master Pac standards.

Protection

The field is not protected

Available Inputs

There are no available inputs into the drop down itself. Listing of states is the same as the Master Pac listing of available states.

Changes Allowed

Yes. Also note that 'M684718A' is filling the state based on the MasterPac policy with the highest underlying GL premium. If the underlying premium changes, so too could the predominant state.

Required / Optional

Required

Functional Notes

If the state defaulted is a county town code state, then the supplemental 'City' question should already be displayed on screen. If the state defaulted is not a county town code state, then the two supplemental questions should be hidden from view. If the operator changes the state from a non-county town code state to a county town code state, then the supplemental questions should appear.

Prompt Text Help

PREDOMINANT STATE – The predominant state should be based on the state where the insured conducts their primary operations. If the defaulted state needs to be amended, click on the drop down here and scroll through the list to find the appropriate state. You may also key the first letter of state you are searching for. Clicking on the first letter of the state multiple times, will alphabetically scroll you through all the states beginning with that letter.

Note: Depending on the state selected, you may be required to key in city information. This is because the state selected requires a county town code for tax purposes. The county town code will be derived based on the city entered. The county town code itself, however, will not display on the screen.

*Predominant City (ALT & i):*

Initial Display

If the predominant state defaulted was a county town code state, the predominant city should be defaulted based on translation from 'M684718A' which will actually return a county town code. If the defaulted predominant state is not a county town code state, then selection of a county town code state (by the operator) should trigger the supplemental question of predominant city, however, blanks should be shown Prompt Type / Length Entry box based on Master Pac standards.

Protection

No

Available Inputs

Freeform text

Changes Allowed
Yes

Required / Optional
This is a required field if the state under 'Predominant State' is a county town code state Functional Notes
Changes made to this field should not update submission information nor should any underlying policy information be amended.

Prompt Text Help
CITY – Type the city name associated with the predominant state. The predominant city and state will be used to derive the county town code. The county town code itself, however, will not display on the screen.

*Program Code (ALT & C):*

Initial Display
The Program Code will be pulled from 'M684718A'. If a program code is not returned from 'M684718A' (which would occur if a MasterPac policy did not exist, either in the Host or in the Net) then pull the program code from the submission level.

Prompt Type / Length
Entry box, 3 alphanumeric characters allowed. Question mark button (?) to the right of the entry box that will pull the up the program code help window. This window should be the same program code help that we are using for MasterPac on the Location Schedule.

Protection
No and allow data entry directly into the entry box without necessitating that the operator use the program code help window.

Available Inputs
Valid program codes for the product group

Changes Allowed
Yes

Required / Optional
Required

Functional Notes

Prompt Text Help

*Description (ALT & D):*

Initial Display

The program code description will be based on the program code either defaulted from 'M684718A' (or the submission – see above) or based on the operator's selection.

Prompt Type / Length

Entry box. We do not collect or display program code description in the native system today. Whatever is reasonable to display will be acceptable. This really is informational only to the operator. We can discuss this when needed.

Protection

Yes, data cannot be mapped over to the native system. It is simply an informational display.

Available Inputs

Program Code descriptions associated with the program code. Not sure what the source table will be for this information.

Changes Allowed

No, only to Program Code

Required / Optional

Optional in the sense that if a program code description is not returned for whatever reason, this should not result in an error condition.

Functional Notes

Prompt Text Help

MODAL WINDOWS

Named Insured Modal Window

The Named Insured modal window is used to collect complete named insured information when the entry boxes on the Policy Information screen do not provide the operator with enough room to fully key all named insureds.

Prompts / Displays

The 'Named Insured' modal window should utilize the fixed font that MasterPac is using today.

The rows within the modal should be exactly 30 characters wide. L105 currently collects 823 rows of 79 characters, a total of 75 screens. Based on our one-shot, however, we can limit the number of rows to 200. Upon opening the modal window, text from the entry box on Policy Information should fill into the first row of the modal and the cursor should be positioned on the second row.

Buttons:

DONE – The DONE button updates the named insured with information keyed within the modal window and returns the operator to the Policy Information screen. Amended text (if applicable) from the first line of the named insured window should display in the first entry box on the Policy Information screen Cancel – The Cancel button simply closes the window without making any updates to the named insured information.

The modal window also contains an 'X' close button in the upper right corner of the title bar. This functions the same as Cancel.

Derivations:

The host will need the following in order to derive CG D0 74, the Named Insured endorsement. This will be needed as part of the 'Issue' screenflow and as part of the forms derivation process.

Endorsement Coverage - 'NI' should be sent to the host, with the exception of the predominant state being New York, in which case 'NY' should be sent. Predominant state determination will be explained in detail later.

Endorsement Number - Reserve endorsement number '01' for named insured overflow. '01' should be passed to the host when there is a need for the named insured endorsement to be derived.

Title - The wording 'Named Insured Endorsement' should be passed to the host and inserted on the 'Title' row.

Screen L105:

Row 2 - Insert wording "The Named Insured is amended to read:"

Row 3 - Fill with row 1 and 2 from the modal window

Row 4 - Fill with rows 3 and 4 from the modal window

Row 5 - Fill with rows 5 and 6 from the modal window…etc., etc. Proceed sequentially from this point forward.

MODAL WINDOWS

Program Code Help
The Program Code Help Window should be taken from what MasterPac uses on the Location Schedule. The only difference is in the data, that is the list of program codes would include both MasterPac as well as Omni program codes. Functionally, the behavior of the window should be the same as MasterPac.

PAGE BUTTONS

CONTINUE: (alt – C)

The CONTINUE button displays and is active at all times. Validations and edits are invoked when CONTINUE is pressed. If all validations and edits are passed, then the Umbrella policy is established and the policy number is derived. If this is a subsequent visit to this screen, then any changed information should be saved. Finally, the CONTINUE button moves the operator to the second and main page in the Umbrella quote screenflow.

SCREEN TABBING ORDER

Initial Cursor Position
As all information should be defaulted as part of the initialize of this screen, the initial cursor position should be on the CONTINUE button. If any information has not been defaulted, then position the cursor on the first blank field found starting from the top of the page.

Default Button on ENTER
CONTINUE is the default for the ENTER key except as noted above.

Tab Sequence Throughout Screen
1. CONTINUE button
2. Legal Entity
3. Other Description (if 'Other' for Legal Entity)
4. Named Insured (entry box)
5. Ellipse button(Named Insured)
6. Policy Number (for Home Office IDs)
7. Policy Mailing Address (line 1)
8. Policy Mailing Address (line 2)
9. City
10. State
11. Zip 4
12. Zip 5
13. Effective Date
14. Expiration Date 15. Predominant State
16. Predominant City (if applicable)
17. Program Code
18. Program Code Description
19. CONTINUE button and then loop back if the tab key is pressed again

Umbrella Detail

(Umbrella Detail / Underlying Detail / Pricing )

PAGE PROMPTS / FIELDS

*Umbrella Limit:*

Initial Display
The limit initially defaults to $1,000,000.

Prompt Type / Length
Single drop to accommodate an answer length of 11 characters, which includes commas and dollar signs. Actual answer length is 8, excluding dollar signs and commas.

From this point forward, this documentation will describe answer length as the actual length of the answer, excluding dollar signs and commas. Existing MasterPac standards to fill dollar signs and commas when tabbing from a field should be implemented throughout this application.

The entry box standards also established by MasterPac in accordance with look and feel (standard small and standard large) should also be implemented here. The PowerPoint slides should not be looked at as an accurate representation of entry box sizes Protection
Field is not protected Available Inputs
Specific answer values in the range of $1,000,000 - $25,000,000, in million dollar increments, whole numbers only Changes Allowed
Yes Required / Optional
This is a required field Functional Notes
Because we are using round numbers, the limit will not impact matrix eligibility Prompt Text Help UMBRELLA LIMIT – Select the Umbrella Limit from the drop down. Field Office authority is limited to $16,000,000, which includes primary liability limits.

*Retained Limit:*

Initial Display

The initial default is based on predominant state and is as follows:

CA: - Answer should be defaulted to '0'

CT: - Answer should be defaulted to $10,000

NY: - Answer should be defaulted to $10,000

All other states should default the answer to $5,000.

Prompt Type / Length

Entry box. Length of 8 numeric characters. Should include dollar signs and commas.

Protection

This field is not protected

Available Inputs

Any answer in the range of 1 – 99,999,999, with the exception of California which allows an answer in the range of 0 – 99,999,999.

Changes Allowed

Yes, but answer should be saved on a re-visit of the screen.

Required / Optional

Required

Functional Notes

Matrix eligibility is lost for NY and CT if the retained limit is less than $10,000. For all other states, except California, matrix eligibility is lost if the retained limit is less than $5,000. For California, all answers are eligible for matrix rating.

Prompt Text Help

RETAINED LIMIT – The Umbrella provides coverage excess of the Retained Limit. The Retained Limit should be at least $10,000 when the predominant operations are in either New York or Connecticut. If the defaulted answer needs to be changed, delete or overtype the defaulted answer with the appropriate Retained Limit. Note that the ability for the system to rate this policy may be affected based on the Retained Limit selected.

*Exclusions:*

Initial Display

This prompt displays with no exclusion defaulted. If the predominant state is New York or Texas, the 'Auto Liability' answer should not be included as an available choice.

Prompt Type / Length

Multi-Select List Box

Protection

Not protected

Available Inputs

Answer values are as follows. Please arrange the answers in the order shown below. Refer to the PowerPoint slides for details.

Products / Completed Operations

Personal & Advertising Injury

Auto Liability

Employers Liability

Changes Allowed

Yes

Required / Optional

Optional

*Exclusions (continued):*

Functional Notes

- If Predominant State is Texas or New York, do not include 'Auto Liability' as an available selection.
- If 'Products / Completed Operations' is one of the answers, then matrix eligibility is lost
- If 'Auto Liability' is one of the answers, then the section titled Auto Policy Information should collapse, including all questions and answers associated with this section. These questions are: 'Is Auto Coverage with the Travelers?', 'Underlying Limits' , 'Coverage', 'Underlying Premium', and 'Number of Owned Autos'. Any answers previously stored should be deleted so as not to be used in the matrix analysis.
- Selection of any or all of the answers generates exclusionary endorsements. I assume that we will wrap the forms derivation process that is currently in place.
- There is no need to default 'Products / Completed Operations', as we currently are not supporting Manufacturers Pac. When Manufacturers Pac is implemented, there is the potential that 'M684718A' could pass a 'Products Exclusion' indicator. We will re-address in the future.

- If a selection is not made, an 'N' should be sent to the host, otherwise a 'Y' should be sent for each selection made based on the below:

Exclude Auto Liability
If 'Auto Liability' is selected, a 'Y' should be passed, otherwise, pass an 'N'

Exclude Employers Liability
If 'Employers Liability' is selected, a 'Y' should be passed, otherwise, pass an 'N'

Exclude Products/Completed Operations
If 'Products/Completed Operations' is selected, a 'Y' should be passed, otherwise, pass an 'N'

Exclude Personal/Advertising Injury Limits
If 'Personal & Advertising Injury' is selected, a 'Y' should be passed, otherwise, pass an 'N'.

Prompt Text Help
EXCLUSIONS:
Products / Completed Operations – If Products / Completed Operations has been excluded on the underlying, then you must exclude Products / Completed Operations on the Umbrella.

Personal & Advertising Injury – If Personal and Advertising Injury has been excluded on the underlying, it should be excluded on the umbrella, or consider writing a following form policy.

Auto Liability - Our position is not to exclude auto liability. If auto is written with another company that meets our financial requirements, the preferred method of handling this is to attach a retained limit endorsement. For risks that have no know automobile exposure, then the minimum acceptable coverage is Hired and Non-Owned-Owned with a limit of $500,000. This may be provided under the MasterPac policy, a General Liability policy, or under an automobile policy. A retained limit endorsement should still be attached in this instance.

Employers Liability – Employers Liability is required on all accounts with the exception of monopolistic states like Ohio. Monopolistic states should have a retained limit endorsement attached with minimum limits of 100/100/500.

*GL Policy Information - Underlying Limits:*

Initial Display

Set the default based on the answer that comes back from 'M684718A'. If, however the answer to the question 'Is this account associated with a MasterPac' is No, then default the answer to blank upon the initialize of the screen.

Prompt Type / Length

Single Drop, in accordance with our MasterPac standards.

Protection

Not Protected

Available Inputs

Available selections are:
$500,000 / $1,000,000
$1,000,000 / $2,000,000
Other

Changes Allowed

Yes, and answer should be saved, however, if any MasterPac underlying policy is successfully re-rated, the answer should be refreshed with data pulled from the underlying.

Required / Optional

Required

Functional Notes

- Not eligible for matrix rating is the answer choice is other than $500/$1,000,000 or $1,000/$2,000,000.
- The Underlying GL Limit is defaulted from '18A' based on the MasterPac policy with the lowest limit
- Send to the host:

If answer is $500,000/$1,000,000, send a '1' and if the answer is $1,000,000/$2,000,000, send a '2'. If the answer is 'Other', send a '3'

Prompt Text Help

UNDERLYING LIMITS- If not defaulted, select the General Liability Occurrence / Aggregate combination based on underlying policy information from the drop down. Note that our minimum underlying limit requirements are $500/$1000 in order to quote or write an umbrella.

*GL Policy Information - Underlying Premium::*

Initial Display

Set the default based on the answer that comes back from 'M684718A'. If there is no MasterPac policy, or if this information is not available, then the field should be left blank upon initialize of the screen.

Prompt Type / Length

Entry box. 8, which is large enough to accommodate dollar signs and commas. Legacy system answer has a length of 6.

Protection

This field is not protected

Available Inputs

Any answer in the range of 1 – 999,999

Changes Allowed

Yes, and answer should be saved, however, if any underlying MasterPac policy is successfully re-rated, the answer should be refreshed with data pulled from the underlying.

Required / Optional

This field is required

Functional Notes

- Not eligible for Matrix rating if the premium answer is greater than $25,000.
- Answer is an accumulated answer based on common ex dates Prompt Text Help

UNDERLYING PREMIUM –

*Number of Swimming Pools:*

Initial Display

Set the default based on the answer that comes back from 'M684718A'. If there is no MasterPac policy, or if this information is not available, then the field should be left blank upon initialize of the screen.

Prompt Type / Length

Entry box. Maximum answer length is 2. Size the entry box in accordance with MasterPac established standards Protection No Available Inputs Any answer in the range of 0 – 99 is allowed.

Changes Allowed

Yes, and answer should be saved, however, if any underlying MasterPac policy is successfully re-rated, the answer should be refreshed with data pulled from the underlying.

Required / Optional
Required

Functional Notes
More than 9 pools is not eligible for matrix rating

Prompt Text Help
NUMBER OF SWIMMING POOLS – Enter the number of swimming pools for which there is a General Liability exposure associated with this risk.

*Is Auto coverage with the Travelers?:*

Initial Display
Set the default based on the answer that comes back from 'M684718A'. If this information is not available, then the field should be left blank upon initialize of the screen.

Prompt Type / Length
Radio button

Protection
No

Available Inputs
Yes or No

Changes Allowed
Yes, and answer should be saved, however, if any underlying policy is successfully re-rated, the answer should be refreshed from '18A'.

The following '18A' exception logic is noted informationally: The answer to this question is saved if an automobile policy is not found and Hired or Non-Owned does not exist on any MasterPac policy and the answer to 'Coverage' is 'Any Auto'.

Required / Optional
Required, unless 'Auto Liability' has been excluded, in which case this question won't be asked Functional Notes Matrix eligibility is lost if the answer to this question is 'No' and the Underlying Limit (Auto) is any answer other than $1,000,000.

Prompt Text Help
*IS AUTO COVERAGE WITH THE TRAVELERS – Indicate by clicking on the Yes or No if auto coverage is written by the Travelers. If the automobile policy is written with another company, then the minimum limit requirements are $1,000,000 CSL and the company meet a financial rating of A- or better.*

*Auto Policy Information – Underlying Limits:*

Initial Display
Set the default based on the answer that comes back from 'M684718A'. If this information is not available, then the field should be left blank upon initialize of the screen.

Prompt Type / Length
Single Drop

Protection
No

Available Inputs
$500 CSL
$1,000 CSL
Other

Changes Allowed
Yes, and answer should be saved, however, if any underlying policy is successfully re-rated, the answer should be refreshed with data pulled from the underlying.

The following '18A' exception logic is noted informationally: The answer is saved if an automobile policy is not found and Hired or Non-Owned does not exist on any MasterPac policy and the answer to 'Coverage' is 'Any Auto'

Required / Optional
Required provided 'Auto Liability' has not been excluded, in which case this question won't be asked.

Functional Notes
- Matrix eligibility is lost if limit provided here is other than $500,000 or $1,000,000
- If the answer selected is $500 CSL, then send a '1' to the host and if the answer is $1,000 CSL, then send a '2' to the host. Otherwise, send a '3'.
- The '18A' program defaults the answer based on the lowest limit in the case of multiples Prompt Text Help

*Auto Policy Information - Coverage:*

Initial Display

Set the default based on the answer that comes back from 'M684718A'. If this information is not available, then the field should be left blank upon initialize of the screen.

Prompt Type / Length

Single Drop. 1 byte according to the host. However, size the single drop to be large enough to fit the words "Hired and Non-Owned" in the drop down.

Protection

Not protected

Available Inputs

Available inputs are:
Any Auto
Hired & Non-Owned

Changes Allowed

Yes, and answer should be saved, however, if any underlying policy is successfully re-rated, the answer should be refreshed with data pulled from the underlying.

The following '18A' exception logic is noted informationally: The answer is saved if an automobile policy is not found and Hired or Non-Owned does not exist on any MasterPac policy and the answer to 'Coverage' is 'Any Auto'

Required / Optional

Required, provided 'Auto Liability' has not been excluded

Functional Notes

- An answer of 'Any Auto' to this question triggers two supplemental questions: 'Underlying Premium' and 'Number of Owned Autos'. Otherwise, if 'Hired and Non-Owned-Owned' is given as an answer, then these two supplemental questions should not be asked.
- Translate as follows: If 'Any Auto' is selected, then send a '1' to the host. If 'Hired and Non-Owned' is selected, then send a '2'.
- If the '18A' program sends back a '3' (indicating no auto coverage), then either 'Auto Liability' must be excluded or a valid coverage answer must be selected (see above for available inputs). We will need to discuss how exactly we handle and present this error to the operator.

Prompt Text Help

*COVERAGE – Select from the drop down, whether the underlying automobile policy covers all autos, including Hired and Non-Owned or if the policy strictly covers hired & non-owned autos only. Coverage for Hired and Non-Owned may also be provided on the MasterPac policy or on an OMNI policy. If an owned automobile exposure may develop during the policy term, a retained limit endorsement should be attached during issuance.*

*Auto Policy Information – Underlying Premium:*

Initial Display

Set the default based on the answer that comes back from 'M684718A'. If this information is not available, then the field should be left blank upon initialize of the screen.

This question is supplemental to the question of 'Coverage' under 'Auto Policy Information'. If the answer to 'Coverage' is 'Hired and Non-Owned', then this question should not be asked. If the answer to 'Coverage' is 'Any Auto' then ask this question.

Prompt Type / Length

Entry box. 8, which is large enough to accommodate dollar signs and commas. Legacy system answer has a length of 6.

Protection

This field is not protected

Available Inputs

Any answer in the range of 1 – 999,999

Changes Allowed

Yes, and answer should be saved, however, if any underlying auto policy is successfully re-rated, the answer should be refreshed with data pulled from the underlying.

The following '18A' exception logic is noted informationally: The answer is saved if an automobile policy is not found and Hired or Non-Owned does not exist on any MasterPac policy and the answer to 'Coverage' is 'Any Auto'

Required / Optional

Required, provided 'Auto Liability' has not been excluded. If 'Auto Liability' has been excluded, this question should not even be asked.

Functional Notes

- Underlying automobile premium does not impact matrix eligibility
- Premium is an accumulated answer based on common ex dates Prompt Text Help

UNDERLYING PREMIUM -

*Number of Owned Autos:*

Initial Display

Set the default based on the answer that comes back from 'M684718A'. If this information is not available, then the field should be left blank upon initialize of the screen. Note that this question is not asked if the answer to 'Coverage' is Hired and Non-Owned Prompt Type / Length Entry box, answer length is 3 numeric characters.

Protection

No

Available Inputs 1-999

Changes Allowed

Yes, and answer should be saved, however, if any auto underlying policy is successfully re-rated, the answer should be refreshed with data pulled from the underlying.

The following '18A' exception logic is noted: The answer is saved if an automobile policy is not found and Hired or Non-Owned does not exist on any MasterPac policy and the answer to 'Coverage' is 'Any Auto'

Required / Optional

Required if answer to 'Coverage' is 'Owned Autos'

Functional Notes

Matrix eligibility is lost if answer is greater than 99

Prompt Text Help

NUMBER OF OWNED AUTOS – If this information is not defaulted, enter the number of automobiles that the insured owns

*Do you want the system to rate this:*

Initial Display

This field should be defaulted based on existing matrix criteria identified from 'M684718A'. Note that if this question has been defaulted to 'No' due to conditions outside of the umbrella (i.e. underlying GL premium), then the sections titled 'GL Policy Information' and 'Auto Policy Information' should be collapsed. The only two sections that should show, therefore, would be 'Umbrella Detail' and the 'Pricing' section.

If conditions outside of the umbrella policy qualify the umbrella for matrix rating, then default the answer to Yes. This is true regardless if all necessary data required to complete the matrix analysis does not exist upon the initialize of 'Umbrella Detail'. For example, all answers cannot be defaulted.

Prompt Type / Length

Radio Button

Protection

Protect the answer to 'No' if the non-matrix conditions were caused solely outside of the umbrella policy and are not shared data items within the application. See 'Conditions for Non-Matrix Pricing' for further detail on when to protect. Produce the informational message shown below if the question was defaulted to 'No' because it was determined that this policy is not eligible for matrix rating. Please refer to PowerPoint slides for positioning of this message on screen.

"Policy is not eligible for system rating. Enter a premium and click on the Rate button."

Available Inputs

Yes or No

Changes Allowed

May always be changed from Yes to No. May only be changed from No to Yes, provided either a. The policy is eligible for matrix rating
b. The reasons this answer is defaulted to 'No' are because the policy is not eligible for matrix rating and <u>all</u> of those reasons are within the policy.

In situations where data was keyed under 'Underlying Detail' and the operator subsequently answers 'No' to the question of 'Do you want the system to rate this?', collapse the sections, but do not delete previously saved data. The operator could switch the answer back to allow the system to rate the policy and the information should not be deleted in this instance.

Required / Optional

Required

Functional Notes

Translate a 'No' answer to 'Y' and a 'Yes' answer to 'N' to pass to the host

Prompt Text Help

*Enter the annual Umbrella Premium:*

Initial Display

This question is supplemental to the question of 'Do you want the system to rate this?'. It is triggered by a 'No' answer to that question, however that 'No' question is set, either by the operator or by the system. The answer will always be blank first time through.

Prompt Type / Length

Entry box, 7 numeric characters allowed today in the host. Entry box in accordance with MasterPac standards. Should allow for dollar signs and commas.

Protection

No

Available Inputs 1-9999999

Changes Allowed

Yes

Required / Optional

Required if answer to 'Do you want the system to rate this?' is No.

Functional Notes

Prompt Text Help

*Rate Effective Date (ALT & R):*

Initial Display

Set the default based on the answer that comes back from 'M684718A'. If nothing is returned, then the rate effective date should be handled in accordance with the written date / effective date state rules already in place for MasterPac.

Prompt Type / Length

Entry box that contains two forward slashes (/) based on MasterPac established standards.

Protection

This field is protected for effective date states only.

Available Inputs

Numeric only and valid calendar dates.

Changes Allowed

Changes are allowed for written date states. On screen editing will be needed. Greg is researching current host editing.

Required / Optional

Required

Functional Notes

Prompt Text Help

RATE EFFECTIVE DATE – For written date states, this date may be amended. Effective Date states default this date based on the Policy Effective Date.

PAGE BUTTONS

<u>RATE: (include Hotkey alt-R)</u>

The 'Rate' button should do the following, but not necessarily in this order:

- Check to see that all mandatory questions for rating have been answered. If all mandatory questions have not been answered, then return errors in accordance with established standards pertaining to mandatory fields.
- Call the PRD_UW MAINTAIN event. Calling the PRD_UW MAINTAIN event from the 'Rate' action will allow us to not have to have a separate consistency check to check for items such as Predominant State and the Auto Liability exclusion or…the Predominant State and the Retained Limit answer. It should also do the obvious which is to cross validate answers with questions to make sure the answers are valid in accordance with the tables and any scope conditions that may exist.
- Check authority. Authority should be set to either Yes or No coming out of rating realizing that the operator may upset the authority on the ISSUE SCREENS causing the authority indicator to be re-set.
- Check matrix eligibility. If system is able to rate the policy then return the operator to the Account Summary screen with premium information displaying in the grid. If matrix conditions are not met, then the question 'Enter the Annual Umbrella Premium' should display and the answer to the question 'Do you want the system to rate this?' should be changed to 'No'. The 'Underlying Detail' section should be collapsed. Again, do not delete data previously keyed information under 'Underlying Detail'. There is no need to.

The informational message shown below should display. Please refer to the PowerPoint slides for the positioning of this message on the screen.

"Policy is not eligible for system rating. Enter a premium and click on the Rate button"

In this situation, the operator will key in a premium amount into the entry box. Clicking on the 'Rate' button should then return the operator to the Account Summary Screen with the dollar figure keyed under Pricing shown in the appropriate cell within the Account Summary grid (pro-rated if appropriate).

SCREEN TABBING ORDER

Initial Cursor Position
Umbrella Limit
Default Button on ENTER

RATE is the default for the ENTER key except as noted above.

Tab Sequence Throughout Screen
1. Umbrella Limit
2. Retained Limit
3. Products / Completed Operations
4. Personal & Advertising Injury
5. Auto Liability
6. Employers Liability
7. GL Underlying Limits
8. GL Underlying Premium
9. Number of Swimming Pools
10. Is Auto Coverage with the Travelers? (if applicable)
11. Auto Underlying Limits (if applicable)
12. Coverage (if applicable)
13. Auto Underlying Premium (if applicable)
14. Number of Owned Autos (if applicable)
15. Do you want the system to rate this?
16. Enter the annual Umbrella premium (if applicable)
17. RATE

ERROR MESSAGING

ERROR MESSAGE NAME

These error message are here as a placeholder:

"Retained Limit of '0' is not valid based on Predominant State"

"Auto Liability cannot be excluded based on Predominant State"

Pricing / State Plans

Web-based GUI system – Work Comp Quote

New Business

PAGE PROMPTS / FIELDS

*Pricing Plan Type (Guaranteed / Variable / Fixed):*

Initial Display

Based on the mix of states on the policy, the pricing methods allowable as combinable displays. For example, if a state doesn't allow a fixed dividend plan, then this option is suppressed. The default will always be Guaranteed Cost.

Selection of a pricing method is required, but will be defaulted.

Prompt Type / Length

Radio Buttons

Protection

These fields are not protected. A selection will only be dimmed if there are no company / rate modes available under that plan for the mix of states.

Available Inputs

Singular selection amongst the available radio buttons.

Changes Allowed

Changes are allowed for this prompt. If changes are made, then the available companies and rate mode choice lists are revised according the combinabilities of the states on the policy.

Required / Optional

A choice is required.

Functional Notes

What are the default companies and rate modes, if any, when the pricing method is variable dividend or fixed dividend ?????????? Actuarial to define these.

*State:*

Initial Display

The state cells display, in alphabetic order, the list of states that are on the policy.

Prompt Type / Length

Display only in a protected cell. Cell is a two character display of valid states.

Protection

State is protected at all times.

Available Inputs

No input is allowed in this cell.

Changes Allowed

No changes are allowed in this cell.

Required / Optional

This is a display-only cell

Functional Notes

If a state is deleted from the State / Class Code screen, then the state row is removed from this grid and any subordinate state plans are also removed.

*Company:*

Initial Display

The Company defaults to the same company we use in IE Work Comp. In most states, this is the INS company. This should be a tablized state reference already.

Prompt Type / Length

This is a dropdown box. Direct input is not allowed into the field. The Company dropdown contains the Company abbreviation, the full company name (or reasonable abbreviation) and a 'tag' for the pricing company such as "DISC," "SURCH," "HI-DISC," etc. Actuarial to define and associate these 'tags.'

The cell should be long enough to contain the three character company code, then up to 25 characters for the company name, and up to 10 characters for the pricing track 'tag.'

Protection

This field can only be populated from the dropdown list. Changes can be made to the company during quoting.

Available Inputs

The lists of companies available to each state depends on the pricing method chosen in combination with the states on the policy and the Rate Modes available as combinable.

Changes Allowed

Changes can be made to this field, but only via the dropdown list.

Required / Optional

Selection of a company is required, but the field will be defaulted.

Functional Notes

A sophisticated table reference will need to be built to support this.

Some of the companies which we don't want to necessarily advertise will be listed, but the 'tag' for the company will be blank. For example:

| | | |
|---|---|---|
| COF | Charter Oak Fire | (DISC) |
| TIL | Travelers Indemnity | (HI-DISC) |
| TIA | Travelers Indemnity of America | |
| INS | Travelers Insurance Co. | (STD) |

*Rate Mode:*

Initial Display

The Rate Mode defaults to 'G' – (Guaranteed Cost) as it does today in Issue Express WC.

Prompt Type / Length

This is a dropdown list. No input is allowed directly into this field other than by choosing from the dropdown list. The drop down list should contain the actual rating mode value (e.g. G) followed by the text associated with that rate mode (e.g. Guaranteed Cost).

Protection

This field is not protected.

Available Inputs

The list of Rate Modes (with each state row) depends on the pricing method selected in combination with the states on the policy and the pricing company chosen for the state.

Changes Allowed

Changes are allowed in this field only by a selection from the dropdown list.

Required / Optional

Selection of a Rate Mode is required, but the rate mode would have been defaulted.

Functional Notes

Actuarial to define which rates mode are made available via the net and when the tag should present.

*Schedule Mod Factor:*

Initial Display

The initial display of this field is blank.

Use of Schedule Mod is optional.

This field will be protected in those states that don't allow scheduled mods.

Prompt Type / Length

This is a numeric field as a positive number. This is up to 4 characters in length, one of which is the decimal.

Protection

This field is unprotected unless the state does not allow for Schedule Rating or the company chosen does not allow for schedule rating.

Available Inputs

A positive number, probably in the range of .01 thru 9.99.

Changes Allowed

Changes are allowed in this field.

Required / Optional

Entry of a Schedule Mod is optional.

Functional Notes

The factor entered into this field will need to be converted to two fields for Rapid. If the factor is greater than 1.00, then we need to pass a D (Debit) element. If the factor is less than 1.00, we need to pass a C (Credit) element.

If the factor is greater then 1.00, subtract 1.00 from the Sched mod and pass the difference to the Rapid Sched Mod Ftr element. If the Sched Mod is less than 1.00. subtract the Sched Mod from 1.00 and pass the difference to the Rapid Sched Mod element.

*Merit Mod:*

Initial Display

The initial display is blank. This cell will be protected as blank if an Experience Mod exists for the state (on the State / Class Code screen). This cell will also be protected as blank if the state does not offer a Merit Rating program.

Prompt Type / Length

Dropdown box. The cell displays only the positive or negative percentage while the dropdown itself displays the +/- percentage along with descriptive text that will serve as something of a Help.

Protection

This cell will be protected if an experience mod exists for that state and will be protected if the state does not have a merit rating program.

Available Inputs

Input can only be made via the Dropdown. The available percentages and descriptive texts varies by state.

Changes Allowed

Changes can be made to this field.

Required / Optional

The status of Required or Optional depends on the state. (Is this quantifiable? Can we really dictate a choice be made when we don't accurately know the premium?) Some states require a choice.

Functional Notes

The contents of the Dropdown may look something like:

| | |
|---|---|
| -5% | (0 indemnity claims, prem $500 to $4,000) |
| 0% | (1 indemnity claim, prem $500 to $4,000) |
| +5% | (2 indemnity claims, prem $500 to $4,000) |

The cell itself will only show +5%, for example.

*(State Plan) Massachusetts ARAP:*

Initial Display

This displays whenever the state is Massachusetts. The initial display is blank.

Prompt Type / Length
Input box of 5 numeric, one of which is the decimal.

Protection
This field is not protected.

Available Inputs
Operator input of a positive number.

Changes Allowed
Changes are allowed in this field

Required / Optional
Entry into this field is optional.

Functional Notes

*(State Plan) Contractors Credit:*

Initial Display
The prompt displays only if a contractors-related class code has been previously input and the state allows for use of the contractors credit.

Prompt Type / Length
The type must very depending on the requirements of the state.

- If the state has preset values, then present a dropdown.
- If the state uses credits within a range, then present an input box which is limited according to the state's range
- If the credit is supplied in percentage form, then capture as a percentage and convert for Rapid rating.
- If the credit is supplied as a factor, then capture a factor and convert for rapid rating.

Protection
This field is not protected.

Available Inputs
Either dropdowns or limited ranges according to the state program.

Changes Allowed
Changes are allowed in this field.

Required / Optional
This field is optional.

Functional Notes

The label for this item should be customized to the preferred name of the state plan. Further, the label should imply how the item should be entered (e.g. Factor versus Percentage).

*(State Plan) Managed Care:*

Initial Display

This prompt displays only if the state has a Managed Care Program.

Prompt Type / Length

Protection

Available Inputs

Changes Allowed

Changes should be allowed in this field.

Required / Optional

Other than New Jersey, selection of the Managed care program should be optional.

Functional Notes

For New Jersey Managed Care, drive the credit based on the state / company selected. Basically, if the conditions exist, then force the credit on the policy. We will not show the prompt in the additional state plans section for New Jersey.

>>>>> Need more information regarding New Hampshire plan <<<<<

*(State Plan) Small Deductible:*

Initial Display

Prompt Type / Length

Protection

Available Inputs

Changes Allowed

Required / Optional

Functional Notes

>>> Need more information regard which states we'll show this for and what their programs are. <<<<<<

*Massachusetts Private Employer / Public Employer:*

Initial Display

Display this prompt below the State/Company grid whenever Massachusetts is on the policy. This prompt should not be considered under the Additional State Plan section. There should be no default on this prompt.

Display the prompt as:
Massachusetts: ○ Private Employer / ○ Public Employer

Prompt Type / Length

Radio Button

Protection

This field is not protected. (Will need to be protected for mid-term changes when built)

Available Inputs

Operator selection of Private Employer or Public Employer.

Changes Allowed

Changes are allowed in this field.

Required / Optional

Selection of Private or Public is required input.

Functional Notes (This prompt is used to apply the appropriate tax in Massachusetts.)

MODAL WINDOWS

Window Name / Purpose

No modals needed on this screen.

PAGE BUTTONS

Additional State Plans: (alt-A)

This button always displays. If when a state is selected, and that state has no additional state plans, dim the button.

The Additional State Plans button can be chosen when focus is on a state row in the grid, or a state row has been selected. (Further, the operator can double-click a state row to accomplish clicking Additional State Plans).

Given the state and policy conditions, a dynamic list of available state plans is presented in the lower portion of the screen.

Save and Return to Account Summary: (alt-S):
Selecting this button will save the data keyed in the pricing grid (and the state plans) and will move the operator to the Account Summary screen setting the Policy Status to Pended. Choosing this should not lock the policy to the operator that performed the action.

Later, the operator must re-access this screen and choose Rate to send the policy to RAPID rating.

Rate (alt-R):
The Rate button displays and is active at all times. Clicking Rate saves the data keyed or data changed, submits the policy to RAPID rating and moves the operator to the Account Summary screen where the rated premium can be viewed.

SCREEN TABBING ORDER

Initial Cursor Position
When screen appears, place focus on the Rate button.

Default Button on ENTER
The Rate button should be the default for the Enter key.

Tab Sequence Throughout Screen
1. Rate button
2. Guaranteed Cost
3. Variable Dividend
4. Fixed Dividend
5. Company (first state)
6. Rate Mode (first state)
7. Schedule Mod (first state)
8. Merit Mod (first state)
9. Company (second state)
10. Rate Mode (second state)
11. Schedule Mod (second state)
12. Merit Mod (second state), etc…
13. Additional State Plans button
14. Save and Return button Note: When state plans have been chosen, place focus on the first state plan available for the state.

Policy Information Screen

Web-based GUI system – Work Comp Quote

New Business

PAGE PROMPTS / FIELDS

*Legal Entity:*

Initial Display
The Legal Entity displays prefilled to the value held at the submission level.

Prompt Type / Length
Dropdown listing. Follow MasterPac selections.

Protection
Field is unprotected

Available Inputs
Same as Submission Level choices and MasterPac Policy Information choices Changes Allowed
Changes can be made. If a change is made to the legal entity, the revised selection will not be passed back up to the submission level and will not update the MasterPac Policy Information screen.

Required / Optional
Content is required but will be defaulted.

Functional Notes
On re-displays of the screen, the Legal Entity is the value as last held at the WC policy level and is not refreshed from the submission level.

Based on legal entity chosen, an informational example of the Named Insured input convention displays. If the legal entity is changed, the informational message will also be updated.

>> Needs Work… Are the conventions different for WC than for Mpac? ? <<<<<<

*Describe Other:*

Initial Display

The Describe Other field displays when the Legal Nature is Other. This field initially displays blank.

Prompt Type / Length

Freeform text. Follow MasterPac format of 20 alpha/numeric characters. (This is actually shorter than the Native Rapid1 field, but is consistent with the IE WC field.)

Protection

Field is unprotected

Available Inputs

Freeform text

Changes Allowed

Changes can be made. If a change is made to the Describe Other, the revised description will not be passed back up to the submission level and will not update the MasterPac Policy Information screen.

Required / Optional

Entry is required if the Legal Entity is "Other."

Functional Notes

On re-displays of the screen, the Describe Other is the value as last held at the WC policy level and is not refreshed from the submission level.

*Named Insured:*

Initial Display

The Named Insured displays prefilled and unprotected with the text held at the submission level.

Prompt Type / Length

Text box with scroll bar. Scroll bar to appear when more than two lines of text entered. This should be consistent with the MasterPac field size. (Initially, two lines of 30 characters per line). See Functional Note below.

Protection

Field is unprotected at all times.

Available Inputs

Freeform text keyed by operator.

Changes Allowed

If a change is made to the name at the WC policy level, the revised text will not be passed back up to the submission level or the MasterPac policy level but will only be saved as part of the Work Comp database.

Required / Optional

At least one character in line one is required, but the name will have been prefilled.

Functional Notes

On re-displays of the screen, the Named Insured will prefill with the text as last saved in Work Comp.

If more than two lines of text are captured in the Named Insured field, the system will print the policy referencing the WC long named insured endorsement (currently "and as per WC990601(A)" on the second line of the Dec page). Re-displays of the screen should not mention the endorsement, rather, show as much of the pure name text as possible. When the name overflow occurs, we'll need to set the RAPID prompt 'Do you need to reference the Named Insured Endorsement' to YES. Further, we will derive the WC990601-A form on the optional forms list (something not currently done), and present the fill-in form as part of the Issue process.

>Should we just state the WC 99 06 01 and leave off the 'space A'? <<<<<<<<<

>Is the size of the eventual Long Named Insured screen the same as MasterPac's Long Named Insured? We need to mirror what Rapid 1 has today! <<<<<<<<<<

*Policy Number:*

Initial Display

On initial display of the screen, the Policy Number field is blank and protected.

Prompt Type / Length

Informational display. Not a defined input field. Follow Policy Number Format 'standard.'

Protection

Field is always protected. (Field will be unprotected for Home Office logons)

Available Inputs

No input allowed. (Input can be made by Home Office logons)

Changes Allowed

No changes to field allowed. (Input can be made by Home Office logons)

Required / Optional

Derivation is automatic, so no input is necessary.

Functional Notes

Once Done is chosen on the screen, a Policy Number and Policy Form (UB) is derived. On subsequent displays of the screen, the derived form and policy number displays. The display is in the form of UB-123X4567.

Like MasterPac, the Policy Form and Policy Number are protected and not changeable, except for Home Office logons.

*Policy Mailing Address:*

Initial Display

The Policy Mailing Address displays as two lines of text and displays prefilled and unprotected with the text from the submission level.

Prompt Type / Length

Freeform text keyed by operator into text field. Follow MasterPac format which should be two lines of 30 characters each line.

Protection

This field is unprotected.

Available Inputs

Freeform operator input.

Changes Allowed

Yes

Required / Optional

At least one character in line one is required, but the field will be defaulted.

Functional Notes

If a change is made to the address at the WC policy level, the revised text will not be passed back up to the submission level or the MasterPac policy level but will only be saved as part of the Work Comp database.

On re-displays of the screen, the address will prefill with the text as last saved in Work Comp.

*City:*

Initial Display

The City displays as a field of text and displays prefilled and unprotected with the text from the submission level.

Prompt Type / Length
Freeform text keyed by the operator into text field. Follow MasterPac field length which should be 24 alpha-numeric characters.

Protection
This field is unprotected.

Available Inputs
Freeform operator input.

Changes Allowed
Yes, changes are allowed.

Required / Optional
At least one character is required, but the City will have been prefilled.

Functional Notes
If a change is made to the City at the WC policy level, the revised text will not be passed back up to the submission level or the MasterPac policy level but will only be saved as part of the Work Comp database.

On re-displays of the screen, the City will prefill with the text as last saved in Work Comp.

*State:*

Initial Display
The State displays as a two-character abbreviation and displays prefilled and unprotected with the text from the submission level.

Prompt Type / Length
Dropdown choice list. Follow MasterPac convention which should be a two alpha characters.

Protection
Field is unprotected.

Available Inputs
Listing of states is the same as the MasterPac listing of available states.

Changes Allowed

Yes, changes to field are allowed.

Required / Optional
A valid state is required, but the field will have been prefilled.

Functional Notes
If a change is made to the State at the WC policy level, the revised State will not be passed back up to the submission level or the MasterPac policy level but will only be saved as part of the Work Comp database.

On re-displays of the screen, the State will prefill with the state as last saved in Work Comp.

*ZIP:*

Initial Display
The ZIP Code displays as a freeform numeric field capable of handling the 'ZIP + 4' ZIP code and displays prefilled and unprotected with the ZIP Code from the submission level.

Prompt Type / Length
Freeform text (numeric and 'dash') Follow ZIP Code 'standard.'

Protection
Field is unprotected.

Available Inputs
Freeform text field (numeric and 'dash'). Five or Nine characters (or 10 with a dash) are required.

Changes Allowed
Yes.

Required / Optional
A 5 or 9 digit ZIP is required, but the ZIP will have been prefilled.

Functional Notes
If a change is made to the ZIP Code at the WC policy level, the revised ZIP will not be passed back up to the submission level or the MasterPac policy level but will only be saved as part of the Work Comp database.

On re-displays of the screen, the ZIP will prefill with the ZIP as last saved in Work Comp. If a nine character ZIP is input, then the re-display will place a dash (-) between the 5$^{th}$ and 6$^{th}$ numeric (or whatever the 'standard' is).

*Effective Date:*

Initial Display
The Effective Date will displays defaulted to the effective date at the Account level.

Prompt Type / Length
Freeform text field of Numeric and 'slashes' (Follow the Date 'standard' defined.)

Protection
This field is not protected.

Available Inputs
A valid date must be in this field.

Changes Allowed
Yes, changes to the effective date are allowed.

Required / Optional
A valid date is required, but the field will have been prefilled.

Functional Notes

*Expiration Date:*

Initial Display
Take the expiration date from the submission level.

Prompt Type / Length
Freeform text field of Numeric and 'slashes.' Follow the Date 'standard' defined.

Protection
Field is unprotected.

Available Inputs
A valid calendar date must be input.

The WC policy term must be either short-term, annual or up to '1 year and 16 days' total duration. Screen editing must ensure this.

Changes Allowed
Yes, changes allowed.

Required / Optional

A valid date, which is not equal to or earlier than the Effective Date is required, but the Expiration Date will have been prefilled.

Functional Notes

*Employer's Liability Limit:*

Initial Display

The field displays prefilled with the standard 100,000 / 500,000 / 100,000 value. If a change is made to the field, the changed value is held and re-displayed.

Prompt Type / Length

Drop down list containing the following choices. Display the values with commas and slashes separating the items, but pass as discrete values without any punctuation.

100,000 / 500,000 / 100,000
500,000 / 500,000 / 500,000
1,000,000 / 1,000,000 / 1,000,000
2,000,000 / 2,000,000 / 2,000,000

Protection

This field is unprotected for additional choices from the drop-down. Text input into the field is not allowed and should only be loaded with choices from the dropdown.

Available Inputs

Drop down list containing the following choices:

100,000 / 500,000 / 100,000
500,000 / 500,000 / 500,000
1,000,000 / 1,000,000 / 1,000,000
2,000,000 / 2,000,000 / 2,000,000

Changes Allowed

Changes are allowed when picked from the dropdown list.

Required / Optional

A selection from the list is required, but the Limit will have been defaulted,

Functional Notes

The displays in this one field populate the three fields in RAPID1 for Each Accident, Policy Limit and Each Employee. Perhaps this listing can be treated as text within the dropdown where the three related numeric values are passed separately and used for rating.

*Short Term for Concurrency:*

Initial Display

This prompt and radio buttons only appear on the screen when the policy period is short-term. If this prompt is displayed, the default value is set to YES.

Prompt Type / Length

This is a Yes / No radio button. (Not sure of the standard defined.... Should be YES followed by NO, but not sure if the radio button appears before or after the individual choice). YES o / NO o or o YES / o NO or, are there even slashes?

Protection

This field is unprotected.

Available Inputs

Yes or No selections are the only valid options.

Changes Allowed

This field can be changed. If changed, the changed value is held and potentially re-displayed.

Required / Optional

If the policy is Short Term, then either a Yes or No must be selected. This field will have appeared defaulted, however.

Functional Notes

This Yes / No answer is handled the same way as within Issue Express – Work Comp. The Yes / No answers are converted to numeric choices for RAPID rating purposes.

MODAL WINDOWS

*Window Name / Purpose*

No Modal Windows needed on this screen

PAGE BUTTONS

<u>DONE: (alt-D)</u>

The DONE button displays and is active at all times. Clicking DONE saves the data keyed or changed and establishes the Work Comp policy. As part of that establishment, a Policy Number is assigned and 'UB' policy form is associated.

Clicking Done moves the operator to the State / Class Code page.

SCREEN TABBING ORDER

Initial Cursor Position
Start focus in the Named Insured field.

Default Button on ENTER
Done is the default for the Enter key.

Tab Sequence Throughout Screen
1. Named Insured
2. Policy Number (for Home Office)
3. Policy Mailing Address Line 1
4. Policy Mailing Address Line 2
5. City
6. State
7. ZIP
8. Effective Date
9. Expiration Date
10. Employer's Liability Limit
11. Short Term for Concurrency (if Short Term policy)
12. DONE
13. Legal Entity
14. Describe Other (if Other for Legal Entity)

WARNING MESSAGES

WARNING MESSAGE SCREEN NAME
No Warning Messages needed on this screen.

Subject: WC Net - Policy Info Screen

Team,

I understand that the screen standards stipulate the Account Name in the header of all line-of-business screens.

My screen documentation for the WC Policy Info screen deliberately left off any name in the header - our position at that time.

By this memo, please include the Account Name as a display within the page header of the WC Policy Info screen. I'll be revising the scren documenation to reflect this standard.

(Eventually, the philosophy will be that any account-level screen displays the Account Name, while any policy-level screen displays the Policy Name. This standard would hold even if the page already contains that same information in some other field on the page (e.g. Policy Info screen Named Insured))

ScoreCard Screen

Web-based GUI system – Work Comp Quote

PAGE PROMPTS / FIELDS

*State:*

Initial Display

The State displays as a two character item. Not all authority conditions are state-level, so this field will not always appear with information.

Prompt Type / Length

Two-character field. This may be defined as alpha-numeric as this column is a re-use of MasterPac's Location field. The content of the cell should be centered.

Protection

This field is always protected.

Available Inputs

No input is allowed in this field.

Changes Allowed

Changes are not allowed in this field.

Required / Optional

This column always displays for WC, but content within is optional.

Functional Notes

Prompt Text Help

*Loc:*

Initial Display

This column always displays on the WC ScoreCard. Content, however, depends on the kind of authority message displayed. Some authority conditions are at a location level and should display the location number when passed from Issue Express.

This WC column is a re-use of MasterPac's Building column.

Prompt Type / Length

This field is three-characters long. Any leading zeros should be dropped from the display. The location number should be centered within the cell.

Protection

This cell is always protected.

Available Inputs

No operator input can be made into this cell.

Changes Allowed

Changes are not allowed in this cell.

Required / Optional

Display of a location numbr is optional based on the kind of authority message developed.

Functional Notes

Prompt Text Help

*Reason:*

Initial Display

The reason column always dispays and always has content. If there is no authority item, then the entire row should not display on the grid.

Prompt Type / Length

This is a display up to 53 characters in length, left justified within the cell.

Protection

This cell is always protected.

Available Inputs

Operator input into this cell is not allowed.

Changes Allowed

Operator changes cannot be made into this cell.

Required / Optional

Display is always required. If no additional authority reasons exist, then the entire row should not display in the grid.

Functional Notes

Prompt Text Help

*Policy Limit:*

Initial Display

This column heading always appears. Display of information within the cell depends on the kind of authority message displayed. Some messages contain reference "Policy Limit" information while other messages do not.

Prompt Type / Length

This cell is up to 11 characters in length.

Protection

This field is always protected.

Available Inputs

The operator cannot make any entries into this field.

Changes Allowed

Changes cannot be made to this field.

Required / Optional

Display of information in this cell is optional depending on the message presented.

Functional Notes

Prompt Text Help

*Authority Limit:*

Initial Display

This column heading always appears. Display of information within the cell depends on the kind of authority message displayed. Some messages contain reference "Policy Limit" information while other messages do not.

Prompt Type / Length

This cell is up to 11 characters in length.

Protection

This field is always protected.

Available Inputs

The operator cannot make any entries into this field.

Changes Allowed

Changes cannot be made to this field.

Required / Optional

Display of information in this cell is optional depending on the message presented.

Functional Notes

Prompt Text Help

MODAL WINDOWS

There are no Modal Windows on this page.

PAGE BUTTONS

Return to Account Summary: (alt-R)
Furture Enhancement:
Choosing this button returns the operator to the Account Summary page

SCREEN TABBING ORDER

Intitial Cursor Position
ADDITIONAL POSSIBLE FEATURE:
Initial cursor focus is on the Return to Acccount Summary button.

Default Button on ENTER
The default for the Enter key is on the Return to Account Summary button.

Tab Sequence Throughout Screen
There is only one possible focus – the Return to Account Summary button.

WARNING MESSAGES

There are no Warning Messages needed on this screen.

ERROR MESSAGING

There are no operator-controllable error messages possible on this page.

Screen Name

Web-based GUI system – MasterPac Issuance

PAGE PROMPTS / FIELDS

*Name (Payer Detail):*

Initial Display

Via the Modal Window, default the Payer Name for the insured row to the Account Name. Default the Payer Name for the Other Payer and Finance Co to blank.

The cell within the grid is protected and displays the content of the respective modal window.

Redisplays of this cell presents the contents from Direct Bill if a record of the account exists in Dir Bill.

Prompt Type / Length

The modal window name is 2 lines of 32 characters. It is freeform text.

Protection

The cell itself is protected as display only. The content can only be changed via the modal window.

Available Inputs

The modal window allows update at any time. The cell itself is protected.

Changes Allowed

Changes can only be made via the modal window. Direct input into the grid cell is not allowed.

Required / Optional

A name entry is required for the insured row. Name entries are required in the Other Payer and Finance Co rows when they exist in the grid.

Functional Notes

At least one character is required in the first line of any of the names via the modal window. The display in the grid is the first line of the name.

*Street (Payer Detail):*

Initial Display

The initial default of the Insured Street is the Account street. If a record of the account exists in Direct Bill, then display the street from Direct Bill The initial default of the Other Payer and Finance Co street is blank. Redisplays present the contents from Direct Bill if the respective (other payer / finance co.) account record exists in Dir Bill.

Prompt Type / Length

The street length is 1 line of 32 characters and is freeform text.

Protection

The field is always unprotected.

Available Inputs

Freeform text by the operator.

Changes Allowed

Changes are always allowed in this field.

Required / Optional

At least one character is required in the street of all rows that exist on the table.

Functional Notes

The following existing Direct Bill edits will be performed at the host:

Must not allow any number of X's

Must not allow any number of A's

Must not allow any number of Z's

Must not allow any number of –'s

Must not allow QWERTYUIOP or any number of these characters in a row

Must not allow ABCDEFGHIJKL or any number of these characters in a row

Must not allow UNKNOWN

Must not allow ANYWHERE

Must not allow ANY WHERE

Must not allow NOT AVAILABLE

Must not allow UNAVAILABLE

*City (Payer Detail):*

Initial Display

The initial default of the Insured City is the Account City. If a record of the account exists in Direct Bill, then display the City from Direct Bill The initial default of the Other Payer and Finance Co City is blank. Redisplays present the contents from Direct Bill if the respective account (other payer / finance co.) record exists in Dir Bill.

Prompt Type / Length

The City length is 1 line of 20 characters and is freeform text.

Protection

The field is always unprotected.

Available Inputs

Freeform text by the operator.

Changes Allowed

Changes are always allowed in this field.

Required / Optional

At least one character is required in the City of all rows that exist on the table.

Functional Notes

The following Direct Bill editswill be performed at the host:
Must not allow any number of X's
Must not allow any number of A's
Must not allow any number of Z's
Must not allow any number of –'s
Must not allow QWERTYUIOP or any number of these characters in a row
Must not allow ABCDEFGHIJKL or any number of these characters in a row
Must not allow UNKNOWN
Must not allow ANYWHERE
Must not allow ANY WHERE
Must not allow NOT AVAILABLE
Must not allow UNAVAILABLE

*State (Payer Detail):*

Initial Display

The initial default of the Insured State is the Account State. If a record of the account exists in Direct Bill, then display the State from Direct Bill The initial default of the Other Payer and Finance Co State is blank. Redisplays present the contents from Direct Bill if the respective account (other payer / finance co.) record exists in Dir Bill.

Prompt Type / Length

The State length is 1 line of 2 characters in dropdown.

Protection
The field is always unprotected.

Available Inputs
State choices available via the dropdown. Include the 50 states plus PR, VI, DC.

Changes Allowed
Changes are always allowed in this field.

Required / Optional
A valid State abbreviation is required.

Functional Notes

*ZIP (Payer Detail):*

Initial Display
The initial default of the Insured ZIP is the Account State. If a record of the account exists in Direct Bill, then display the ZIP from Direct Bill The initial default of the Other Payer and Finance Co ZIP is blank. Redisplays present the contents from Direct Bill if the respective account (other payer / finance co.) record exists in Dir Bill.

Prompt Type / Length
The ZIP length is 5 or 9 numerics. Format should be the ZIP code "standard" defined.

Protection
The field is always unprotected.

Available Inputs
ZIP is input by the operator and must be a valid ZIP.

Changes Allowed
Changes are always allowed in this field.

Required / Optional
A valid ZIP is always required in any row.

Functional Notes

*Type (Payer Detail):*

Initial Display

This field displays informationally and cannot be changed. An INSURED row is always present. The OTHER PAYER or FINANCE CO. labels always appear to place hold rows for potential input or to display names/addresses if they already exist in the Direct Bill account record.

Prompt Type / Length

Display only.

Protection

This field is always protected.

Available Inputs

This field cannot be entered. The display values are:
Insured
Other Payer
Finance Co.

Changes Allowed

Changes cannot be made to this field.

Required / Optional

Display only

Functional Notes

*Billing Contact Phone):*

Initial Display

The Billing Contact phone displays unprotected and is optional. The initial display is the Account phone number, but re-displays pulls the phone number from the direct bill database.

Prompt Type / Length

Field is a 10 digit numeric phone number in the standard phone number format used elsewhere in the net.

Protection

This field is always unprotected

Available Inputs

The operator can overtype a numeric phone number.

Changes Allowed
Changes are always allowed in this field.

Required / Optional
Existence of a phone number is OPTIONAL. Though the field is optional, it will appear on the screen prefilled with the account phone number. If input, it must be a total of 10 numerics.

Functional Notes
Do not prefill the phone number if the phone exists as 999-999-9999.

*Check Number:*

Initial Display
The initial display of the check number is blank. If previous detail exists within Direct Bill, then present the stored check number.

Prompt Type / Length
The Check Number is valid as up to 10 alpha-numerics and is input by the operator.

Protection
This field is not protected.

Available Inputs
Freeform text by the operator.

Changes Allowed
Changes are always allowed in this field.

Required / Optional
This field is required on New Business;.

Functional Notes
If the input is OVERRIDE or TRANSFER, set the Direct Bill Deposit Received attribute to N (No) and ignore any input in the Actual Check Amount field.

If any other value is input for Check Number, set Direct Bill's Deposit Received attribute to Y (Yes) and require input into the Check Amount field.

*SAI Number:*

Initial Display
This label always displays the SAI number of the account.

Prompt Type / Length
9 Characters of alpha-numeric.

Protection
This label is display only.

Available Inputs
No inputs can be made.

Changes Allowed
Changes cannot be made to this label.

Required / Optional
Display will always occur.

Functional Notes
This label is needed on the screen as content for the Check Control Document. When a better printing feature is built, this should be removed from the screen and just automatically printed.

*Actual Check Amount:*

Initial Display
The Check Amount field displays blank, initially, unless the Direct Bill system has a Check Amount already stored for the account.

Prompt Type / Length
This field is 10 digits of numeric, (which also counts the decimal).

Protection
This field is unprotected.

Available Inputs
Any numeric value greater that zero.

Changes Allowed
Changes are allowed on this field.

Required / Optional
Input is required when the check number is other than OVERRIDE or TRANSFER.

Functional Notes

The amount in the Actual Check Amount field must always agree with the Actual DownPay Amount total in the downpayment information grid. Changes to one field must immediately populate the contents of the partner cell.

*Line Of Business:*

Initial Display
Display the line of business tag based on policy form. This display cannot be changed.

Prompt Type / Length
This is a display only field.

Protection
This field is protected.

Available Inputs
This field cannot be entered into.

Changes Allowed
Changes are not allowed on this screen.

Required / Optional
Display will always occur for each Line of Business.

Functional Notes

*Policy Form / Policy Number:*

Initial Display
Display the Policy Form and Policy Number of the policies on the account as taken from Issue Express and Web-based GUI system.

Prompt Type / Length
Standard Policy Form and Policy Number format.

Protection
This field is protected.

Available Inputs
This is a display-only field.

Changes Allowed
Changes cannot be made to this field.

Required / Optional
Display will always occur for each policy known.

Functional Notes

*Policy Eff Date:*

Initial Display
Display the Policy Effective Date for each policy on the account as taken from Issue Express and Web-based GUI system.

Prompt Type / Length
Standard Policy Effective Date format.

Protection
This field is protected and cannot be entered.

Available Inputs
This field is display only.

Changes Allowed
Changes cannot be made into this field.

Required / Optional
Display will always occur for each policy.

Functional Notes

*Policy Premium:*

Initial Display
Display the Policy Premium for each line of business on the account from Issue Express and Web-based GUI system.

Prompt Type / Length
Use the same length / format as from Issue Express Account Summary screen.

Protection
This field cannot be entered into.

Available Inputs
This is a display-only field.

Changes Allowed

Changes cannot be made to this field.

Required / Optional

Display will always occur for each policy.

Functional Notes

Display only thise policies with premium from Issue Express and exclude those policies which are Agency Billed or Direct Billed Off Account.

*Number of Install:*

Initial Display

The initial display of this field is blank. If an installment plan exists within Direct Bill for this account, then display the plan stored. Once a selection is made by the operator for the number of installments for the FIRST policy listed on the grid, then prefill the remaining policies with the same number of installments.

Beyond the initial drive from the FIRST policy, changes can be made to the other individual policies without populating any other policy row.

Prompt Type / Length

Dropdown defaulted to blank.

Protection

This field is unprotected and can be changed.

Available Inputs

The choices in the dropdown are:
Ann – Annual
2 – Semiannual
4 – Quarterly
6 – Six Pay
10 – Ten Pay
10E – Ten Equal Only the first text portion of each plan should display in the grid. Show only Ann, 2, 4, 6, 10 or 10E.

(If these options are ever changed, then the Facet will need to be re-programmed accordingly.)

Changes Allowed

Changes can be made to these fields. The first policy occurrence drives an initial default to the other policies. Changes to the other policies affects only that policy.

Required / Optional

Selection of a Number of Installments is required.

Functional Notes

If a Finance Company exists, then limit the number of installments to ANN.

Given the Installment Plan options chosen and the known policy terms, set the Lump Sum indicator in Direct Bill and the Installments Per Year prompt in Direct Bill according to the following matrix:

| Install Opt (input) | Policy Term (from IE) | Set Lump Sum (in DirBill) | Set Install Per Year (in DirBill) |
|---|---|---|---|
| Ann | =3yr | N | ANN |
| Ann | ≠3yr | Y | <blank> |
| 2 | =3yr | N | 2 |
| 2 | ≠3yr | N | 2 |
| 4 | =3yr | N | 4 |
| 4 | ≠3yr | N | 4 |
| 6 | =3yr | N | 6 |
| 6 | ≠3yr | N | 6 |
| 10 | =3yr | N | 10 |
| 10 | ≠3yr | N | 10 |
| 10E | =3yr | N | 10E |
| 10E | ≠3yr | N | 10E |

*Actual Downpay Amount:*

Initial Display

The initial display should be the same as the amounts and totals from the Suggested Downpay Amount column.

Prompt Type / Length

Input by the operator. The value cannot be greater than the policy premium itself.

Protection

This field is not protected.

Available Inputs

Freeform currency inputs by the operator.

Changes Allowed
Changes are allowed in this field and will automatically update the column total.

Required / Optional
Entry into the field is required.

Functional Notes
The initially derived Actual Downpay Amounts are totaled and presented in the total section and repeated in the Actual Check Amount field.

If revised downpay amounts are overtyped into the individual line-of-business fields, then the amounts are simply totaled and presented in the Actual Downpay Total field and repeated in the Actual Check Amount field.

If a revised Actual Downpay Total or Actual Check Amount is overtyped, then the facet will portion the total check into the line-of-business Actual Downpay Amount fields. The portioning will be determined as follows:

1) Calculate what percentage the total check amount is against the total account premium.

2) Apply that calculated percentage to each individual line-of-business premium and display the result in the individual line-of-business Actual Downpay Amount fields.

*Suggested Downpay Amount:*

Initial Display
The display of this field should be either 20% or 25% of the individual policy premiums. If the insured's state (shown in this direct bill page) is Texas, then use the 20%. For all other states, the 25% amount is used.

Prompt Type / Length
The suggested downpay amount cannot be greater than the policy premium.

Protection
This field is display only.

Available Inputs
This field cannot be entered into.

Changes Allowed
Changes cannot be made to this field.

Required / Optional

Display will always occur for any all policies in this grid with the exception of the policies whose premium is not known.

Functional Notes

Total all individual policy suggested downpay amounts and present in the total field and Actual Check Amount fields.

*Estimated Installment:*

Initial Display

This is a display-only field whose values are calculated on initialization of the screen. See Functional notes for calculation formula.

The Estimated Installment Total is a summation of the individual line-of-business Estimated Installment amounts.

Prompt Type / Length

This is display only and thevalue cannot exceed the actual policy premium.

Protection

This total field is a protected display and is not cross-validated.

Available Inputs

Input cannot be made into this field.

Changes Allowed

Changes cannot be made to this field. The amounts can be changed as a result of changing the number of installments or the actual downpay amount.

Required / Optional

This display will always occur for any each line of business that shows an actual premium.

Functional Notes

The Estimated Monthly Installment fields provide a rough approximation of he installment amount. This display does not present the amount of the FIRST installment. In simplistic terms, the individual installment amounts are calculated as:

$$\frac{\text{(Policy Premium) minus (Downpay Amount)}}{\text{(Weighted Number of Installments)}}$$

To calculate the Estimated Monthly Installment amount for each line-of-business policy:

1) Subtract the Downpay Amount from the Policy Premium.

2) Divide the result above according to the Installment Plan selected:

| Install Plan: | Divide by: |
|---|---|
| ANN | 1 |
| 2 | 2 |
| 4 | 3 |
| 6 | 5 |
| 10 | 9 |
| 10E | 9 |

(Note: For ANN, the calculation works for both 3Year and Not3Year policies)

3) Display the result of the calculation in the Estimated Monthly Installment field.

4) Note that if the insured is paying the entire premium with the downpay, then the calculation would work out as Policy Premium (1000) minus downpay amount (1000) divided by the number of installments:

(1000 – 1000) / num install = zero divided by the number of installments which would equal zero. This is a valid and sound calculation.

MODAL WINDOWS (Payer Name)

Window Name / Purpose
The Payer Name modal appears when the ellipse button is selected for any of the payer names on the Payer Detail grid. The window displays to capture the 2 lines of 32 characters of the payer name. Once the modal is closed, the first line of 32 characters displays in the Payer Detail grid as protected.

Prompts / Displays
The window contains a simple field for the capture of the name. The modal includes:
Title: Payer Name
'X' (close) button in the title bar on the right side.

Prompt: The prompt label is "Name:"

Field: Include a freeform text block of 2 lines of 32 characters

Buttons:
OK button: Include an OK button to edit the input, save the data, close the window, and place the cursor back on the ellipse from where the came.

Cancel button: Include a Cancel button to ignore any input changes, close the window, and place focus back on the ellipse button for the Payer Name.

Editing:
For successful OK exit from the modal, require at least 1 character of input in the first line.

PAGE BUTTONS

Delete Other Payer / Finance Co.: (alt-E)
The Delete Payer button is available when an Other Payer or Finance Company exists in the grid above. The operator moves focus to the row or selects the row with the 'nub' and clicks the Delete Payer button. This action sets the Direct Bill 'Other Payer' or 'Finance Company' prompts to 'N' (No) respectively.

It should not be permitted to delete the Insured row on the screen. Therefor, protect the nub so that the row cannot be selected, or present an error message is the row is highlighted and the Delete button is clicked.

Print Check Control Document: (alt-P)
The Print Check Control Document button displays and is always available. For the first print deliverable, this button should launch a screen print of this page. Data should contain everything including the Producer Code line at the top to and including the Done button on the bottom. The print should not include the navigator bar nor the browser.

Delete Policy From Check Control Document (alt-C)
The Delete Policy From Check Control Document button displays and is always available. The purpose is to remove a line of business that displays in the grid as a line that will not be written (but hadn't been truly declined in native IE).

The operator moves focus to a row, or uses the select 'nub,' then presses the Delete Policy button. The selected row is removed from the screen, and all totals and amounts are re-calculated and re-displayed.

DONE: (alt-D)
The DONE button displays and is active at all times. DONE edits the screen, passes key data to Direct Bill and moves the user to the Policy Output page.

SCREEN TABBING ORDER

Initial Cursor Position

On first access of this screen, focus should be on the ellipse button for the Payer Name.

On re-displays of this screen, focus should be on the Done button.

Tab Sequence Throughout Screen

1. Ellipse button of Payer Name
2. Payer Street
3. Payer City
4. Payer State
5. Payer ZIP
6. Repeat for each additional Payer row
7. Delete Other Payer / Finance Co. button
8. Billing Phone Number
9. Check Number
10. Check Amount
11. Install Plan dropdown for first LOB
12. Actual DownPay Amount for first LOB
13. Repeat above two steps for each LOB
14. Actual DownPay Amount total (in grid)
15. Print CCD button
16. Done button Functional Notes

WARNING MESSAGES

WARNING MESSAGE SCREEN NAME

No warning messages needed.

ERROR MESSAGING

ERROR MESSAGE NAME

If a Finance Company name exists, then the only valid installment choice is ANN. "When a Finance Company exists, the only valid Installment Option is ANN (Annual)"

The Insured billing name cannot be deleted. Either protect the row from being selected, or produce an error message if the insured row is highlighted and the operator clicks the Delete button. "You cannot delete the Insured information from this schedule."

ADDITIONAL POSSIBLE FEATURE ITEMS

1. Intelligently display available Installment Plan choice lists based on policy term.
2. Improve the Downpayment calculation for Work Comp to pull the WC Situs State from RAPID to sense if Texas (which uses 20% downpay). Use the actual situs state for all lines-of-business.
3. Enhance the Monthly Installment presentation to display a full installment amount / billing date schedule. (This necessitates tapping into existing Direct Bill logic).
4. Integrate the $5 Flat Service Fee into the billing schedule.
5. Add bar code / scan line to printed CCD
6. Rebuild the CCD printing process.
7. Remove the button Exclude Selected LOB from Calculation once all lines are available in the net.

State Issue Information Screen

Web-based GUI system – Workers Comp Issue

PAGE PROMPTS / FIELDS

*Fed. Employer Id #:*

Initial Display

This field(s) is located in the Legal Entity Number section of the screen. One field is present for every legal entity on the policy and listed on this page. Upon initial display, this field is blank.

Prompt Type / Length

Entry box / 9 numeric bytes

Protection

Unprotected

Available Inputs

Freeform operator input

Changes Allowed

Yes

Required / Optional

Required for legal enties with one or more locations in the following states:
Alabama
Colorado
Connecticut
District of Col.
Florida
Georgia
Idaho
Illinois
Indiana
Kansas
Kentucky
Louisiana
Maine
Maryland
Massachusetts
Michigan Minnesota
Mississippi
Missouri
Montana
Nebraska
Nevada
New Hampshire
New Mexico
New York
Ohio
Oregon
Pennsylvania
Rhode Island
South Carolina
South Dakota
Tennessee
Texas
Utah
Vermont
Virginia
Wisconsin
Wyoming Functional Notes Prompt Text Help Fed. Employer Id # - Input the 9 digit Federal Employer Id number associated with this legal entity. A Federal Employer Id number, or FEIN, is assigned to every legal entity by the Federal Government. The presence of more than one id number for a particular Named Insured indicates that there are multiple legal entities that must be entered on the Legal Entity Information screen. This information is transmitted to WC state authorities and must be accurate in order for the insured to avoid fines for failure to secure WC coverage.

*[State Employer Id #:]*

Initial Display

This field(s) is located in the Legal Entity Information section of the screen. For every entity having a location in a state that has an id of this kind, the field displays. The title of the field varies depending on the specific name of the id in that state (see below). Upon initial display, this field is blank.

The field names: (In bold are the ids that are unique)

Alabama Unemployment Id # (up to 15 digits)
Alaska Unemployment Id # (up to 15 digits)
Arizona Unemployment Id # (up to 15 digits)
Arkansas Unemployment Id # (up to 15 digits)
California Unemployment Id # (up to 15 digits)
Colorado Unemployment Account # (15 digits)
Connecticut Unemployment Id # (up to 15 digits)
Delaware Unemployment Id # (up to 15 digits)
District of Columbia Unemployment Id # (up to 15 digits)
Florida Unemployment Id # (up to 15 digits)
Georia Unemployment Id # (up to 15 digits)
Hawaii Dept. of Labor # (10 digits)
Idaho State Unemployment Tax Admin # (10 digits)
Illinois Unemployment Id # (up to 15 digits)
Indiana Unemployment Id # (6 digits)
Iowa Unemployment Id # (up to 15 digits)
Kansas Unemployment Id # (up to 15 digits)
Kentucky Employer's Id # (10 digits)
Louisiana Unemployment Id # (up to 15 digits)
Maine Unemployment Insurance Account # (10 digits)
Maryland Unemployment Id # (up to 15 digits)
Massachusetts Unemployment Id # (up to 15 digits)
Michigan Unemployment Id # (up to 15 digits)
Minnesota Unemployment Id # (10 digits)
Mississippi Unemployment Id # (up to 15 digits)
Missouri Unemployment Id # (up to 15 digits)
Montana Unemployment Id # (up to 15 digits)
Nebraska Unemployment Id # (up to 15 digits)
Nevada Unemployment Id # (up to 15 digits)
New Hampshire Unemployment Id # (up to 15 digits)
New Jersey Taxpayer Id # (12 digits)
New Mexico Unemployment Id # (7 digits)
New York Employers Registration # (7 digits)
North Carolina Unemployment Id # (up to 15 digits)
North Dakota Unemployment Id # (up to 15 digits)
Ohio Unemployment Id # (up to 15 digits)
Oklahoma Unemployment Id # (up to 15 digits)
Oregon WC Division # (7 digits)
Pennsylvania Unemployment Id # (up to 15 digits)
Rhode Island Unemployment Id # (up to 15 digits)
South Carolina Unemployment Id # (up to 15 digits)
South Dakota Unemployment Id # (up to 15 digits)
Tennessee Unemployment Id # (up to 15 digits)
Texas Unemployment Id # (up to 15 digits)

Utah Unemployment Id # (up to 15 digits)
Vermont Unemployment Id # (up to 15 digits)
Virginia Unemployment Id # (up to 15 digits)
Washington Unemployment Id # (up to 15 digits)
West Virgina Unemployment Id # (up to 15 digits)
Wisconsin Unemployment Id # (up to 15 digits)
Wyoming Unemployment Id # (up to 15 digits)

Prompt Type / Length
Entry box / up to 15 digits

Protection
No

Available Inputs
Freeform numeric field

Changes Allowed
Yes

Required / Optional
Required for the following states:
Colorado
Hawaii
Idaho
Indiana
Kentucky
Maine
Minnesota
New Jersey
New Mexico
New York Functional Notes

*California Legal Entity Ind:*

Initial Display
This field is present for every entity with a California location. This field initially displays blank.

Prompt Type / Length
Drop down box. Follow selections available on Policy Information screen for Legal Entity.

Protection
No

Available Inputs
Same as Policy Information screen inputs. Limited Liability Company is not a valid input.

Changes Allowed
Yes.

Required / Optional
Required

Functional Notes

Prompt Text Help

*Describe Other:*

Initial Display
This field is displays when the Legal Entity Indicator is Other. This field initially displays blank.

Prompt Type / Length
Freeform text. Follow format requirements for Describe Other field on Policy Information screen.

Protection
No

Available Inputs
Freeform text

Changes Allowed
Yes.

Required / Optional
Required if the California Legal Entity Ind is Other.

Functional Notes

Prompt Text Help

*Risk Id #*

Initial Display

This field initially displays blank.

Prompt Type / Length

Entry box (as part of grid) / up to 9 alpha-numeric characters

Protection

No

Available Inputs

Freeform. However, "Not Avail" is not valid when Experience Mod Indicator is "Actual"

Changes Allowed

Yes

Required / Optional

Required

Functional Notes

Prompt Text Help

Risk Id # - Input the Risk Id # assigned by the particular rating organization to this insured when it be became experience rated.

*Experience Mod Indicator*

Initial Display

This field is located in the Experience Mod grid. It displays blank upon initial display.

Prompt Type / Length

Drop down listing / up to 13 characters

Protection

No

Available Inputs

Actual
Tentative – Not valid in CA, MI
Preliminary – Not valid in CA, MI
Contingent – Not valid in CA, MI, TX Prior – CA and MI only
Not Available Changes Allowed
Yes Required / Optional
Required Functional Notes Prompt Text Help
Experience Mod Ind – Select from the drop down box the applicable Experience Mod Indicator. Your valid options are:
Actual
Tentative – Not valid in CA, MI
Preliminary – Not valid in CA, MI
Contingent – Not valid in CA, MI, TX
Prior – CA and MI only
Not Available

MODAL WINDOWS

No Modal Windows

PAGE BUTTONS

Continue (Alt-C):
The Continue button displays and is active at all times. Clicking Continue saves the data keyed or changed data and moves the operator to the General Issue Information screen.

The issue-rating process will also be performed to:
1) derive Commission % and Insuring company to be displayed on the General Issue Screen
2) derive forms to display on the Forms screen In order to process issue-rating, watchfile will be prefilled with 0.

SCREEN TABBING ORDER

Initial Cursor Position
The screen should appear with the cursor focused on the Federal Employer Id # of the first legal entity listed.

Default Button on ENTER
Continue is the default button.

Tab Sequence Throughout Screen
1. Federal Employer id # - Entity 1
2. [State Employer id #] – Entity 1
3. Federal Employer id # - Subsequent entities
4. [State Employer id #] – Subsequent entities
5. California Legal Entity Ind
6. Risk Id # - Inter/Intra State column
7. Risk Id # - CA column
8. Risk Id # - DE column
9. Risk Id # - MI column
10. Risk Id # - NJ column
11. Risk Id # - PA column
12. Experience Mod Indicator – Inter/Intra State column
13. Experience Mod Indicator – CA column
14. Experience Mod Indicator – DE column
15. Experience Mod Indicator – MI column
16. Experience Mod Indicator – NJ column
17. Experience Mod Indicator – PA column
18. Continue

ERROR MESSAGING

ERROR MESSAGE NAME
'Not Avail' is not a valid Risk Id when the Experience Mod Indicator is 'Actual'

Please enter an Experience Mod Indicator

Please enter a Risk Id #

Please enter a Fed. Employer Id #

'Tentative' is not a valid Experience Mod Indicator in the states of CA or MI

'Preliminary' is not a valid Experience Mod Indicator in the states of CA or MI

'Contingent' is not a valid Experience Mod Indicator in the states of CA, MI or TX 'Prior' is only a valid Experience Mod Indicator in the states of CA and MI California Legal Entity Ind is required Cannot have Experience Mod Indicator or Risk Id if there is no Experience Mod

WORKERS COMP QRL OVERVIEW

These requirements are meant to mirror the existing functionality of the Account and MasterPac Quick Reference Locator and Navigator. Obviously, many of the menu choices are Workers Comp-specific, but the functionality is almost identical to that of MasterPac processing with a few changes noted below.

There are three rules that guide the functionality of the Quick Reference Locator and Navigator for WC Issue:

1. The first time through the issue screens, the operator must be led through each screen to ensure proper processing.

- Navigator – Initially displays collapsed, showing only the Legal Entities reference as the first screen in the issue process. As the operator moves through the screen-flow the Navigator builds, displaying the next screen in the flow.
   - Quick Reference Locator – Opposite of the Navigator, this screen displays menu choices of screens already processed. Therefore, it is not accessible until after the Legal Entity Information screen is processed. Like the Navigator, it too would build as subsequent screens are processed.

2. If the operator utilizes the Quick Reference Locator or Navigator to re-access and modify an issue screen, they must re-access all of the subsequent issue screens.

- Navigator – In this case, the Navigator is collapsed, viewing only the next screen in the flow.
   - Quick Reference Locator – Displays only those screens that display prior to the modified screen. The operator is forced to hit 'Continue' or use the Navigator to access the next logical screen.

3. If the operator modifies the quote, they are forced to re-access all of the issue screens.

- Navigator – As in the first time through the issue path, the Navigator displays only the Legal Entities reference. As the operator moves through the screen-flow the Navigator builds, displaying the next screen in the flow.
   - Quick Reference Locator – Again, it is not accessible until after the Legal Entity Information screen is processed. Like the Navigator, it too would build as subsequent screens are processed.

Note on numbers 2 and 3: These processing constraints are due to the dependencies on almost every issue screen with the quote data and dependencies between several of the issue screens themselves. This is particularly true for the forms information. Despite what the Data Exists indicator is, when the quote is modified the Forms Derivation indicator must be reset and the operator forced to re-access the Forms screen.

Navigator/Quick Reference Locator

Web-based GUI system – Workers Comp New Business Issue

Navigator selections are as follows in the order that they should appear:
Legal Entities
State Issue Info
General Issue Info
Forms
Billing
Final Issue Info

---

Quick Reference Locator

Click to go to:

| | | |
|---|---|---|
| Legal Entity Information | State Issue Info | General Issue Info |
| Legal Entity Names | Federal Employer Id #s | Inspection/Accounting Contact |
| Location Addresses Information | State Unemployment Id #s | Officer Election/Exclusion |
| California Legal Entity Information | Commission | Risk Id #s |
| | Experience Mod Indicator | |

| | | |
|---|---|---|
| Forms | Direct Bill | Final Issue |
| Derived Forms | Payer Information | Book Rollover Indicator |
| Optional Forms | Downpayment Information | Automatic Renewal Indicator |
| Fill-in Completion | Check Information | Select Office Copy |
| Service Center Copy | Mail Direct To Agent | |

Workers Compensation (WC) Issue - Final Issue Screen

PROMPTS / FIELDS

*Prompt Name: Insuring Company*

Initial Display
The full name of the insuring company of the predominant state is displayed and cannot be changed by the operator.

Prompt Type

N/A – Display only

Protection
Yes

Available Inputs
None

Changes Allowed
No.

Required / Optional
N/A

Functional Notes

Prompt Text Help
(?) – INSURING COMPANY:

*Prompt Name: Should this policy be automatically renewed?*

Initial Display
This question appears only for Home Office and Field employees. Agents will not be asked this question. If an agent is processing business, it should be assumed that the policy is to be automatically renewed. If a renewal stop (watch file) needs to be placed on the policy, it will need to be processed by a TIC employee.

The initial display of the screen should default the question of 'Should this policy be automatically renewed?' with a 'Yes' answer. The options will be 'Yes and 'No' and will be in the form of radio buttons. The 'Yes' answer will always be the default value. Some translation will need to be done with the 'No' answer and is explained in detail below. Note: answering 'No' to this question creates a referral condition and prevents agents from fully issuing a renewal.

Prompt Type
Radio Buttons

Protection
No

Available Inputs
'Yes' or 'No'

Changes Allowed
Yes

Required / Optional
Required

Functional Notes
Issue Express offers 'Watch File' selections, which we will not be incorporating into the Net. The values that Issue Express offers today are O, W, X, Y, Z, and C. These codes basically serve the same purpose in that they all prevent a policy from going through the automatic renewal process and stop the policy at the end of its term. There is more business meaning attached to these codes than there probably should be. Because each office has different business interpretations as to what each of these codes should mean, it is difficult to determine exactly what the text description contained in a drop down for 'Watch File' should be. We will recommend instead that operators send a memo to file when using a watch file in the Net to identify reasons as to why this policy should be stopped upon renewal.

Translation
For TIC employees, translation will be made so that a 'Yes' answer to the question 'Should this policy be automatically renewed' will set 'Watch File' on the PIF to '0'. A 'No' answer to this question will set 'Watch File' to 'W'.

If an Agent is processing, then the map and translate process should have stored a '0' under Watch File in the legacy system.

Consideration will need to be made for retrievals in terms of either deleting an existing 'Watch File' or translating it upon retrieval into the Net. This, however, will be addressed at a later date.

Prompt Text Help
(?) – WILL THIS POLICY BE AUTOMATICALLY RENEWED?: If there is an underwriting reason to prevent the policy from going through the automatic renewal process, answer Yes to prevent the policy from being automatically renewed next term.

*Prompt Name: Is this Policy Part of a Book Roll-Over?:*

Initial Display
This question will initially default as No.

Prompt Type
Radio buttons

Protection
Unprotected

Available Inputs
Yes or No

Changes Allowed
Yes.

Required / Optional
Required

Functional Notes
NOTE. Instead of creating a new field for book roll-over, Actuarial is adding additional values to the reinsurance field for all lines. 'B' indicates a book roll-over and no reinsurance. 'C' indicates both a book roll-over and reinsurance. The issue systems have already made the change to allow any value for the reinsurance question.

Julie and Marsha would like us to have two separate questions in the IENet for all lines:
Will this policy be reinsured? Yes/No
Is this policy part of a book roll-over? Yes/No
Combinations of these two questions should be mapped to the converted value column as shown below;

| Reinsurance | Book roll-over | Converted to value in Reinsurance Ind |
|---|---|---|
| Y | Y | C (new) |
| Y | N | Y |
| N | Y | B |
| N | N | N |

*We have pulled the question Will this policy be reinsured? from the Net. Therefore, it should be assumed that the answer to the reinsurance questions is No. So the map and translate would only get a 'B' or an 'N'

Prompt Text Help
(?) – IS THIS POLICY PART OF A BOOK ROLL-OVER?: Answer the question as YES if this policy is part of a book roll-over. The answer to this question will be used for statistical reporting only.

*Mail Directly to Agency?*

Initial Display
This field displays defaulted to YES for all reporting offices except 700 and 02Y. For reporting offices 700 and 02Y, default this prompt to NO. This is the current default process that Issue Express provides today.

Prompt Type / Length
Yes / No radio button.

Protection
This field is always unprotected and can be changed.

Available Inputs
YES / NO radio button

Changes Allowed
Changes are allowed on this prompt.

Required / Optional
Selection of either Yes or No is required.

Functional Notes
Regardless of reporting office, if the defaulted answer is changed by the operator, the value should be saved on a subsequent redisplay of the screen.

Prompt Text Help
(?) – MAIL DIRECTLY TO AGENCY?:

*"Send Select Office Copy to":*

Initial Display
The "Send Select Office Copy to" displays defaulted. Content is the office code.

Prompt Type / Length

This is an Entry Box which displays defaulted. Field should contain the three-digit office code.

Protection

This field is unprotected and can be changed by the operator to a valid office code.

Available Inputs

All of the valid office codes and service centers.

Changes Allowed

Changes can be made to this field.

Required / Optional

A valid office code is required in this field.

Functional Notes

Prompt Text Help (?) – SEND SELECT OFFICE COPY TO:

*"Send Service Center Copy to":*

Initial Display

The "Send Service Center Copy to" displays defaulted. Content is the office code.

Prompt Type / Length

This is an Entry Box which displays defaulted. Field should contain the three digit office code.

Protection

This field is unprotected and can be changed by the operator to a valid office code.

Available Inputs

All of the valid reporting office codes / service centers

Changes Allowed

Changes can be made to this field.

Required / Optional

A valid office code is required in this field.

Functional Notes

Prompt Text Help (?) – SEND SERVICE CENTER COPY TO:

*Agency Insured's ID (used for Download)*

Initial Display

This field initially displays blank.

Prompt Type / Length

Up to 30 Characters.

Protection

This field is unprotected.

Available Inputs

Changes Allowed

Changes are allowed in this field.

Required / Optional

Input (up to 30 Characters) is optional

Functional Notes

Prompt Text Help (?) – AGENCY INSURED'S ID:

MODAL WINDOWS

Window Name / Purpose

None needed.

PAGE BUTTONS

Save and Return to Account Summary (ALT+S)

The Save and Return to Account Summary button is used to reject the full issuance of the policy. The screen will be edited to validate the "Send Select Office Copy to" and "Send Service Center Copy to" displayed or changed on this screen. Clicking this button will save the data captured on this screen and returns the operator to the Account Summary screen.

Issue (ALT+I):

The Issue button launches re-rating, authority checks, consistency checks and then commits the policy to full issuance. The screen will be edited to validate the "Send Select Office Copy to" and "Send Service Center Copy to" displayed or changed on this screen. Policy re-rating and full issuance will be kicked off when leaving this page.

After Issue is chosen, the operator will be returned to the Account Summary screen.

SCREEN TABBING ORDER

*Initial Cursor Position*
Whenever the screen is accessed, focus should be on the Issue button.

Default Button on ENTER
ISSUE button

Tab Sequence Throughout Screen
On initial display of the screen, focus should be placed on the Issue button. Then, tab through the screen in the following order. Note that tabbing through the radio button questions should not change either the defaulted or operator selected answer.

1. Issue button
2. 'Should this policy be automatically renewed?'
3. 'Is this policy part of a book roll-over?'
4. "Mail Directly to Agency?"
5. "Send Select Office Copy to"
6. "Send Service Center Copy to"
7. "Agency Insured's ID"
8. Save and Return to Account Summary button
9. Issue button then continue to loop through the screen

ERROR MESSAGING

ERROR MESSAGE NAME
On issuance from this screen, consistency checks are performed and any host issue errors are determined. These messages must be presented to the operator.

ADDITIONAL POSSIBLE FEATURES

1. Provide the actual name of the office in addition to the office code.
2. Suppress the displays of the Select Office and Service Center when the Mail Direct is NO. As a result, capture a new item called "Send Paper to." Construct this to standardize the Line of business variety in the office codes used when Mail to Agent is NO.
3. Create an ability to view / change the number of copies printed. Plus add the capability to address whose attention the copies should be sent to.

Legal Entity Information Screen

Web-based GUI system – Workers Comp Issue

PAGE PROMPTS / FIELDS

*Entity*

Initial Display

The Entity field is in the Legal Entity grid. The initial display for the first row is entity 1.

Prompt Type / Length

Display box / The field is numeric, 2 bytes in length

Protection

This field is protected. It is a display field only.

Available Inputs

No direct input into the field itself

Changes Allowed

Changes are not allowed to this field.

Required / Optional

A value is required, although the field in row 1 will be prefilled.

Functional Notes

Adding and deleting legal entities (rows) is performed using the Add Another Entity and Delete Selected Entity buttons.

Prior to being saved, if a row is deleted and there are higher numbered entities listed, the higher entity numbers are renumbered to avoid any gaps in entity numbering. There must always be at least one entity row.

Prompt Text Help

Entity – This field displays the unique number associated with each legal entity on the policy. It is derived by the system when an entity is added and is protected.

*Name(s)*

Initial Display

The Name(s) field displays in the Legal Entity grid. The Name(s) field in row 1 is prefilled upon initial display with the first three lines of the Named Insured entered on the Policy Information screen. Even though the operator may have chosen to reference the Named Insured Endorsement, the name prefilled in this field must be the actual name entered.

Prompt Type / Length

Display box (as part of grid). Depending on the limitations of the screen, the box should display as much of the 30 bytes of the 1st line of the name as possible. In addition, each cell should be able to scroll from left to right to display the entire 30 characters of a name. However, when focus leaves the cell, the cell should left justify to display the first part of the name.

A maximum name size of 3 lines (30 bytes each) will be entered by using the ellipse button and displaying a modal window.

Protection

Yes

Available Inputs

There is no direct input into the Name(s) field itself.

Changes Allowed

Not directly into the cell. Any changes would be made by accessing the modal window using the ellipse button.

Required / Optional

Required

Prompt Text Help

Name(s) – Web-based GUI system allows the input of three names associated with each legal entity on the policy. This field displays the first line of the first name for the given entity.

*State*

Initial Display

The State field is located in the Address grid. The State field in every row is prefilled upon initial display with the state from every location on the State/Class Code screen. Each row should display the correct state/location combination entered on the State/Class Code screen.

Prompt Type / Length

Display box (as part of grid). 2 byte state code

Protection

Yes

Available Inputs
There is no direct input into this field.

Changes Allowed
Not directly into the cell. Any changes to states/locations on the policy should be made from the State/Class Code screen.

Required / Optional
Required

Prompt Text Help
State – The state displays prefilled from the State/Class Code Screen. No state or location can be deleted from the Legal Entity Information Screen. Rather, you must return to the State/Class Code Screen to delete any state/location combination.

*Loc*

Initial Display
The Loc field is located in the Address grid. The Loc field in every row is prefilled upon initial display with each location on the State/Class Code screen. Each row should display the correct state/location combination entered on the State/Class Code screen.

Prompt Type / Length
Display box (as part of grid). Up to a 2-byte numeric

Protection
Yes

Available Inputs
There is no direct input into this field.

Changes Allowed
Not directly into the cell. Any changes to states/locations on the policy should be made from the State/Class Code screen.

Required / Optional
Required

Prompt Text Help
Location – The location displays prefilled from the State/Class Code Screen. No state or location can be deleted from the Legal Entity Information Screen. Rather, you must return to the State/Class Code Screen to delete any state/location combination.

*Street*

Initial Display

The Street field is located in the Address grid. It displays blank upon initial display. The number of street fields available in the grid is dependent on the number of State/Location rows.

Prompt Type / Length

Display box (as part of grid). 30 bytes in length.

Depending on the limitations of the screen, it may be necessary to make the field scroll left to display all 30 bytes Protection Yes Available Inputs None. Use the 'nub' to highlight the desired row, then select the 'Add/Update Address Info' button for the display of a modal window to input the info.

Changes Allowed

No changes are allowed from the grid, only from the modal window.

Required / Optional

Street is required input on the modal window and then displayed in this field ($1^{st}$ line only).

Functional Notes

If all 30 bytes cannot display at once, when focus is off the field, left justify the data to display the first part of the street data entered.

Prompt Text Help

Street – The address information (Street, City, Zip Code) for each state/location combination is entered by depressing the 'Add/Update Address Info' button. A modal window displays where it is possible to enter more than one address for the selected state/location combination. However, only the first address entered displays in the grid on the Legal Entity Information screen. If two lines of address are input, the information is saved, but only one line displays on the grid.

*City*

Initial Display

The City field is located in the Address grid. It displays blank upon initial display. The number of city fields available in the grid is dependent on the number of State/Location rows.

Prompt Type / Length

Display box (as part of grid). 25 bytes in length. Depending on the limitations of the screen, it may be necessary to make the field scroll to display all 25 bytes.

Protection

Yes

Available Inputs

None. Use the 'nub' to highlight the desired row, then select the 'Add/Update Address Info' button for the display of a modal window to input the info.

Changes Allowed

No changes are allowed from the grid, only from the modal window.

Required / Optional

City is required input on the modal window and then displayed in this field.

Functional Notes

If all 25 bytes cannot display at once, when focus is off the field, left justify the data to display the first part of the City data entered.

Prompt Text Help

City – The address information (Street, City, Zip Code) for each state/location combination is entered by depressing the 'Add/Update Address Info' button. A modal window displays where it is possible to enter more than one address for the selected state/location combination. However, only the first address entered displays in the grid on the Legal Entity Information screen.

*Zip Code*

Initial Display

The Zip Code field is located in the Address grid. It displays blank upon initial display. The number of Zip Code fields available in the grid is dependent on the number of State/Location rows.

Prompt Type / Length

Display box (as part of grid). 5 bytes in length.

Protection

Yes

Available Inputs

None. Use the 'nub' to highlight the desired row, then select the 'Add/Update Address Info' button for the display of a modal window to input the info.

Changes Allowed

No changes are allowed from the grid, only from the modal window.

Required / Optional

A valid Zip Code is required on the modal window and then displayed in this field ($1^{st}$ 5 bytes only).

Functional Notes

Prompt Text Help

Zip Code – The address information (Street, City, Zip Code) for each state/location combination is entered by depressing the 'Add/Update Address Info' button. A modal window displays where it is possible to enter more than one address for the selected state/location combination. However, only the first address entered displays in the grid on the Legal Entity Information screen. If a nine digit Zip Code is input, the information is saved, but only the first five digits display on the grid.

*[Assigned] Entity*

Initial Display

The [Assigned] Entity field is located in the Address grid. It displays prefilled with a 1 upon initial display for each state/location row.

Prompt Type / Length

Display box (as part of grid). 2 bytes in length

Protection

Yes

Available Inputs

There is no direct input into the Entity field itself. All input is made from a modal window triggered by the use of the 'Assign' button within a given row.

Changes Allowed

Any changes would be made from the 'Assign' modal window.

Required / Optional

A valid legal entity assignment is required for each row.

Functional Notes

If more than one entity is present on the Entity grid, the default of 1 is erased, whereby the operator is forced to use the 'Assign' button and choose the appropriate entity(ies) associated with the given location. Exception, if the location info was already saved with the default of 1, it will not be erased.

It is possible to assign more than one entity to a location in the modal window. For every entity assigned to the location a new row is created. (See page 12 of Legal Entity slides)
-Even though there are separate rows, modification of address information for this state/location combination needs to be performed only once. The changed info is then displayed in all affected rows of the grid.
-When multiple entities are assigned to the same location, the additional rows created should display together on the grid. (All rows for each location should display together)
-To delete the entity/location relationship, depress the 'Assign' button, remove the 'check' next to the given entity. The row is then deleted on the grid, unless it is the only row for that location. If that is the case, the row re-displays with the entity field blank.

Prompt Text Help

Entity – Assign a Legal Entity to this location by depressing the 'Assign' button. A modal window will appear with the list of legal entities on the policy. You may choose one or more entities that are associated with this location. When more than one entity is chosen for this location new lines on the grid are created to display the assignment of each entity. However, even though the information displays on separate lines of the grid, if any address information needs to be changed for this location, it only needs to be changed once to affect all the lines on the grid.

MODAL WINDOWS

Entity Names Modal

The Entity Names modal window displays when the ellipse button is chosen from the Legal Entity grid. It allows for the input of three names for the Legal Entity noted in the window title.

The window title should read "Names Associated with Entity [number]". The Entity number, without the brackets, will be dynamic based on the row that the ellipse button was chosen from.

Click 'OK' to return to the Legal Entity grid to display the entered data.
Click 'Cancel' to return to the Legal Entity grid without displaying any entered data.

(Entity Names Modal) Prompts / Displays (Entity Names Modal) Name 1:

Initial Display

The Name 1 field is prefilled upon initial display with the Named Insured entered on the Policy Information screen. Even though the operator may have chosen to reference the Named Insured Endorsement, the name prefilled in this field must be the actual name entered.

Prompt Type / Length

Three Entry boxes/ 30 bytes each

Protection

No

Available Inputs

Freeform alpha/numeric field

Changes Allowed

Changes can be made in this field.

Required / Optional

Entry of at least one character in the first of three entry boxes is required. Entry into the 2nd and 3rd entry boxes is optional.

Functional Notes

To delete a name, highlight the desired name and press delete. If names 2 or 3 are deleted, upon reentry to the screen the remaining names should be moved up into the another name field so that there are no gaps in names on the screen.

(Entity Names Modal) Name 2:

Initial Display

The initial display is blank.

Prompt Type / Length

Three Entry boxes/ 30 bytes each

Protection

No

Available Inputs

Freeform alpha/numeric fields

Changes Allowed
Changes can be made in these fields.

Required / Optional
Optional

Functional Notes (Entity Names Modal) Name 3:

Initial Display
The initial display is blank.

Prompt Type / Length
Three Entry boxes/ 30 bytes each

Protection
No

Available Inputs
Freeform alpha/numeric field

Changes Allowed
Changes can be made in this field.

Required / Optional
Optional

Functional Notes

Address Modal

The Address modal window displays when the 'Add/Update Address Info' button is chosen and a row is selected from the Address grid. It allows for the input of the full address associated with the State/Location noted in the window title. It also allows for the ability to add multiple addresses for this location.

The window title should read "Address(es) Associated with [state] Location [number]". The state and location number, without the brackets, will be dynamic based on the row that the ellipse button was chosen from.

The grid is for display purposes only. Any changes must be made in the fields below the grid. When an address is selected (highlighted by using the 'nub') the values for the address display in the fields below. The grid displays only the first line out of a possible two lines of street.

The grid should display up to 3 addresses. When a 4th address is added, the grid should go into a scroll mode.

If a location is assigned to more than one entity, creating multiple rows on the address grid on the Legal Entity Info screen, and it is necessary to modify or delete the address, the operator should be able to access the one common address modal to make the changes to the multiple rows.

Click 'Add/Update Address' to either add a complelety new address to the location or change the details of a selected address. This also triggers the zip code validation. No commit at this point.

Click 'Delete Selected Address' is also available to remove an address from the location noted in the window title.

Click 'OK' to perform the zip code validation, derive the County Town Code (See below) and return to the Legal Entity Information screen, displaying the information entered on the Address grid (only 1st line of street). No commit at this point.

Click 'Cancel' to return to the Legal Entity grid without performing any functions or displaying any new data.

Deriving County Town Code:

-Derive for all states but only pass to RAPID I the codes for Alabama and Lousiana.
-If the location has multiple addresses, send the 1st address's code to RAPID I for each location.

(Address Modal) Prompts / Displays (Address Modal) Street (Alt S):

Initial Display
The Street field displays blank upon initial display.

Prompt Type / Length
Two Entry boxes/ 30 bytes each

Protection
No

Available Inputs

Freeform alpha/numeric field

Changes Allowed
Changes can be made in this field.

Required / Optional
Entry of at least one character in the first of two entry boxes is required. Entry into the 2nd entry box is optional.

Functional Notes

Prompt Text Help
Street – Input the street address associated with this location. If more room is required, you may tab to the second line to complete the remainder of the street address. However, only the first line of the street address displays on the Legal Entity Information Screen.

<u>(Address Modal) City (Alt C):</u>

Initial Display
The City field initially displays blank, unless the data for this field was directly input into the Address grid. If so, the information should display in its entirety in this field.

Prompt Type / Length
Entry box / 25 characters in length

Protection
No

Available Inputs
Freeform alpha field

Changes Allowed
Changes can be made in this field.

Required / Optional
City is required entry onto the modal window.

Functional Notes

Prompt Text Help

City – Enter the city associated with this address. Be careful to spell the city name correctly because it will be used to validate the zip code as well as derive the County Town Code for some states.

*(Address Modal) State:*

Initial Display

The full state name of the state/location row chosen displays upon initial display of window.

Prompt Type / Length

Display field/ up to 20 alpha characters

Protection

Yes

Available Inputs

None.

Changes Allowed

No

Required / Optional

Required

Functional Notes

*(Address Modal) Zip Code (Alt Z):*

Initial Display

The Zip Code field displays blank upon initial display.

Prompt Type / Length

Two Entry boxes. 5 bytes for the first box, 4 bytes for the second box

Protection

No

Available Inputs

Freeform Numeric field. Cross validation against city, state and zip should be performed when the 'Add/Update Address' or 'OK' buttons are pressed.

Changes Allowed

Yes

Required / Optional

A valid Zip Code (1st 5 bytes) is required.

Functional Notes

Zip code help should be implemented bases on what has already been built for MasterPac (location schedule).

Prompt Text Help

Zip Code – Enter the zip code for this address. If the zip code is not known, click on the question mark (?) for help.

Assign Entities Modal

The Assign Entities modal window displays when the 'Assign' button is chosen from a given row of the Address grid. It is used to choose the entities associated with the given location.

The window title should read "Legal Entity Assignment for [state] Location [#]". The state and location number, without the brackets, will be dynamic based on the row that the 'Assign' button was chosen from.

Every legal entity present in the Legal Entity grid should be listed in the grid on this modal window, with its associated names (1st line of each name). The operator will assign one or more legal entities to a location by highlighting the legal entity using the 'nub' on the given row of the grid. Selection of multiple rows at one time must be allowable. When a row is chosen, an "X" should display in the field. The grid should display up to 3 legal entities. On the 4th entity, the grid should go into a scroll mode. In addition, each cell should be able to scroll from left to right to display the entire 30 characters of a name. However, when focus leaves the cell, the cell should left justify to display the first part of the name.

Click 'OK' to return to the Legal Entity Information screen and display the numeric value of each entity selected in the [Assign] Entity field of the Address grid. If multiple entities are selected, a new row on the Address grid will display for each selected entity.

Click 'Cancel' to return to the Legal Entity Information screen without displaying any new data.

Zip Code Help Modal

This modal window should be built based on what has already been built for MasterPac (Location Schedule).

PAGE BUTTONS

Add Another Entity (Alt-A)
The Add Another Entity button displays at all times. When selected, an additional row is added to the Legal Entity grid with the Entity number prefilled using the number from the row above plus 1. Cursor focus is placed in the Name(s) field of the new row.

Delete Selected Entity (Alt-D)
The Delete Selected Entity button displays at all times. The button is active only when a legal entity row has been selected and highlighted. When a row is highlighted and the Delete Selected Entity is chosen, the selected row is removed from the grid. If previously saved, this selection also fires off the 'maintain'. If not saved previously, the entity is deleted from the grid, but the 'maintain' is not performed.

Only one row may be deleted at one time. It should not be possible for the operator to select multiple rows simultaneously.

If there is only one row present, this button is not active.

Add/Update Address Info (Alt-U):
This button displays at all times. It is active only when a state/location row has been selected. When chosen, the address modal window displays to enter the address info for the selected row.

Continue (Alt-C):
The Continue button displays and is active at all times. Clicking Continue fires off the 'maintain' and moves the operator to the State Issue Information screen.

SCREEN TABBING ORDER

Initial Cursor Position
The screen should appear with the cursor focused on the ellipse button of the first line of the Legal Entity grid.

Default Button on ENTER
Continue is the default button

Tab Sequence Throughout Screen
1. Ellipse button – Row 1 of Legal Entity grid
2. Ellipse button – Subsequent rows of Legal Entity grid
3. Add Another Entity button
4. Delete Selected Entity
5. 'Nub' – Row 1 of Address grid
6. Assign Button – Row 1 of Address grid 7. 'Nub'– Subsequent rows of Address grid
8. Assign button – Subsequent rows of Address grid
9. Add/Update Address Info button
10. Continue

ERROR MESSAGING

ERROR MESSAGE NAME

Cannot delete only entity present

Must input at least one name for a legal entity

Street is required

City is required

A valid Zip Code is required

At least one entity needs to be assigned to this location

General Issue Information

Web-based GUI system – Workers Compensation Issuance

PAGE PROMPTS / FIELDS

(This field has been moved to the Final Issue Screen)

Should this policy be automatically renewed?

Initial Display

This question appears only for Home Office and Field employees. Agents will not be asked this question. If an agent is processing business, it should be assumed that the policy is to be automatically renewed. If a renewal stop (watch file) needs to be placed on the policy, it will need to be processed by a TIC employee.

The initial display of the screen should default the question with a 'Yes'.

Prompt Type

Radio buttons

Protection

No

Available Inputs

Selection of a 'Yes' or 'No' radio button.

Changes Allowed

Yes

Functional Notes

Issue Express offers 'Watch File' selections, which we will not be incorporating into the Net. The values that Issue Express offers today are O,W,X,Y,Z, and C. These codes basically serve the same purpose in that they all prevent a policy from going through the automatic renewal process and stop the policy at the end of its term.

Translation

Translation will be necessary so that a 'Yes' answer to the will set 'Watch File' to '0'. A 'No' answer to this question will set 'Watch File' to 'W' . Consideration will need to be made for retrievals in terms of either deleting an existing 'Watch File' or translating it upon retrieval into the Net. This, however, will be addressed at a later date.

Prompt Text Help

Same as MasterPac.

[Election Question]

Initial Display

The question that appears upon initial display of the screen varies, depending on the policy legal entity as described below:

Partnership – "Will any of the Partners be covered under this policy?"
Individual – "Will the Sole Proprietor be covered under this policy?"
Corporation, Joint Venture, Other – Will any of the Executive Officers be covered under this policy?

The default value of the answer also varies, depending on the legal entity and the mailing state. For example, if Partnership and CT, then the default is 'Yes", because partners are automatically included.

Prompt Type

Radio buttons

Protection

No

Available Inputs

Yes/No

Changes Allowed

Yes

Functional Notes

The information collected in this field and the "What state governs this election or exclusion?" field will be used to derive the applicable endorsement (usually operator requested).

Prompt Text Help

[QUESTION] – The purpose of this field is to attach the appropriate election or exclusion form. This information, along with the governing state, will allow the system to derive the applicable form, if one is necessary.

Example: In the state of Connecticut, partners are automatically included under the Workers Compensation Act. If partners wish to be excluded from coverage, answer 'No' to this field and Web-based GUI system will automatically attach form WC 00 03 08 (Partners, Officers and Others Exclusion Endorsement).

What state governs this election or exclusion?

Initial Display

This field initially displays with the mailing address state. If the mailing address state is not a state covered on the State Class Code screen, then this field should default with the predominant state.

Prompt Type

Drop down box/ 2 alpha characters

Protection

No

Available Inputs

The drop down box will contain the states on the policy.

Changes Allowed

Yes

Functional Notes

The information will be used to derive the applicable endorsement (usually operator requested).

Prompt Text Help

[QUESTION] – The purpose of this field is to attach the appropriate election or exclusion form necessary to meet state guidelines. This information, along with the question above, will allow the system to derive the applicable form, if one is necessary.

Example: In the state of Connecticut, partners are automatically included under the Workers Compensation Act. If partners wish to be excluded from coverage, an endorsement is necessary. However, in the state of Delaware, partners are automatically excluded from coverage. No endorsement is needed.

Because the law varies by state, please use care when choosing the state the benefits would be assigned to if a loss occurred.

*Commission %:*

Initial Display

This field displays if the commission percentages for every state on the policy are the same. The commission will display in the form of a percentage.

Prompt Type / Length
Display field. The length is 5 bytes.

Protection
Yes

Available Inputs
00.00 to 25.00 – The value will display in the form of a percentage (25.00 %). The value must be converted from a decimal received from RAPID I.

Changes Allowed
Yes

Required / Optional
Required

Functional Notes
The commission will be prefilled from the Producer Database according to the producer code that is being used to quote and/or issue the account.

Prompt Text Help
COMMISSION % - The Commission is the contractual amount the Agent will receive for a particular policy. The standard commission will default. If a negotiated commission percentage has been agreed upon then answer 'Yes' to the 'Any change to standard commission?' field. An additional field will display to input the negotiated commission.

*Any change to the standard commission %?*

Initial Display
It initially displays with a value of 'None'.

Prompt Type / Length
Radio Button

Protection
No

Available Inputs
None/Policy/State
Only one choice is allowed.

Changes Allowed

Yes

Required / Optional

Required

Functional Notes

If the operator chooses 'Policy', an additional entry box displays to input the negotiated commission percentage.

If the operator chooses 'State', the State Negotiated Commission grid displays for the input of any negotiated commission percentages at the state level.

Prompt Text Help

ANY CHANGE TO THE STANDARD COMMISSION %? – This field is used when it is necessary to apply a commission other than what was derived.

Your valid options are:
Policy – To apply a negotiated commission to the entire policy.
State – To apply a negotiated commission on a state-by-state basis.

The standard derived commission displays in the 'Commission %' field, if it is the same for every state on the policy. If the derived commission varies by state, every state's commission can be viewed by choosing 'State' in this field.

*Negotiated Commission %:*

Initial Display

This field displays if the answer to 'Any change to the standard commission %?' was 'Policy'. The initial display of the field is blank.

Prompt Type / Length

Entry box/5 bytes

Protection

No

Available Inputs 00.00 to 25.00 - The value will be input on the net in the form of a percentage (25.00 %). The value needs to be converted to a decimal for RAPID I (.25). Accept up to 5 bytes of input data and convert if necessary (ex. 15).

Changes Allowed

Yes

Required / Optional

Optional. If the field is left blank, the answer to 'Any changes to the standard commission?' field defaults back to 'None'.

Functional Notes

If the operator changes the field "Any change to the standard commission?" to 'None' or 'State':

If data exists in this field, refer to the edit message section of this document. If no data exists, this field becomes hidden again.

Prompt Text Help

NEGOTIATED COMMISSION %– Input the percentage of commission that was negotiated for the entire policy. The percentage input (15.00) will be converted to a decimal format (.15) when transferred to the host system for rating.

If the commission was negotiated on a state-by-state basis, 'State' must be answered in the field above, and the percentages entered on the State Negotiated Commission grid.

*State*

Initial Display

This field is part of the State Negotiated Commission grid. The column heading should read 'Apply to:' A separate field displays for every state on the State/Class Code screen. Every state is a separate row on the grid.

Prompt Type / Length

Display field / 2 bytes in length

Protection

Yes

Available Inputs

None

Changes Allowed

No. Any changes to the states on the policy should be made on the State/Class Code screen.

Required / Optional

Required

Functional Notes

Prompt Text Help

*Standard Commission %*

Initial Display
This field is part of the State Negotiated Commission grid. A separate field displays for every state on the State/Class Code screen. Every state is a separate row on the grid. Upon initial display, the derived commission for each state displays in each state row.

Prompt Type / Length
Display field / 5 bytes in length

Protection
Yes

Available Inputs
None

Changes Allowed
No. Any changes to the commission would be made in the Negotiated Commission % fields on the grid.

Required / Optional
Required

Functional Notes

Prompt Text Help

*[State] Negotiated Commission %:*

Initial Display
This field is part of the State Negotiated Commission grid. A separate field displays for every state on the policy. Every state is a separate row on the grid.

Prompt Type / Length
Entry box / 5 bytes

Protection
No

Available Inputs 00.00 to 25.00 - The value will be input on the net in the form of a percentage (25.00 %). The value needs to be converted to a decimal for RAPID I (.25). Allow up to 5 bytes and convert if necessary (ex. 15)

Input into a minumum of one is required.

Changes Allowed

Yes

Required / Optional

Optional.

Functional Notes

If the operator changes the field "Any change to the standard commission?" to 'None' or 'Policy':

If data exists in this field, refer to the edit message section of this document.
If no data exists, this field becomes hidden again.

Prompt Text Help

STATE NEGOTIATED COMMISSION %– Input the percentage of commission that was negotiated on a state-by-state basis. The percentage(s) input (15.00) will be converted to a decimal format (.15) when transferred to the host system for rating.

(this field has been removed. It was deemed to be unnecessary. The Reinsurance Ind will be prefilled with an N.)

<u>Will this policy be reinsured?</u>

Initial Display

This field does NOT display for agents. Extra space should not be apparent in the agent's view.
For field and home office, tt is initially defaulted to 'No'.

Prompt Type / Length

Radio button

Protection

No

Available Inputs

Yes / No

Changes Allowed
Yes

Required / Optional
Required

Functional Notes
Answers to this question and the next question, "Is this policy part of a book roll-over?" will populate the Reinsurance Indicator field in RAPID I. It will be done in the following way:

| Reinsurance | Book roll-over | RAPID I Reinsurance Ind |
|---|---|---|
| Y | Y | Y |
| Y | N | Y |
| N | Y | B |
| N | N | N |

Prompt Text Help
WILL THIS POLICY BE REINSURED? – Answer 'Yes' to this question if this policy is part of a facultative reinsurance program.

(This field has been moved to the Final Issue Screen)

Is this policy part of a book roll-over?

Initial Display
This field is initially defaulted to 'No'.

Prompt Type / Length
Radio button

Protection
No

Available Inputs
Yes / No

Changes Allowed
Yes

Required / Optional
Required

Functional Notes

Answers to this question and the previous question, "Will this policy be reinsured?" will populate the Reinsurance Indicator field in RAPID I. It will be done in the following way:

| Reinsurance | Book roll-over | RAPID I Reinsurance Ind |
|---|---|---|
| Y | Y | Y |
| Y | N | Y |
| N | Y | B |
| N | N | N |

Prompt Text Help

IS THIS POLICY PART OF A BOOK ROLL-OVER? – Answer 'Yes' to this question if this policy is part of a book roll-over.

*Is there an Inspection or Accounting Contact?*

Initial Display

This field initially displays with a value of 'No'.

Prompt Type / Length

Radio button

Protection

No

Available Inputs

Yes / No

Changes Allowed

Yes

Required / Optional

Required

Functional Notes

Answering 'Yes' to this field will display additional fields to input the names and telephone numbers of the Inspection and/or Accounting contacts.

Prompt Text Help

INSPECTION OR ACCOUNTING CONTACT - Answering 'Yes' to this field will display additional fields to input the names and telephone numbers of the Inspection and/or Accounting contacts.

*Inspection Contact Name:*

Initial Display

This field initially displays blank. It appears only when the operator answered 'Yes' to the question 'Is there an Inspection or Accounting Contact?'.

Prompt Type / Length

Entry Box / 30 bytes

Protection

No

Available Inputs

Freeform alpha-numeric field

Changes Allowed

Yes

Required / Optional

Optional

Functional Notes

If no data is entered in any of the contact or phone number fields, then the fields become hidden again and the field 'Is there an Inspection or Accounting Contact?' is changed to 'No'.

If the operator changes the field "Is there an inspection or accounting contact?" to 'No':

If data exists in this field, data is deleted and the field becomes hidden again.
If no data exists, this field becomes hidden again.

Prompt Text Help

INSPECTION CONTACT – Enter the name of the individual to contact in the Insured's organization regarding an inspection of the premises. This information appears on the Overprint Page of the policy.

*[Inspection Contact] Phone #:*

Initial Display

This field initially displays blank. It appears only when the operator answered 'Yes' to the question 'Is there an Inspection or Accounting Contact?'.

Prompt Type / Length

3 Entry Boxes for telephone number - 3, 3, and 4 bytes respectively
1 entry box for Extension – 4 bytes Protection
No Available Inputs
Freeform numeric field Changes Allowed
Yes Required / Optional
Optional Functional Notes
If no data is entered in any of the contact or phone number fields, then the fields become hidden again and the field 'Is there an Inspection or Accounting Contact?' is changed to 'No'.

If the operator changes the field "Is there an inspection or accounting contact?" to 'No':
If data exists in this field, data is deleted and the field becomes hidden again.
If no data exists, this field becomes hidden again.

Prompt Text Help
PHONE # – Enter the phone number of the individual to contact in the Insured's organization regarding an inspection of the premises. This information appears on the Overprint Page of the policy.

*Accounting Contact Name:*

Initial Display
This field initially displays blank. It appears only when the operator answered 'Yes' to the question 'Is there an Inspection or Accounting Contact?'.

Prompt Type / Length
Entry Box / 30 bytes

Protection
No

Available Inputs
Freeform alpha-numeric field

Changes Allowed
Yes

Required / Optional
Optional

Functional Notes
If no data is entered in any of the contact name and phone number fields, then the fields become hidden again and the field 'Is there an Inspection or Accounting Contact?' is changed to 'No'.

If the operator changes the field "Is there an Inspection or Accounting Contact?" to 'No':
If data exists in this field, data is deleted and the field becomes hidden again.

Prompt Text Help
ACCOUNTING CONTACT – Enter the name of the individual to contact in the Insured's organization regarding audit information. This information appears on the Overprint Page of the policy.

*[Accounting Contact] Phone #:*

Initial Display
This field initially displays blank. It appears only when the operator answered 'Yes' to the question 'Is there an Inspection or Accounting Contact?'.

Prompt Type / Length
3 Entry Boxes for telephone number - 3, 3, and 4 bytes respectively
1 entry box for Extension – 4 bytes Protection
No Available Inputs
Freeform numeric field Changes Allowed
Yes Required / Optional
Optional Functional Notes If no data is entered in any of the contact name and phone number fields, then the fields become hidden again and the field 'Is there an Inspection or Accounting Contact?' is changed to 'No'.

If the operator changes the field "Is there an Inspection or Accounting Contact?" to 'No':
If data exists in this field, data is deleted and the field becomes hidden again.

Prompt Text Help

PHONE # – Enter the phone number of the individual to contact in the Insured's organization regarding audit information. This information appears on the Overprint Page of the policy.

*( This field has been moved to the Final Issue Screen.)*
*Insuring Company:*

Initial Display

The three character insuring company code (i.e. TCT) of the predominant state will be derived during the rating according to existing logic and displayed for informational purposes as part of the facet. The full name of the company should be displayed as well.

Prompt Type / Length

Display Box

Protection

Yes

Available Inputs

N/A

Changes Allowed

No

Required / Optional

N/A

Functional Notes

MODAL WINDOWS

There are no modal windows from this screen.

PAGE BUTTONS

Continue (Alt -C)

The Continue button displays and is active at all times. Clicking Continue:

- saves the data
- brings the policy through rating, only if a negotiated commission was input
- derives the SIC code,
- moves the operator to the Forms screen

SCREEN TABBING ORDER

Initial Cursor Position

The screen should appear with the cursor focused on 'Yes' radio button of the field "Should this policy be automatically renewed?"

Default Button on ENTER

Continue is the default button.

Tab Sequence Throughout Screen

1. 'None' radio button – Any change to the standard commission?
2. 'Policy' radio button – Any change to the standard commission?
3. 'State' radio button – Any change to the standard commission?
4. Negotiated Commission % (policy level)
5. [State Negotiated] Commission % – Row 1 of State Negotiated Commission grid
6. [State Negotiated] Commission % – Subsequent rows of State Negotiated Commission grid
7. Inspection Contact Name
8. Entry box 1 - Inspection Contact Phone #
9. Entry box 2 - Inspection Contact Phone #
10. Entry box 3 - Inspection Contact Phone #
11. Inspection Contact Extension #
12. Accounting Contact Name
13. Entry box 1 - Accounting Contact Phone #
14. Entry box 2 - Accounting Contact Phone #
15. Entry box 3 - Accounting Contact Phone #
16. Accounting Contact Extension #
17. Continue

ERROR MESSAGING

Negotiated commission data exists. Delete this data before making a change to the 'Any change to the standard commission?' field.

This edit appears when either policy or state negotiated commission exists, and the operator is attemping to change the prompt "Any change to the standard commission?"

Input a valid value for commission.
This edit appears when the operator enters a value in any of the negotiated commission fields that is not within the specified range of valid values.

A-Rate Submission for NY

Web-based GUI system – Umbrella Issuance

PAGE PROMPTS / FIELDS

*Does the rate or total premium differ from that of the expiring policy by more than +/=30%?:*

Initial Display
Two options are presented here. Whatever is easier to do will be OK.

Option 1: This question displays with the No answer protected for all new business transactions (Note that the discussion below assumes the question is shown based on a protected No answer).

Option 2: Hide the question the derive the answer

Prompt Type / Length
Radio Buttons

Protection
The 'No' answer should be protected for all new business transactions Available Inputs
Yes or No Changes Allowed
Not on new business transactions Required / Optional
Required Functional Notes
This question appears under the heading 'Filing Information'

Prompt Text Help
No help available at this time

*Business Description:*

Initial Display

The prompt displays possibly with a business description derived through existing CUP logic. If CUP is not returning a description, then pull the description associated with the program code stored at the submission level. The defaulted description is overideable by the operator.

Prompt Type / Length
Entry Box. 15 alphanumeric.

Protection
No

Available Inputs
Up to 15 alphanumeric characters

Changes Allowed
Yes

Required / Optional
Required

Functional Notes

Prompt Text Help
Describe the insured's principal business or activity. The defaulted description is being pulled from either an underlying Master Pac (if applicable) or is based on the program code selected on the Common Screen. If can be overridden if needed.

*Was all or a portion of the total premium determined by application of a minimum premium?:*

Initial Display
This question displays with no answer initially defaulted.

Prompt Type / Length
Radio Buttons

Protection
Not protected

Available Inputs
Yes or No

Changes Allowed

Yes

Required / Optional
Required

Functional Notes
A Yes answer to this question triggers the supplemental question that reads: "If the minimum premium only represents…".

Prompt Text Help
Answer Yes if all or a portion of the total Umbrella premium was determined by application of a minimum premium.

*If the minimum premium only represents a portion of the total premium, indicate the nature and amount of the minimum premium:*

Initial Display
This question is supplemental to a Yes answer to the question: "Was all or a portion of the total premium determined by application of a minimum premium". There is no defaulted answer to this question.

Prompt Type / Length
Entry Box. 25 alphanumeric.

Protection
No

Available Inputs
Up to 25 alphanumeric characters.

Changes Allowed
Yes

Required / Optional
Required if primary question is answered Yes.

Functional Notes

Prompt Text Help
???

*Describe the type and cost of any reinsurance affecting the rating of the risk:*

Initial Display

This question displays defaulted with a defaulted answer (N/A/) having been derived through existing CUP logic.

Prompt Type / Length
Entry Box. 2 lines. 60 alphanumeric.

Protection
No

Available Inputs
Up to two lines of 60 alphanumeric characters.

Changes Allowed
Yes

Required / Optional
One alphanumeric character is required.

Functional Notes

Prompt Text Help
Describe the type and cost of any reinsurance affecting the rating of the risk.

*Describe and explain each significant element of judgement employed in determining the "a" rate applicable to this risk::*

Initial Display
This question displays with a defaulted answer (defined below) depending on whether or not the policy is matrix or non-matrix rated.

Prompt Type / Length
Entry Box. 60 alphanumeric.

Protection
No

Available Inputs
Up to 60 alphanumeric characters. Default as follows:

Matrix rated: "Priced in Accordance with Matrix Program"
Non-Matrix: "See attached worksheet"

Changes Allowed
Yes

Required / Optional
Required

Functional Notes
If the policy is re-rated and switched from matrix to non-matrix, do not delete a previously saved answer.

Prompt Text Help
????

*Line::*

Initial Display
The grid is exactly 5 rows. There are two rows for GL and AL and one row for EL. Note that EL policy information will not be returned through any existing CUP logic when the CUP predominant state is NY, though there may be a WC policy on the WIP. The line codes are protected and cannot be changed by the operator.

Prompt Type / Length
Grid cell. 2 characters.

Protection
Yes

Available Inputs
N/A

Changes Allowed
No

Required / Optional
At least one row in the grid is required before the operator can move to the next screen.

Functional Notes

Prompt Text Help
No help

*Carrier::*

Initial Display
The cells within this column may initially be displayed with defaults (company codes) derived through existing CUP logic.

Prompt Type / Length
Grid cell. 20 alphanumeric characters.

Protection
No

Available Inputs
Up to 20 alphanumeric characters.

Changes Allowed
Yes

Required / Optional
Required if any cell within the same row contains data

Functional Notes

Prompt Text Help
Enter the carrier name and/or insuring company to which this coverage part applies.

*Limits(000):*

Initial Display
The cells within this column may initially be displayed with defaulted information derived through existing CUP logic.

Prompt Type / Length
Grid cell. 20 alphanumeric characters.

Protection
No

Available Inputs
Up to 20 alphanumeric characters.

Changes Allowed
Yes

Required / Optional
Required if any cell within the same row contains data

Functional Notes

Prompt Text Help
Enter the limit(s) of the underlying policy

*Effective:*

Initial Display
The cells within this column may initially be displayed with defaulted information derived through existing CUP logic.

Prompt Type / Length
Grid cell. 8 alphanumeric characters.

Protection
No

Available Inputs
Any valid date

Changes Allowed
Yes

Required / Optional
Required if any cell within the same row contains data

Functional Notes

Prompt Text Help
Enter the effective date of the underlying policy

*Expiration:*

Initial Display
The cells within this column may initially be displayed with defaulted information derived through existing CUP logic.

Prompt Type / Length
Grid cell. 8 alphanumeric characters.

Protection
No

Available Inputs
Any valid date. Expiration date should be greater than effective date. Any other validation logic that seems necessary that can easily be used here is OK.

Changes Allowed
Yes

Required / Optional
Required if any cell within the same row contains data

Functional Notes

Prompt Text Help
Enter the expiration date of the underlying policy

*Premium:*

Initial Display
The cells within this column may initially be displayed with defaulted information derived through existing CUP logic.

Prompt Type / Length
Grid cell. 7 numeric characters.

Protection
No

Available Inputs
Up to 7 numeric characters. Dollar signs and commas are OK.

Changes Allowed
Yes

Required / Optional
Required if any cell within the same row contains data

Functional Notes

Prompt Text Help
Enter the premium of the underlying policy

PAGE BUTTONS

Continue: ( alt-c)
Performs any necessary validations, saves the data and moves the operator to the Direct Bill screen.

SCREEN TABBING ORDER

Initial Cursor Position
The Continue button

Default Button on ENTER
The Continue button

Tab Sequence Throughout Screen
Continue button
Business Description
"If minimum premium only represents…" (if applicable)
"Describe the type and cost…"
"Describe and explain…"
To the grid, starting on the first row under Carrier, moving left to right, and row to row
Back to the Continue button

ERROR MESSAGING

- Error if operator tries to leave the screen and at least one row in the grid is not fully complete.

Message should read: "At least one underlying policy must be entered in the grid"

- Error for partially complete rows
- Standard mandatory question edits and answer validation
- Errors resulting from entering alphas in a numeric field and vice versa

Web-based GUI System – Automobile Quote

Class Code Help Screen

PAGE PROMPTS / FIELDS

*Vehicle Group::*

Initial Display

The screen will initially display with the five Vehicle Groups. Each one will have a Radio button in front of it which will be blank. Nothing will be defaulted.

Prompt Type / Length

Prompt type will be Radio Buttons as shown below..

VEHICLE GROUP:

O Commercial O Private Passenger O

Livery / Public

Protection

Unprotected

Available Inputs

One selection can be made from the five groups shown. Available inputs will be "YES" if button is clicked or "NO" if left blank.

Changes Allowed

Yes changes are allowed.

Required / Optional

One type is required to be checked for the class code help to work.

Functional Notes

Prompt Text Help

*COMMERCIAL GROUP*
*VEHICLE SIZE (GVW):*

Initial Display

After selecting Commercial as the Group type. The first question to be displayed is the Vehicle Size: Nine choices will be made available, the radio button for each will initially display blank.

Prompt Type / Length

Radio button as shown below:

VEHICLE SIZE (GVW):
O Light (under 10,000) O Medium (10,001 - 20,000) O Heavy (20001 - 45000)
O Extra Heavy (over 45000) O Truck-Tractor (0-45000) O Truck- Protection Unprotected.

Available Inputs

'YES' if radio button is clicked on or 'NO' if left blank.

Changes Allowed

'YES' if radio button is clicked on or 'NO' if left blank.

Required / Optional

Yes

Functional Notes

Prompt Text Help

*COMMERCIAL GROUP*
*BUSINESS USE:*

Initial Display

After selecting Commercial as the Group type. The second question to be displayed is the Business Use: Three choices will be made available, the radio button for each will initially display blank.

Prompt Type / Length

Radio Button for each as shown below:

BUSINESS USE:
O Service O Retail O Commercial

Protection

Unprotected

Available Inputs

"Yes" if the radio button is clicked or 'NO' if left blank.

Changes Allowed
Yes

Required / Optional
Required if Commercial class code is to be derived.

Functional Notes

Prompt Text Help

*COMMERCIAL GROUP*
*RADIUS OF OPERATION:*

Initial Display
After selecting Commercial as the Group type. The third question to be displayed is the Radius Of Operation: Three choices will be made available, the radio button for each will initially display blank.

Prompt Type / Length
Radio Buttons as shown below;

| | **RADIUS OF OPERATION :** | |
|---|---|---|
| O Local 0-50 | O 51-200 miles | O Over 200 |

Protection
Unprotected.

Available Inputs
If radio button is clicked the answer will be YES, if blank the answer will be NO.

Changes Allowed
Yes.

Required / Optional
Required if class code is to be derived.

Functional Notes

Prompt Text Help

*8COMMERCIAL GROUP*
*SECONDARY CLASS CODE:*

Initial Display

After selecting Commercial as the Group type. The fourth question to be displayed is the Secondary Class Code: Eight choices will be made available, the radio button for each will initially display blank.

Prompt Type / Length

Radio button as shown below:

SECONDARY CLASS CODE :

O Trucker O Food Delivery O
Specialized Delivery
O Waste Disposal O Farmer O Dump Protection Unprotected Available Inputs YES if button is clicked, NO if left blank.

Changes Allowed

Yes.

Required / Optional

Required for class code to be derived.

Functional Notes

Prompt Text Help

*COMMERCIAL GROUP*
*SECONDARY CODE - Continued*

Initial Display

After selecting Commercial as the Group type. The fifth question to be displayed is the Secondary - Continued: Number and choices will vary depending on the Secondary Class Code that was chosen, the radio button for each will initially display blank.

Prompt Type / Length

Radio button as shown below.

Secondary - continued:

O Logging & Lumber O Not Otherwise Classified

Protection

Unprotected.

Available Inputs

YES if radio button is clicked and NO if left blank.

Changes Allowed

Yes.

Required / Optional

Required if class code is to be derived.

Functional Notes

After the Secondary – continued (or fifth digit) is selected, a message will come up on the screen telling the operator the generated class code. The operator can either Save & Return to the vehicle schedule screen or change one or more of the answers to the questions to get a different class code generated.

Prompt Text Help

*PRIVATE PASSENGER GROUP*
*VEHICLE IS USED:*

Initial Display

After selecting Private Passenger as the Group type. The first question to be displayed is the Vehicle Is Used: Two choices will be made available, the radio button for each will initially display blank.

Prompt Type / Length

Radio button as shown below:

VEHICLE IS USED:
O In Business O Not in Business

Protection

Unprotected.

Available Inputs

YES if button is clicked on, NO if left blank.

Changes Allowed

Yes.

Required / Optional

Answer is required if class code is to be derived.

Functional Notes

If 'IN BUSINESS' is selected, no other questions need to be asked for class code to be generated. Message should come up on the Help screen with the generated class code.

If 'NOT IN BUSINESS' is selected, two additional questions will need to be asked.

Prompt Text Help

*PRIVATE PASSENGER GROUP*
*VEHICLE IS DRIVEN:*

Initial Display

After selecting Private Passenger as the Group type. The second question to be displayed is the Vehicle Is Driven: Three choices will be made available, the radio button for each will initially display blank.

Prompt Type / Length

Radio button as shown below:

| **For Non-Business; VEHICLE IS DRIVEN:** | | |
|---|---|---|
| O To or from work or Not driven to work | O To or from work or | O |

Protection

Unprotected.

Available Inputs

YES if button is clicked on, NO if left blank.

Changes Allowed

Yes.

Required / Optional

Answer is required if class code is to be derived.

Functional Notes

For NON BUSINESS

Prompt Text Help

*PRIVATE PASSENGER GROUP*
*OPERATOR'S EXPERIENCE:*

Initial Display

After selecting <u>Private Passenger</u> as the Group type. The third question to be displayed is the Operator's Experience: Three choices will be made available, the radio button for each will initially display blank.

Prompt Type / Length

Radio button as shown below:

For Non-Business; OPERATOR'S EXPERIENCE:

O None licensed > 5 years O Not owner or principal O Owner or principal operator Protection Unprotected.

Available Inputs

YES if button is clicked on, NO if left blank.

Changes Allowed

Yes.

Required / Optional

Answer is required if class code is to be derived.

Functional Notes

For NON BUSINESS, After this question is answered a message will appear on the screen telling the operator what the generated class code is. The operator can either save that class and return to the vehicle schedule or change the answer(s) to the questions.

Prompt Text Help

*LIVERY / PUBLIC GROUP:*

Initial Display

After selecting <u>Livery / Public</u> as the Group type. The first question to be displayed is the Vehicle Type. Sixteen choices will be made available, the radio button for each will initially display blank.

The second question to display after the operator has selected the Vehicle Type will be Radius Of Operation. Three choices are available for this question and each will display a blank radio button.

If the operator selects a Vehicle Type of Bus or Van Pool, a third question will be asked. It will be for Seating Capacity. There are four choices for this questions, each will display a blank radio button.

Prompt Type / Length

Radio button as shown below:

Question #1

| | VEHICLE TYPE: | |
|---|---|---|
| O Taxicab | O Church Bus | O School bus owned by Political Subdivision or School District. |
| O Limousine | O Urban Bus | O Other School Bus |
| O Airport Bus or Limo | O Inter-City Bus | O Charter Bus |
| O Van Pool – employee operated | O Sightseeing Bus | O Trans. Athletes or Entertainers |
| O Van Pool - other | O Bus NOC | O Social Service – Employee Operated<br>O Social Service – other |

Question #2

| | **RADIUS OF OPERATION :** | |
|---|---|---|
| O Local 0-50 | O 51-200 miles | O Over |

Question #3

| | SEATING CAPACITY: | |
|---|---|---|
| O 1 to 8 | O 9 to 20 | O 21 to 30 |
| OOver 60 | | |

Protection

Unprotected.

Available Inputs

YES if button is clicked on, NO if left blank.

Changes Allowed

Yes.

Required / Optional

Answers are required if class code is to be derived.

Functional Notes

If Taxicab or Limousine if chosen, the only question to be asked is Radius operation, then the class code can be derived.

For all Buses, both Radius and Seating capacity are needed to derive the class code.

For Van Pools the only question that will need to be asked before the class code can be derived is Seating Capacity. Radius in not needed.

After all questions are answered a message will appear on the screen telling the operator what the generated class code is. The operator can either save that class and return to the vehicle schedule or change the answer(s) to the questions.

Prompt Text Help

*MUNICIPAL GROUP:*

Initial Display

After selecting Municipal as the Group type. One question will be displayed asking the Vehicle Type: Ten or eleven choices will be made available depending on the state, the radio button for each will initially display blank.

No other questions will need to be asked to derive the class code.

Prompt Type / Length

Radio button as shown below:

| VEHICLE TYPE: | | |
|---|---|---|
| Fire Department | Ambulance | Funeral |
| O PPT | O Ambulance | O Limousine |
| O All other | O Invalid Car | O Hearse |
| | O Used by employees | O Flower Car |
| Law Enforcement | | |
| O PPT | | |
| O All other | | |

Protection

Unprotected.

Available Inputs

YES if button is clicked on, NO if left blank.

Changes Allowed
Yes.

Required / Optional
Answer is required if class code is to be derived.

Functional Notes
After the Vehicle Type is selected a message will appear on the screen telling the operator what the generated class code is. The operator can either save that class and return to the vehicle schedule or change the Vehicle Type.

Prompt Text Help

*MISCELLANEOUS GROUP:*

Initial Display
After selecting Miscellaneous as the Group type. One question will be displayed asking the Vehicle Type: Three choices will be made available, the radio button for each will initially display blank.

Prompt Type / Length
Radio button as shown below:

| VEHICLE TYPE: | | |
|---|---|---|
| O Bobtail Operations | O Antique Autos | O Driver Training |
| O Motor Home > 22 ft | O Motor Home < 22 ft. | O Comml Driving School |
| O MobileHome -camper | O Mobile Home -trailer | O Motorcycle |
| O Special/Mobile Equip. | O Farm equipment | O Lawnmower |
| O Snowmobile | O Farm Tractor | O Plates |
| O Leasing/Renting | O Autobody Mfg | |

Protection
Unprotected.

Available Inputs
YES if button is clicked on, NO if left blank.

Changes Allowed
Yes.

Required / Optional
Answer is required if class code is to be derived.

Functional Notes

After this question is answered a message will appear on the screen telling the operator what the generated class code is. The operator can either save that class and return to the vehicle schedule or select another Vehicle Type.

Prompt Text Help

MODAL WINDOWS

Window Name / Purpose

Prompts / Displays

Buttons:

PAGE BUTTONS

SAVE & RETURN: (ALT + S)
After the message that was generated to show the operator what the derived class code is, by clicking on this button that class code will be saved and brought back into the Vehicle Schedule grid.

CANCEL: (ALT + C)
The Cancel button will not save any information and just bring the operator back to the Vehicle schedule grid – class code field, where they will need to input the class code or take some other action.

SCREEN TABBING ORDER

Initial Cursor Position
On first entry to this screen the cursor should start focus in the Vehicle Group – on the first selection.

Default Button on ENTER
The default button should be the Cancel button.

Tab Sequence Throughout Screen

Umbrella Underlying Schedule

PAGE PROMPTS / FIELDS

*Policy Number:*

Initial Display
The cells are initially prefilled with information returned from Issue Express Prompt Type / Length
Entry box, as part of the grid. 23 characters.

Protection
Field is protected for Issue Express policies but is not if the row was operator added Available Inputs
Available inputs are only allowed into operator added rows and can be any alpha numeric combination. Entry can be made directly into the cell in this situation. Issue Express policy numbers should be grayed out and protected. They are displayed informationally.

Changes Allowed
Only to operator added rows

Required / Optional
Required

Functional Notes

Prompt Text Help
Enter the policy number that this Umbrella policy will be excess over.

*Coverage:*

Initial Display
The cells are initially prefilled with information returned from Issue Express.

Prompt Type / Length
Single drop for operator added rows, Issue Express policies do not have drop down options Protection This field is protected for Issue Express policies. The answer is displayed for informational purposes only. The operator added rows are not protected. The operator selects from a drop down list of available answers which are detailed below.

Available Inputs
For Issue Express policies the answer is displayed for Information purposes only. The operator added policies allow for the following answer choices within the drop down, however, both Auto Liability and Employer's Liability should be filtered based on their exclusion, if it exists.

General Liability
Auto Liability
Employer's Liability

Changes Allowed
Only on operator added policies.

Required / Optional
Required

Functional Notes

Prompt Text Help
Select the type of policy from the drop down that the Umbrella policy will be excess over.

*Standard Limits:*

Initial Display
The cells are initially prefilled with information returned from Issue Express. Translation issues will need to be discussed.

Prompt Type / Length
Single Drop for operator added rows

Protection
Operator added rows are not protected. The answer, for Issue Express policies, is displayed for information purposes only. Abbreviations may be necessary but they should be discussed with myself first.

Available Inputs
For Issue Express policies the answer is displayed for Information purposes only. Again, translation issues will need to be discussed. The operator added policies allow for the following answer choices within the single drop. Note that answer values vary based on the answer given for 'Coverage' within the same row.

<u>If the answer to Coverage is 'General Liability'</u>, then the list should contain the following:
$500,000/$1,000,000/$1,000,000
$500,000/$1,000,000/ PRODUCT-OPS EXCLUDED
$1,000,000/$2,000,000/$2,000,000
$1,000,000/$2,000,000/ PRODUCT-OPS EXCLUDED <u>If the answer to Coverage is 'Auto Liability'</u>, then the list should contain the following:
$500,000 CSL
$1,000,000 CSL
$500,000/$500,000/$500,000
$500,000/$1,000,000/$500,000
$1,000,000/$1,000,000/$500,000
$1,000,000/$1,000,000/$1,000,000

<u>If the answer to Coverage is 'Employer's Liability'</u>, then the list should contain the following:
$100,000/$500,000/$100,000
$500,000/$500,000/$500,000
$1,000,000/$1,000,000/$1,000,000
$2,000,000/$2,000,000/$2,000,000

Changes Allowed
Yes, but only on operator added policies.

Required / Optional
An answer is required for operator added policies for either 'Standard Limits' or 'Non-Standard Limits'. However, an answer for each cannot exist, so in this sense, they are considered mutually exclusive of one another.

Functional Notes
Standard Limits and Non-Standard Limits are mutually exclusive of each other. If possible, we should include "blanks" in the list, so that the operator may de-select an answer if they decide to use Non-Standard Limits. If the operator tries to open up the ellipse from the Non-Standard cell, and there is an answer other than blanks in the Standard Limits cell, then the following message should be produced:

You cannot have both Standard Limits and Non-Standard Limits for the same policy. You must delete one or the other.

Same message should be given in the reverse situation as well. If it is easier to do a cross validation on the CONTINUE, then that would be acceptable.

Prompt Text Help

Select the appropriate limit from the drop drown in regards to the policy being entered on this row. If the actual policy limit does not appear within the drop down list of choices, then you can key in another limit using the "Non-Standard Limit" ellipse button.

*Non-Standard Limits:*

Initial Display
The cells are initially (and always) grayed for Issue Express policies. Operator added policies may show a portion of free-form wording typed within the modal, if this is a re-visit to the screen.

Prompt Type / Length
Grayed cell that contains an ellipse button that opens a modal window on operator added rows. Modal Window details are explained later in this documentation.

Protection
The cell itself cannot be typed into, for either Issue Express policies, or operator added policies. Operator added policy limits can be changed, but they must be changed by opening up the modal.

Available Inputs
There are no direct inputs into the cell itself.

Changes Allowed
Yes, but only on operator added policies and only through the modal.

Required / Optional
An answer is required for operator added policies for either 'Standard Limits' or 'Non-Standard Limits'. However, an answer for each cannot exist, so in this sense, they are considered mutually exclusive of one another.

Functional Notes
Standard Limits and Non-Standard Limits are mutually exclusive of each other. If possible, we should include "blanks" in the list, so that the operator may de-select an answer if they decide to use Non-Standard Limits. If the operator tries to open up the ellipse from the Non-Standard cell, and there is an answer other than blanks in the Standard Limits cell, then the following message should be produced:

You cannot have both Standard Limits and Non-Standard Limits for the same policy. You must delete one or the other.

Same message should be given in the reverse situation as well. If it is easier to do a cross validation on the CONTINUE, then that would be acceptable.

Prompt Text Help

*Company:*

Initial Display
The cells are initially prefilled with information returned from Issue Express.

Prompt Type / Length
Entry box. 8 characters allowed on operator added policies.

Protection
The field is protected for Issue Express policies and contains the 3 character standard TIC abbreviations. The field is not protected, however, for operator added policies. The answer will be typed by the operator and can be changed.

Available Inputs
Free form text on operator added policies. Issue Express will return the appropriate company abbreviations on Issue Express policies.

Changes Allowed
Yes, but only on operator added policies.

Required / Optional
Required

Functional Notes

Prompt Text Help
Key the insuring company code for this policy

*Should Added Policies be printed first on the Underlying Schedule?:*

Initial Display
Question is not initially displayed unless an answer has been saved and this is a re-visit to the screen. The question is triggered, and appears, through the 'Add Policy' action. The answer should initially be defaulted to No.

Prompt Type / Length
Radio button question

Protection
Not protected

Available Inputs

Yes or No

Changes Allowed
Yes

Required / Optional
Required

Functional Notes

Prompt Text Help
If added policies should be printed first on the underlying schedule before the derived policies, answer Yes to this question.

*Is Employer's Liability written with an acceptable carrier?*

Initial Display
Question is not initially displayed unless an answer has been saved and this is a re-visit to the screen. The question is triggered, and appears, through the 'Add Policy' action and the addition an Employer's Liability policy to the schedule. Regardless of the number of operator added Employer's Liability policies, this question should only be asked once. If all Employer's Liability policies are deleted from the schedule, the question, and its answer, should be deleted. The forms derivation required indicator will also need to be re-set in this instance. The facet should also hide the question from the operator under this situation. There is no defaulted answer for this question upon its initial display.

Prompt Type / Length
Radio button question

Protection
Not protected

Available Inputs
Yes or No

Changes Allowed
Yes

Required / Optional
Required

Functional Notes
Answering Yes to this question will derive a retained limit endorsement, UM 011, as part of the forms derivation process.

Prompt Text Help

*Is Auto written with an acceptable carrier?*

Initial Display
Question is not initially displayed unless an answer has been saved and this is a re-visit to the screen. The question is triggered, and appears, through the 'Add Policy' action and the addition an Automobile policy to the schedule. Regardless of the number of operator added Automobile policies, this question should only be asked once. If all Automobile policies are deleted from the schedule, the question, and its answer, should be deleted. The forms derivation required indicator will also need to be re-set in this instance. The facet should also hide the question from the operator under this situation. There is no defaulted answer for this question upon its initial display.

Prompt Type / Length
Radio button question

Protection
Not protected

Available Inputs
Yes or No

Changes Allowed
Yes

Required / Optional
Required

Functional Notes
Answering Yes to this question will derive a retained limit endorsement, UM 012, as part of the forms derivation process.

Prompt Text Help

MODAL WINDOWS

Non-Standard Limits
To allow free form text to be keyed in by the operator. The window should be sized to be 5 rows of 25 characters for each row. More rows can be added for aesthetics if needed, but the rows should be limited to 25 characters for each row.

Buttons:

OK – The OK button accepts the data keyed into the modal and returns the operator the Underlying Schedule with a portion of the text keyed into the modal, returned to the cell.

Cancel – The Cancel button simply closes the window without making any updates to the grid.

The modal window also contains an 'X' close button in the upper right corner of the title bar. This functions the same as Cancel.

PAGE BUTTONS

ADD POLICY: (include Hotkey alt-a)

The 'Add Policy' button adds a blank row to the grid, formatted as defined within these requirements. Note that a maximum of ten policies (policies issued outside of Issue Express, Net or Host, can be added to the grid. If operator tries to add an 11th policy to the grid, the facet should return the following message:

"The maximum number of policies that can be added to the Underlying Schedule has been exceeded"

DELETE ADDED POLICY: (include Hotkey alt-d)

The 'Delete Added Policy' button deletes the selected operator added row from the grid. Allow for the delete to happen without requiring the operator to key all the necessary information required for the row. Only validate for incomplete data when the CONTINUE button is pressed. Issue Express rows cannot be deleted. Only operator added rows. If operator tries to delete an Issue Express row, then display the following message:

"If the Umbrella policy is not excess over the selected policy, then the policy must be excluded within the Umbrella quote"

CONTINUE: (include Hotkey alt-c)

The 'Continue' button should check to see that partially complete rows are completed and any other necessary cross validations are done. I.E. between 'Coverage' and 'Standard Limit' or on the mutually exclusive relationship between 'Standard Limits' and 'Non-Standard Limits'. Finally, the commit to the PIF should only occur from the CONTINUE button.

SCREEN TABBING ORDER

Initial Cursor Position

Continue button

Default Button on ENTER

CONTINUE is the default for the ENTER key

Tab Sequence Throughout Screen
CONTINUE button

POLICY NUMBER cell (only for operator added rows if they exist)
COVERAGE cell (only for operator added rows if they exist)
STANDARD LIMITS cell (only for operator added rows if they exist
NON-STANDARD LIMITS cell (only for operator added rows if they
COMPANY cell (only for operator added rows if they exist)

| |
|---|
| Movement is from left to right, row to row through |

ADD POLICY button
DELETE ADDED POLICY button
CONTINUE button (and then loop back through)

ERROR MESSAGING

1. Error message if more than ten policies are added. See 'Add Policy' button documentation above for details.

"The maximum number of policies that can be added to the Underlying Schedule has been exceeded"

2. Error message if either an Auto Liability or Employer's Liability policy was added to the schedule by the operator, and coverage had previously been excluded from quote. If possible, two distinct error messages should be created.

"You cannot exclude Auto Liability coverage and add an Auto Liability policy to the schedule. If this policy is to be excess over Auto Liability, then modify the quote to include coverage. Otherwise, delete the Auto Liability policy from the schedule."

"You cannot exclude Employer's Liability coverage and add an Employer's Liability policy to the schedule. If this policy is to be excess over Employer's Liability, then modify the quote to include coverage. Otherwise, delete the Employer's Liability policy from the schedule."

Note: This error will need to be part of issue consistency as well

FORMS

Web-based GUI system – Umbrella Issuance

PAGE PROMPTS / FIELDS

*Prompt Name: Form Number*

Initial Display
The Form Number prompt is the first column heading in the forms grid. The column is initially populated with form numbers that have been derived through existing CUP logic. A subsequent display of the screen may include form numbers added by the operator not initially included on the list.

Prompt Type / Length
Fourteen characters spaces which represents a grid cell large enough to accommodate the full form number including spaces between every two characters. This is how the data is stored and this is how it will be presented for CUP.

Protection
Yes

Available Inputs
N/A

Changes Allowed
No

Required / Optional
Required

*Prompt Name: Form Name*

Initial Display
Form Name is the second column heading in the forms grid. The column is initially populated with form names derived through existing CUP logic. A subsequent visit of the screen may include form names added by the operator not initially included on the list.

Prompt Type / Length
Grid Cell / 50 bytes

Protection

Yes

Available Inputs
N/A

Changes Allowed
No

Required / Optional
Required

*Prompt Name: Optional*

Initial Display
The Optional column is the third column heading in the forms grid. Because of existing CUP forms derivation logic, the column heading could initially include a mixture of 'Y's and 'N's*. Additionally, a subsequent display of the screen may identify forms added by the operator. Operator added forms are considered optional forms, and in this case, will always be set to 'Y'.

*Forms coded as either 'M' or 'D' on Trims table 23 will be considered mandatory and cannot be deleted by the operator. Note that forms coded as a 'D' get derived because of data keyed during quote whereas forms codes as an 'M' are derived because of conditions outside of the policy data. All other forms ('I's and 'L's) will be considered optional. 'L's are linked forms (forms that exist on the underlying policies) and 'I's are optional. It is understood that all 'I's and 'L's will be loaded into the CLSI optional forms table.

Prompt Type / Length
Grid Cell

Protection
Yes

Available Inputs
Y or N

Changes Allowed
No

Required / Optional
Required

*Prompt Name: Fill-In Required*

Initial Display
Fill-In Required is the fourth column heading in the forms grid. The column is initially sorted by the facet so that forms with Fill-In Required Indicators set to 'Y' are sorted first in the column, followed by forms that have their Fill-In Required Indicators set to 'N'. As a second sort, forms should be sorted whose Fill-In Complete Indicators are set to 'N'. Finally, after those sorts are complete, forms should be sorted alphanumerically by form number.

Prompt Type / Length
Grid Cell

Protection
Yes

Available Inputs
Y or N. All 'Y' indicators should be in RED.

Changes Allowed
No

Required / Optional
Yes

*Prompt Name: Fill-In Complete*

Initial Display
Fill-In Complete is the final heading in the grid. The column is used to identify forms whose Fill-In Required Indicators equal 'Y' have successfully been completed by the operator. The column could include a mixture of possible values of Y, N, or N/A. Where Fill-In Required = 'Y', Fill-In Complete will always equal either 'Y' or 'N'. Where Fill-In Required = 'N', the only value associated with Fill-In Complete should be N/A. For side-door forms, the Fill-In Complete is set to 'Y' when all mandatory occurrences (as defined in the side-door database) have been satisfied. The Fill-In Complete Indicator for manuscript endorsements can be set to 'Y' when at least one alphanumeric character is keyed on a line within the data collection window. To my knowledge, CUP has one fill-in form that is not considered a side-door form. This is being handled on a separate facet. Note the sorting discussed above under the Fill-In Required section.

Prompt Type / Length
Grid Cell

Protection
Yes

Available Inputs
Possible values of Y, N, or N/A

Changes Allowed
No

Required / Optional
Required

*Prompt Name: Totals*

Initial Display
The Totals row hangs off the grid, specifically under the columns of Fill-In Required and Fill-In Complete. It should identify the number of fill-ins that are required and the number of fill-ins that are complete. Both of these numbers could change, and could either increase or decrease, depending on action taken by the operator. If possible, the operator should be able to see the Fill-In Complete total change depending on their action, while still on the screen.

Prompt Type / Length
N/A

Protection
Yes

Available Inputs
Numeric answers including '0' as a valid answer

Changes Allowed
Not directly by the operator

Required / Optional
Required.

Side-Door/Fill-In Data Collection Window

Window Name / Purpose
This window is simply used for side-door data collection and is titled Fill-In Information. The window is scrollable. The cursor should initially be positioned in the first prompt for the form. The operator should be able to tab from prompt to prompt and the window should automatically scroll as necessary. The event PROD UNDRW INIT FILL-IN DATA should get information stored on the side-door database needed for side-door data collection including: Row Type, Prompt Length, Field Characteristic (if Row Type=F), Field Type, Special Values when appropriate, Total Occurrences, Form Occurrences, and Mandatory/Required Fields. Form Occurrences will be used to display 'X' number of blocks and to display the 'Additional Occurrence' button when the number of Form Occurrences does not equal the Total Occurrences. Saves should be performed with the selection of an 'Additional Occurrence'. When the operator selects the next row from the grid that requires fill-in, data should automatically be saved from the prior form. Additionally, a save should occur from CONTINUE, ADD FORM, ADDITIONAL OCCURRENCE and ADD MANUSCRIPT as well.

Prompts / Displays

Prompts and header information will be returned from the event PROD UNDRW INIT FILL-IN DATA. If Row Type = H, then prompt should be bolded and capitalized. Please refer to the chart below for prompt display types.

| Row Type | No. of Occurrences | Permitted Values (VL) | Display Type |
|---|---|---|---|
| F | =1 | Field Type = VL | SD (Single Drop) |
| F | >1 | Field Type = VL | ML (Multi Select List) |
| F | =1 | Blank | EB (Entry Box) |
| F | >1 | Blank | MB (Memo Box) |

Buttons:

Restore/Maximize Button (+ / -) – The restore/maximize button should allow the operator to work on side-door/fill-in data collection in a full-screen mode or to restore the window back to its initial display if in full-screen mode. The plus sign (+) should show when the window is minimized and the minus sign (-) should show when the window is maximized.

Additional Occurrence – The 'Additional Occurrence' button allows the operator to request additional occurrences of repeating blocks. Side-Door stores the maximum and should be utilized to disable the button when the maximum number has been reached.

Delete Selected Occurrence – When the cursor is positioned within any field that is part of a block, the 'Delete Selected Occurrence' button should be enabled. Clicking on this button should delete the block information and collapse the form so that the occurrence (including the prompts) no longer appears. The 'Delete Selected Occurrence' button should only appear when there is more than one repeating block on the screen, if at least one block is defined as mandatory. Otherwise, if all blocks are not mandatory, the button may appear all the time. Any block should be able to be deleted provided that if side-door requires at least one block to be mandatory, that there is at least one complete block of information.

Note: Operators should also be able to delete lines within a block by "blocking" text and hitting the delete button on their keyboard. Again, edits should be invoked if at least one complete block of information is mandatory for the form, and that is not found to exist.

When the button is clicked a warning message should be displayed as follows with YES and NO buttons shown:

Are you sure you want to delete this block of data?

MANUSCRIPT FORMS

Manuscript Forms are considered fill-in forms, and are not side-door forms. Data collection for a manuscript form is free form. There is one question that is asked and that is "Form Name". "Form Name" allows for a maximum of 67 fixed font characters. Additionally, at least one alpha numeric character is required in any entry box other than the "Form Name". "Form Name" itself is optional. If a "Form Name" is not keyed by the operator, then the default name "Manuscript Endorsement" should be used. If possible, on a save the title keyed by the operator (if any) should be returned and be visible from the forms grid as part of the form name. We will need to talk about how that name may be cut when it is returned to the grid. Number of rows can be limited to what Pac uses, however, a one-shot should be done to see how many pages are used today in production. 79 fixed font characters for each row. If possible, entry boxes should not scroll.

Manuscript Endorsement List
The 'Manuscript Endorsement List' should display when the operator clicks on the 'Add Manuscript' button. The window should be headed with the wording 'Manuscript Endorsement List' and hard coded wording should display directly under this window title that states: Please input the number of manuscripts needed for each line. The window will display the following prompts in the order listed below. These prompts represent line designations. To the right of each of these line designations should be entry boxes.

General Liability ▾
Interline ▾

Prompts / Displays
The line designation prompts should all be single drops. A '0' should be defaulted upon the initial display and will mean that no manuscripts are to be added for this line. Upon a re-visit of the window, '0' will mean no additional manuscripts are to be added for this line. There a total of 21 CG's and 21 IL's that the operator can select.

Manuscript Form Numbers:
The table below illustrates how the numbering should be controlled for manuscript endorsements. Today, in the native system, the operator controls the numbering and can start with any number provided subsequent endorsements are added sequentially. For the Net, we will control the numbering.

| | General Liability | Interline |
|---|---|---|

| | | |
|---|---|---|
| 1st two characters | Always 'CG' | Always 'IL' |
| 2nd two characters | Always 'T8' | Always 'T8" |
| 3rd two characters | '00' if number of 'GLT8's' equals 1, '01' if number of 'GLT8's' equals 2, etc. | '00' if number of Operator Added 'ILT8's' equals 1, '01' if number of Operator Added 'IlT8's' equals 2, etc. |
| Next two characters | Always the effective month of the policy | Always the effective month of the policy |
| Final two characters | Always the effective year of the policy | Always the effective year of the policy |

Buttons:
OK – The OK button accepts the number of manuscripts selected by line and adds that number of rows to the forms grid and returns the operator to the 'Forms Screen'. The cursor should be positioned in the 'Side-Door/Fill-In Data Collection' window for the first occurrence of a manuscript if multiples were added. (Note the maximum size of the Fill-In Data Collection window based on what Master Pac collects today: 74 columns, 3 screens of 12 rows, 1 screen of 9 rows. Total rows = 45)

Cancel – The Cancel button simply closes the window without making any updates to the quote and/or grid.

PAGE BUTTONS – FORMS SCREEN (Main)

Add Form: (alt-A)
The 'Add Form' button opens the 'Optional Forms List'. Pac has a host edit when more than 72 forms have been added to the quote and this button is selected. CUP has 70.

Delete Optional Form (alt-d):
Operators are able to select a row within the 'Forms Grid' from the 'nub' on the left hand side of the grid. If the form is optional, enable the 'Delete Optional Form' button. The operator may then click on the 'Delete Optional Form' button, and provided the 'Operator Added' Indicator equals 'Y', the row should be deleted in its entirety. A blank row should not remain in the grid, and the grid should be compressed. If possible, operators should be able to delete a form that has not yet been completed.

Add Manuscript (alt-m):
The 'Add Manuscript' button allows operators to request a given number of manuscript endorsements by line. As with 'Add Form' a host edit may occur when the maximum number of manuscript endorsements has been added to the policy. There is a maximum of 21 for each line.

CONTINUE: (alt-c)
The CONTINUE button displays and is active at all times. Note: An operator should be able to move to the next screen by selecting CONTINUE, though all fill-in forms may not be complete. The consistency check should handle checking to see where all forms with a 'Fill-In Required' indicator = Y, also have the 'Fill-In Complete' indicator also equal to 'Y'.

SCREEN TABBING ORDER – FORMS

Initial Cursor Position
On the first prompt within the side-door data collection window of a side-door form. If there are no side-door or fill-in forms for the quote, default the cursor to the CONTINUE button.

Tab Sequence Throughout Screen
Tabbing should occur within the side-door/fill-in data collection window and move the cursor from prompt to prompt within the window and the window should automatically scroll. It should not be necessary for the operator to have to scroll unless they want to review previously keyed information in that manner. When all prompts for one occurrence of a side door form have been completed, tabbing should occur as follows:

Additional Occurrence (if applicable)

Grid (to the next occurrence of a form that has the Fill-In Complete Indicator set to 'N'. Row should not be highlighted in this instance. User has to click on the row to refresh the fill-in window below*. If all forms have their Fill-In Complete Indicator set to 'Y', move directly to CONTINUE CONTINUE
*If another fill-in form is highlighted from the grid, position the cursor in the first prompt of the form and start the process all over again.

SCREEN TABBING ORDER – OPTIONAL FORMS

Initial Cursor Position
The 'Enter LOB' Button

Tab Sequence Throughout Screen
Enter LOB
Form Name (Partial)
Search
More Forms
Add Selected Form
Cancel
Number
Edition Date
Add Form

SCREEN TABBING ORDER – MANUSCRIPT ENDORSEMENT LIST

Initial Cursor Position
Initial Cursor Position should be within the 'General Liability' drop down.

Tab Sequence Throughout Screen
General Liability
Interline
OK
Cancel

INFORMATIONAL MESSAGES

FORM NOT FOUND – PLEASE SEARCH AGAIN
This message occurs when an operator is performing a search on the 'Optional' Forms Screen and nothing was returned that matched the search criteria keyed.

ERROR MESSAGES

FORM CANNOT BE ADDED BECAUSE THE SITUS STATE HAS NOT APPROVED THE FORM
This error would be produced if an operator was optionally trying to add a form and the situs state on the policy did not match the states that had approved the form being added.

FORM NUMBER AND/OR EDITION DATE IS NOT VALID. PLEASE VERIFY.
This is an existing host edit and occurs if form number and/or edition is not sequenced properly OR if form number and/or edition date is not valid. This error is triggered off the add when user clicks on 'Add Form' button from the Optional Forms Screen.

FORM CANNOT BE ADDED BECAUSE THE MAXIMUM NUMBER OF FORMS (70) ALREADY EXISTS
Host edit occurs when an operator clicks on the 'Add Form' button and 70 forms already exist on the policy and the operator is trying to add the 71st form.

<u>MANUSCRIPT FORM CANNOT BE ADDED BECAUSE THE MAXIMUM NUMBER OF MANUSCRIPT FORMS HAS ALREADY BEEN ADDED</u>
Host edit occurs when an operator clicks on the 'OK' button and there are 21 manuscript endorsements for the line (CG's or IL's). Edit could potentially occur when the operator clicks on 'Add Manuscript' button as well and the maximum has been exceeded.

<u>THIS FORM CANNOT BE ADDED BECAUSE "XX XX XX XX XX" ALREADY EXISTS ON THE POLICY.</u>
1. There are conflict forms that cannot be added together on the same policy so they are mutually exclusive of each other. The rules are as follows:

- UM 03 06 (Exclusion – Auto Liability) any edition date, cannot exist with UM 00 12 (Retained Limit – Auto Liability) any edition date.
- UM 02 32 (Exclusion – Employer's Liability) and edition date, cannot exists with UM 00 11 (Retained Limit- Employer's Liability) any edition date.*

*this is something that does not happen today, however, Greg will be making changes to the host to support this

- UM 01 90 (Discrimination Exclusion) any edition date, cannot exist with UM 03 36 (Unintentional Discrimination) any edition date.

2. Error should also be received if an attempt is made to add the same exact form that already exists on the policy.

<u>FORM CANNOT BE ADDED BECAUSE IT IS A MANDATORY DERIVABLE FORM</u>
This edit should occur if the operator keys a form number and edition date, clicks on ADD FORM, and that form is found on our table to be both mandatory and derivable

Optional Forms List

SCREEN OVERVIEW

Screen Purpose:
The purpose of this screen is allow the operator to add forms to the policy. The operator may either add a form by entering in the form number and edition date (if known) or select from a list of optional forms presented in a grid form. The operator may also search for a form, either by Line of Business OR by form name (fuzzy search).

Initial Screen Display
The screen is initially displayed showing a list of only optional forms in a grid. Where the 'Policy Holder Notice' Indicator equals 'Y', these forms should filtered out from the list.

Manuscript forms should be filtered out of the list as well. Forms are also filtered based on situs state and state scoping done on the form. Finally, a form that is both mandatory and derivable should be filtered from the list.

Note: We should try to deal with the issue of multiple edition dates of the same form showing up on the list.

Screen Features
This screen offers the ability to see a block of a list of optional forms by 'Form Number' and 'Form Name' presented in a grid format. As mentioned above, the operator may perform a search for a form in one of two ways: either by LOB or by keying search alpha numeric search criteria. Once the search is performed (operator clicks on SEARCH button), the operator may then select the applicable form from the grid by highlight the row using the 'nub' off to the left of the grid, and clicking on the ADD SELECTED FORM button down on the bottom of the screen. The operator may also key in the form number and edition date and click on the ADD FORM button. This assumes the operator knows the number and edition date of the form. Adding a form in this manner would be necessary to add a policy holders notice that wasn't derived by the system. Additionally, any form, could be added knowing the form number and edition date.

Cross-Screen Impacts:
Forms added from this screen needed to be added to the forms grid on the prior screen. Note that only one form may be added at a time. If the form being added is a side-door form, then either ADD FORM or ADD SELECTED FORM should position the user in the first prompt of the side-door data collection window. Else, the cursor should be positioned on the CONTINUE button on the main forms screen. Editing may occur based on state approval of a form. This should be an intra-screen edit on the 'Add'. Also note "conflict forms" and duplicate forms could produce an error. See discussion under "Error Messages".

PAGE PROMPTS / FIELDS

*Prompt Name: Select LOB*

Initial Display
There is no default for the 'Select LOB' prompt upon the initialize of this screen.

Prompt Type / Length
Single Drop, two bytes

Protection
No

Available Inputs

User selects from a drop down containing the following values: UM, CG, IL, and ALL, in that order. Note that if the situs state = TX, selection of 'CG' in the drop down should include the one TX optional form: TX GL 04 92. Selection of 'ALL' would include all forms in the list, eliminating any filtering done previously.

Changes Allowed
Yes

Required / Optional
No

Functional Notes

*Prompt Name: Form Name (Partial):*

Initial Display
Blank.

Prompt Type / Length
Entry Box, 30 bytes. Note: A minimum of 4 bytes is required.

Protection
No

Available Inputs
No, completely free form to accommodate any alpha numeric. Note that the fuzzy search is against the name, not the number. We need to accommodate alpha numeric as form names may contain numeric values. The search should be a combined search to search on all words keyed as a collective whole.

Changes Allowed
Yes

Required / Optional
Optional

Functional Notes
'Form Name' is mutually exclusive of 'Select LOB'. Therefore, Select LOB should be protected once information is keyed into 'Form Name (Partial)'. Fuzzy search and limited by the search criteria so that the list only contains forms that match the search criteria.

*Prompt Name: Number:*

Initial Display

Blank upon initial display

Prompt Type / Length
Entry box, 6 bytes

Protection
No

Available Inputs
Should be in the following format: LN1234, no spaces. These values are represented in the table below. Error if not in this format OR if form number and/or edition date is not valid, OR if form is not approved for the state. This error is triggered off the add when user clicks on 'Add Form' button. See Error Messaging for details.

| | |
|---|---|
| XX | 2 character alpha typically designating the line code |
| XY | Part of the form number |
| YY | Part of the form number |

Changes Allowed
Yes

Required / Optional
Optional, but required if 'Edition Date' is keyed. Don't enable 'Add Form' button until both Number and Edition date has been entered.

Functional Notes

*Prompt Name: Edition Date:*

Initial Display
Blank

Prompt Type / Length
Entry Box, 4 bytes

Protection
No

Available Inputs
MMYY, where MM = month and YY = year

Changes Allowed
Yes

Required / Optional
Optional, but required if 'Number' is keyed. Don't enable the 'Add Form' button until both Number and Edition Date have been keyed.

Functional Notes

PAGE BUTTONS – OPTIONAL FORMS LIST

Search: (alt-s):
The 'Search' button is enabled when either a LOB is selected from the 'Select LOB' prompt OR search criteria is keyed into the 'Form Name (Partial)' prompt. The 'Search' button performs the search according to the criteria defined in this documentation.

Add Form (alt-a):
The 'Add Form' button adds the form to the quote and to the forms grid (prior screen). It is enabled when both Number and Edition Date have been keyed by the operator. If the form being added is a side-door form, then clicking on the 'add' should position the cursor within the side-door data collection window, on the first prompt that needs data to be keyed by the operator. Else, position the cursor on the CONTINUE button.

Add Selected Form (alt-s):
The 'Add Selected Form' button is enabled when a row is selected from the 'nub' within the optional forms grid. This button adds the form to the quote and to the forms grid (prior screen). If the form being added is a side-door form, then clicking on the 'add' should position the cursor within the side-door data collection window, on the first prompt that needs data to be keyed by the operator. Else, position the cursor on the CONTINUE button.

More Forms (alt-m):
The 'More Forms' button brings back 'X' additional occurrence of optional forms. Upon an initial search, if all forms cannot be returned based on the search criteria, highlight the MORE FORMS button so that the operator is aware that there are more forms. If all optional forms can be returned in one trip, disable the MORE FORMS button.

Cancel:
The 'Cancel Button' returns the operator to the main forms screen without any optional forms being added.

NAMED INSURED OVERFLOW ENDORSEMENT

Derivations:
The host will need the following in order to derive CG D0 74, the Named Insured endorsement. If the named insured modal window exceeds 2 rows
then perform CG D0 74 Derivation and Reformat Named Insured.

Endorsement Coverage:
'NI' should be sent to the host, with the exception of the predominant state being New York, in which case 'NY' should be sent.

Endorsement Number:
'01' should be passed to the host when there is a need for the named insured endorsement to be derived.

Title:
The wording 'Named Insured Endorsement' should be passed to the host and inserted on the 'Title' row.

CG D0 74 Derivation:

| | |
|---|---|
| Row 02 - CG D0 74: | The Named Insured is amended to read: |
| Row 03 - CG DO 74: | (row 01 of Named Insured)(row 02 of Named Insured) |
| Row 04 - CG D0 74: | (row 03 of Named Insured)(row 04 of Named Insured) |

Continue on sequentially from here until all rows are pulled

Reformat Named Insured:
Row 02 - Named Insured: and as per "CG D0 74"

CUP ISSUE NAVIGATOR / QUICK ACCESS LOCATOR

Issue Screens:

Issue Screens should appear in the navigator, but access should be edited under the following conditions:

- When any policies exist in Issue Express with a function code other than new business. This rule holds true even if the policy with a function code other than new business has been purged or declined. In this case, the operator will have to transfer the policy to the host to issue the CUP policy. When the 'Transfer' option is eventually eliminated, the operator will need to call the hotline where the policy may be transferred through the OLM.

Error message should read: This policy must be transferred because of mid-term activity in Issue Express. Please call the Commercial Lines System Help Desk. Agents: Dial 1-800-842-2522. All others: 1-800-248-1911.

- If any underlying new business policies, either host or net, has a status other than issued, purged, or declined. This rule exists to ensure that the CUP premium is accurate, that forms derivation is complete, and that other issue information has been derived (i.e. company).

Error message should read: New business policies must be Issued, Purged, or Declined before accessing the Issue Screens.

- If we find auto rating information is missing from the CUP quote and the operator has not excluded Auto Liability Error message should read: Auto Policy Information is not complete. Auto Policy Information must be completed before accessing the issues screens or Auto Liability must be excluded.

- If commission is not found on the policy. This will be accomplished by looking for the existence of the line question of COMMISSION_Q1 on the PIF. If this is not found, then the operator should receive an error.

Error message should read: Please modify the policy and verify the commission under the Pricing section (Umbrella Detail). If commission is not being negotiated or contributed, simply re-rate the policy. After re-rating, click on Issue Screens to continue the issue process.

Issue Screens should not appear in the navigator, if the rating status of the policy is represented in the below grid. Note that this is existing logic that Master Pac uses today.

| Status | I.e. Status code | Pol check status code |
|---|---|---|
| Issued | Position 1 = f | C and preceding function = I |
| Issued requested | Position 2,3 = rr | I |
| Transferred | Position 1 = m | 'c' and preceding function = x |
| Transfer requested | Position 2,3 = ss | X |
| Declined | Position 1 = g or l | D |
| Purged | Position 2,3 = kk | D |
| To be purged | ? | W |
| Rating | Position 2,3 = dd | T |
| Rate error | Position 2,3 = ff | E and preceding function = i |
| Referred (agent only) | Position 1 = a,b, c, or j | F |

Or

The "Rating Required" Indicator equals Yes (Policy needs to be rated)

Underlying Schedule:

Underlying Schedule should be the only navigator selection available when Issue Screens is first accessed by the operator, as it is a guided walkthrough of each screen that the operator takes first time through. The Quick Access Locator, as with the other lines, should not show upon the first access of the Issue Screens.

Forms Derivation Required Indicator:

We will be using the Forms Derivation Required indicator in lieu of having a separate indicator to track whether or not the Underlying Schedule needs to be re-derived. That is, if the Forms Derivation Required is re-set, based on the requirements defined below, then the assumption is that the Underlying Schedule will need to be re-derived. Under this scenario, if this indicator is re-set, Underlying Schedule, should be the only navigator selection, as well as the only selection from the Quick Access Locator. Defined below are the requirements for re-setting the Forms Derivation Required Indicator.

This indicator should be re-set when the CUP policy is re-rated. Realize that this could occur in one of two ways.

1. The operator could modify the CUP policy and re-rate the CUP by clicking RATE from PRICING.

2. An underlying policy could be added and rated, in which case the CUP policy will be re-rated*

* Note that rating a Workers Comp policy does not re-rate the CUP policy. We will not change this process, however, we will want to see that the Forms Derivation Required indicator gets re-set when a Workers Comp policy is issued. This will allow an operator to start a Workers Comp policy and then later purge or decline the policy without impact to the Forms Derivation Required indicator. Really the concern here is that a newly issued Workers Comp policy (or any newly added underlying policy for that matter) gets added to the Underlying Schedule.

Changes to the Underlying Schedule:

An add, change, or delete of an operator added policy could potentially mean that forms will need to be re-derived. If an operator is just reviewing the screen or the information in the grid, however, forms will not need to be re-derived. Under the scenario where there is an impact to the Forms Derivation Required Indicator, the navigator should collapse to force the operator through Forms. This means that the navigator would collapse and is represented below. This is true even if the complete indicator was previously set to Yes for the Billing and Final Issue screens. The Quick Access Locator should also be adjusted to reflect the following if the operator were to move out to the Account Summary Screen and then re-access the Issue Screens.

| For NY policies: | For all other states: |
|---|---|
| Underlying Schedule | Underlying Schedule |
| A-Rate Submission | Forms |
| Forms | |

A-Rate Submission:

A-Rate Submission should appear in the navigator, as well as the Quick Reference Locator, when its complete indicator has been set to Yes. Once this indicator has been set to Yes, we will not be re-deriving answers, so there are no cross screen impacts within the Issue Screens themselves. The following is worth noting. If the operators modifies the quote and changes the predominant state, CUP will need to be re-rated. Note that the predominant state may also change based on the addition of a new Master Pac policy. Still, in either example, CUP will need to be re-rated. When CUP is re-rated, the Forms Derivation Indicator will be re-set back to Yes. A re-access of the Issue Screens should show only the Underlying Schedule (see discussion above under Underlying Schedule) thereby forcing the operator through the Underlying Schedule. From this point forward, the operator would continue to either the A-Rate screen or Forms, depending on what the predominant state is.

Forms:

Forms should not appear in the navigator the first time through the issue screenflow. However, upon a re-access of the Issue Screens, Forms should always appear. The issue is whether or not Forms will be the last selection, both on the navigator as well as the Quick Reference Locator, and is dependent on the Forms Derivation Indicator (see discussion above under Underlying Schedule).

Billing:

Billing should appear in the navigator, as well as the Quick Reference Locator, as long as the Forms Derivation Indicator equals No (Forms do not need to be re-derived).

Final Issue:

Final Issue should always appear in the navigator, as well as the Quick Reference Locator, except as noted above in those situations where forms needs to be re-derived. This is true regardless as to whether the complete indicator for this screen had previously been set to Yes.

AUTOMOBILE ISSUE

Final Issue Screen

PROMPTS / FIELDS

Prompt Name: Insuring Company

Initial Display
The full name of the company should be displayed as an informational message based on the company used for the predominant state.

Prompt Type
Entry Box

Protection
Yes

Available Inputs
N/A

Changes Allowed
No.

Required / Optional
Required

Functional Notes
The name of the company is shown on the pricing screen. We want to have it displayed here too.

The Insuring company determines what company will print on the policy paper. For single state policies this company should not be different from the pricing company. On multi state policies, if the companies differ by state if could be.
All the field people who responded said that they never change. Just set it to predominant state.

Prompt Text Help
(?) – INSURING COMPANY:

Prompt Name: Should this policy be automatically renewed?

Initial Display

This question appears only for Home Office and Field employees. Agents will not be asked this question. If an agent is processing business, it should be assumed that the policy is to be automatically renewed. If a renewal stop (watch file) needs to be placed on the policy, it will need to be processed by a TIC employee.

The initial display of the screen should default the question of 'Should this policy be automatically renewed?' with a 'Yes' answer. The options will be 'Yes and 'No' and will be in the form of radio buttons. The 'Yes' answer will always be the default value. Some translation will need to be done with the 'No' answer and is explained in detail below. Note: answering 'No' to this question creates a referral condition and prevents agents from fully issuing a renewal.

Prompt Type

The question 'Should this policy be automatically Renewed?' will have radio buttons as the possible answers and the answers will be 'Yes' or 'No'.

Protection

The answer to this question is completely changeable and should be unprotected for the New Business function.

Available Inputs

Selection of a 'Yes' or 'No' radio button.

Changes Allowed

Yes

Required / Optional

Required

Functional Notes

Issue Express offers 'Watch File' selections which we will not be incorporating into the Net. The values that Issue Express offers today are O, W, X, Y, Z, and C. These codes basically serve the same purpose in that they all prevent a policy from going through the automatic renewal process and stop the policy at the end of its term. There is more business meaning attached to these codes than there probably should be. Because each office has different business interpretations as to what each of these codes should mean, it is difficult to determine exactly what the text description contained in a drop down for 'Watch File' should be. We will recommend instead that operators send a memo to file when using a watch file in the Net to identify reasons as to why this policy should be stopped upon renewal.

Translation

For TIC employees, translation will be made so that a 'Yes' answer to the question 'Should this policy be automatically renewed' will set 'Watch File' on the PIF to '0'. A 'No' answer to this question will set 'Watch File' to 'W' .

If an Agent is processing, then the map and translate process should have stored a '0' under Watch File in the legacy system.

Consideration will need to be made for retrievals in terms of either deleting an existing 'Watch File' or translating it upon retrieval into the Net. This, however, will be addressed at a later date.

Prompt Text Help (?) – WILL THIS POLICY BE AUTOMATICALLY RENEWED?: If there is an underwriting reason to prevent the policy from going through the automatic renewal process, answer Yes to prevent the policy from being automatically renewed next term.

Prompt Name: Is this Policy Part of a Book Roll-Over?:

Initial Display

This question will initially default as No.

Prompt Type

Radio buttons

Protection

Unprotected

Available Inputs

Yes or No

Changes Allowed

Yes.

Required / Optional

Required

Functional Notes

NOTE. Instead of creating a new field for book roll-over, Actuarial is adding additional values to the reinsurance field for all lines. 'B' indicates a book roll-over and no reinsurance. 'C' indicates both a book roll-over and reinsurance. The issue systems have already made the change to allow any value for the reinsurance question.

Julie and Marsha would like us to have two separate questions in the IENet for all lines:
Will this policy be reinsured? Yes/No
Is this policy part of a book roll-over? Yes/No
Combinations of these two questions should be mapped to the converted value column as shown below;

| Reinsurance | Book roll-over | Converted to value in Reinsurance Ind |
|---|---|---|
| Y | Y | C (new) |
| Y | N | Y |
| N | Y | B |
| N | N | N |

* It should be assumed that the answer to the reinsurance questions is No. So the map and translate would only get a 'B' or an 'N'

Prompt Text Help (?) – IS THIS POLICY PART OF A BOOK ROLL-OVER?: Answer the question as YES if this policy is part of a book roll-over. The answer to this question will be used for statistical reporting only.

Prompt Name: Is this the only policy written for this account?:

Initial Display

If the policy is NOT associated with a Master Pac policy and the state is Virginia, we'll ask; IS THIS THE ONLY POLICY WRITTEN FOR THIS ACCOUNT? With no answer defaulted.

Prompt Type

Radio buttons

Protection

Unprotected.

Available Inputs

Available answers are Yes or No.

Changes Allowed

Yes

Required / Optional

Required

Functional Notes

This question is only displayed for Virginia policies if the Associated with Master Pac question on the submission was answered No. If it was answered as Yes, we should make sure that the Master Pac policy was quoted in the NET.

Backup Information:
2) There is a coding issue with Virginia (650) policies. From what I understand, they get a CPM code from this indicator and from this code other codes such as Written and Hazard codes are derived. For monoline (Basic) the hazard code is different and needs to be reported that way. Previously, we decided that we will always set this indicator to A) Account since we really shouldn't be writing much monoline business.

Prompt Text Help
(?) – IS THIS THE ONLY POLICY WRITTEN FOR THIS ACCOUNT?: For accounts that you are writing only the automobile, this question should be answered as Yes. If other lines are written for this account leave the answer as No.

Print Auto ID cards?:

---

Initial Display
This field displays defaulted to what is selected in the Producer Profile. If no producer profile then default to Yes.

Prompt Type / Length
Yes / No radio button.

Protection
This field is always unprotected and can be changed.

Available Inputs
YES / NO radio button,

Changes Allowed
Changes are allowed on this prompt.

Required / Optional
Selection of either Yes or No is required.

Functional Notes
If the defaulted answer is changed by the operator, the value should be saved on a subsequent redisplay of the screen.

Prompt Text Help
(?) – PRINT AUTO ID CARDS?:

Mail Directly to Agent:

Initial Display
This field displays defaulted to YES for all reporting offices except 700 and 02Y. For reporting offices 700 and 02Y, default this prompt to NO. This is the current default process that Issue Express provides today.

Prompt Type / Length
Yes / No radio button.

Protection
This field is always unprotected and can be changed.

Available Inputs
YES / NO radio button,

Changes Allowed
Changes are allowed on this prompt.

Required / Optional
Selection of either Yes or No is required.

Functional Notes
Regardless of reporting office, if the defaulted answer is changed by the operator, the value should be saved on a subsequent redisplay of the screen.

Prompt Text Help
(?) – MAIL DIRECTLY TO AGENCY?:

Audit Indicator.

Initial Display
This field will be defaulted to 'N', which will display literal 'Not Auditable' (N). The codes in parentheses are the codes that Auto uses today. They should not be displayed on the facet.

Prompt Type
Drop down Box

Protection
unprotected

Available Inputs

Available answers in the drop down are: (M) Monthly, (Q) Quarterly, (S) Semi-annual, (A) Annual or (N) Not Auditable (default)

Changes Allowed
Yes

Required / Optional
Required

Functional Notes

Prompt Text Help
(?) – AUDIT INDICATOR: The Audit Indicator will default to Not Auditable. If your policy will be audited, click on the drop down and select how often the policy will be audited.

"Send Select Office Copy to":

Initial Display
The "Send Select Office Copy to" displays defaulted. Content is the office code.

Prompt Type / Length
This is an Entry Box which displays defaulted. Field should contain the three digit office code.

Protection
This field is unprotected and can be changed by the operator to a valid office code.

Available Inputs
All of the valid reporting office codes and service centers. Note that '308' is a valid input and stops the print of the policy paper. This code should be used when testing.

Changes Allowed
Changes can be made to this field.

Required / Optional
A valid office code is required in this field.

Functional Notes

Prompt Text Help
(?) – SEND SELECT OFFICE COPY TO:

"Send Service Center Copy to":

Initial Display

The "Send Service Center Copy to" displays defaulted. Content is the office code.

Prompt Type / Length

This is an Entry Box which displays defaulted. Field should contain the three digit office code.

Protection

This field is unprotected and can be changed by the operator to a valid office code.

Available Inputs

All of the valid reporting office codes / service centers. Note that '308' is a valid input and stops the print of the policy paper. This code should be used when testing.

Changes Allowed

Changes can be made to this field.

Required / Optional

A valid office code is required in this field.

Functional Notes

Prompt Text Help (?) – SEND SERVICE CENTER COPY TO:

Agency Insured's ID (used for Download): ______________________

Initial Display

This field initially displays blank.

Prompt Type / Length

Up to 30 Characters.

Protection

This field is unprotected.

Available Inputs

Changes Allowed

Changes are allowed in this field.

Required / Optional

Input (up to 30 Characters) is optional

Functional Notes

Prompt Text Help (?) – AGENCY INSURED'S ID:

MODAL WINDOWS

Window Name / Purpose

None needed.

PAGE BUTTONS

Save and Return to Account Summary (ALT+S)

The Save and Return to Account Summary button is used to reject the full issuance of the policy. The screen will be edited to validate the "Send Select Office Copy to" and "Send Service Center Copy to" displayed or changed on this screen. Clicking this button will save the data captured on this screen and returns the operator to the Account Summary screen.

Issue (ALT+I):

The Issue button launches re-rating, authority checks, consistency checks and then commits the policy to full issuance. The screen will be edited to validate the "Send Select Office Copy to" and "Send Service Center Copy to" displayed or changed on this screen. Policy re-rating and full issuance will be kicked off when leaving this page.

After Issue is chosen, the operator will be returned to the Account Summary screen.

SCREEN TABBING ORDER

*Initial Cursor Position*

Whenever the screen is accessed, focus should be on the Issue button.

Default Button on ENTER

ISSUE button

Tab Sequence Throughout Screen

On initial display of the screen, focus should be placed on the Issue button. Then, tab through the screen in the following order. Note that tabbing through the radio button questions should not change either the defaulted or operator selected answer.

10. Issue button
11. 'Should this policy be automatically renewed?'
12. 'Is this policy part of a book roll-over?'
13. 'Is this the only policy written for this account?'

14. "Print Auto ID cards?"
15. "Mail Directly to Agent"
16. 'Audit Indicator'
17. "Send Select Office Copy to"
18. "Send Service Center Copy to"
19. "Agency Insured's ID"
20. Save and Return to Account Summary button
21. Issue button then continue to loop through the screen

WARNING MESSAGES

WARNING MESSAGE SCREEN NAME

ERROR MESSAGING

ERROR MESSAGE NAME
On issuance from this screen, consistency checks are performed and any host issue errors are determined. These messages must be presented to the operator.

Error if 'Select' or 'Service' answers are not valid send offices, '308' exception logic aside.

ISSUES

ISSUE ITEM

ADDITIONAL POSSIBLE FEATURES

4. Provide the actual name of the office in addition to the office code.
5. Suppress the displays of the Select Office and Service Center when the Mail Direct is NO. As a result, capture a new item called "Send Paper to." Construct this to standardize the Line of business variety in the office codes used when Mail to Agent is NO.
6. Create an ability to view / change the number of copies printed. Plus add the capability to address who's attention the copies should be sent to.

COVERAGE SCHEDULE SCREEN FOR AUTO ISSUE - PROMPTS / FIELDS

Prompt Name: Driver Other Car / Name(s) of Individual(s):

Initial Display

The screen consists of scheduled item tables. Scheduled Items are based on coverages added to the quote. This section, therefore, may not always appear.

The table should be set up as follows; the heading 'Drive Other Car' should appear above the table. The first row will contain the question 'Name(s) of Individual(s)'. Scheduled Item questions are at a policy level. The table should display the number of rows equal to the number of individuals input in the quote information (if possible). All rows displayed would require something to be filled in before the policy could be issued.

No sorting by column heading is allowed.

Prompt Type

Entry boxes, as part of the table.

Protection

Nothing is protected except for the column headings

Available Inputs

Free form text.

Changes Allowed

Yes

Functional Notes

There are validations that are done that basically compare the total answers under a column to the 'parent' question answer from the quote.

The table should allow a maximum of 10 rows with a maximum length of 30 alphanumeric characters and is not scrollable.
Items are deleted by double clicking on the row to highlight and pressing the delete key on the operator's keyboard.

If changes are made to the quote after the information has been filled out, it should be saved but we'll need to flag the operated with a Warning message that changes were made and they need to correct the names. If the number of individuals is less than the original input, the Warning message would need to tell them to Remove X name(s). If the number is more than original input, than that many additional rows will need to be added to the table.

If a line is left blank the operator may move off the screen but they should not be allowed to issue the policy. A consistency check should be performed to make sure all names (rows) are completed before issuance.

Tabbing

Tabbing should move the cursor from row to row within a table. Tabbing should allow the cursor to move to the first cell in the next row. When the focus is moved off the last table in this section, the cursor should be positioned on the 'Continue' button.

PROMPTS / FIELDS

Prompt Name: Broadened PIP / Name(s) of Individual(s):

Initial Display

The screen consists of scheduled item table. Scheduled Items are based on coverages added to the quote. This section, therefore, may not always appear.

The table should be set up as follows; the heading 'Broadened PIP' should appear above the table. The first row will contain the question 'Name(s) of Individual(s)'. Scheduled Item questions are at a policy level. The table should then display the number of rows equal to the number of individuals input in the quote information (if possible). All rows displayed would require something to be filled in.

No sorting by column heading is allowed.

Prompt Type

Entry boxes as part of the table for scheduled names.

Protection

Nothing is protected except for the column headings

Available Inputs

Free form text.

Changes Allowed

Yes.

Functional Notes

There are validations that are done that basically compare the total answers under a column to the 'parent' question answer from the quote.

The table should allow a maximum of 6 rows with a maximum length of 30 alphanumeric characters and is not scrollable. Items are deleted by double clicking on the row to highlight and pressing the delete key on the operator's keyboard.

If changes are made to the quote after the information has been filled out, it should be saved but we'll need to flag the operated with a Warning message that changes were made and they need to correct the names. If the number of individuals is less than the original input, the Warning message would need to tell them to Remove X name(s). If the number is more than original input, than that many additional rows will need to be added to the table.

Tabbing

Tabbing should move the cursor from row to row within a table. When the focus is moved off the last row in the table, the cursor should be positioned on the 'Continue' button.

Page Level Help Text

This screen appears when Drive Other Car Coverage and/or Broadened Personal Injury Protection were selected in the quote screens. In the quote screens you indicated how many individuals were covered under each of these coverages. On the Coverage Schedule screen, we are showing a table with a set number of rows. These rows will match the number of individuals entered in quote. To issue the policy, the names of each individual must be completed.

If the number of individuals has changed, you must go back into the quote screens to make your changes. Then, when you return to this screen, the number of rows will match. If the number of individuals is now less than what it was you'll need to delete a row from the table. To delete a row, click on the row to highlight and then press the delete key on your keyboard.

MODAL WINDOWS

Comments

SCREEN TABBING ORDER

Initial Cursor Position

Initial focus should be placed on the CONTINUE button

Default Button on ENTER

CONTINUE button should act as the default for the ENTER key.

Tab Sequence Throughout Screen

1. CONTINUE button

2. First input row of the grid, then the next available. When no more rows are available then the cursor should either go to the next grid or the CONTINUE button.

BUTTONS

CONTINUE - (ALT+C):
The CONTINUE button displays and is active at all times. If CONTINUE is clicked or entered on than any data that was keyed, changed or defaulted should be saved.

Pressing the CONTINUE button should move the operator to the Forms screens.

WARNING MESSAGES

Warning: Quote Information Changed:
If operator changes the answer on "Number of Individual(s)" for Drive Other Car Coverage or Broadened PIP Coverage in the quote after the Issue Information was completed, then one of the following Warning messages should be displayed when the Coverage Schedule is accessed in the Issue Screens. After OK is clicked in the window, the cursor should move to the first row in the table.

If possible where the Warning message indicates 'X' this be replaced with the new answer to the question asked in quote, so the operator will know how many names should appear in the schedule.

This message will be invoked during new business and renewal processing.

Prompts / Displays
This warning message will appear if the operator presses CONTINUE without completing the table or if the operator changes (increases) the number of individuals for DOC coverage or Broadened PIP in the quote information. The following would apply if the number of individuals is now more than what was originally entered in quote. (This message will only be brought up once per entry of the screen. If the operator clicks OK and does not add any

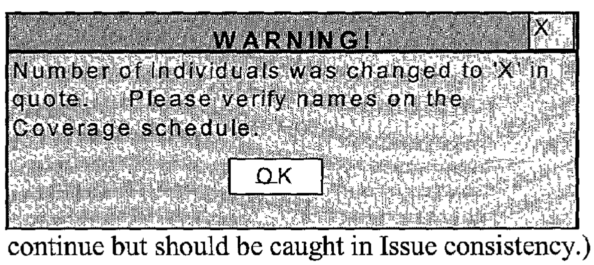

names they can continue but should be caught in Issue consistency.)

If the information in quote is changed and the number of individuals is now less than what was originally entered in quote, put up the following message. In this case the operator must delete the appropriate number of rows to equal the quote information in order to continue.

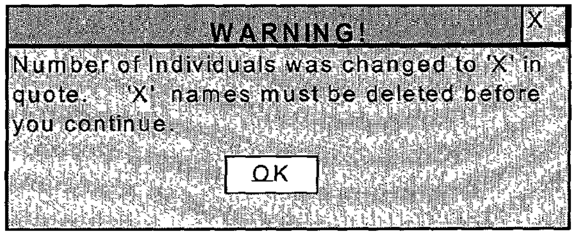

<u>Buttons:</u>
OK (alt +O)– The OK button simply closes the window. The cursor should then be placed on the first row in the table.

The modal window also contains an 'X' close button in the upper right corner of the title bar. This functions the same as OK.

ERROR MESSAGING

The completion of the names for both DOC and BPIP will be done in Consistency check. If the total number of names are not complete than the operator should not be allowed to issue the policy and they should receive an error. The error should tell them that they need to complete the Coverage Schedule for DOC and / or BPIP.

The exception being if the number of individuals was changed to a lower number than what was originally entered. The operator would need to decide which rows should be deleted. We will put up a Warning message telling them to do so.

ISSUES:

This screen was originally planned to follow the TRMR screen. The TRMR screen has been pulled from a day 1 deliverable but will be scheduled after Rapid 2 makes their changes. These changes are in the Rapid 2 queue for October 2000.

When completed then this screen will follow the TRMR if applicable.

Navigator / Quick Reference Locator Requirements

Introduction

These requirements are meant to mirror the most of the existing functionality of the Account and Master Pac Policy Navigators and Quick Reference Locator. The appearance of "Issue Screens' on the navigator should function as it does for Master Pac. The screen names to be displayed for AUTO are shown below.

The issue navigator selections are listed below in the order that they should appear:

- Additional Interests
- Reporting Info
- TRMR
- Coverage Schedule
- Forms
- Billing
- Final Issue The quote and issue navigator selections should never appear at the same time. This is controlled through the selection of either the 'Modify Quote' navigator selection or the 'Issue Screens' navigator selection. After a guided flow through the quote screens, the Rating Required Indicator will initially be set to 'Y'. Once on Pricing, and the quote is rated, the Rating Required Indicator will be set to 'N'. This doesn't mean that the issue navigator selections should now appear. It is when the operator selects 'Issue Screens' off the navigator that the issue navigator selections should appear. (Please refer to Master Pac's navigator requirements for the other status conditions that will determine whether or not to show 'Issue Screens' on the navigator.)

Navigator:

1. The first time through the Issue Screens, the user is guided, screen by screen.

The navigator should initially display collapsed, showing only the Additional Interest (or Reporting Info) reference as the first screen in the issue process. As the operator moves through the screen-flow the Navigator builds, displaying the next screen in the flow.

2. The second time through (as long as the operator has not modified the quote), the navigator should display with all of the Issue Screens that the operator had previously completed.
   If the operator utilizes the Navigator to re-access and modify an issue screen, they must re-access all of the subsequent issue screens. In this case, the Navigator is collapsed, viewing only the next screen in the flow.

3. Similarly, if the operator, once in issue, goes back into rating (Modify Quote), the issue navigator selections should disappear, and the quote navigator selections should react as if the first time through.

A unique situation exists for Auto, if the auto quote is for non-owned and hired coverages only, then some of the issue screens do not apply and those navigator choices should not be shown. These requirements will be defined below.

Note that List W.I.P. and Establish New should always appear as part of the navigator under ACCOUNT – Actions.

If a navigator selection is used by an operator to go back or forward rather then hitting one of the buttons on the screen, a message should be brought up stating the " Any changes to your data will not be saved. Do you want to continue?' If Yes is answered that any changes will not be saved on the screen they are leaving. If No is answered the operator should be brought back to the screen they were on.

Quick Reference Locator:
The screens works by clicking on the screen title (underlined) that the specific field falls under.

The quick reference locator in the Issue path works similar to the quote locator. On first entry to the Issue screens the locator should come up with just the Additional Interest selections and Reporting Information, unless a Non-owned and Hired policy. In this instance the only selection should be Reporting Information.

The other issue screens should not be shown on the locator until they have been completed. All selections should show if the operator has already been to the Final Issue screen and the Save & Return to Account Summary button has been used, unless the operator goes back into the quote screens. In this instance the quick reference locator should behave as if the first time through.

Navigator Selection – ISSUE Path:

Additional Interests:

Additional interests information is not required, therefore the operator should be able to move forward through the issue screens. There is one exception to this statement which is discussed below.

The selection of 'Issue Quote', however, off the navigator, should normally take the operator to the 'Additional Interest' screen. The operator may select CONTINUE to move past this screen, either because there are no additional insureds on the policy or Loss Payees are not needed OR because the operator chooses not to complete the additional insured information in the grid at this time. As long as the operator is within the issue screen flow, any incomplete additional insureds information that is part of the grid, would be picked up in issue consistency. 'Additional Interests', therefore, should always be available from the navigator as long as the operator is within the issue path, except as below.

The selection of an additional interest such as a Loss Payee or Additional Insured from the 'Additional Interests' screen may require Forms Derivation to occur again. In this instance, the navigator should show: Additional Interests, General Issue Information and Forms only.

Exception:
If the auto quote is covering non-owned and hired only then this screen should not show. It should not be available as a navigator selection or show on the Quick Locator.
Non-owned and Hired policies are identified by having Automobile Liability Coverage with only a symbol 8 and/or 9. In addition to the Liability Coverage described, the policy could also contain Comprehensive, Specified COL or Collision with only a symbol 8.

Reporting Information:

'Reporting Information' should appear in the navigator as part of the issue screenflow. The completion of the vehicle identification number will be mandatory on all policies that contain a Vehicle Schedule.

In the case of a non-owned and hired only policy, this is the first choice on the navigator and quick locator.

Coverage Schedule:

'Coverage Schedule' should appear in the navigator as part of the issue screen flow if applicable. The Coverage Schedule will require completion if Drive Other Car and Broadened PIP coverage are part of the quote. If these two coverages are not, then this selection should not appear in the navigator or as part of the quick locator.

Forms:

'Forms' should appear in the navigator as part of the issue screen flow. The selection of an additional insured, Loss Payee or a Cession Notice may require Forms Derivation to occur again.

Billing:

'Billing' should appear in the navigator as part of the issue screen flow.

Final Issue:

'Final Issue' should appear in the navigator as part of the issue screen flow.

Quick Reference Locator
Click to go to:

Additional Interests
Additional Insured
Loss Payee

Reporting Information
Vehicle Indent Numbers
NY – DMV Reporting
MA - DMV Reporting
MA – Cession Notice
County Town Codes Coverage Schedule
Drive Other Car Names
BPIP Names Forms
Derived Forms
Optional Forms
Fill-In Completion Direct Bill
Payer Information
Down payment Information
Check Information Final Issue
Insuring Company
Audit Indicator
Select Office Copy
Service Center Copy
Mail Direct to Agent
Print Auto ID Cards

Auto Issue - Reporting Information

PAGE PROMPTS / FIELDS

Initial Display

This question will display for all states. The answer to this question will default to No.

Prompt Type / Length

Radio buttons.

Protection

No

Available Inputs

Yes or No

Changes Allowed

Yes

Required / Optional

Optional

Functional Notes

Prompt Text Help (?) - HAVE ANY CERTIFICATES OF INSURANCE BEEN MADE FOR THIS POLICY?: If any certificates of insurance have been manually issued for this policy, answer the question as Yes. By answering Yes the policy will be flagged that certificates have been issued.

*Federal Employers Identification Number:*

Initial Display

This question will display for Louisiana and Nevada only. The initial display for this question will be blank.

Prompt Type / Length

Entry box – length is 9 alpha-numeric characters.

Protection

Unprotected

Available Inputs

Changes Allowed
Yes

Required / Optional
Required

Functional Notes
This question needs to be asked if Louisiana or Nevada is on the policy. This information is also needed for Massachusetts and New York but we will NOT ask this question here. We will ask for the FEIN in the registration information modal.

Prompt Text Help
(?) – FEDERAL EMPLOYERS IDENTIFICATION NUMBER:

*Should a Cession Notice be sent?:*

Initial Display
This question will display for Massachusetts Ceded policies only. It should be defaulted to Yes.

Prompt Type / Length
Radio Buttons

Protection
Unprotected

Available Inputs
Yes or No

Changes Allowed
Yes

Required / Optional
Required

Functional Notes
By answering the question as Yes, a cession notice will be sent by the host system. If answered as No then the cession notice must be manually sent by the operator.

Prompt Text Help (?) – SHOULD A CESSION NOTICE BE SENT?: - This is an indicator to determine whether or not a cession notice is to be sent to the reinsurance facility. This question is applicable to Massachusetts Ceded policies only.
If the question is answered as Yes the cession notice will be sent to CARR. If a manual cession notice will be sent then change the default to No.

Note: If 'No' is selected, the cession notice must be manually completed by the operator and sent to CARR.

*What city should be used to derive the county town code?:*

Initial Display
This question should be asked for the states requiring a county town code. The answer will default as BLANK.

Prompt Type / Length
Entry box.

Protection
Unprotected.

Available Inputs
Valid cities for the Predominant state. There is a possibility there could be a BPIP state and / or two Free Form states. The three applicable BPIP states are FL NJ, or NY. For free form coverages all county town states would be applicable.

Changes Allowed
Yes.

Required / Optional
Required.

Functional Notes
If the Predominant state is AL, AR, AZ, DE, FL, IL, LA, MS, MA, NJ, NY, NC, ND, or SC (or if multi state policy and Broadened PIP state is FL, NJ or NY, or free form coverage with the state not equal to predominant state) and we have optional coverage's on the policy then this question should be asked.
Note: This question could show up three or four times if Predominant state, BPIP state, Liab free form and Phys Free form states are all different and all are states requiring a county town code.

Note: Umbrella uses a service that by inputting the predominant city, a county town code is generated. Umbrella selects the first county town code that applies to the city input.

Prompt Text Help
(?) - WHAT CITY SHOULD BE USED TO DERIVE THE COUNTY TOWN CODE?:

*Vehicle Schedule Grid:*

Initial Display

The initial display of this grid will contain a list of vehicles from the Vehicle Schedule in quote. The year, make/model will prefill from the vehicle schedule. The answer to the question 'Is this vehicle owned by an individual' will prefill in the grid. The garaging state will prefill in the 'State Registered' column in the grid.

Prompt Type / Length

The prompt type is a Grid containing 8 columns with a 'nub' at the beginning of each row. Only three columns will allow information to be input. In the illustration below, the grayed columns will be derived from information in quote and are not changeable. Direct input is not allowed for Registration Info. This information is completed by pressing the ellipse button and bringing up a modal window.

Protection

The Vehicle number, year, make/model, state garaged and individually owned information will be protected. The other information that is in the grid will be unprotected.

| | Veh # | Year | Make/Model | State Garaged | Vehicle Identification # | VIN Exc | State Registered | Individually Owned | Registration Info | |
|---|---|---|---|---|---|---|---|---|---|---|
| | 1 | 1997 | Chevy Blazer | NY | | N | NY | N | | ... |
| | 2 | 1995 | Ford Taurus | NY | | N | NY | Y | | ... |

Available Inputs

See information contained in the following pages.

Changes Allowed

Changes are allowed to the Vehicle Identification Number, State registered and Registration Info (if New York or Mass). Other columns are protected.

Required / Optional

Input of the Vehicle Identification Number and State registered are mandatory. (Some exceptions exist for certain class codes).
Registration Info is mandatory for vehicles registered in New York or Mass. (Some exceptions exist for certain class codes).

Functional Notes

Prompt Text Help

*GRID: Veh#, Year, Make/Model, State Garaged:*

Initial Display
The initial display of these four fields in the grid will show the prefilled information from the vehicle schedule.

Prompt Type / Length
Vehicle number has a prompt length of 3 (numeric).
Vehicle Year has a prompt length of 4 (numeric).
Make/Model has a prompt length of 15 alpha-numeric characters.
State Garaged has a prompt length of 2 characters (alpha).

Protection
All are protected.

Available Inputs
Information for these fields will be brought back from the Vehicle schedule in quote.

Changes Allowed
No

Required / Optional
All are required.

Functional Notes
The information for all four items will prefill from the vehicle schedule in quote.

Prompt Text Help

*GRID: Vehicle Identification #, VIN Exc.:*

Initial Display
The initial display for Vehicle Identification # will be blank.

Prompt Type / Length
The Vehicle Identification # is an entry box within the grid. Prompt length up to 17 alpha-numeric characters.
The VIN Exc. is an entry box with a length of 1 character.

Protection
The VIN is unprotected.

Available Inputs

All states require a VIN be input. This field can not be left blank.
Outstanding item is Plates – not sure if something is needed in the VIN field.

Changes Allowed

Yes

Required / Optional

A valid VIN is required for all vehicles garaged in Arkansas, Colorado, Massachusetts or New York. For these states the VIN EXC field will always be NO and can not be changed.
All other states the VIN exception is allowed.

Functional Notes

In the host, the operator is allowed to override the VIN (some state exceptions). We are not going to ask this question if the VIN is invalid and then set the answer in the grid. If an invalid vin is input, a message should be brought up telling the operator their vin is invalid. Do they want to correct it? – Yes or No. This message would be for all states except AR, CO, MA or NY.
For AR, CO, MA or NY, the message will still be brought up but it will not ask if the want to override just tell them they must correct the vin.
NOTE: Refer to the MODAL section for complete details.

A valid VIN is required if the vehicle is garaged in Arkansas, Colorado, Massachusetts or New York. These states do not allow the VIN exception to be used. In the host, the VIN exception is set to No and protected. For all other states the VIN exception of Yes can be used.

Note: For all states there are some class codes that VIN is not required (i.e. trailers, mobile equipment).

Prompt Text Help

*GRID: State Registered:*

Initial Display

The initial display of the this field will be prefilled with the same state as the 'State Garaged'.

Prompt Type / Length

Drop down box with a field length of 2.

Protection

Unprotected.

Available Inputs

The 2 digit abbreviation for all states.

Changes Allowed

Yes.

Required / Optional

Required input.

Functional Notes

If the 'State Registered' field contains NY or MA then Registration Info will be required. For all other states, registration info is not required.

Texas can be included in the drop down as it is allowed as a Registrant state.

Prompt Text Help

*GRID: Individually Owned:*

Initial Display

The initial display for this field will be prefilled from the answer to the question 'Vehicle is owned by an individual.' in quote.

Prompt Type / Length

Entry box – length = 1 byte.

Protection

Protected.

Available Inputs

'Y' (yes) or 'N' (no).

Changes Allowed

No.

Note: If this information is incorrect the operator must go back into their quote to change the answer.

Required / Optional

Required.

Functional Notes

The information for this field will prefill from quote.

In quote, the question id is 'VEHOWNINDVL_Q1' it comes from the PRDLN_EXP_QUES_DTL table. The answer ids to this question are VEHOWNINDVL_A01 (text value N) and VEHOWNINDVL_A02 (text value Y) and both are on the PRDLN_EXP_ANS_DTL table.

Prompt Text Help

*GRID: Registration Info:*

Initial Display
The initial display of the field will be blank. This field will only be active if the state registered is Mass or New York.

Prompt Type / Length
The operator can not type into this field in the grid. The field should contain an ellipse button, that when pressed a modal window will be brought up to collect the necessary registration information.

Protection
Protected.

Available Inputs
See Modal Window section.

Changes Allowed
Yes

Required / Optional
Required only if the State Registered is NY or MA.
Otherwise it is not required and the ellipse button should be disabled.

Functional Notes
If the State Registered is NY or MA:
This field must work in conjunction with the answer to the 'individually owned' field. Depending on how this question is answered, different information is asked. (details are explained under the modal window.)

Additional states will be added to this as time goes on. CT is on the horizon for registration information to be collected.

The following stat codes are excluded from dmv processing: 7907 Farm Equipment, 7908 Fire Department - PPT, 7909 Fire Depart All Other, 7911 Law enforcement agencies ppt, 7912 Law enforcement Agencies all other, 7942 law enforcement agencies - motorcycles, 7953 farm special plates, 7964 snowmobiles, 07070 owner repairman plates, 07060 transporter plates, 04560 boat trailers, also some mobile equipment codes and service and utility trailers Note: In Rapid 2 the DMV table: A6277859. This table is used to check if a state needs the Registration Information completed.

Prompt Text Help

MODAL WINDOWS

Registration Information: Corporate Ownership.
The purpose of this modal window is to collect the necessary information needed to sent to the Department of Motor Vehicles.

Prompts / Displays
If the answer to 'Individually Owned' is 'N' (no) then the following modal window will need to be brought up.

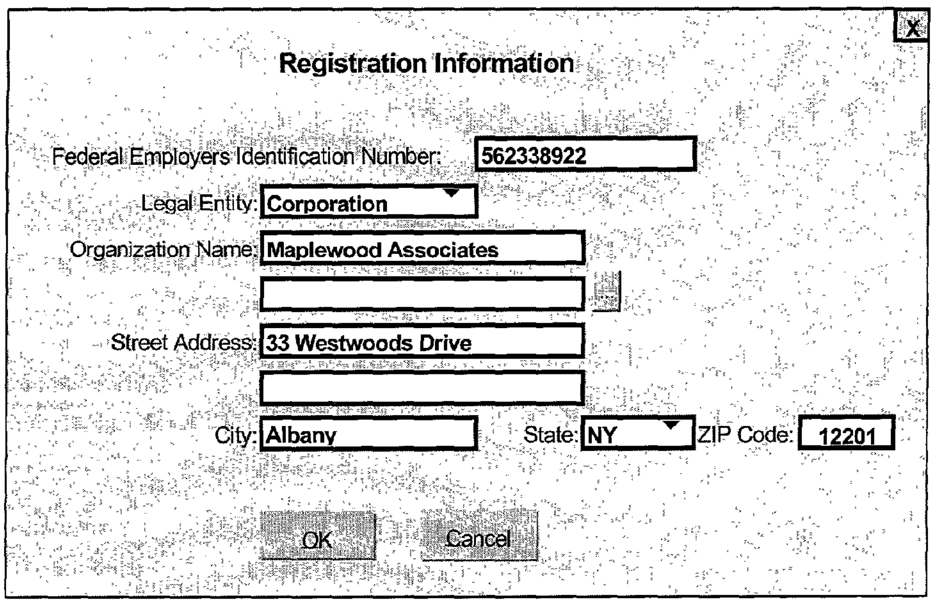

MODAL TITLE: Registration Information:
The title in the modal window should read 'Registration Information'

Federal Employers Identification Number:
The initial display should be blank.
The type of prompt should be a entry box allowing 9 alpha-numeric characters.
This is a required field. A valid FEIN must be entered.

Legal Entity:

The legal entity should default to corporation. It should contain a drop down with Corporation, Partnership, Joint Venture or Other. Individual should NOT be included in the drop down.

Organization Name:
The organization name should default as blank for the first vehicle.
The type of prompt should be an entry box, should allow two boxes. The first box should allow up to 35 characters. The second should allow up to 25 characters.
The first line of the name is a required field.
Field is unprotected and changes can be made to it.

After the second line an ellipse button should be displayed. When this button is pressed another screen should be brought up allowing 4 additional organizational names to be input.

Refer to Modal Window details on page 16 & 17.

Street Address:
The street address should prefill from the mailing address on the Policy Information screen.
The type of prompt should be an entry box, should allow two boxes. Both of which should allow up to 35 alpha-numeric characters.
The first line is a required.
Field is unprotected and changes can be made to it.

City:
The city should prefill from the mailing address on the Policy Information screen.
The type of prompt is an entry box. Length of the box should allow up to 30 characters.
This is a required field. It is unprotected and changes can be made to it.

State:
The state should prefill from the mailing address on the Policy Information screen.
The type of prompt should be a drop down containing valid 2 digit state abbreviations.
Field is required and unprotected.

ZIP Code:
The zip code should prefill from the mailing address on the Policy Information screen.
The prompt length should be an entry box which allows up to 10 numeric characters.
Field is required and unprotected.

Functional Notes:
The information that is entered on this modal should prefill for all subsequent 'like' vehicles. Like vehicles must have the same Ownership information.

Leased Vehicles. When a vehicle is registered in a leasing company's (i.e. Ryder, Penske) name (and our insured is not the leasing company) the vehicle should not be reported to the DMV. Systems is currently working on a long term solution to identify/exclude these type of vehicles from DMV reporting. Until this is in place the following short term procedure should be followed:

After obtaining a copy of the vehicle registration it is determined that the vehicle is registered in a
leasing company's name the following information should be input on the Registration Information
screen:

Last Name/Organization = XXX
FEIN = 000000000
Legal Entity = C
VIN = valid VIN

This combination of data will alert systems to remove this record from DMV reporting. Please remember this only applies to vehicles registered to a leasing company. Information should continued to be collected for leased vehicles registered in our insured's name as they must be reported to the DMV.

Buttons:
OK – The OK button should Save the information entered and return the operator to the Reporting Info screen. In the grid under the heading Registration Info the word 'COMPLETED" should be returned.

Cancel – The Cancel button simply closes the window without making any updates to the table or the grid. Under the heading. No words should be returned.

The modal window also contains an 'X' close button in the upper right corner of the title bar. This functions the same as Cancel.

Tabbing Sequence:
On initial display of the window, focus should start on the first question then tab through the rest of the screen. The order is as follows:
1.) Federal Employers Identification Number
2.) Legal Entity
3.) Organization Name
4.) Street Address
5.) City
6.) State
7.) Zip Code
8.) OK button
9.) Cancel button If tabbing off the Cancel button, sequence should loop back to the top and around again.

MODAL WINDOWS

Registration Information: Corporate ownership – Additional Names.

The purpose of this modal window is to collect the necessary information needed to sent to the Department of Motor Vehicles.

Prompts / Displays

If the ellipse button is pressed on the Registration Info modal, then the following modal window will need to be brought up. A maximum of 4 additional names can be collected.

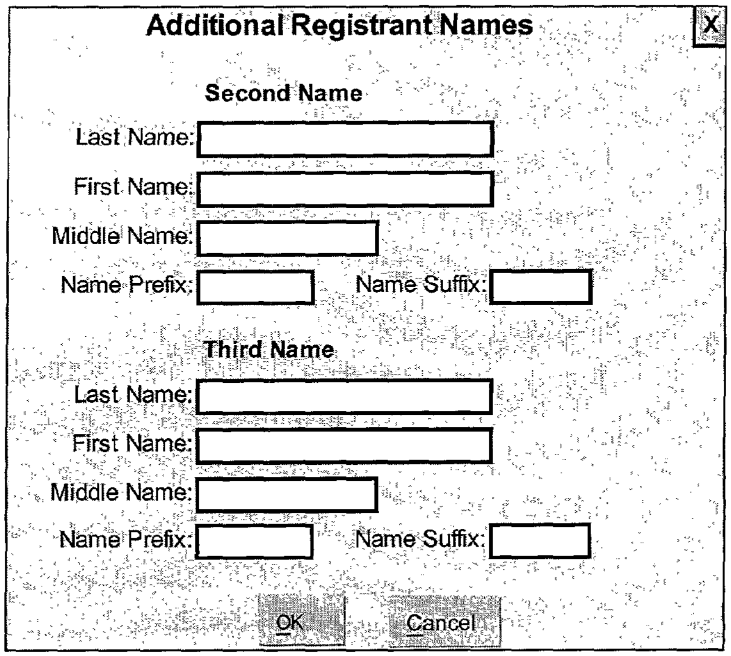

MODAL TITLE: Registration Information:

The title in the modal window should read 'Additional Registrant Names'

Title above each group of names should show as SECOND NAME, / THIRD NAME, / FOURTH NAME, / FIFTH NAME.

Last Name:

The last name should default as blank.

The type of prompt should be an entry box. The box should allow up to 35 characters.

First Name:

The first name should default as blank.

The type of prompt should be an entry box. The box should allow up to 25 characters.

Middle Name:
The middle name should default as blank.
The type of prompt should be an entry box. The box should allow up to 25 characters.

Name Prefix:
The name prefix should default as blank
The prompt type is an entry box and allow up to 9 alpha-numeric characters.

Name Suffix:
The name suffix should default as blank.
The prompt type is an entry box and allow up to 9 alpha-numeric characters.

Functional Notes:
A maximum of 4 additional names can be collected on this screen.
The information that is entered on this modal should prefill for all subsequent 'like' vehicles. Like vehicles must have the same Ownership information.

Buttons:
OK – The OK button should Save the information entered and return the operator to the Registration Info modal.

Cancel – The Cancel button simply closes the window without making any updates and returns the operator to the Registration Info modal.

The modal window also contains an 'X' close button in the upper right corner of the title bar. This functions the same as Cancel.

Tabbing Sequence:
On initial display of the window, focus should start on the first question under the Label Second Name, then tabs through the rest of the screen. The order is as follows:

SECOND NAME
1.) Last Name
2.) First Name
3.) Middle Name
4.) Name Prefix
5.) Name Suffix
THIRD NAME
6.) Last Name
7.) First Name
8.) Middle Name
9.) Name Prefix
10.) Name Suffix <u>FOURTH NAME</u>
11.) Last Name
12.) First Name
13.) Middle Name
14.) Name Prefix
15.) Name Suffix
<u>FIFTH NAME</u>
16.) Last Name
17.) First Name
18.) Middle Name
19.) Name Prefix
20.) Name Suffix
21.) OK button
22.) Cancel button. After tabbing off the button, sequence should loop back to the top and round again.

MODAL WINDOWS

Registration Information: Individual ownership

The purpose of this modal window is to collect the necessary information needed to sent to the Department of Motor Vehicles.

<u>Prompts / Displays</u>
If the answer to <u>'Individually Owned' is 'Y' (yes)</u> then the following modal window will need to be brought up.

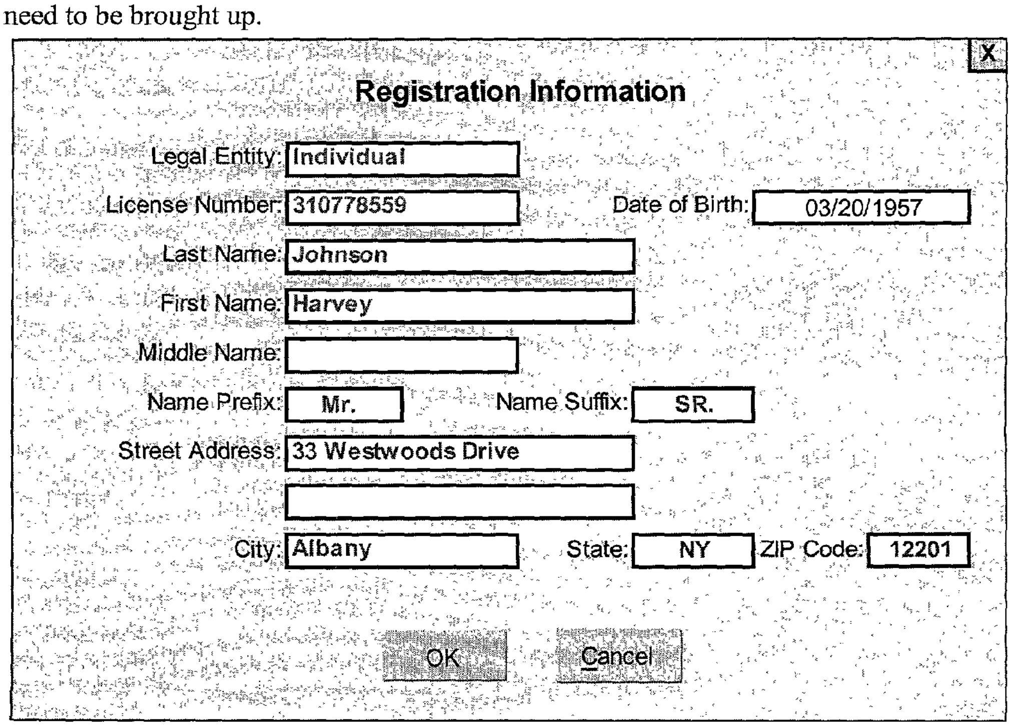

MODAL TITLE: Registration Information:
The title in the modal window should read 'Registration Information'

Legal Entity:
The legal entity should default to Individual. No other choices should be available. Field is required and not changeable.

License Number:
The license number should default as Blank.
The type of prompt should be an entry box and allow up to 20 alpha-numeric characters.
The field is required. It is unprotected and can be changed.

Date of Birth:
The Date of birth should default as Blank.
The type of prompt should be an entry box and allow up to 8 numeric characters. Format should be MMDDCCYY.
The field is required. It is unprotected and can be changed.

Last Name:
The last name should default as blank for the first vehicle.
The type of prompt should be an entry box. The box should allow up to 35 characters.
This is a required field. It is unprotected and changes can be made to it.

First Name:
The first name should default as blank for the first vehicle.
The type of prompt should be an entry box. The box should allow up to 25 characters.
This is a required field. It is unprotected and changes can be made to it.

Middle Name:
The middle name should default as blank for the first vehicle.
The type of prompt should be an entry box. The box should allow up to 25 characters.
This is an optional field. It is unprotected and changes can be made to it.

Name Prefix:
The name prefix should default as blank for the first vehicle.
The prompt type is an entry box and allow up to 9 alpha-numeric characters.
This is an optional field. It is unprotected and changes can be made to it.

Name Suffix:
The name suffix should default as blank for the first vehicle.
The prompt type is an entry box and allow up to 9 alpha-numeric characters.
This is an optional field. It is unprotected and changes can be made to it.

Street Address:
The street address should prefill from the mailing address on the Policy Information screen. The type of prompt should be an entry box, should allow two boxes. Both of which should allow up to 35 alpha-numeric characters.
The first line is a required.
Field is unprotected and changes can be made to it.

City:
The city should prefill from the mailing address on the Policy Information screen.
The type of prompt is an entry box. Length of the box should allow up to 30 characters.
This is a required field. It is unprotected and changes can be made to it.

State:
The state should prefill from the mailing address on the Policy Information screen.
The type of prompt should be a drop down containing valid 2 digit state abbreviations.
Field is required and unprotected.

ZIP Code:
The zip code should prefill from the mailing address on the Policy Information screen.
The prompt length should be an entry box which allows up to 10 numeric characters.
Field is required and unprotected.

Functional Notes:
The information that is entered on this modal should prefill for all subsequent 'like' vehicles. Like vehicles must have the same Ownership information.

Buttons:
OK – The OK button should Save the information entered and return the operator to the Reporting Info screen. In the grid under the heading Registration Info the word 'COMPLETED" should be returned.

Cancel – The Cancel button simply closes the window without making any updates to the table or the grid. Under the heading. No words should be returned.

The modal window also contains an 'X' close button in the upper right corner of the title bar. This functions the same as Cancel.

Tabbing Sequence:
On initial display of the window, focus should start on the second question (License Number) then tab through the rest of the screen. The order is as follows:

1.) License Number
2.) Date of Birth
3.) Last Name

4.) First Name
5.) Middle Name
6.) Name Prefix
7.) Name Suffix
8.) Street Address
9.) City
10.) State
11.) Zip Code
12.) OK button
13.) Cancel button. After tabbing off the button, sequence should loop back to the top and around again.

MODAL WINDOWS

WARNING – Invalid VIN:

The purpose of this modal window is to warn the operator that the vehicle identification number that they have input is nor valid. If they choose to do so they could correct it or continue on with the incorrect one.

Prompts / Displays

The Warning message will display if the VIN that is input is invalid.

The following message should be brought up if the State Garaged is Arkansas, Colorado,

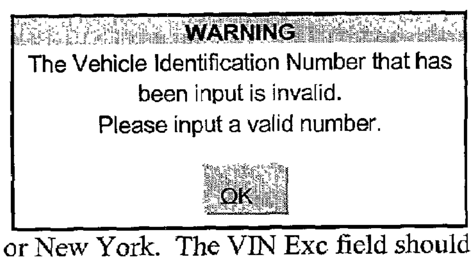

Massachusetts or New York. The VIN Exc field should be set to 'N'.

When the operator clicks on the OK button, they should be brought back to the Vehicle Identification Number field so they can correct the number.

For All other states, the Warning message should read as follows:

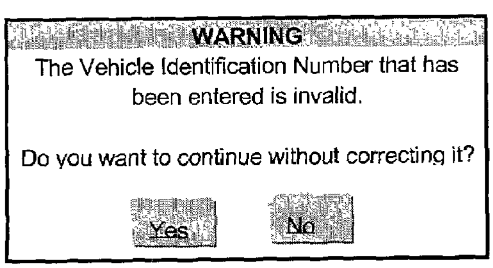

When the operator clicks on YES button, the VIN Exc field should be set to a 'Y' and they should be able to continue on.
If they click on the NO button, the VIN Exc field should be set to a 'N' and they should be brought back to the Vehicle Identification Number field so they can correct the number.

PAGE BUTTONS

Continue: (Alt + C)
The CONTINUE button should display and is active at all times. If CONTINUE is clicked or Entered on than any data that was keyed, changed or defaulted should be saved.

Pressing the CONTINUE button should move the operator to the TRMR (if applicable) or the Coverage Schedule (if applicable) or the Forms screen.

SCREEN TABBING ORDER

Initial Cursor Position

Default Button on ENTER
The CONTINUE button should be the default button for the ENTER key.

Tab Sequence Throughout Screen
Tabbing sequence should start on the first question on the screen. Then follow the order shown below:
1.) Have any certificates of Insurance been made for this policy
2.) Should a Cession notice be sent (If Mass Ceded policy)
3.) Federal Employers Identification Number (If LA or NV policy)
4.) What city should be used to derive the county town code. (If applicable state)
5) Vehicle Issue Information – Grid.
5A.) Vehicle Identification Number
5B.) State Registered
5C) Registration Info – ellipse button (if applicable state)
6) Continue Button
Then loop around starting at the top.

ISSUES

ISSUE ITEM
1) A question – 'Filing Data Required'. This is a Yes / No question. If Yes is answered than another screen is brought up, where filing information is entered. The actual filings are not made, this is just a screen where we capture the filing numbers so the operator will know what filings have been made.

Forms Screen – Auto Issue
PAGE PROMPTS / FIELDS

Prompt Name: Form Number

Initial Display

The 'Form Number' prompt is the first column heading in the forms grid. The column is initially populated with form numbers derived through RAPID II, as well as the Named Insured endorsement or freeform manuscript endorsements. A subsequent display of the screen may include form numbers added by the operator not initially included on the list.

Prompt Type / Length

Prompt type is a display box as part of a grid. Length of box should be 14 characters, which would accommodate the full form number including the spaces between every two characters for most automobile forms. This is how the data is stored and how it should be presented for Automobile. Some of the automobile forms are smaller in length than 14. For these forms they should be brought back as they are stored.

Protection

Yes, both the column heading and the form number (display box) should be protected.

Available Inputs

No direct input into the cell itself. The operator may choose 'Add Form' button to add optional forms to the grid.

Changes Allowed

No, except that an operator can delete a row from the grid provided that the form is an operator added form. The operator may also add a form and create an extra row in the grid. Also, if add manuscript is chosen, a row should be added to the grid and the appropriate form number should be input (CA T8 0? MM YY).

Required / Optional

Required

Functional Notes

Prompt Text Help

Prompt Name: Form Name

Initial Display

'Form Name' is the second column heading in the forms grid. The column is initially populated with form names for the derived forms. A subsequent display of the screen may include form numbers added by the operator not initially included on the list.

Prompt Type / Length

Display Box (as part of the grid). Length of 50 characters.

Protection

Yes

Available Inputs

None

Changes Allowed

No, except that an operator can delete a row from the grid provided that the form is an operator added form. The operator may also add a form and create an extra row in the grid. Also, if 'add manuscript' is chosen, a row should be added to the grid with the form name of 'Manuscript Endorsement' for the initial view.

Required / Optional

Required

Functional Notes

Note: Master Pac brings back 25 bytes for Form Name. Question brought up to allow 50.

VA – not all the titles show on the 863 table.

Prompt Text Help

Prompt Name: Optional

---

Initial Display

'Optional' is the third column heading in the forms grid. The display boxes below the column heading should initially be set with all 'N's, except for any election forms or the Named Insured endorsement that was chosen prior to accessing this screen. A subsequent display of the screen may identify that the operator has added forms. This is denoted when the 'Optional' Indicator equals 'Y'

Prompt Type / Length

Display Box (as part of the grid). Same length requirements as Master Pac in order to fit onto viewable real estate, without having to scroll left to right.

Protection

Yes

Available Inputs

There is no direct input into the 'Optional' cell itself.

Displayed values are 'Y' or 'N'.

Changes Allowed

Not directly into the cell. The indicator is set through other actions.

Required / Optional

Required

Functional Notes

Prompt Text Help

Prompt Name: Fill-In Required

Initial Display

'Fill-In Required' is the 4th column heading in the forms grid. The column is initially sorted so that forms with 'Fill-In Required' Indicators set to 'Y' are sorted first in the column, followed by forms that have their 'Fill-In Required' Indicators set to 'N'. This is independent of any column sorting/filtering the operator may elect to perform after the screen is initialized. As a second sort by the facet, forms should be sorted by 'Fill-In Complete' Indicators set to 'N' and finally, alphabetically by form number. Please note that it is possible that all Fill-In Required Indicators could be set to 'N' upon initialization of the screen. If this is the case, the facet should sort alphabetically by form number.

Prompt Type / Length

Follow Master Pac standards.

Protection

Yes

Available Inputs

There is no direct input allowed.

Displayed values are 'Y' or 'N'.

Changes Allowed

No

Required / Optional

Yes

Functional Notes

Prompt Text Help

Prompt Name: Fill-In Complete

Initial Display

Fill-In Complete is the final heading in the grid. The column is used to identify forms whose Fill-In Required Indicators equal 'Y' have successfully been completed by the operator. The column could include a mixture of possible values of Y, N, or N/A. Where Fill-In Required = 'Y', Fill-In Complete will always equal either 'Y' or 'N'. Where Fill-In Required = 'N', the only value associated with Fill-In Complete should be N/A. For side-door forms, the Fill-In Complete is set to 'Y' when all mandatory occurrences (as defined in the side-door database) have been satisfied. The Fill-In Complete Indicator for manuscript endorsements can be set to 'Y' when at least one alphanumeric character is keyed on a line within the data collection window.

Prompt Type / Length

Same length requirements as Master Pac in order to fit onto viewable real estate, without having to scroll left to right.

Protection

Yes

Available Inputs

There is no direct input from the operator.
Applicable display values:
If 'Fill-in Required' = Y, applicable display values are Y or N.
If 'Fill-in Required' = N, applicable display value is N/A.

Changes Allowed

No changes allowed directly by the operator into the cell itself. Changes are accomplished through other actions.

Required / Optional

Required

Functional Notes

Prompt Text Help

Prompt Name: Totals

Initial Display

The Totals row hangs off the grid, specifically under the columns of Fill-In Required and Fill-In Complete. It should identify the number of fill-ins that are required and the number of fill-ins that are complete. Both of these numbers could change, and could either increase or decrease, depending on action taken by the operator. If possible, the operator should be able to see the Fill-In Complete total change depending on their action, while still on the screen.

Prompt Type / Length

Follow Master Pac standards

Protection

Yes

Available Inputs

Numeric value representing a total. Zero (0) is a valid value.

Changes Allowed

Not directly by the operator

Required / Optional

Required

Functional Notes

Prompt Text Help

Side Door / Fill-In Data Collection Window:

This window is simply used to collect side-door and fill-in information and is titled 'Fill-In Information'. The window is scrollable. The cursor should initially be positioned in the first prompt for the form. The operator should be able to tab from prompt to prompt and the window should automatically scroll as necessary. The event PROD UNDRW INIT FILL-IN DATA should get information stored on the side-door database needed for side-door data collection including: Row Type, Prompt Length, Field Characteristic (if Row Type = F), Field Type, Special Values when appropriate, Total Occurrences, Form Occurrences, and Mandatory/Required Fields. Form Occurrences will be used to display 'X' number of blocks and to display the 'Additional Occurrence' button when the number of Form Occurrences does not equal the Total Occurrences. Saves should be performed with the selection of an 'Additional Occurrence'..

When the operator selects the next row from the grid that requires fill-in, data should automatically be saved from the prior form. Additionally, a save should occur on the CONTINUE, ADD FORM, ADDITIONAL OCCURRENCE and ADD MANUSCRIPT as well.

Buttons:

Restore/Maximize Button (+ / -) – The restore/maximize button should allow the operator to work on side-door/fill-in data collection in a full-screen mode or to restore the window back to its initial display if in full-screen mode. The plus sign (+) should show when the window is minimized and the minus sign (-) should show when the window is maximized.

Additional Occurrence – The 'Additional Occurrence' button allows the operator to request an additional occurrence of a block. Side-Door stores the maximum and should be utilized to disable the button when the maximum number has been reached.

Delete Selected Occurrence – When the cursor is positioned within any field that is part of a block, the 'Delete Selected Occurrence' button should be enabled. Clicking on this button should delete the block information and collapse the form so that the occurrence (including the prompts) no longer appears. The 'Delete Selected Occurrence' button should only appear when there is more than one repeating block on the screen, if at least one block is defined as mandatory. Otherwise, if all blocks are not mandatory, the button may appear all the time. Any block should be able to be deleted provided that if side-door requires at least one block to be mandatory, that there is at least one complete block of information when the "mandatory information missing" edits are invoked.

Note: Operators should also be able to delete lines within a block by "blocking" text and hitting the delete button on their keyboard. Again, edits should be invoked if at least one complete block of information is mandatory for the form, and that is not found to exist.

We will also need a way to visibly identify repeating blocks. As such, separate repeating blocks with lines.

When the button is clicked a Warning Message should be displayed as follows with YES and NO buttons shown:

Are you sure you want to delete this block of data?

Manuscript Endorsements:

Manuscript Forms are considered fill-in forms, and are not side-door forms. Data collection for a manuscript form is completely free form and there are no prompts associated with these types of forms, with the exception of the first line. The first line of the form is used to capture the Form Name. Additionally, at least one alpha numeric character is required in any entry box other than the "Form Name". "Form Name" itself is a required field. If possible, on a save the form title keyed by the operator should be returned and be visible from the forms grid as part of the form name.

Manuscript Endorsements are also derived by adding Freeform Coverage during the quote process. The appropriate derived form number, the form name of what was typed in the 'Title' field during quote process, the Optional column should be set to 'N', fill-in required column should be 'Y' and fill-in complete column should be 'N' should be shown in the forms list.

The length of the 'Form Name" entry box should allow 50 alpha-numeric characters. The entry boxes for the free form text should allow 45 rows of 60 characters. Rapid 2 allows more than this but for now we will limit to make consistent with the number of rows captured for Master Pac.
(awaiting a one shot to verify that 45 rows are sufficient.)

Note: Not sure if we can have the Optional column set to 'N' for the manuscript endorsements added because of freeform coverage in quote and have it set to 'Y' if the manuscript was added by pressing the button on the forms screen.

Manuscript Endorsement List
The 'Manuscript Endorsement List' should display when the operator clicks on the 'Add Manuscript' button. The window should be headed with the wording 'Manuscript Endorsement List' and hard coded wording should display directly under this window title that states: Please input the number of manuscripts needed for each line. The window will display the following prompts in the order listed below. These prompts represent line designations. To the right of each of these line designations should be entry boxes.

Automobile ▼
Interline ▼

Prompts / Displays
The line designation prompts should all be single drops. There's a total of 15 CA's and 10 IL's that the operator can select. Of the total 15 CA's, 00 should be used for the named insured endorsement, 01, 02, 03 should be used for premium manuscript endorsements and 04 – 15 should be used for any operator added manuscript endorsements.

Manuscript Form Numbers:
The table below illustrates how the numbering should be controlled for manuscript endorsements. Today, in the native system, the operator controls the numbering and can start with any number provided subsequent endorsements are added sequentially. For the Net, we will control the numbering.

| | Automobile | Interline |
|---|---|---|
| 1st two characters | Always 'CA' | Always 'IL' |

| | | |
|---|---|---|
| 2nd two characters | Always 'T8" | Always 'T8' |
| 3rd two characters | '04' if number of Operator Added 'CAT8's' equals 1, '05' if number of Operator Added 'CAT8's' equals 2, etc. | '00' if number of Operator Added 'ILT8's' equals 1, '01' if number of Operator Added 'ILT8's' equals 2, etc. |
| Note : Named Ins'd endt s/b CA T8 '00', the 3 PBE's should be CA T8 01, 02, & 03, then any non-premium manuscripts starting with CA will be '04' through '15'. | | |
| Next two characters | Always the effective month of the policy | |
| Final two characters | Always the effective year of the policy | |

Buttons:
OK (ALT + O) – The OK button accepts the number of manuscripts selected by line and adds that number of rows to the forms grid and returns the operator to the 'Forms Screen'. The cursor should be positioned in the 'Side-Door/Fill-In Data Collection' window for the first occurrence of a manuscript if multiples were added.

Cancel (ALT + C) – The Cancel button simply closes the window without making any updates to the quote and/or grid.

NAMED INSURED OVERFLOW ENDORSEMENT

Derivations:
The host will need the following in order to derive CA T8 00, the Named Insured endorsement. If the named insured modal window exceeds 2 rows
then
perform CA T8 00 Derivation and Reformat Named Insured.

Title:
The wording 'Named Insured Endorsement' should be passed to the host and inserted on the 'Coverage' field.

Endorsement Number:
CA T8 00 MM YY (Use the Month & Year that the policy is effective) should be sent back to the endorsement number field.

CA T8 00 Derivation:
In the Host show under ENTER DOCUMENT DATA show:
Row 01: The Named Insured is amended to read:
Row 02: (row 01 of Named Insured Modal)(row 02 of Named Insured Modal)
Row 03: (row 03 of Named Insured Modal)(row 04 of Named Insured Modal)
Continue on sequentially from here until all rows are pulled Reformat Named Insured:
Row 02 - Named Insured: and as per "CA T8 00".

MODAL WINDOWS

None

PAGE BUTTONS – FORMS SCREEN

Add Form: (alt-A)
The 'Add Form' button displays and is active at all times. Use of this button saves the current list of forms and brings the operator to the 'Optional Forms List' screen.

Delete Optional Form (alt D):
Operators are able to select a row within the 'Forms Grid' using the 'nub' on the left-hand side of the grid. If the 'Operator Added' Indicator equals 'Y', enable the 'Delete Added Form' button. The operator may then click on the 'Delete Added Form' button, and provided the 'Operator Added' Indicator equals 'Y', the row should be deleted in its entirety. A blank row should not remain in the grid, and the grid should be compressed.

Add Manuscript (alt-M):
The 'Add Manuscript' button allows operators to request a given number of manuscript endorsements by line. As with 'Add Form' an edit may occur when the maximum number of manuscript endorsements has been added to the policy. There is a maximum of 15 CA forms and 10 IL forms.

Continue: (alt-C)
The Continue button displays and is active at all times. Use of this button brings the operator to the Direct Bill screen, saving the forms data.

Note: An operator should be able to move to the next screen by selecting Continue, though all fill-in forms may not be complete. The consistency check should handle checking to see where all forms with a 'Fill-In Required' indicator = Y, also have the 'Fill-In Complete' indicator also equal to 'Y'.

SCREEN TABBING ORDER – FORMS

Initial Cursor Position
The cursor should be placed on the first field within the fill-in data collection window of the first fill-in form. If there are no forms that require fill-in, default the cursor to the Continue button.

Tab Sequence Throughout Screen

Fill-in Data Collection Window

Tabbing should occur within the fill-in data collection window and move the cursor from prompt to prompt within the window and the window should automatically scroll. It should not be necessary for the operator to have to scroll unless they want to review previously keyed information in that manner. When all prompts for this first fill-in form have been completed, tabbing should occur as follows:

Additional Occurrence button (if applicable):
Tabbing should continue to loop through the screen, starting at the top of the tabbing sequence.

1. Grid

To the next occurrence of a form that has the Fill-In Complete Indicator set to 'N'. Row should not be highlighted in this instance. User has to click on the row to refresh the fill-in window below*. If all forms have their Fill-In Complete Indicator set to 'Y', move directly to the Add Form button.
Add Form button
Delete Added Form button
Add Manuscript button
Continue button
Tabbing should continue to loop through the screen, starting at the top of the tabbing sequence.

*If another fill-in form is highlighted from the grid, position the cursor in the first prompt of the form and start the process all over again.

Default Button on Enter

The Continue button should be the default.

Optional Forms List

SCREEN OVERVIEW

Screen Purpose:
The purpose of this screen is to allow the operator to add forms to the policy. The operator may add a form by selecting from a list of optional forms presented in a grid. The operator may also search for a form on the list by form name (fuzzy search) or form number.

Initial Screen Display
The screen initially displays showing a list of only optional forms in a grid. The grid is static in its display of 9 rows. If there are more than 9 forms to display, the grid should scroll so that all forms attached to the policy can be reviewed. The grid also contains a 'nub' on the left where the operator can select a form to add to the policy.

The following optional forms must be filtered out of this optional forms list:
- Forms not applicable to the states on the policy.
- Form versions that have been replaced by new versions
- New versions of forms that have not been approved in the states on the policy

Screen Features
This screen offers the ability to view a list of optional forms by 'Form Number' and 'Form Name' presented in a grid format. As mentioned above, the operator may perform a search for a form by using a partial form name or number. Once the search is performed (operator clicks on 'Search' button), the operator may then select the applicable form from the grid by highlighting the row using the 'nub' to the left of the grid, and clicking on the 'Add Selected Form' button.

The operator may also key in the form number and edition date and click on the ADD FORM button. This assumes the operator knows the number and edition date of the form. Any form, could be added if the form number and edition date are known.

Cross-Screen Impacts:
Forms added from this screen must be added to the grid on the Forms screen. Note that only one form may be added at a time. If the form being added requires fill-in information, then either 'Add Form' or 'Add Selected Form' should position the user in the first prompt of the fill-in data collection window. Else, the cursor should be positioned on the 'Continue' button on the main Forms screen.

Editing may occur based on state approval of a form. This should be an intra-screen edit on the 'Add'. Also note "conflict forms" could produce an error. See discussion under "Error Messages".

PAGE PROMPTS / FIELDS

Prompt Name: Form Name (Partial):

Initial Display
The initial display of 'Form Name' is Blank.

Prompt Type / Length
Entry Box, allowing 30 bytes maximum and 4 bytes minimum.

Protection
No

Available Inputs

Free form to accommodate any alpha numeric. Note that the fuzzy search is against the name, not the number. We need to accommodate alpha numeric as form names may contain numeric values. The search should be a combined search to search on all words keyed as a collective whole.

Changes Allowed

Yes

Required / Optional

Optional

Functional Notes

In conjunction with the 'Search' button, input into this field creates a search of the applicable optional forms. The results of the search will display in the grid. Forms not meeting the search criteria will not display. The operator can either choose to use the 'Add Selected Form' button to add forms to the policy or use the 'Cancel' button to return to the original optional forms list or perform another Search.

Help Text

FORM NAME – To search for a optional form by name, input part of the Form Name. A minimum of 4 characters is needed to search. The maximum number of letters that can be input is 30. If you can not find the form you are searching for try another form of the word. Example: Try 'EXCL' if this doesn't bring back the expected results, try 'EXCLUSION'.

Prompt Name: Form Number [search]

Initial Display

The initial display of 'Form Number' is Blank.

Prompt Type / Length

Combo box, maximum of 6 bytes, minimum of 2 bytes.

Protection

No

Available Inputs

Alphanumeric field

A drop down should include the word 'ALL" to allow the operator to refresh the screen and bring back all of the applicable optional forms for their policy.

Changes Allowed

Yes

Required / Optional

Optional

Functional Notes

In conjunction with the 'Search' button, input into this field creates a search results list to display in the grid. No other forms display at this time other than those meeting the search criteria. The operator can either choose to use the 'Add Selected Form' button to add forms to the policy or use the 'Cancel' button to return to the original optional forms list or do another Search. By including the word 'ALL' in a drop down it will allow the operator to refresh the screen and bring back all of the applicable optional forms for their policy.

If no forms match the search criteria bring up the FORM NOT FOUND – PLEASE SEARCH AGAIN.

(Refer to Informational Message documentation.)

Help Text

FORM NUMBER – To search for an optional form by number, input a minimum of 2 characters of the form number you wish to search. There is no need to type spaces in between the characters. Example: You known that you form start with 'CA99', so input this and click on the Search button. All of the applicable forms starting with CA99 will be displayed in the forms list. To bring back all of the applicable optional forms for your policy, select ALL from the drop down and click on the Search button.

OPTIONAL FORMS GRID:

Grid Column Header: Form Number

---

Initial Display

The 'Form Number' prompt is the first column heading in the Optional Forms grid. The column is initially populated with a list of optional forms using the forms filter previously noted.

Prompt Type / Length 10 characters, display box (as part of the grid)

Protection

Yes

Available Inputs

None. The operator may choose 'Add Selected Form' button to add forms to the grid on the main Forms screen.

Changes Allowed
No

Required / Optional
Required

Functional Notes

Prompt Text Help

Grid Column Header: Form Name

Initial Display
'Form Name' is the second column heading in the Optional Forms grid. The column is populated with shortened names of optional forms derived through RAPID 2.

Prompt Type / Length
Display Box (as part of the grid). Same length requirements as Master Pac in order to fit onto viewable real estate, without having to scroll left to right.

Protection
Yes

Available Inputs
None

Changes Allowed
No

Required / Optional
Required

Functional Notes

Prompt Text Help

ADD A FORM: (IF NUMBER AND EDITION DATE ARE KNOWN)
Number:

Initial Display
The 'Number' prompt is blank upon initial display

Prompt Type / Length
Entry box, 6 bytes

Protection
No

Available Inputs
Should be in the following format: LN1234, no spaces. These values are represented in the table below. Error if not in this format OR if form number and/or edition date is not valid, OR if form is not approved for the state. This error is triggered off the add when user clicks on 'Add Form' button. See Error Messaging for details.

| | |
|---|---|
| XX | 2 character alpha typically designating the line code |
| XY | Part of the form number |
| YY | Part of the form number |

Changes Allowed
Yes

Required / Optional
Optional, but required if 'Edition Date' is keyed. Don't enable 'Add Form' button until both Number and Edition date has been entered.

Functional Notes

Prompt Text Help

Edition Date (MMYY):

Initial Display
Initial display is Blank.

Prompt Type / Length
Entry Box, 4 bytes

Protection
No

Available Inputs
MMYY, where MM = month and YY = year

Changes Allowed
Yes

Required / Optional

Optional, but required if 'Number' is keyed. Don't enable the 'Add Form' button until both Number and Edition Date have been keyed.

Functional Notes

Prompt Text Help

PAGE BUTTONS – OPTIONAL FORMS LIST

Search: (alt-S):
The 'Search' button is enabled when search criteria is keyed into the 'Form Name (Partial)' or 'Form Number (Partial)' prompts. The 'Search' button performs the search only on the optional forms listed in the grid. The search results list displays in the grid. No other forms display at this time.

Add Selected Form (alt-F):
The 'Add Selected Form' button is enabled when a row is selected from the 'nub' within the optional forms grid. This button adds the form to the quote and to the grid on the main Form's screen. If the form being added is a fill-in form, then clicking on the 'add' should position the cursor within the fill-in data collection window on the Forms screen, on the first prompt that needs data to be keyed by the operator. Else, position the cursor on the 'Continue' button.

More Forms (alt M)
The 'More Forms' button brings back 'X' additional occurrence of optional forms. Upon an initial search, if all forms cannot be returned based on the search criteria, highlight the MORE FORMS button so that the operator is aware that there are more forms. If all optional forms can be returned in one trip, disable the MORE FORMS button.

Cancel (alt C):
The 'Cancel Button' returns the operator to the main Forms screen without any optional forms being added.

Add Form (alt A):
The 'Add Form' button adds the form to the quote and to the forms grid (prior screen). It is enabled when both Number and Edition Date have been keyed in by the operator. If the form being added is a side-door form, then clicking on the 'add' should position the cursor within the side-door data collection window, on the first prompt that needs data to be keyed by the operator. Else, position the cursor on the CONTINUE button.

SCREEN TABBING ORDER – OPTIONAL FORMS

Initial Cursor Position
The Form Name (Partial) field

Tab Sequence Throughout Screen

Tabbing should occur throughout the prompts in this order:

1. Form Name (Partial)
2. Form Number (Partial)
3. Search button
4. 'Nub' - row 1 of grid
5. 'Nub' – subsequent rows of grid
6. Add Selected Form
7. Cancel Then loop around starting at the Form Name (partial).

Default Button on Enter

The 'Continue' button should be the default.

INFORMATIONAL MESSAGES

FORM NOT FOUND – PLEASE SEARCH AGAIN

This message occurs when an operator is performing a search on the 'Optional' Forms Screen and nothing was returned that matched the search criteria keyed.

ERROR MESSAGES

Rapid 2 does not edit optional forms by state. The operator can add any optional form.

FORM NUMBER AND/OR EDITION DATE IS NOT VALID. PLEASE VERIFY.

This edit occurs if the form number is not found on the Auto State Approval Table (?). This error is triggered when the user clicks on 'Add Form' button from the Optional Forms List Screen.

FORM CANNOT BE ADDED BECAUSE THE MAXIMUM NUMBER OF OPTIONAL FORMS (60) ALREADY EXISTS

Host edit occurs when an operator clicks on the 'Add Form' button and 60 optional forms already exist on the policy and the operator is trying to add the 61st form.

FORM CANNOT BE ADDED BECAUSE THE TOTAL NUMBER OF FORMS (225) HAS BEEN REACHED.

Host edit occurs when an operator clicks on the 'Add Form' button and the total number of 225 forms has been reached on the policy and the operator is trying to add the 226th form.

MANUSCRIPT FORM CANNOT BE ADDED BECAUSE THE MAXIMUM NUMBER OF MANUSCRIPT FORMS HAS BEEN REACHED.

Host edit occurs when an operator clicks on the 'OK' button and there are 50 premium manuscript endorsements or 50 non-premium manuscript endorsements.

We are limiting the total number of premium endorsements to 3 and non-premium endorsements to 12 CA's or 10 IL's. We'll not reach the host edit in this instance. We'll need a IENET edit to occur when they try to ad a 16th CA manuscript endorsement or the 11th IL manuscript endorsement. Edit could potentially occur when the operator clicks on 'Add Manuscript' button as well and the maximum has been exceeded.

<u>THIS FORM CANNOT BE ADDED BECAUSE "XX XX XX XX XX" ALREADY EXISTS ON THE POLICY.</u>
This edit displays when the operator attempts to add an optional form that was previously added using the 'Add Selected Form' button from the Optional Forms List Screen.

Umbrella Issue - Final Issue Screen

PROMPTS / FIELDS

*Prompt Name: Insuring Company*

Initial Display
The full name of the insuring company is dispalyed and cannot be changed by the operator. I imagine there will be a touchpoint to the legacy system to get the insuring company, however, the rules are outlined below under 'Available Inputs' if needed.

Prompt Type
N/A – Display only

Protection
Yes

Available Inputs
Travelers of Illinois if the situs state is California, Georgia, or Louisiana
Travelers Indemnity of Connecticut, if the situs state is Texas
Travelers Indemnity Company for all other states Changes Allowed
No.

Required / Optional
N/A

Functional Notes

Prompt Text Help
(?) – INSURING COMPANY:

*Prompt Name: Should this policy be automatically renewed?*

Initial Display
This question appears only for Home Office and Field employees. Agents will not be asked this question. If an agent is processing business, it should be assumed that the policy is to be automatically renewed. If a renewal stop (watch file) needs to be placed on the policy, it will need to be processed by a TIC employee.

The initial display of the screen should default the question of 'Should this policy be automatically renewed?' with a 'Yes' answer. The options will be 'Yes and 'No' and will be in the form of radio buttons. The 'Yes' answer will always be the default value. Some translation will need to be done with the 'No' answer and is explained in detail below. Note: answering 'No' to this question creates a referral condition and prevents agents from fully issuing a renewal.

Prompt Type
Radio Buttons

Protection
No

Available Inputs
'Yes' or 'No'

Changes Allowed
Yes

Required / Optional
Required

Functional Notes
Issue Express offers 'Watch File' selections which we will not be incorporating into the Net. The values that Issue Express offers today are O, W, X, Y, Z, and C. These codes basically serve the same purpose in that they all prevent a policy from going through the automatic renewal process and stop the policy at the end of its term. There is more business meaning attached to these codes than there probably should be. Because each office has different business interpretations as to what each of these codes should mean, it is difficult to determine exactly what the text description contained in a drop down for 'Watch File' should be. We will recommend instead that operators send a memo to file when using a watch file in the Net to identify reasons as to why this policy should be stopped upon renewal.

Translation
For TIC employees, translation will be made so that a 'Yes' answer to the question 'Should this policy be automatically renewed' will set 'Watch File' on the PIF to '0'. A 'No' answer to this question will set 'Watch File' to 'W'.

If an Agent is processing, then the map and translate process should have stored a '0' under Watch File in the legacy system.

Consideration will need to be made for retrievals in terms of either deleting an existing 'Watch File' or translating it upon retrieval into the Net. This, however, will be addressed at a later date.

Prompt Text Help (?) – WILL THIS POLICY BE AUTOMATICALLY RENEWED?: If there is an underwriting reason to prevent the policy from going through the automatic renewal process, answer Yes to prevent the policy from being automatically renewed next term.

*Prompt Name: Is this Policy Part of a Book Roll-Over?:*

Initial Display

This question will initially default as No.

Prompt Type

Radio buttons

Protection

Unprotected

Available Inputs

Yes or No

Changes Allowed

Yes.

Required / Optional

Required

Functional Notes

NOTE. Instead of creating a new field for book roll-over, Actuarial is adding additional values to the reinsurance field for all lines. 'B' indicates a book roll-over and no reinsurance. 'C' indicates both a book roll-over and reinsurance. The issue systems have already made the change to allow any value for the reinsurance question.

Julie and Marsha would like us to have two separate questions in the IENet for all lines:

Will this policy be reinsured? Yes/No

Is this policy part of a book roll-over? Yes/No

Combinations of these two questions should be mapped to the converted value column as shown below;

| Reinsurance | Book roll-over | Converted to value in Reinsurance Ind |
|---|---|---|
| Y | Y | C (new) |
| Y | N | Y |
| N | Y | B |
| N | N | N |

*It should be assumed that the answer to the reinsurance questions is No. So the map and translate would only get a 'B' or an 'N'

Prompt Text Help
(?) – IS THIS POLICY PART OF A BOOK ROLL-OVER?: Answer the question as YES if this policy is part of a book roll-over. The answer to this question will be used for statistical reporting only.

*Mail Directly to Agent: (ALT+M)*

Initial Display
This field displays defaulted to YES for all reporting offices except 700 and 02Y. For reporting offices 700 and 02Y, default this prompt to NO. This is the current default process that Issue Express provides today.

Prompt Type / Length
Yes / No radio button.

Protection
This field is always unprotected and can be changed.

Available Inputs
YES / NO radio button

Changes Allowed
Changes are allowed on this prompt.

Required / Optional
Selection of either Yes or No is required.

Functional Notes
Regardless of reporting office, if the defaulted answer is changed by the operator, the value should be saved on a subsequent redisplay of the screen.

Prompt Text Help
(?) – MAIL DIRECTLY TO AGENCY?:

*"Send Select Office Copy to": (ALT+O)*

Initial Display
The "Send Select Office Copy to" displays defaulted. Content is the office code.

Prompt Type / Length

This is an Entry Box which displays defaulted. Field should contain the three digit office code.

Protection
This field is unprotected and can be changed by the operator to a valid office code.

Available Inputs
All of the valid reporting office codes and service centers. Note that '308' is a valid input and stops the print of the policy paper.

Changes Allowed
Changes can be made to this field.

Required / Optional
A valid office code is required in this field.

Functional Notes

Prompt Text Help
(?) – SEND SELECT OFFICE COPY TO:

*"Send Service Center Copy to": (ALT+C)*

Initial Display
The "Send Service Center Copy to" displays defaulted. Content is the office code.

Prompt Type / Length
This is an Entry Box which displays defaulted. Field should contain the three digit office code.

Protection
This field is unprotected and can be changed by the operator to a valid office code.

Available Inputs
All of the valid reporting office codes / service centers. Note that '308' is a valid input and stops the print of the policy paper.

Changes Allowed
Changes can be made to this field.

Required / Optional
A valid office code is required in this field.

Functional Notes

Prompt Text Help
(?) – SEND SERVICE CENTER COPY TO:

*Agency Insured's ID (used for Download): (ALT+A)*

Initial Display
This field initially displays blank.

Prompt Type / Length
Up to 30 Characters.

Protection
This field is unprotected.

Available Inputs

Changes Allowed
Changes are allowed in this field.

Required / Optional
Input (up to 30 Characters) is optional

Functional Notes

Prompt Text Help
(?) – AGENCY INSURED'S ID:

MODAL WINDOWS

Window Name / Purpose
None needed.

PAGE BUTTONS

Save and Return to Account Summary (ALT+S)
The Save and Return to Account Summary button is used to reject the full issuance of the policy. The screen will be edited to validate the "Send Select Office Copy to" and "Send Service Center Copy to" displayed or changed on this screen. Clicking this button will save the data captured on this screen and returns the operator to the Account Summary screen.

Issue (ALT+I):
The Issue button launches re-rating, authority checks, consistency checks and then commits the policy to full issuance. The screen will be edited to validate the "Send Select Office Copy to" and "Send Service Center Copy to" displayed or changed on this screen. Policy re-rating and full issuance will be kicked off when leaving this page.

After Issue is chosen, the operator will be returned to the Account Summary screen.

SCREEN TABBING ORDER

*Initial Cursor Position*
Whenever the screen is accessed, focus should be on the Issue button.

Default Button on ENTER
ISSUE button

Tab Sequence Throughout Screen
On initial display of the screen, focus should be placed on the Issue button. Then, tab through the screen in the following order. Note that tabbing through the radio button questions should not change either the defaulted or operator selected answer.

22. Issue button
23. 'Should this policy be automatically renewed?'
24. 'Is this policy part of a book roll-over?'
25. "Mail Directly to Agent"
26. "Send Select Office Copy to"
27. "Send Service Center Copy to"
28. "Agency Insured's ID"
29. Save and Return to Account Summary button
30. Issue button then continue to loop through the screen

WARNING MESSAGES

WARNING MESSAGE SCREEN NAME

ERROR MESSAGING

On issuance from this screen, consistency checks are performed and any host issue errors are determined. These messages must be presented to the operator.

ERROR MESSAGE NAME
Error if 'Select' or 'Service' answers are not valid send offices, '308' exception logic aside.

ISSUES

ISSUE ITEM

ADDITIONAL POSSIBLE FEATURES

7. Provide the actual name of the office in addition to the office code.
8. Suppress the displays of the Select Office and Service Center when the Mail Direct is NO. As a result, capture a new item called "Send Paper to." Construct this to standardize the Line of business variety in the office codes used when Mail to Agent is NO.
9. Create an ability to view / change the number of copies printed. Plus add the capability to address who's attention the copies should be sent to.

POLICY INFORMATION SCREEN – AUTO QUOTE

PROMPTS / FIELDS

Legal Entity: (ALT + L)

Initial Display

The Legal Entity displays prefilled to the value held at the submission level.

Prompt Type / Length

Dropdown listing will be available. The drop down box will consist of the following options; Corporation, Individual, Partnership, Joint Venture or Other. If Other is selected then another text box will be shown for the description of other. The field length for Other description is 20 characters.

Protection

Field is unprotected

Available Inputs

One of the choices from the drop down box must be selected. Blank is NOT allowed. (Same as the Submission level and Master Pac Information choices).

Changes Allowed

Changes can be made. If a change is made to the legal entity, the revised selection will not be passed back up to the submission level and will not update the Master Pac Policy Information screen.

Required / Optional

This is a required field.

Functional Notes

On re-displays of the screen, the Legal Entity is the value as last held at the Auto policy level and is not refreshed from the submission level.

Based on legal entity chosen, an informational example of the Named Insured input convention displays. If the legal entity is changed, the informational message will also be updated.

If Other was selected then the description will stay on the screen. The information message for the Named Insured will not display on the screen if Other is the Legal entity chosen.

Prompt Help Text

LEGAL ENTITY – The Legal Entity will prefill based on what was input on the Common Information screen. If the legal entity needs to be changed for a particular policy, click on the drop down arrow to select which legal entity describes this policy.

Please Note: As you change the legal entity, the 'Key as' information on the right hand side of the screen will change based on the naming conventions for that Legal Entity.

Named Insured: (ALT+N)

Initial Display
The Named Insured displays prefilled and unprotected with the text held at the submission level.

Prompt Type / Length
Rapid 2 field length is 30 characters of 2 lines. Changed Named Insured: prompt type will be an entry box, 30 characters exactly. An ellipse button (...) to the right of the entry box should open a modal window. See section on 'Modal Window" for details.

Protection
Field is unprotected at all times.

Available Inputs
Field contains freeform text, which is keyed by the operator.

Changes Allowed
If a change is made to the name at the Auto policy level, the revised text will not be passed back up to the submission level or the Master Pac policy level but will only be saved as part of the Automobile database.

Required / Optional
This is a required field

Functional Notes
On re-displays of the screen, the Named Insured will prefill with the text as last saved in Automobile.

Use same length standard (for the total amount of actual long name) as Master Pac.

Prompt Help Text
NAMED INSURED – The Named Insured will default from the Account Common Information screen. If changes need to be made, overtype with the correct legal Named Insured for this policy. In contrast to the Common Information screen, you have more than one line of space to input the Named Insured. Press the ellipse button to bring up a window, which will allow you to type the entire Named Insured.

If the Named Insured is longer than 2 lines, the "Named Insured" endorsement "CA T8 00" will be automatically generated. The information from the pop-up window will be filled into the form. Although not visible on the screen, the Policy Declarations page will fill with the first line from the window and the second line will contain the wording 'And As Per CA T8 00'.

When you have competed the named insured information in the pop-up window, click on DONE to save. If CANCEL is clicked, no changes to the policy information will be saved.

Policy Number: (NO ALT Key assigned)

Initial Display
On initial display of the screen, the Policy Number field is blank and protected.

Prompt Type / Length
Informational display. Not a defined input field. Follow Policy Number Format 'standard.' Show the policy form then a hyphen followed by the policy number.

Protection
Field is always protected. (Field will be unprotected for Home Office IDs)

Available Inputs
No input allowed. (Input can be made by Home Office IDs only on the initial display of the screen.)

Changes Allowed
No changes to field allowed. (A policy number can be input on the initial display of the screen by Home Office IDs only.)

Required / Optional
The field is required but derivation is automatic, so no input is necessary.

Functional Notes
Once CONTINUE has been chosen, a Policy Number and Policy Form (810 or 650) are derived. On subsequent displays of the screen, the derived form and policy number displays. The display is in the form of 810 - 123X4567 for all states except Virginia. For Virginia the display is 650 – 123X5678

Like Master Pac, the Policy Form and Policy Number are protected and not changeable but are required.

For Home Office IDs, they can only input a policy number on the initial display of the screen. Once the screen has been saved, changes will no longer be allowed.

Out of scope; Texas, NIPPON, Garage, Truckers.

Prompt Help Text

POLICY NUMBER – The Policy Number will initially be blank. Once you press the Continue button a policy number will be automatically assigned to this policy. On re-visit to the Policy Information screen, the policy number will be prefilled and protected.

The policy number also appears as part of the Account Summary screen.

Mailing Address: (ALT+M)

Initial Display

The Policy Mailing Address displays as two lines of text and displays prefilled and unprotected with the text from the submission level.

Prompt Type / Length

Freeform text keyed by operator into text field.

Rapid 2 allows 2 lines – 30 characters.

Protection

This field is unprotected.

Available Inputs

Field contains freeform text, which is input by an operator.

Changes Allowed

Yes

Required / Optional

This is a required field (one line).

Functional Notes

If a change is made to the address at the Auto policy level, the revised text will not be passed back up to the submission level or the Master Pac policy level but will only be saved as part of the Automobile database.

On re-displays of the screen, the address will prefill with the text as last saved in Automobile.

Prompt Help Text

POLICY MAILING ADDRESS – The Policy Mailing Street address in defaulted from the Account Common Information screen. If changes need to made for this policy overtype the Policy's Mailing Street address or P.O. Box on the first line with the correct information. If more room is required, tab into the second line and complete the remainder of the street address.

City: (ALT+Y)

---

Initial Display
The City displays as a field of text and displays prefilled and unprotected with the text from the submission level.

Prompt Type / Length
Freeform text keyed by the operator into text field.
Rapid 2 allows 1 line of 24 characters.

Protection
This field is unprotected.

Available Inputs
Freeform operator input.

Changes Allowed
Yes, changes are allowed.

Required / Optional
This is a required field and can not be left blank.

Functional Notes
If a change is made to the City at the Auto policy level, the revised text will not be passed back up to the submission level or the Master Pac policy level but will only be saved as part of the Automobile database.

On re-displays of the screen, the City will prefill with the text as last saved in Automobile.

Relationship validations will take place between the City Name / State / ZIP.

Prompt Help Text
POLICY CITY – The City will be defaulted from the Account Common Information screen. If changes need to be made for this policy overtype with the correct City name.

State: (ALT+S)

---

Initial Display

The State displays as a two-character abbreviation and displays prefilled and unprotected with the text from the submission level.

Prompt Type / Length

Dropdown choice list.
Field length is 2 characters.

Protection

Field is unprotected.

Available Inputs

Listing of states is the same as the Master Pac listing of available states.

Changes Allowed

Yes, changes to field are allowed.

Required / Optional

This is a required field and can not be left blank.

Functional Notes

If a change is made to the State at the Auto policy level, the revised State will not be passed back up to the submission level or the Master Pac policy level but will only be saved as part of the Automobile database.

On re-displays of the screen, the State will prefill with the state as last saved in Automobile.

Prompt Text Help

POLICY STATE – The Policy State will default from the Account Common Information. If changes need to made, click on the drop down arrow to the right of the prompt and select the correct 2-character state abbreviation.

Or tab into the state box and press the first letter of the state you wish to select. You may need to do this repeatedly to alphabetically scroll through all the states beginning with that letter until you reach the correct state abbreviation.

ZIP: (ALT+Z)

Initial Display

The ZIP Code displays as a freeform numeric field and displays prefilled and unprotected with the ZIP Code from the submission level.

Prompt Type / Length
Two freeform text (numeric) input boxes. First box length is 5 bytes and second box length is 4 bytes. Follow ZIP Code 'standard.'

Protection
Fields are unprotected.

Available Inputs
Freeform text fields (numeric).

Changes Allowed
Yes.

Required / Optional
The first ZIP (5 digit) code box is required. The second inbox ZIP (4 digit) code box is optional.

Functional Notes
If a change is made to the ZIP Code at the Auto policy level, the revised ZIP will not be passed back up to the submission level or the Master Pac policy level but will only be saved as part of the Automobile database.

On re-displays of the screen, the ZIP will prefill with the state as last saved in Automobile.

Prompt Text Help
POLICY ZIP – The zip code will default from the Account Common Information screen. If the zip code needs to be changed, overtype with the appropriate first 5 digits of the ZIP Code. If the ZIP is longer than 5 digits you have room in the second box to input the remaining numbers.

<u>EFFECTIVE DATE: (ALT+E)</u>

Initial Display
The Effective Date will displays defaulted to the effective date of the submission.

Prompt Type / Length
Freeform text field of Numeric characters and 'slashes'
Format MM/DD/YYYY , field should input a slash between the month and day, and between the day and the year.

Protection
The Effective Date is unprotected.

Available Inputs

The effective date must be a valid calendar date. Exception is for the date of 2/29, editing exists today not allowing the operator to use this date.

Changes Allowed

Yes, changes to the effective date are allowed.

Required / Optional

Required.

Functional Notes

If no submission exists, tabbing off of the Effective Date field should populate the Expiration Date field as an annual term. If a submission exists, then refer to the Expiration Date information below for prefill rules.

Prompt Help Text

POLICY EFFECTIVE DATE – This date will automatically prefill from the effective date input on the Common Information screen. If the effective date of the Policy is different from the Account's effective date, input the Month, Day and 4 digit Year the policy coverage is effective.

EXPIRATION DATE: (ALT+X)

Initial Display

If a no submission exists, then default the expiration date to an annual term based on the Effective Date input.

If a submission exists and is short-term, then pre-fill the Auto Expiration date with that short-term Expiration Date.

If a submission exists and is a for three-year term, then prefill the Auto Expiration date with an annual term based on the effective date of the Auto.

Prompt Type

Freeform text field of Numeric characters and 'slashes'.

Format MM/DD/YYYY , field should input a slash between the month and day, and between the day and the year.

Protection

Field is unprotected.

Available Inputs

A valid calendar date must be input. Editing exists today for the date of 2/29.

The Auto policy term must be either short-term or annual. Screen editing must ensure this.

Changes Allowed

Yes, changes allowed.

Required / Optional

Required.

Functional Notes

If a no submission policy exists, then default the expiration date to an annual term based on the Effective Date input.

If a submission exists and is short-term, then pre-fill the Auto Expiration date with that short-term Expiration Date.

If a submission exists and is for a three-year term, then prefill the Auto Expiration date with an annual term based on the effective date of the Auto.

Prompt Text Help

POLICY EXPIRATION DATE – This date will automatically prefill from the expiration date input on the Common Information screen. If the Policy expiration date is different from the Account expiration date, input the Month, Day and 4 digit Year the policy coverage is to expire.

Please note: Automobile policies can only be written for one year or less.

RATE EFFECTIVE DATE: (ALT+R)

Initial Display

The Rate Effective Date will displays defaulted to the Effective Date if there is a submission. If no submission then rate date should be left blank.

Prompt Type

Freeform text field of Numeric characters and 'slashes'.
Format MM/DD/YYYY, field should input a slash between the month and day, and between the day and the year.

Protection

The Rate Effective Date unprotected.

Available Inputs

The Rate effective date can not be greater than the effective date.

Changes Allowed

Yes, changes are allowed as long as the rate effective date is not greater than the effective date.

Required / Optional

Required.

Functional Notes

The Rate Effective date should default to the Effective date if there is a submission. If there is not a submission then it should be left blank.

Example: If the submission was effective 1/1/99, then both the effective date and rate effective date would be set to 1/1/99. They can both be changed but the Rate effective date can never be greater than the Effective date - edits are received.

If there wasn't a submission then both Effective date and Rate Effective date would be blank. If the operator inputs 1/1/99 for the effective date and does not input a Rate effective date, we will set the Rate effective date to be the same as the Effective date. If the operator inputs both, again the Rate effective date can never be greater than the effective date - edits are received.

It works the same regardless of whether it is a Written or Effective date state. Any processing of that sort is not done on the screen but rather in the table access of Rate tables. Effective date states are edited if the rate effective date is changed to something other than the effective date of the policy. For Written date states we will not add any new editing.

*Prompt Text Help*
RATE EFFECTIVE DATE – This date will automatically prefill with the same date as the effective date input on the Common Information screen. If the rate effective date field is blank or the Policy effective date was changed, input the Rate effective with the same date as the effective date.

Please note: The Rate effective date and Policy effective date should be the same. The Rate Effective date can never be greater than effective date.

PREDOMINANT STATE: (ALT+P)

Initial Display

The State displays as a two-character abbreviation and displays prefilled and unprotected with the text from the mailing address state in the submission level.

Prompt Type / Length

Dropdown choice list.
Field length is 2 characters.

Protection

Field is unprotected.

Available Inputs

Listing of states are the same as the listing of available states for Master Pac. (with the exception of Texas.)

Changes Allowed

Yes, changes to this field are allowed.

Required / Optional

This is a required field and can not be left blank.

Functional Notes

The predominant state input in this box will determine what coverages will be brought back on the Policy Coverage screen.

On redisplay of this screen, if the state is changed then a Warning message will be put up, telling the operator that all coverage information previously entered will be deleted. Are they sure they want to change? If they say Yes, then all Policy and vehicle coverages will be deleted and they will need to re-enter. The Vehicle schedule will not be deleted. If they say No, then the predominant state will not change.

Prompt Help Text

PREDOMINANT STATE – The State where the Insured has their principal business location and the state to which the policy premium is charged. The Predominant state will determine the edition of any countrywide forms used on the policy.

The predominant state will default with the same state as the mailing address. If it needs to be changed, click on the drop down arrow and scroll through the list to select the appropriate state abbreviation. You may also press the first letter of the state until you reach the correct state abbreviation.

Please Note: On Single state policies the Predominant State will determine what coverages will be brought down to the Policy Coverage screen.

SINGLE STATE POLICY: (ALT+G)

Initial Display

The prompt will always default the answer of Yes. (Default was determined because 96.3% of the Select auto policies are written as single state.)

Prompt Type / Length

This is a Yes / No radio buttons.

Protection

This field is unprotected.

Available Inputs

Yes or No selections are the only valid options.

Changes Allowed

This field can be changed. If changed, the changed value is held.

Required / Optional

This is a required field.

Functional Notes

If value remains as Yes, then the policy coverages will be derived from the applicable state coverage choices.

If value is changed to NO, then all policy coverages will display.

On re-visit to this screen if indicator is changed then a Warning message will be displayed – telling operator that coverage choices may have changed, please verify all coverage selections. If Multi state is selected and the CONTINUE button is pressed, the indicator will be protected, so that the operator can not come back and change to Single state.

If the predominant state is equal to MA, CA, HI or VA, then the policy can only be written as a single state. We have decided not to protect this field BUT the operator should be edited.

Prompt Help Text

SINGLE STATE POLICY – This prompt will originally come up defaulted to 'Yes' (this is a single state policy.) If your policy is covering more than one state change the answer to No by clicking on the appropriate radio button.

This prompt is used to help tailor the policy coverages that will be displayed. By answering Yes, this is a Single State policy, only the applicable coverages and options available in that state will be shown. If No is answered then all coverages and options will be shown.

If the predominant state is equal to CA, HI, MA, or VA, then the policy can only be written as a single state.

CEDED POLICY: (ALT+O)

Initial Display

Question will only display if predominant state is equal to MA. If prompt is displayed, the defaulted value will be set to No for all agents.

Prompt Type / Length

This is a Yes / No radio button.

Protection

This field is unprotected.

Available Inputs

Yes or No selections are the only valid options.

Changes Allowed

This field can be changed for all agents.

Required / Optional

This is a required field if the predominant state is Mass.

Functional Notes

This Yes / No answer is handled the same way as within Issue Express – for Mass Auto.

The Yes / No answers are converted to numeric choices for RAPID II rating purposes.

NO – voluntary auto (AO)

YES – ceded (A4)

If the Ceded Indicator is changed, a Warning message will be triggered, telling the operator that this change could result in policy coverage changes, please review all coverage selections ERP business is out of scope and must continue to be written through the Rapid 2 system.

Prompt Help Text

CEDED POLICY – This prompt is available on Massachusetts policies only. If NO is answered to this question, then the voluntary limits, rates and rules will apply to the policy. If the question is answered YES, then the facility limits, rates and rules will apply.

Please note: An agent must be licensed with CAR to write involuntary (facility) business.

LOSS HISTORY: In the past 3 years have there been 4 or more covered losses and / or has any single loss exceeded $4,000? - (ALT+H)

Initial Display

Authority question will show exactly as it shows in Issue Express except it will not be defaulted to anything. Operator will need to select either Yes or NO. If Yes is selected then a grid will come up to collect the loss history information. (date of loss, description & amount of loss). The cursor should then move to the first Date of Loss.

Prompt Type / Length

YES or NO radio buttons.

Protection

This field is unprotected.

Available Inputs

This is a required field and can not be left blank. Yes or No selections are the only valid options.

Changes Allowed

This field can be changed.

Required / Optional

This is a required field and can not be left blank.

Functional Notes

The Grid should come up displaying 5 rows. It should allow a maximum of 10 losses (rows) input, therefore becoming scrollable after the initial 5 rows are completed.

The Grid should contain a 'nub' and when clicked on, highlight that row. It should allow the operator to delete an entire row. On redisplay after a row has been deleted any rows displaying after it should automatically move up.

| | Date of Loss | Description | Amount Paid |
|---|---|---|---|
| | | | |
| | | | |
| | | | |
| | | | |
| | | | |

If operator changes the answer to this question to NO, then grid and the information entered will be removed. A warning message should come up advising operator that all loss history info will be deleted.

If the Grid headings "Date of Loss" or "Amount Paid" are clicked on, the information can be sorted. For the Date of Loss, dates should be sorted from oldest to newest. For the Amount Paid, dollar amount should sort from greatest to lowest.

The operator can not click on the grid columns and change the size.

On redisplay of the screen, if YES was the answer, then YES and the Grid will show at all times.

Prompt Help Text

LOSS HISTORY – This prompt is used to identify previous loss history. If there have been 4 or more covered losses in the past 3 years and/or if one single loss exceeds $4,000, click on the 'YES' button otherwise click on the 'NO' button.

Please Note: If 'Yes' was answered, a Loss History Grid will be displayed for you to complete. The Date of Loss, a brief loss Description, and Amount Paid for each loss must be completed. The entire row must be completed for each loss entered in the grid. To delete a loss, click on the row to highlight and press the delete key.

DATE OF LOSS:

Initial Display
The Date of loss field will be blank on initial display.

Prompt Type / Length
Freeform text field of Numeric characters and 'slashes'. (example; 12/01/1998)

Protection
The field is left unprotected.

Available Inputs
The date of loss must be a valid calendar date and not greater than "today's" date.

Changes Allowed
Yes, changes are allowed.

Required / Optional
This is an optional field.

Functional Notes
On re-display of the screen the date will display. The grid should sort the losses in date order (oldest date at the top, to newest date at the bottom.)

The operator should be able to TAB into the Loss description field. Inside the field operator should be able to use the backspace key to move the cursor back one space at a time. If characters have been typed and the backspace is used the character should be removed.

Edit; the Date of Loss can not be greater than current date.

DESCRIPTION:

Initial Display
The Description field will be blank on initial display.

Prompt Type / Length
Freeform text field
RAPID 2 field length is 30 characters – one line.

Protection
The Description field will be unprotected.

Available Inputs

Freeform text.

Changes Allowed

Yes

Required / Optional

This is a required field and can not be left blank.

Functional Notes

If a row has been started (the date of loss has been input), then the description must be entered.

After loss description has been entered, operator should be able to TAB into the Amount of Loss field.

On re-display of the screen, the wording will appear.

AMOUNT PAID:

Initial Display

The Amount field will initially display as blank.

Prompt Type / Length

Freeform text field of Numeric characters, Dollar sign ($).and Comma (,).
RAPID 2 – 8 characters and must be numeric.

Protection

Field in unprotected.

Available Inputs

Free form text

Changes Allowed

Yes

Required / Optional

This is a required field and can not be left blank.

Functional Notes

If a row has been started (date & description) have been entered than this field must be completed.

After Amount of Loss has been entered, operator should be able to TAB into the next row, Date of Loss field.

On re-display of the screen, the amount of loss including the dollar sign and commas will show.

If operator clicks on the Grid heading- AMOUNT PAID, should be able to sort losses by the amount paid. Sort order should be greatest value at the top descending to lowest value.

If no further loss history needs to be entered, operator will need to click on CONTINUE to move the Policy Coverage screen.

BUTTONS

CONTINUE: (ALT+C)
The CONTINUE button displays and is active at all times. Clicking CONTINUE validates the data input, saves the data keyed or changed and establishes the Automobile policy. As part of that establishment, a Policy Number is assigned and '810' or '650' policy form is associated. The Auto policy is put on the PIF.

MODAL WINDOWS:

Named Insured Modal Window
The Named Insured modal window is used to collect complete named insured information when the entry boxes on the Policy Information screen do not provide the operator with enough room to fully key all named insureds.

Prompts / Displays
The 'Named Insured' modal window should utilize the fixed font that Master Pac is using today.
The rows within the modal should be exactly 30 characters wide. L105 currently collects 823 rows of 79 characters, a total of 75 screens. We should limit this to what Select typically writes. Upon opening the modal window, text from the entry box on Policy Information should fill into the first row of the modal and the cursor should be positioned on the second row.

Buttons:
DONE – The DONE button updates the named insured with information keyed within the modal window and returns the operator to the Policy Information screen. Amended text (if applicable) from the first line of the named insured window should display in the first entry box on the Policy Information screen Cancel – The Cancel button simply closes the window without making any updates to the named insured information.

The modal window also contains an 'X' close button in the upper right corner of the title bar. This functions the same as Cancel.

Derivations:
The host will need the following in order to derive CA T8 00, the Named Insured endorsement. This will be needed as part of the 'Issue' screenflow and as part of the forms derivation process.

Endorsement Coverage - 'NI' should be sent to the host, with the exception of the predominant state being New York, in which case 'NY' should be sent. Predominant state determination will be explained in detail later.

Endorsement Number - Reserve endorsement number '01' for named insured overflow. '01' should be passed to the host when there is a need for the named insured endorsement to be derived.

Title - The wording 'Named Insured Endorsement' should be passed to the host and inserted on the 'Title' row.

Screen L105:
Row 2 - Insert wording "The Named Insured is amended to read:"
Row 3 - Fill with row 1 and 2 from the modal window
Row 4 - Fill with rows 3 and 4 from the modal window
Row 5 - Fill with rows 5 and 6 from the modal window…etc., etc. Proceed sequentially from this point forward.

SCREEN TABBING ORDER

Initial Cursor Position
If submission is present start focus in the Named Insured field.
If no submission is present then start focus in the Legal Entity field.

Default Button on ENTER
CONTINUE is the default for the Enter key.

Tab Sequence Throughout Screen
15. Named Insured (entry box)
16. Named Insured (ellipse button)
17. Policy Number (for Home Office IDs)
18. Policy Mailing Address Line 1
19. Policy Mailing Address Line 2

20. City
21. State
22. ZIP 5 – ZIP 4
23. Effective Date
24. Expiration Date
25. Rate Effective Date
26. Predominant State
27. Single state policy?
28. Ceded Policy?
29. Loss History
30. CONTINUE button
31. Legal Entity
32. Describe Other (if Other for Legal Entity)
33. Named Insured (entry box) and then loop back if the tab key is pressed again.

NOTE: If the legal entity is blank, then place initial focus on the Legal Entity field – this should not occur frequently. Else, place focus as described above.

WARNING MESSAGES

LOSS HISTORY DELETE:
A warning message should appear if loss history information has been entered and now they are changing the Authority question to NO from YES.

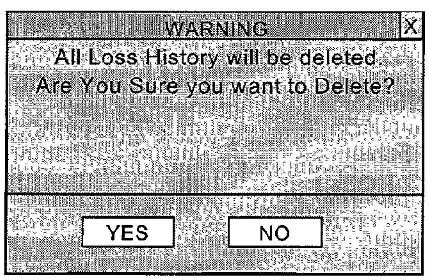

Prompt / Displays
The window should contain;
Title: WARNING
Warning Wording "All loss history will be deleted. Are you sure you want to delete?"
X (close) button in the right side of the title bar. Acts as cancel.

Buttons:
YES – The YES button will accept the delete. When clicked on all the loss information that was entered in the grid will be deleted.

NO – The NO button will act as a cancel button. When clicked on, all loss information will be saved and the Authority questions will revert back to YES.

PREDOMINANT STATE:

A warning message should appear if predominant state has been entered and when the operator revisits the screen, they are changing it.

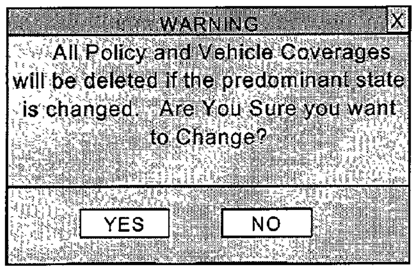

Prompt / Displays

The window should contain;

Title: WARNING

Warning Wording "All Policy and Vehicle Coverages will be deleted if the predominant state is changed. Are you sure you want to change?"

X (close) button in the right side of the title bar. Acts as cancel.

Buttons:

YES – The YES button will accept the change to the predominant state. When clicked on all the Policy and vehicle coverages (not vehicle schedule) that were entered for the policy will be deleted.

NO – The NO button will act as a cancel button. When clicked on, the predominant state will not change. It will revert back to what it was.

SINGLE STATE / MULTI STATE IND:

A warning message should appear if the Single State Indicator is changed on a re-visit of the screen. Operator will be instructed that coverage choices may change and to verify their policy coverage selections.

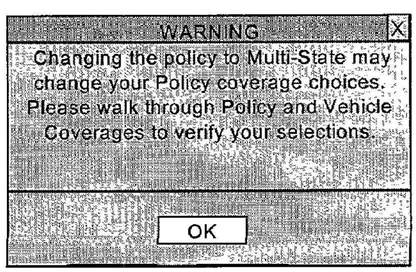

Prompt / Displays

The window should contain;

Title: WARNING

Warning Wording "Changing the Policy to Multi state may change your Policy coverage choices. Please walk through Policy and Vehicle Coverages to verify your selections."

X (close) button in the right side of the title bar. Acts as cancel.

Buttons:
OK – The OK button will accept the change.

CEDED IND:
A warning message should appear if the Ceded Indicator is changed on a re-visit of the screen. Operator will be instructed that coverage choices may change and to verify their policy coverage selections.

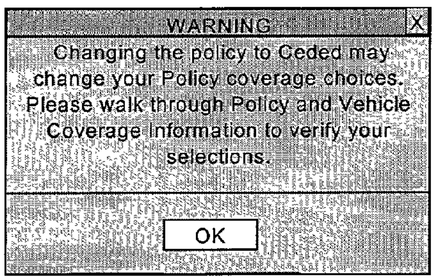

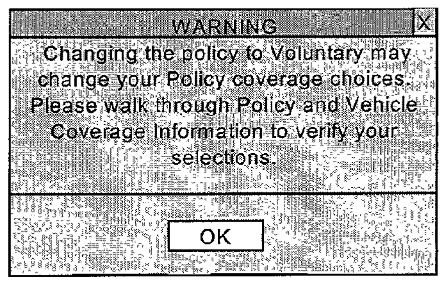

Prompt / Displays

The window should contain;

Title: WARNING

Warning Wording "Changing the Policy to Ceded may change your Policy coverage choices. Please walk through Policy and Vehicle Coverage information to verify your selections."

Or

"Changing the Policy to Voluntary may change your Policy coverage choices. Please walk through Policy and Vehicle Coverage information to verify your selections."

X (close) button in the right side of the title bar. Acts as cancel.

Buttons:
OK – The OK button will accept the change.

ERROR MESSAGING

ERROR MESSAGE NAME

EDIT – Policy period can not be longer than one year.

EDIT – Effective date can not equal 2/29/XX.
Expiration date can not equal 2/29/XX.
Rate effective date can not equal 2/29/XX.

EDIT – Rate effective date can not be greater than effective date.

EDIT – Effective and Expiration date can not be equal.

EDIT – CA can not be written as multi state.
MA can not be written as multi state.
HI can not be written as multi state.
VA can not be written as multi state.

LOSS HISTORY: GRID:

EDIT - Date of Loss can not be greater than current date.
EDIT – Date of Loss is not a valid date.
EDIT – Description of Loss must be completed.
EDIT – Amount Paid must be completed.

Additional Possible Features

ADDITIONAL POSSIBLE FEATURES:

Texas automobile – this is not supported in Issue Express today. These policies have a modified issue through Rapid 2.

Garage – Not issued in Issue Express today. Modified issue through Rapid 2.

Nippon

Mass ERP business – Not issued in Issue Express today. These are issued in Rapid 2.

Loss History: Suggestion to total losses input and set indicator to Yes if over 4,000. Day 2 – to remain consistent with Pac. We were going to do some sorting inside the grid, on the date of loss and the amount of loss. Can't do this day one. Look at for some future date.

Supporting Documentation:

Single State Policy o No o Yes

Default to Yes based on one-shot: 55,319 policies are Single State (96.4%)
1,661 are 2 states (2.8%)
226 are 3 states (.4%)

256 are between 4 and 16 states (.4%)

MA will be set to Yes and protected if Predominant state is MA.
VA will be set to Yes and protected if Predominant state is VA.
Hawaii will be set to Yes and protected if Predominant State is HI.
TX will have to be dealt with as TX comes on board.

---

Ceded:
This will display for MA only policies.
Drop downs are

- A0 - Voluntary
- A4 - Ceded
- A5. - ERP
  - Agent's that are A5 (ERP) - will be out of scope.

MailBox List

Web-based GUI system

PAGE PROMPTS / FIELDS

*MailBox List: Delete ?*

Initial Display

This column allows the operator to click and select (mark) those rows that will be deleted with the Delete from List button.

This column displays with the cell either:
1. Protected, with gray background and with no ghost radio button
2. Unprotected, with white background and an un-selected radio button RULES for Display
1. If the Type is Approval, Approval+, Declination, Declination+, Reply, Reply+ or Memo, then display the radio button view.
2. If the Type is Referral or Referral+, then don't display the radio button view and show the cell protected.

There will never be a situation when initialization of the screen displays a selected radio button.

Prompt Type / Length

If the cell is unprotected, a radio button is visible. The default for the radio button is un-selected.

Protection

If unprotected, the radio button can be turned on or off. If the cell is protected, then there is no radio button to select.

Available Inputs

The radio button can be turned on or off.

Changes Allowed

Changes can be made to the radio buttons. Once Delete from List button is clicked, the rows are removed from the list and are not even available for a changed selection.

Functional Note:

1. On initialization of the page, no rows are selected for delete and the Delete from List button, consequently, will be grayed. Once a radio button has been selected, the Delete from List button should become active.
2. If radio buttons are selected (the Delete from List button active) and the operator clicks the Continue button without first cleaning the list, the present a warning message (with an OK button) "There are entries marked for deletion which have not been processed. Before you can Continue, click the 'Delete from List' button to clean the list, or de-select the radio buttons in the list."

*MailBox List: Type*

Initial Display
This cell displays the type of mail contained in the list.

Prompt Type / Length
Display-only cell about 12 characters wide.

Protection
No operator input can be made into the cell.

Available Inputs
No inputs can be made, but the possible display literals are as follows:

| | |
|---|---|
| Memo | Items that are "Incoming Correspondence." Both agents and field receive memos sent to them. |
| Reply | Items that are incoming correspondence and are replies to memos. |
| Reply+ | Items that are incoming correspondence and are replies to memos. The "+" indicates that there are other MailBox items (i.e. Memos / Replies) associated with the policy. |
| Referral | Only field office employees will see this as a Type. This comprises the "Incoming Referral" bucket. |
| Referral+ | Only field office employees will see this as a Type. This comprises the "Incoming Referral" bucket. The "+" indicates that there are other MailBox items (Memos/Replies) associated with the policy. |
| Approval | Only agents would see this Type. If the Referral Response is of Approving the policy, then show "Approved" as the Type. |
| Approval+ | Only agents would see this Type. If the Referral Response |

| | |
|---|---|
| | is of Approving the policy, then show "Approved" as the Type. The "+" indicates that there are other MailBox items (Memos/Replies) associated with the policy. |
| Declination | Only agents would see this Type. If the Referral Response is of Declining the policy, then show "Declination" as the Type. |
| Declination+ | Only agents would see this Type. If the Referral Response is of Declining the policy, then show "Declination" as the Type. The "+" indicates that there are other MailBox items (Memos/Replies) associated with the policy. |

Changes Allowed

The operator cannot make changes to this cell.

Required / Optional

A display will always occur.

Functional Notes

For mixed types under one policy key, present the one type literal that is most 'important.' The displayed literal should be the highest of:

Declination, Declination+, Approval, Approval+ (most important)<br>
Referral, Referral+ ↕<br>
Reply, Reply+<br>
Memo (leased important)

Note: There is no Memo+. This heading is the lowest level and there is no need to distinguish multiple memos.

Prompt Text Help

*MailBox List: From*

Initial Display

Display the name of the sender from the operator name table.

Prompt Type / Length

This field should be "X" alphabetic characters (whatever the operator name table contains.)

Protection

This is a display-only cell.

Available Inputs

No input can be made into this cell

Changes Allowed

No changes are allowed in this cell.

Required / Optional

Display will always occur.

Functional Notes

The width of this cell may be shortened smaller than the actual data content. When the Facet is being built, let's discuss where the initial width should be fixed, but the operator should have the ability to scale the cell width to expand the view.

Prompt Text Help

*MailBox List: Regarding*

Initial Display

Display the Account Name in this cell. Pull from the host layout (either Policy Name or Account Name, whichever is stored).

Prompt Type / Length

Display the full account name (X(?)) in this cell. This will probably be in upper-case.

Protection

This cell is protected.

Available Inputs

No input can be made into this cell.

Changes Allowed

No changes are allowed in this cell.

Required / Optional

A display will always occur.

Functional Notes

The width of this cell may be shortened smaller than the actual data content. When the Facet is being built, let's discuss where the initial width should be fixed, but the operator should have the ability to scale the cell width to expand the view.

Prompt Text Help

*MailBox List: Line*

Initial Display
Display an abbreviation of the line of business based on the policy form.

Prompt Type / Length
Up to 5 character alpha display. Possible values are:

MPac
Auto
WComp
Umbr

Protection
This cell is protected.

Available Inputs
No input can be made to this cell.

Changes Allowed
No changes are allowed.

Required / Optional
A display will always occur.

Functional Notes

Prompt Text Help

*MailBox List: Latest Action*

Initial Display
The Latest Action column indicates the MM/DD/YYYY the message was sent.

Prompt Type / Length
Numeric in the format of MM/DD/YYYY

Protection
This is a protected display-only cell.

Available Inputs
No input allowed.

Changes Allowed

No changes allowed.

Required / Optional
Display will always occur.

Functional Notes
Use the Date/Timestamp of the most recent item as the determinant in ordering the policy in the list (newest at top, oldest at bottom)

Prompt Text Help

PAGE BUTTONS

*Delete from List: (alt+D)*
Agents and Field personnel can clean from the MailBox List only certain entries (or the portion of the entry). The Delete from List button should always appear on the page. The button should be grayed (inactive) or black (active) depending on whether any 'delete' radio buttons have been selected. (GJC 4/24/2000)

When Delete is used, the row should be removed from the listing (and perhaps the unopened mail switch on the item should be set as an 'old' memo).

Functional Note: Incoming Referrals (Net "Referral") are automatically removed from the list when the policy is Approved, Declined, Issued, Purged (or otherwise purged).

Functional Note: Multiple rows can be flagged with the delete indicator.

*Continue: (alt+C)*
The Continue button appears at all times and is always active.

If no entries are highlighted in the grid, then clicking Continue produces the following pop-up (which also includes an OK button):

"A row must be selected."

If an entry is highlighted in the grid and Continue is clicked, then move the operator either to the Memo screen (if memo exists) or the Account Summary page (if no memo exists) .

- Go to Account Summary if mail type is Referral, Declination or Approval.
- Go to memo for all other types including the "+" compliment.

Double-clicking a row on the grid should be the same as a single click select followed by Continue.

Continue is the default for Enter.

Preserve the policy key of the row that is highlighted on the MailBox List so that that specific policy can be automatically highlighted on the Account Summary page

SCREEN TABBING ORDER

Initial focus should be on the Continue button. Tabbing should move from the Continue to the first 'Delete' radio button and on down through all the active 'Delete' radio buttons. Tabbing should continue to the Delete from List button, then back to the Continue button.

WARNING MESSAGES

1) When the operator hits Continue from the list, there is a possibility that the list contains 'old' records. If the memo intended for presentation is no longer available, then present the following message. Include an OK button on the message.

"A change in the status of the mail item has occurred since you last accessed your MailBox. The requested item is no longer available for view, or the policy status has changed. The next time you re-access your MailBox List, the item should no longer appear. You can force a refresh by selecting 'Home' from the navigator then re-selecting MailBox."

(This message appears while still on the MailBox list. Since the page is not automatically re-initialized when the message appears, it is necessary to instruct the user how to force a refresh of the screen.)

2) Message no longer needed since situation will be covered in message #1.

3) The supporting events can handle a maximum of 296 +/- mailbox messages. If that maximum has been reached, then present the following message (which includes and OK button):

"You have more mail than the MailBox can display. Attend to your messages, or delete old messages, so that the rest of your mailbox list can be presented. Your MailBox List will be refreshed when you re-enter the MailBox."

It is understood that the most recent block of messages may not be the messages first presented. The operator might be presented with the oldest block or an indeterminate mixture.

4) If 'Delete' radio buttons are selected (the Delete from List button active) and the operator clicks the Continue button without first cleaning the list, the present a warning message (with an OK button) "There are entries marked for deletion which have not been processed. Before you can Continue, click the 'Delete from List' button to clean the list, or de-select the radio buttons in the list."

5) If no entries are highlighted in the grid, then clicking Continue produces the following pop-up (which also includes an OK button): "A row must be selected."

MailBox Memo

Web-based GUI system

PAGE PROMPTS / FIELDS

*Line:*

Initial Display
Display the line of business literal abbreviation for the policy.

Prompt Type / Length
Up to 5 alphabetic characters.

Protection
This is a protected field

Available Inputs
No input can be made into this field. Possible displays are:

1. MPac
2. Auto
3. WComp
4. Umbr

Changes Allowed
Changes cannot be made to this field

Required / Optional
Display will always occur.

Functional Notes
Convert the policy form into a label for display in this field.

Prompt Text Help

*Policy Number*

Initial Display
Display the Form and Policy Number for the policy.

Prompt Type / Length
Up to 4 alphas for the form, hyphen, 8 alpha-numerics for the policy number Protection This is a protected field.

Available Inputs
No input can be made into this field.

Changes Allowed
Changes cannot be made to this field.

Required / Optional
A display will always occur.

Functional Notes

Prompt Text Help

*Effective Date*

Initial Display
Display the effective date of the policy.

Prompt Type / Length
Numeric display in the standard date format of MM/DD/YYYY. If page space is tight, we may consider dropping the year from the display.

Protection
This is a protected display field

Available Inputs
No input can be made by the operator.

Changes Allowed
Changes may not be made to this field.

Required / Optional
Display will always occur.

Functional Notes

Prompt Text Help

*Producer Name*

Initial Display
Display the Producer Name in this field.

Prompt Type / Length
Display the first 'X' characters of the producer name. Space may dictate that this display be truncated.

Protection
This is a protected field.

Available Inputs
No input may be made into this field.

Changes Allowed
No changes can be made to this field.

Required / Optional
Display should always occur (unless the 'friendly' name table has no entry)

Functional Notes
Pull the name from the 'friendly' producer name table.

Prompt Text Help

*Send To (alt+T)*

Initial Display
The "Send To" dropdown box appears conditionally. Display whenever:

1. The Message section is blank.

The possible choices and defaults depend on Agent versus Field user types.

For Agents: (show all of these day-one)

1. File Only
2. New Business Underwriter[1]
3. Renewal Underwriter[1]
4. Endorsement Underwriter[1]

[1] - Default the pick based on type-of-work. (e.g. If working on a New Biz, then default to New Business Underwriter).

For Field:

1. File Only[1]
2. Agency CSR[1] (default for the Field users) Show only if agent is Automated 3. New Business Underwriter
4. Renewal Underwriter
5. Endorsement Underwriter
6. Underwriting Manager

[1] – For field, default to Agency CSR. But, if the agent is non-automated (and Agency CSR does not display), then default to File Only.

Note: Strip from view those positions whose ID matches the ID of the current operator. This serves to match the current host restrictions on not being able to send to yourself, Note: If no IDs are valid, then only the File Only pick will be available.

When a message is sent, IE uses the Logon/CLID from the Producer Profile that corresponds with the above position label.

Prompt Type / Length

This is a dropdown box that contains up to 5 choices. Length of the item should be 24 characters.

Protection

This is an unprotected field when the message section is blank.

Available Inputs

Available choices are shown above, based on Agent versus Field type.

Changes Allowed

Changes can be made prior to sending the memo/reply.

Required / Optional

Selection of an recipient is required. This field cannot be left blank.

Functional Notes

The message is sent to the LogonOffice/CLID from the profile that corresponds to the Send To value. If Sending to File, then the profile is not considered.

When the screen is initialized, the CLIDs of the positions from the Profile will be validated. If one or more of the IDs are invalid, then present a pop-up message (with an "OK" button):

"One or more "Send To" IDs are invalid, so your choices may be limited. Contact your Field Office / Automation Specialist for update."

In the message, include the literal of the first position which is found to be invalid.

Prompt Text Help

*Message (alt+M)*

Initial Display

This section will always appear:

1. If Send Memo is chosen from the Account Summary, then this field will be unprotected and blank.
2. If Yes is clicked from the Send A Memo Opportunity pop-up.
3. Under any other access, this section will display with its content and will be protected.

Prompt Type / Length

This field accepts / displays alpha-numeric characters:

1. Line 1 is 66 characters
2. Line 2 is 78 characters
3. Line 3 is 78 characters
4. Line 4 is 78 characters NOTE: A fixed, mono-spaced font must be used! Use same as whatever the Named Insured modal window uses.

Protection

If Send Memo is chosen from the Account Summary (or Yes from the Send A Memo Opportunity pop-up), then this field will be unprotected and blank. Under any other access, this section will display with its content and will be protected.

Available Inputs

When unprotected, free form text by the operator.

Changes Allowed

When unprotected, changes can be made to this field prior to sending the message.

Required / Optional

If the operator is clicking Send Memo, then entry into this field is required.

Functional Notes

The staggered field lengths mirror the field lengths available in the host.

Prompt Text Help

*Date Sent [Message]*

Initial Display

This label and value displays whenever the Message section contains values other than blank (on initialization).

Prompt Type / Length

Value is in standard date format of MM/DD/YYYY.

Protection

This field is always protected.

Available Inputs

No operator input is available into this field.

Changes Allowed

No changes are allowed into this field.

Required / Optional

A value will always appear whenever the label is present (according to display conditions noted above.)

Functional Notes

Prompt Text Help

*Sent by [Message]*

Initial Display

This label and value displays whenever the Message section contains values other than blank (on initialization).

Prompt Type / Length

The value is 'X' characters (the Operator Name). Based on space available, this display may need to be truncated.

Protection

This display is always protected.

Available Inputs

No inputs can be made into this display.

Changes Allowed

No changes can be made to this display.

Required / Optional

Content will always display whenever the label is present (see above).

Functional Notes

Prompt Text Help

*Reply (alt+E)*

Initial Display

This field displays whenever the Message section contains data. If there is existing Reply content, then display that content (protected). If there is no existing Reply content for the memo, then this field displays blank (and unprotected).

Prompt Type / Length

This field accepts / displays alpha-numeric characters:

1. Line 1 is 66 characters
2. Line 2 is 78 characters
3. Line 3 is 78 characters
4. Line 4 is 78 characters NOTE: This must be a fixed, mono-spaced font.

Protection

If there is data in the Reply section (on initialization), then the field is protected. If there is no data in the Reply section on initialization, then the field is unprotected.

Available Inputs

Free form text by the operator.

Changes Allowed

Changes are allowed if the field was blank on initialization and the operator has not sent the reply. Once the reply has been sent, the field becomes protected.

Required / Optional

Entry into the field is optional. If the field was blank on initialization, and the operator clicks Send Reply, then the field is required.

Functional Notes

Replies are sent to the LogonOffice/CLID of the person who sent the original memo. The Producer Profile is not re-visited for ID derivation in this 'reply' path.

Prompt Text Help

*Date Sent [Reply]*

Initial Display

This label and value displays whenever the Reply section contains values other than blank (on initialization).

Prompt Type / Length

Value is in standard date format of MM/DD/YYYY.

Protection

This field is always protected.

Available Inputs

No operator input is available into this field.

Changes Allowed

No changes are allowed into this field.

Required / Optional

A value will always appear whenever the label is present (according to display conditions noted above.)

Functional Notes

Prompt Text Help

*Sent by [Reply]*

Initial Display

This label and value displays whenever the Reply section contains values other than blank (on initialization).

Prompt Type / Length

The value is 'X' characters (the Operator Name). Based on space available, this display may need to be truncated.

Protection

This display is always protected.

Available Inputs

No inputs can be made into this display.

Changes Allowed

No changes can be made to this display.

Required / Optional

Content will always display whenever the label is present (see above).

Functional Notes

Prompt Text Help

POP-UP WINDOWS: Send A Memo Opportunity

Window Name / Purpose

The "Send A Memo Opportunity" pop-up appears when the user is on the Account Summary page and the operator takes a certain action. This pop-up provides an opportunity for the operator to send a supplemental memo regarding the action they've just taken.

Facet Note: The presentation of this pop-up should be coded in such a way as to be easily 'switchable.' That is; various Account Summary actions may need to be turned on or off based on Agent versus Field:

1. Force a memo when a certain action is taken.
2. Present the 'opportunity' pop-up when an action is taken.
3. Do not Force or Prompt for memo. Leave to operator discretion.

Present this pop-up under the following two conditions.

1. User is an Agent and user voluntarily Refers the policy
2. User is a Field employee and user selects Decline Prompts / Displays Display the question: "Do you wish to Send A Memo regarding this action?"

Include a Yes button and No button. Also include an 'X' close button in the header according to Windows standards.

Buttons:

Yes (alt+Y) – The Yes button brings the operator from the pop-up (and Account Summary page) to the Memo page. All of the policy keys should be brought forward and populated into the Memo page. NOTE: The 'Yes' button is the default on Enter!

No (alt+N) – The No button removes the pop-up window (like Close) and leaves the operator on the Account Summary page.

PAGE BUTTONS

The Memo page has conditional buttons and variable positions of those buttons based on how the operator got to the Memo page. The three paths are:

1. Access to the Memo page as Send Memo from the Account Summary
2. Access to the Memo page as View Memo from the Account Summary
3. Access to the Memo page from the MailBox List page or Memo on the Account Summary navigator

*Path = Send Memo*

Send Memo (alt+S)
Display "Send Memo". The button should be grayed and inactive initially. As soon as a character is typed into the Message section, activate the Send Memo button.

When Send Memo is selected, the message will be sent.

There will be no confirmation message that the memo was sent. The assumption is that the message went successfully. The operator will be moved to the Account Summary Page.

(See special notes in the Messages section of this package.)

Cancel (alt+C)
If Cancel is selected, the message will not be sent and the operator will be returned to the Account Summary page.

*Path = View Memo*

Delete Memo (alt+D)
The Delete Memo button displays only for Field employees.

When Delete Memo is chosen, the operator will remain on that Memo page. A pop-up message will appear which reads: "Are you sure you wish to delete this memo?" The pop-up should contain a "Yes" button and "Cancel" button.

If the operator selects "Yes" from the pop-up, then leave the operator on the current memo page and present the message "Memo has been marked for deletion" on the page. Once the operator moves from that 'marked' page, the memo will not be accessible. (3/17/00)

If the operator selects "Cancel" from the pop-up, then the pop-up is removed and the Delete action is not processed.

Prev Memo (alt+P)
The Prev Memo button displays gray initially. This button can appear for both Agent and Field users.

If the operator chooses Next Memo and is brought to another memo, then activate the Prev Memo button.

Selecting Prev Memo will page the operator back to the previously viewed memo. This button should remain active as long as there is a previously viewed memo in the display path.

Next Memo (alt+N)
The Next Memo button display conditionally grayed. This button can appear for both Agent and Field users.

The button appears active whenever there are more memos in the path to display. Deactivate the button when on the last viewable memo.

Using the Next Memo button moves the operator to the next memo.

Important Business Event (or Facet) Note: Sort the display of the memos for the current year, followed by the previous term, followed by the term before that, etc…(e.g. 2000, then 1999, then 1998, etc…). Within each independent policy term, display the most recent memo first, followed by the next oldest memo, etc…

(i.e. Pol Eff Date first, Date Sent second)

Display order example:

1. Pol Eff 2000, memo written 1/30/00 ↑
2. Pol Eff 2000, memo written 1/14/00
   Prev
3. Pol Eff 2000, memo written 12/27/99 |
4. Pol Eff 1999, memo written 2/1/99 Next
5. Pol Eff 1999, memo written 1/21/99 ↓

Return to Account Summary (alt+R)

This button is available to both Agents and Field and displays active all the time.

Selecting Return to Account Summary moves the operator to the Account Summary page.

*Path = from the MailBox List*

Prev Memo (alt+P)

The Prev Memo button displays gray initially. This button can appear for both Agent and Field users.

If the operator chooses Next Memo, then activate the Prev Memo button once on that next memo.

Selecting Prev Memo will page the operator back to the previously viewed memo. This button should remain active as long as there is a previously viewed memo in the display path.

Next Memo (alt+N)
The Next Memo button displays gray initially. This button can appear for both Agent and Field users.

If there are additonal memos in the path to display, then keep the Next Memo button active.

Selecting Next Memo will page the operator forward to the next memo. This button should remain active as long as there is a additional memos to display.

Delete Memo (alt+D)
The Delete Memo button displays only for Field employees.

When Delete Memo is chosen, the operator will remain on that Memo page. A pop-up message will appear which reads: "Are you sure you wish to delete this memo?" The pop-up should contain a "Yes" button and "Cancel" button.

If the operator selects "Yes" from the pop-up, then leave the operator on the current memo page and present the message "Memo has been marked for deletion" on the page. Once the operator moves from that 'marked' page, the memo will not be accessible.

If the operator selects "Cancel" from the pop-up, then the pop-up is removed and the Delete action is not processed.

Send Reply (alt+S)
This button can appear to either Agent or Field users.

Display "Send Reply" if the Reply section is unprotected (blank on initialization). In this case, the operator may opt to send a reply to the message. If the Reply section already contains text, then display the button, but inactivate it.

The button should be grayed and inactive initially. As soon as a character is typed into the Reply section, activate the Send Reply button.

(Replies are sent to the LogonOffice/CLID of the person who sent the original memo.)

(See special notes in the Messages section of this package.)

Return to MailBox (alt+R)
This button is available to both Agents and Field and displays all the time.

The Return to MailBox button moves the operator to the MailBox List page.

Account Summary (alt+A)
This button is available for Agents and Field. The button displays conditionally:

The Account Summary button brings the operator to the Account Summary page.

Preserve the policy key so that when the operator gets to the Account Summary page, that particular policy is highlighted in the Account Summary grid.

SCREEN TABBING ORDER

Initial Cursor Position
Begin focus in the Message field if the message is unprotected and blank on initialization. Else, set focus in the Reply section if the reply is unprotected.

Default Button on ENTER
Continue is the default for the Enter button.

Tab Sequence Throughout Screen
Top to bottom tabbing sequence.

MESSAGES

1) In the Send Memo path, we need to ensure that the operator has actually sent the text typed and hasn't inadvertently moved off the screen without sending the message. If text has been entered into the message section (the Send Memo button has become activated), and the operator chooses any navigator item or page button other than Send Memo, then present the following message:

"You've not yet sent the message you've typed. Do you wish to send this message? Choose 'Yes' to remain on the page to send or change the message. Choose 'No' to cancel the message and return to the Account Summary page."

Include a 'Yes' button which removes the pop-up message and leaves the operator on the memo page. Include a 'No' button which should close the pop-up message, discards the typed changes, and moves the operator to the Account Summary page.

2) From the MailBox List path, we need to ensure that the operator has actually sent the reply typed and hasn't inadvertently moved off the page without sending the message. If text has been entered into the Reply section (the Send Reply button has become active), and the operator chooses any navigator item or page button other than Send Memo, then present the following message:

"You've not yet sent the message you've typed. Do you wish to send this message? Choose 'Yes' to remain on the page to send or change the message. Choose 'No' to cancel the message and continue."

Include a 'Yes' button which removes the pop-up message and leaves the operator on the memo page. Include a 'No' button which should close the pop-up message, discards the typed changes, and moves the operator to the next memo, if it exists, or the Account Summary page.

3) When a new memo is sent versus a reply sent, there are differences in whether a 'Send Successful' confirmation is presented. Sending a Memo should not present a confirmation messages while sending a Reply does present a confirmation message. Our desire is to not show confirmation messages at all, but since there are diferent behaviors in the screenflow, there needs to be diferent messaging behaviors.

When a Memo is sent, there is no confirmation message. When the operator clicks Send Memo, the message is sent and the operator returned to the Account Summary.

When a Reply is sent, we can't assume where the operator wants to go next. Since we need to leave the operator on the Message/Reply page after they've clicked Send Reply, then we need to give them some message as to why they've stayed on the page. We'll do that by presenting the following message:

"Reply successfully sent."

Include an OK button which, when clicked, removes the pop-up message and leaves the operator on the Message/Reply page. The operator can now choose a button / navigator to move on.

ADDITIONAL POSSIBLE FEATURES

- Add the ability for TIC employees to send messages / referrals to other Ids within the profile. For example, Allow the Endorsement Underwriter to refer to the New Business underwriter, etc...
- Re: Delete From List – build the functionality of the Delete event into the Continue button.

VEHICLE SCHEDULE – AUTO QUOTE PAGE PROMPTS / FIELDS

*Liability:*

Initial Display

The initial display (if manual premium override was selected) will be " Is Premium to be overridden?" and answer defaulted to No. "Manual Premium:" and a blank input box.

Prompt Type / Length

1st question's prompt type are Radio buttons.
2nd question's prompt type is a free form input text box – 5 byte length.

Protection

Unprotected

Available Inputs

For Is premium to be manually overridden? the available inputs are No or Yes.
If Yes, the for the premium input box the available answers are numeric – 1 through 99999.

Changes Allowed

Yes

Required / Optional

The answer to the 1st question is required. The answer to the second question is required if the first question is answered Yes.

Functional Notes

These prompts will only appear if operator answered Yes to manually override premiums under the Additional Vehicle Information.

Prompt Text Help
(LIA_MAN_RATE_Q1) IS PREMIUM TO BE OVERRIDDEN? –
(LIA_MAN_PREM_Q1) MANUAL PREMIUM: -

*Medical Payments:*

Initial Display

The initial display (if manual premium override was selected) will be " Is Premium to be overridden?" and answer defaulted to No. "Manual Premium:" and a blank input box.

STATE SPECIFIC:
North Carolina – NF PPT– Factory Airbags – default to Blank.
South Dakota – PPT individually owned – Ask if Extended Medical Coverage? – display No.
Virginia - Medical Expense Limit defaults to the same limit as med pay.
For Income Loss Benefits defaults to NO Prompt Type / Length
1st question's prompt type are Radio buttons.
2nd question's prompt type is a free form input text box – 5 byte length.

STATE SPECIFIC:
North Carolina – NF PPT– drop down box
South Dakota – PPT individually owned – check box – blank for NO and X'd for Yes.
Virginia - Medical Expense Limit – free form input box – length 5 bytes.
For Income Loss Benefits - check box – blank for No and X'd for Yes.

Protection
Unprotected

Available Inputs
For Is premium to be manually overridden? the available inputs are No or Yes.
If Yes, the for the premium input box the available answers are numeric – 1 through 99999.

STATE SPECIFIC:
North Carolina – NF PPT – Factory Airbags – default to None, Driver side airbag or Front airbags both sides.
South Dakota – PPT individually owned – Ask if Extended Medical Coverage? – available answers Yes or NO.
Virginia - Medical Expense Limit available inputs are the same limit as med pay. (QUESTION _ IS THIS TRUE?)
For Income Loss Benefits available inputs are YES or NO Changes Allowed
Yes Required / Optional
The answer to the 1st question is required. The answer to the second question is required if the first question is answered Yes.

Functional Notes

The first two prompts will only appear if operator answered Yes to manually override premiums under the Additional Vehicle Information.
The state specific questions will appear for those states and circumstances they apply to.

Prompt Text Help
(MED_MAN_RATE_Q1) IS PREMIUM TO BE OVERRIDDEN? –
(MED_MAN_PREM_Q1) MANUAL PREMIUM: -
(FACT_AIRBAG_Q1) – FACTORY AIRBAGS –
(EXTEND_MED_Q1) – EXTENDED MEDICAL COVERAGE
((MED_EXP_LMT_Q1) – MEDICAL EXPENSE LIMIT:
(INCOME_LOSS_Q1) – INCOME LOSS BENEFITS:
(INCLMAN_PREM_Q1) - MANUAL PREMIUM:

*Basic No Fault:*

Initial Display
The initial display (if manual premium override was selected) will be " Is Premium to be overridden?" and answer defaulted to No. "Manual Premium:" and a blank input box.

Prompt Type / Length
1st question's prompt type are Radio buttons.
2nd question's prompt type is a free form input text box – 5 byte length.

Protection
Unprotected

Available Inputs
For Is premium to be manually overridden? the available inputs are No or Yes.
If Yes, the for the premium input box the available answers are numeric – 1 through 99999.
See below for state specifics.

Changes Allowed
Yes

Required / Optional
The answer to the 1st question is required. The answer to the second question is required if the first question is answered Yes.

Functional Notes
The first two prompts will only appear if operator answered Yes to manually override premiums under the Additional Vehicle Information.
For state specific questions and answers – see table below.

| STATE | NO FAULT – QUESTIONS and ANSWERS | PROMPT TYPE |
|---|---|---|
| ARKANSAS:<br>49 policies | **PPT vehicles only:**<br>__ Accidental Death Benefits – Principal Sum = $5000<br>__ Work Loss Coverage – Income Earner $140 per Week,<br>**Non Income Earner $70 per Week** | **Check box – blank = No, X'd = Yes** |
| | Coverage under the No Fault form for Medical Payments applies to any motor vehicle registered or principally operated in AR which is:<br>1/4/00 – changed question to read: COVG APPLIES TO: due to display problems with the dsg.<br>- An Owned Auto under Part 1 of policy<br>- Owned by the Named Insured | **Drop down with Blank being one option.** |

(can answer Y to both options and do not need to answer bottom question but can't answer the bottom question if no No-Fault option is selected.)

| | | |
|---|---|---|
| COLORADO:<br>766 policies | Comml vehicles _ Vehicle is covered by Workers Comp<br>PPT vehicles _ Vehicle is principally operated by employees | Check box – blank = No, X'd = Yes |
| CONN.:<br>533 policies | PPT vehicles _ Vehicle is principally operated by employees ( Blank = NO, X'd = YES ) | Check box |
| STATE | NO FAULT – QUESTIONS and ANSWERS | PROMPT |
| DISTRICT OF COLUMBIA:<br>138 policies | All vehicles: (Can select 1, 2, or 3 options)<br>Benefit Options: 1) Income Benefits: none, 12,000 or 24,000<br>2) Funeral Benefits: none, 4,000<br>3) Medical Benefits: none, 50,000 or 100,000 | Drop down box |
| | Comml vehicles _ Vehicle is covered by Workers Comp<br>PPT vehicles _ Vehicle is principally operated by employees | Check box – blank = No, X'd = Yes |
| | Public Autos - Is this vehicle Government sponsored?<br>(default to blank – No) | Check Box –<br>Blank = No, X'd = Yes |
| DELAWARE:<br>408 policies | PPT vehicles<br>_ Vehicle is principally operated by employees | Check box – blank = No, X'd = Yes |
| | Individually Owned Autos only: | Drop down |

| | | |
|---|---|---|
| | Deductible: Drop Down options: No Deductible (default), 250, 500, 1000, or 10000. | box . |
| | Deductible Applies to: - Named Insured Only or - Named Insured & Relatives | Drop down box. |
| FLORIDA: 2512 policies | Deductible – Drop Down options: No deductible (default), 250, 500, 1000, or 10000: | Drop down box |
| | Deductible applies to: - Named Insured Only - Named Insured & Relatives | Drop down box |
| | Coverage Options: (Not applicable if PIP Deductible is selected) Drop down selection: - No Coverage option<br>-Coordination with Military – Including Work Loss (.69)<br>-Coordination with Military – Excluding Work Loss (.58)<br>-Exclusion of Work Loss – Named Insured Only (.93)<br>-Exclusion of Work Loss – Named Insured & Relatives (89)<br>-PIP Extended to 100% Medical Expenses and Work Loss (1.17)<br>-PIP Extended to 100% Medical Expenses – Excl. Work Loss for<br>Named Insured & Resident Relatives (1.06) | Drop down box |

Note – send factors in ( )'s. to RII WIP – needed for Rating. Operator does not have to input nor will they display. (WVH-PIP-ADJ-FTR??)

| | | |
|---|---|---|
| Florida – Continued | Comml vehicles _ Vehicle is covered by Workers Comp<br>PPT vehicles _ Vehicle is principally operated by employees. | Check box – blank = No, X'd = Yes |
| HAWAII: 81 policies | Comml vehicles _ Vehicle is covered by Workers Comp<br>PPT vehicles _ Vehicle is principally operated by employees. | Check box – blank = No, X'd = Yes |
| KANSAS: 226 policies | PPT vehicles -_ Vehicle is furnished for regular use.<br>Default to No. | Check box – blank = No, X'd = Yes |

| STATE | NO FAULT – QUESTIONS and ANSWERS | PROMPT |
|---|---|---|
| KENTUCKY: 527 policies | All vehicles: Tort Limitation: Drop down options:<br>(A) Less than Half of Regular Operators accepted Tort Limitation (default) | Drop down box. |

| | | |
|---|---|---|
| | Limitation (default)<br>(B) Half or more Regular Operators accepted Tort Limitation<br>(C ) All Regular Operators accepted Tort Limitation<br>(D) Named Insured Rejects Tort Limitation | |
| | If (D) is selected then ask __ Guest PIP | Check box – blank = No, X'd = Yes |

Note: If D is selected, set on RII WIP WVH-TORT-IND-KY to 'A' and set WVH-REJ-TORT-IND-KY to Y. Do NOT include A, B, C, or D in the drop down answer – this is what Rapid 2 needs.

| | | |
|---|---|---|
| Kentucky – Continued | Deductible: (can't have if Guest PIP = Y)<br>Drop down options: No deductible (default), 250, 500, 1000 | Drop down box. |
| | Comml vehicles _ Vehicle is covered by Workers Comp<br>PPT vehicles _ Vehicle is principally operated by employees. | Check box – blank = No, X'd = Yes |
| MARYLAND :<br>1712 policies | PPT vehicles _Vehicles is principally operated by employees. | Check box – blank = No, X'd = Yes |
| MASS. | _ Vehicle is covered by Workers Comp. | Check box – blank = No, X'd = Yes |
| MICHIGAN: 980 policies | All vehicles:<br>_Is this an Intrastate Vehicle? (default to Yes)<br>note: If No – means interstate, Yes – means intrastate. | Check box – blank = No, X'd = Yes |
| | __Property Damage Liability Coverage Buyback requested. (default to No.)<br>If Manual Rate Premium = Y and PD Buyback is selected above:<br>Manual Premium: allow 5 byte input | Check box – blank = No, X'd = Yes |
| | Comml vehicles _ Vehicle is covered by Workers Comp<br>PPT vehicles _ Vehicle is principally operated by employees | Check box – blank = No, X'd = Yes |
| | Individually Owned Autos:<br>Property Protection Insurance Deductible: No deductible (default), 25, 50, 75, 100, 200, 250, 300, 400, 500, 750, 1000, 2000, 3000, 4000, 5000, 10000 | Drop down box |
| (1/4/00 – ques chged to: EXCESS PIP:) | ~~Coordination of Benefits~~ Excess PIP: -No Excess PIP (Default)<br>-Named Insured has other primary coverage for Medical benefits | Drop down box |

| | | |
|---|---|---|
| | -Named Insured has other primary coverage for Work Loss benefits<br>-Named Insured has other primary coverage for Medical & Work<br>Loss Benefits | |

Note – Set WVH-COORD-BNFT-OPT-MI to 1,2,3 and Factor to .85 for 1, .80 for 2, .65 for 3

| | | |
|---|---|---|
| Michigan – Continued | If no Coordination of Benefits selected offer:<br>Deductible: Drop down options: No deductible (Default), 100, 200, or 300 | Drop down box |
| | If Manual Rate Premium = Y and PPI deductible exists display Manual Premium: and allow input. | Input Box |

| STATE | NO FAULT – QUESTIONS and ANSWERS | PROMPT |
|---|---|---|
| MINNESOTA:<br>621 policies | All vehicles: Deductible:<br>Drop down options: No deductible (Default)<br>Medical Expense $100<br>Work Loss $200<br>Combined Medical Expense & Work Loss | Drop down box. |
| | <u>Comml vehicles</u> _ Vehicle is covered by Workers Comp<br><u>PPT vehicles</u> _ Vehicle is principally operated by employees | Check box – blank = No, X'd = Yes |
| NEW JERSEY:<br>2155 policies | <u>PPT vehicles</u> - Extended Medical Expense Limit to 10,000<br><u>PPT vehicles</u> _ Vehicle is principally operated by employees | Check box – blank = No, X'd = Yes |
| | <u>Individually Owned Autos Only</u>: Deductible:<br>Drop Down options: 250 (default), 500, 1000, or 2500<br>Deductible applicable to Medical Expense Only o Yes o No | Drop down box<br>Radio Button |
| NEW YORK:<br>12259 policies | <u>All vehicles: Optional Coverages</u>: (Can have any/all of these)<br>__ Optional Basic Economic Loss (default to No)<br>__ Work Loss Coordination (.90)<br>__ Eliminate Medical Expense: Named Insured only (.60)<br>__ Eliminate Medical Expense: Named Insured & Relatives(.50) | Check box – blank = No, X'd = Yes |

Send RAPID II factors shown in ( )'s above. These are needed to rate but not needed to be input by operator nor are they displayed to operator (WVH-PIP-ADJ-FTR)

| | | |
|---|---|---|
| New York – Continued | <u>All vehicles:</u><br>If Manual Rate Premium = Y and OBEL is selected above, | Check box – blank = No, |

| | | |
|---|---|---|
| | display:<br>Manual Premium: allow 5 byte input | X'd = Yes<br>Input Box |
| | <u>Comml vehicles</u> _ Vehicle is covered by Workers Comp<br><u>PPT vehicles</u> _ Vehicle is principally operated by employees. | Check box – blank = No, X'd = Yes |
| | <u>Individually Owned Autos:</u><br>Deductible: Drop down options: No Deductible (default), 100 or 200. | Drop down box |
| NORTH DAKOTA:<br>18 policies | <u>Comml vehicles</u> _ Vehicle is covered by Workers Comp<br><u>PPT vehicles</u> _ Vehicle is principally operated by employees | Check box – blank = No, X'd = Yes |
| OREGON:<br>317 policies | <u>All vehicles</u> _ Vehicle is principally operated by employees | Check box – blank = No, X'd = Yes |
| | <u>Individually Owned Autos:</u><br>Deductible: No deductible (default), 100, or 250.<br>If deductible applies then ask:<br>Ded applies to: _ Named Insured Only<br>_ Named Insured & Each Relative | Drop down box.<br><br>Drop down box |
| PENN.<br>3008 policies | <u>Comml vehicles</u> _ Vehicle is covered by Workers Comp<br><u>PPT vehicles</u> _ Vehicle is principally operated by employees | Check box – blank = No, X'd = Yes |

| STATE | NO FAULT – QUESTIONS and ANSWERS | PROMPT |
|---|---|---|
| SOUTH CAROLINA:<br>218 policies | SC no longer has PIP. | |

| | | |
|---|---|---|
| | | |
| UTAH:<br>456 policies | <u>Comml vehicles</u> _ Vehicle is covered by Workers Comp<br><u>PPT vehicles</u> _ Vehicle is principally operated by employees. | |
| WASHINGTON<br>189 policies | No separate questions. | |

Prompt Text Help
(PIP_MAN_RATE_Q1) - IS PREMIUM TO BE OVERRIDDEN?
(PIP_MAN_PREM_Q1) - MANUAL PREMIUM:
(ACC_DEATH_Q1) – ACCIDENTAL DEATH BENEFIT:
(WORK_LOSS_Q1) – WORK LOSS COVERAGE:

(MED_PAY_AR_Q1) – COVG APPLIES TO:
(VEH_COV_WC_Q1) – VEHICLE IS COVERED BY WORKERS COMP:
(VEH_OPER_EMP_Q1) – VEHICLE IS PRINCIPALLY OPERATED BY EMPLOYEES:
(INC_BEN_LMT_Q1) – INCOME BENEFITS LIMIT:
(FUN_BEN_LMT_Q1) – FUNERAL BENEFITS
(MED_BEN_LMT_Q1) – MEDICAL BENEFITS LIMIT:
(PIP_DED_Q1) – DEDUCTIBLE:
(PIP_DED_APP_Q1) – DED APPLIES TO:
(?) – COVERAGE OPTIONS
(FURN_REG_USE_Q1) – VEHICLE IS FURNISHED FOR REGULAR USE:
(TORT_LMT_Q1) – TORT LIMITATION:
(?) – GUEST PIP
(INTRASTATE_Q1) – IS THIS AN INTRASTATE VEHICLE?
(PDBB_Q1) – PROPERTY DAMAGE LIABILITY COVERAGE BUYBACK REQUESTED:
(PDBBMAN_PREM_Q1) - Manual Premium:
(PPI_DED_Q1) – PROPERTY PROTECTION INSURANCE DEDUCTIBLE:
(COOR_BEN_OPT_Q1) – EXCESS PIP:
(EXT_MED_EXP_Q1) – EXTEND MEDICAL EXPENSE LIMIT TO 10,000.
(?) – DEDUCTIBLE APPLIES TO MEDICAL EXPENSE ONLY:
(OBEL_Q1) – OPTIONAL BASIC ECONOMIC LOSS:
(OBELMAN_PREM_Q1_ - Manual Premium:
(WORK_COOR_Q1) – WORK LOSS COORDINATION:
(ELIM_MED_INS_Q1) – ELIMINATE MEDICAL EXPENSE: NAMED INSURED ONLY:
(ELIM_MED_REL_Q1) - ELIMINATE MEDICAL EXPENSE: NAMED INSURED & RELATIVES:
(MEDBEN_ONLY_Q1) – PROVIDE MEDICAL EXPENSE BENEFIT ONLY:
(GOVT_SPONS_Q1) - Is this vehicle government sponsored?
(VEH_OWN_OPER_Q1) - Is this vehicle operated by the owner?

*Additional No Fault:*

Initial Display

The initial display (if manual premium override was selected) will be " Is Premium to be overridden?" and answer defaulted to No. "Manual Premium:" and a blank input box.

Prompt Type / Length

1st question's prompt type are Radio buttons.
2nd question's prompt type is a free form input text box – 5 byte length.

Protection

Unprotected

Available Inputs

For Is premium to be manually overridden? the available inputs are No or Yes.

If Yes, the for the premium input box the available answers are numeric – 1 through 99999.

See below for state specifics.

Changes Allowed

Yes

Required / Optional

The answer to the 1st question is required. The answer to the second question is required if the first question is answered Yes.

Functional Notes

The first two prompts will only appear if operator answered Yes to manually override premiums under the Additional Vehicle Information.

For state specific questions and answers – see table below.

| STATE | ADDITIONAL NO FAULT QUESTIONS & ANSWERS | PROMPT |
|---|---|---|
| COLORADO:<br>76 policies | <u>All vehicles:</u> Additional No Fault Option: chged to 'Addl No-Fault Opt:'<br>- Medical Expense Benefit<br>- Medical Expense Benefit & Work Loss Option<br>(Must select one or delete APIP). | Drop down box. |
| CONNECTICUT<br>80 policies | <u>All vehicles:</u> Additional No Fault Limit: ( no default – let operator Choose.)<br>Drop down selections: Aggregate Limit / Work Loss<br>$10,000 / $200<br>$15,000 / $200<br>$25,000<br>$50,000<br>$75,000<br>$100,000<br>For options above not displaying a Work Loss, must input a Work Loss Limit per week: $200, $300 OR $400. | Drop down box |

Note: One shot needed to determine Work Loss limits to display. Must be even hundred and minimum of $200

| STATE | ADDITIONAL NO FAULT QUESTIONS & ANSWERS | PROMPT |
|---|---|---|
| DELAWARE:<br>346 policies | Additional No Fault Limit: Drop down choices:<br>Total Aggregate Limit<br>$25,000 / $50,000<br>$50,000 / $100,000 | Drop down box |

| | | |
|---|---|---|
| | $100,000 / $300,000<br>$30,000<br>$50,000<br>$100,000<br>$300,000 | |
| FLORIDA:<br>10 policies | APIP in FL is triggered by selecting PIP option 5 or 6 (Extended PIP) and is only for Individual Named Insured's. Additional No Fault Option: $10,000, $25,000, $40,000, $90,000 | Drop down box |
| HAWAII:<br>45 policies | Additional No Fault Limits: Drop down selections:<br>Aggregate Limit Loss of Earnings<br>$30,000 $1,200<br>$50,000 $1,200<br>$75,000 $1,500<br>$100,000 $2,000 | Drop down box |
| KANSAS:<br>15 policies | **Individual Named Insured's Only**<br>Addl No Fault Opt: – Drop down choices<br>Medical Rehabilitation Funeral Work Survivors Benefit<br>Expenses Expenses Expenses Loss Loss Period<br>$12,500 $12,500 $2000 $1050/ $1050/Mo 1 Yr<br>Month $25/Day<br>$27,500 $27,500 $2,500 $1250/ $1250/Mo 2 Yr<br>Month $25/Day | Drop down box |
| KENTUCKY:<br>35 policies | Individual Named Insured's Only: Additional No Fault Limits: Drop down choices:<br>Aggregate Limit Weekly Limit<br>$10,000 $50<br>$20,000 $100<br>$30,000 $200<br>$40,000 $300<br>$65,000 $400<br>$90,000 $550 | Drop down box |
| MINNESOTA:<br>5 policies | Individual Named Insured's Only Addl No Fault Opt: Drop down selections:<br>Medical Exp Other Exp Weekly Max Daily Max<br>$30,000 $20,000 $250 $200<br>$40,000 $20,000 $250 $200<br>$50,000 $20,000 $250 $200<br>$50,000 $25,000 $300 $300 | Drop down box |

| | | | | | |
|---|---|---|---|---|---|
| | $75,000 | $25,000 | $300 | $300 | |
| | $100,000 | $50,000 | $400 | $300 | |

| STATE | ADDITIONAL NO FAULT QUESTIONS & ANSWERS | PROMPT |
|---|---|---|
| NEW JERSEY: 236 policies | Individual Named Insured's Only Addl No Fault Opt:<br>Drop Down choices:<br>Weekly / Total Inc Ben / Per Day / Total Ess Ser / Death Benefit / Funeral Benefit<br>$100 $10,400 $12 $8,760 $10,000 $2,000<br>$125 $13,000 $20 $14,600 $10,000 $2,000<br>$175 $18,200 $20 $14,600 $10,000 $2,000<br>$250 $26,000 $20 $14,600 $10,000 $2,000<br>$400 $41,600 $20 $14,600 $10,000 $2,000<br>$500 $52,000 $20 $14,600 $10,000 $2,000<br>$600 $62,400 $20 $14,600 $10,000 $2,000<br>$700 $72,800 $20 $14,600 $10,000 $2,000<br>$100 Unlimited $12 $8,760 $10,000 $2,000<br>$125 Unlimited $20 $14,600 $10,000 $2,000<br>$175 Unlimited $20 $14,600 $10,000 $2,000<br>$250 Unlimited $20 $14,600 $10,000 $2,000<br>$400 Unlimited $20 $14,600 $10,000 $2,000<br>$500 Unlimited $20 $14,600 $10,000 $2,000<br>$600 Unlimited $20 $14,600 $10,000 $2,000<br>$700 Unlimited $20 $14,600 $10,000 $2,000 | Drop down box |
| | __ Additional no fault applies to Resident Relatives<br>If the above question is answered Yes, then the next question needs to be answered.<br>__ Number of Relatives (need to be in the numeric number.)<br>~~__APIP premium~~ | Check box, blank = No, X'd = Yes<br>Input box. |

APIP premium = Either offer premiums to be charged in the drop down, or in the bridge set a premium- and pass to RII since RII manually rates APIP on BPIP. Premiums are published based on option selected above.

| | | |
|---|---|---|
| NEW YORK: 7262 policies | Additional No Fault Limits: - Drop down choices:<br>Medical Exp., Monthly Work Loss Essential .Services<br>$25,000 $500 $25<br>$50,000 $1,000 $25<br>$100,000 $2,000 $25 | Drop down box |
| | Additional Death Benefit applies.<br>Available answers are Yes or No. Default to No. | Check box. blank = No, X'd = Yes |
| NORTH | Additional No Fault Limits: Drop down choices: | Drop down |

| | | |
|---|---|---|
| DAKOTA:<br>0 policies | Additional Aggregate Limit / Additional Work Loss or Survivor's Income Loss<br>$10,000 / $100<br>$50,000 / $200<br>$70,000 / $200<br>$80,000 / $200 | box |
| PENNSYLVANIA<br>1914 polices | WHAT TYPE OF FIRST PARTY BENEFITS APPLY?<br>COMBINATION or ADDITIONAL<br><br>If Combination First Party Benefits were chosen; | Drop down box |
| Pennsylvania – Continued | COMBINATION FIRST PARTY BENEFIT OPTIONS:<br>(drop down) <u>Total Benefit</u> <u>Funeral Expense</u> <u>Accidental Death</u><br>(1) $50,000 $2,500 $10,000<br>(2) $100,000 $2,500 $10,000<br>(3) $177,500 $2,500 $25,000<br>(4) $277,500 $2,500 $25,000 | Drop down box for choices. |
| Pennsylvania – Continued | If Additional First Party Benefits were chosen;<br><u>MEDICAL EXPENSE BENEFITS LIMIT:</u> Drop down choices:<br>(5) $10,000, (6) $25,000, (7) $50,000, or (8) $100,000<br><u>WORK LOSS BENEFITS MONTHLY / TOTAL:</u><br>Drop down choices:<br>(9) $1,000/5,000. (10) $1,000/15,000, (11)$1,500/25,000, (12) $2,500/50,000<br><u>FUNERAL EXPENSE BENEFITS LIMIT:</u> Drop down choices:<br>(13) $1,500 or (14) $2,500<br><u>ACCIDENTAL DEATH BENEFITS LIMIT:</u> Drop down choices:<br>(15) $5,000, (16) $10,000, or (17) $25,000 | Drop down box for choices for each of the four questions. Blank should be included in each drop down. They don't need to choose from all – just 1. |

If Combination First Party Benefits are selected CAN NOT select Additional First Party Benefits. (vise-versa)
If Additional First Party Benefits – can choose one from each benefit category.
Numbers in (parenthesis) are what is in R2 today. Do NOT show in the drop down.

| | | |
|---|---|---|
| SOUTH CAROLINA:<br>26 policies | no-fault no longer applies. | |

| | | |
|---|---|---|
| UTAH:<br>18 polices | **Individually Owned Auto's Only**<br>Additional No Fault Options: Drop Down options:<br>Additional Medical Benefits — Income Benefits<br>$5,000 per Person — $300 per Person per Week<br>$10,000 per Person — $350 per Person per Week | Drop down box |
| WASHINGTON: | Addl No Fault Opt: Drop down choices<br>$35,000 Medical & Hospital Benefits within 3 yrs of accident<br>$35,000 One Year Income Continuation Benefits<br>$40 per Day Loss of Services Benefits, for at least one year | Drop down box |

Prompt Text Help
(APIPMAN_RATE_Q1) - IS PREMIUM TO BE OVERRIDDEN?
(APIPMAN_PREM_Q1) - MANUAL PREMIUM:
(APIP_OPTS_CO_Q1) – ADDL NO-FAULT OPT:
(APIP_OPTS_KS_Q1) - ADDL NO-FAULT OPT:
(APIP_OPTS_MN_Q1) - ADDL NO-FAULT OPT:
(APIP_OPTS_ND_Q1) - ADDL NO-FAULT OPT:
(APIP_OPTS_NJ_Q1) - ADDL NO-FAULT OPT:
(APIP_OPTS_NY_Q1) - ADDL NO-FAULT OPT:
(APIP_OPTS_UT_Q1) - ADDL NO-FAULT OPT:
(APIP_OPTS_WA_Q1) - ADDL NO-FAULT OPT:
(APIP_OPTS_CT_Q1) – ADDITIONAL NO FAULT LIMITS:
(APIP_OPTS_DE_Q1) – ADDITIONAL NO FAULT LIMITS:
(APIP_OPTS_HI_Q1) – ADDITIONAL NO FAULT LIMITS:
(APIP_OPTS_KY_Q1) - ADDITIONAL NO FAULT LIMITS:
(BEN_TYPE_PA_Q1) – WHAT TYPE OF FIRST PARTY BENEFITS APPLY?
(?) – COMBINATION FIRST PARTY BENEFIT OPTIONS:
(?) – MEDICAL EXPENSE BENEFITS LIMIT:
(?) – WORK LOSS BENEFIT MONTHLY / TOTAL:
(?) - FUNERAL EXPENSE LIMIT:
(?) – ACCIDENTAL DEATH BENEFITS LIMIT:
(NY_ADDL_DTH_Q1) - Additional Death Benefit applies
(RES_REL_NJ_Q1) - Additional No Fault applies to Resident Relatives
(NJ-?) – NUMBER OF RELATIVES:

*Uninsured Motorist:*

Initial Display

The initial display (if manual premium override was selected) will be " Is Premium to be overridden?" and answer defaulted to No. "Manual Premium:" and a blank input box.

See State Specific questions below;

Prompt Type / Length

1st question's prompt type are Radio buttons.

2nd question's prompt type is a free form input text box – 5 byte length.

Protection

Unprotected

Available Inputs

For Is premium to be manually overridden? the available inputs are No or Yes.

If Yes, the for the premium input box the available answers are numeric – 1 through 99999.

See below for state specifics.

Changes Allowed

Yes

Required / Optional

The answer to the 1st question is required. The answer to the second question is required if the first question is answered Yes.

Functional Notes

The first two prompts will only appear if operator answered Yes to manually override premiums under the Additional Vehicle Information.

For state specific questions and answers – see table below.

| STATE | UNINSURED MOTORIST Questions & Answers | PROMPT TYPE |
|---|---|---|
| **ALASKA** | Is property damage included? – Yes or No. | Check box. Default to Yes. |
| **ARKANSAS** | Is property damage included? – Yes or No<br>If YES, then<br>If PD limit is different from UM limit, select limit: | Check box Default to<br>No.<br>Drop down box. |
| CALIFORNIA | Is property damage included? – Yes or No | Check box. Default to No. |
| GEORGIA | Deductible options: Drop down choices: | Drop down box |

| | | |
|---|---|---|
| | No deductible (default)<br>$ 500 each accident<br>$1000 each accident<br>$2000 each accident | |

| STATE | UNINSURED MOTORIST Questions & Answers | PROMPT TYPE |
|---|---|---|
| ILLINOIS | Applies to PPT & recreational veh with no collision.<br>Is property damage included? – Yes or No | Check box Default to No. |
| INDIANA | Is property damage included? – Yes or No.<br>If the above question is answered No then do not ask the following question:<br>Does deductible apply to property damage? – Yes or No. | Check box Default to Yes.<br>Check box Default to Yes. |
| LOUISIANA | **Applies to vehicle as long as no collision coverage**<br>Is property damage included? – Yes or No | Check box. Default to No. |
| MISSISSIPPI | Is property damage included? – Yes or No. | Check box. Default to Yes. |
| NEW YORK | Supplemental coverage is provided. – Yes or No<br>Note: we are not covering statutory on the NET. If answered No here we would need to refer them to Issue Express to finish. | Check box. Default to Yes. |
| NORTH CAROLINA | If PPT – non fleet class 739811 - Split limit apply.<br>What is the each person / each accident limit that applies?<br>100/200, 100/300, 300/300, 250/500, 500/500, 500/1000, or 1000/1000.<br>What is the property damage limit that applies?<br>50, 100, 250, 500, 750, or 1000. | Drop down box for both with the applicable limit choices. |
| OHIO | Applies if vehicle does not have collision coverage.<br>Is property damage included? – Yes or No | Check box. Default to No. |
| OREGON | **This question only applies to private pass types:**<br>Is property damage included? – Yes or No | Check box. Default to No. |

| | | |
|---|---|---|
| | If YES, then<br>If PD limit is different from UM limit, select limit: | Drop down box. |
| RHODE ISLAND | Applies if vehicle does not have collision coverage.<br>Is property damage included? – Yes or No | Check box. Default to No. |
| TENNESSEE | Is property damage included? – Yes or No. | Check box. Default to Yes. |
| UTAH | Applies if vehicle does not have collision and must have UMBI.<br>Is property damage included? – Yes or No. | Check box. Default to No. |
| WASHINGTON | Is property damage included? – Yes or No. | Check box. Default to Yes. |

Prompt Text Help
(UM_MAN_RATE_Q1) - IS PREMIUM TO BE OVERRIDDEN?
(UM_MAN_PREM_Q1) - MANUAL PREMIUM:
(?) – IS PROPERTY DAMAGE INCLUDED? (AL, AR, CA, IL, IN, LA, MS, OH, OR, RI, TN, UT, WA)
(?) – IF PD LIMIT IS DIFFERENT FROM UM LIMIT, SELECT LIMIT: (OR) (AR)
(UM_DED_OPT_Q1) – DEDUCTIBLE OPTIONS: (GA)
(UM_DED_PD_Q1) – DOES DEDUCTIBLE APPLY TO PROPERTY DAMAGE? (IN)
(UM_SUPPL_COV_Q1) – SUPPLEMENTAL COVERAGE IS PROVIDED. (NY)
(?) - WHAT IS THE EACH PERSON/ EACH ACCIDENT LIMIT THAT APPLIES? (NC)
(?) - WHAT IS THE PROPERTY DAMAGE LIMIT THAT APPLIES? (NC)

*Underinsured Motorist:*

Initial Display

The initial display (if manual premium override was selected) will be “ Is Premium to be overridden?” and answer defaulted to No. “Manual Premium:” and a blank input box.

See State Specific questions below;

Prompt Type / Length

1st question’s prompt type are Radio buttons.

2nd question’s prompt type is a free form input text box – 5 byte length.

Protection

Unprotected

Available Inputs

For Is premium to be manually overridden? the available inputs are No or Yes.
If Yes, the for the premium input box the available answers are numeric – 1 through 99999.
See below for state specifics.

Changes Allowed
Yes

Required / Optional
The answer to the 1st question is required. The answer to the second question is required if the first question is answered Yes.

Functional Notes
The first two prompts will only appear if operator answered Yes to manually override premiums under the Additional Vehicle Information.
For state specific questions and answers – see table below.

| STATE SPECIFICS | UNDERINSURED MOTORIST – Questions & Answers | PROMPT |
|---|---|---|
| ARIZONA: | 'If UIM limit is different from UM limit, select limit. '<br>Note: drop down box prefilled with the same limit as UM. List of published limits will be contained in the drop down. Note UIM can not be higher than UM. | Drop down box |
| ARKANSAS: | 'If UIM limit is different from UM limit, select limit. '<br>Note: drop down box prefilled with the same limit as UM. List of published limits will be contained in the drop down. Note UIM can not be higher than UM. | Drop down box |
| CONNECTICUT: | 'Does underinsured motorist conversion coverage apply?'. Available choices Yes or No. | Check box . Defaults to No |
| HAWAII: | 'If UIM limit is different from UM limit, select limit. '<br>Note: drop down box prefilled with the same limit as UM. List of published limits will be contained in the drop down. Note UIM can not be higher than UM. | Drop down box |

| STATE SPECIFICS | UNDERINSURED MOTORIST – Questions & Answers | PROMPT |
|---|---|---|

| | | |
|---|---|---|
| IDAHO: | 'If UIM limit is different from UM limit, select limit. '<br>Note: drop down box prefilled with the same limit as UM. List of published limits will be contained in the drop down. Note UIM can not be higher than UM. | Drop down box |
| INDIANA:: | 'If UIM limit is different from UM limit, select limit. '<br>Note: drop down box prefilled with the same limit as UM. List of published limits will be contained in the drop down. Note UIM can not be higher than UM. | Drop down box |
| MASSACHUSETTS | 'If UIM limit is different from UM limit, select limit. '<br>Note: drop down box prefilled with the same limit as UM. List of published limits will be contained in the drop down. Note UIM can not be higher than UM. | Drop down box. |
| MINNESOTA: | 'If UIM limit is different from UM limit, select limit. '<br>Note: drop down box prefilled with the same limit as UM. List of published limits will be contained in the drop down. Note UIM can not be higher than UM. | Drop down box |
| MISSOURI: | 'If UIM limit is different from UM limit, select limit. '<br>Note: drop down box prefilled with the same limit as UM. List of published limits will be contained in the drop down. Note UIM can not be higher than UM. | Drop down box |
| PENNSYLVANIA: | 'If UIM limit is different from UM limit, select limit. '<br>Note: drop down box prefilled with the same limit as UM. List of published limits will be contained in the drop down. Note UIM can not be higher than UM. | Drop down box |
| SOUTH DAKOTA: | 'If UIM limit is different from UM limit, select limit. '<br>Note: drop down box prefilled with the same limit as UM. List of published limits will be contained in the drop down. Note UIM can not be higher | Drop down box |

| | | |
|---|---|---|
| | than UM. | |
| UTAH: | 'If UIM limit is different from UM limit, select limit. '<br>Note: drop down box prefilled with the same limit as UM. List of published limits will be contained in the drop down. Note UIM can not be higher than UM. | Drop down box |
| WEST VIRGINIA: | 'If UIM limit is different from UM limit, select limit. '<br>Note: drop down box prefilled with the same limit as UM. List of published limits will be contained in the drop down. Note UIM can not be higher than UM. | Drop down box |
| WISCONSIN: | 'If UIM limit is different from UM limit, select limit. '<br>Note: drop down box prefilled with the same limit as UM. List of published limits will be contained in the drop down. Note UIM can not be higher than UM. | Drop down box |

Prompt Text Help
(UIM_MAN_RATE_Q1) - IS PREMIUM TO BE OVERRIDDEN?
(UIM_MAN_PREM_Q1) - MANUAL PREMIUM:
(UIM_LMT_Q1) – IF UIM LIMIT IS DIFFERENT FROM UM LIMIT, SELECT LIMIT:
(UIM_CONVER_Q1) – DOES UNDERINSURED MOTORIST CONVERSION COVERAGE APPLY?
(UIM_SPL_LMT_Q1) - If UIM limit is different from UM limit, Select limit: (Applies to MASS)

*Comprehensive:*

Initial Display

The initial display (if manual premium override was selected) will be " Is Premium to be overridden?" and answer defaulted to No. "Manual Premium:" and a blank input box.

Prompt Type / Length

1st question's prompt type are Radio buttons.
2nd question's prompt type is a free form input text box – 5 byte length.

Protection

Unprotected

Available Inputs

For Is premium to be manually overridden? the available inputs are No or Yes.
If Yes, the for the premium input box the available answers are numeric – 1 through 99999.
See below for state specifics.

Changes Allowed

Yes

Required / Optional

The answer to the 1st question is required. The answer to the second question is required if the first question is answered Yes.

Functional Notes

The first two prompts will only appear if operator answered Yes to manually override premiums under the Additional Vehicle Information.
For state specific questions and answers – see table below.

| STATE SPECIFICS | COMPREHENSIVE Questions & Answers | PROMPT |
|---|---|---|
| ARIZONA | Private Passenger Types:<br>Glass Buyback – (default to No.)<br>Available choices are Yes or No. | Check box |
| CONNECTICUT: | 'Full Glass Coverage' – (default to YES.)<br>Available choices are Yes or No. | Check box. |
| KENTUCKY: | Private Passenger Types:<br>Anti-theft Category: Drop down options:<br>- No Anti-theft device (default)<br>- Alarm Only<br>- Ignition/Steering Column Cut Off Switch<br>- Fuel Cut Off/Permanently attached steering wheel lock/armored<br>- Cable hood lock<br>- Armored Ignition/Armored Cable or Electric Hood Lock<br>- Passiveers<br>- Window Identification<br>- High Security Ignition<br>- Internally Operated Alarms<br>- All Others | Drop down box. |
| STATE SPECIFICS | COMPREHENSIVE Questions & Answers | PROMPT |
| MASSACHUSETTS | $100 glass deductible applies. – Yes or No. default to No. | Check box |

| | | |
|---|---|---|
| | Anti-theft Category - Drop down options:<br>No Anti-theft device (default)<br>Category 1<br>Category 2<br>Category 3<br>Category 4 (Vehicle Recovery Systems)<br>Category 4 and Category 1 Combined<br>Category 4 and Category 2 Combined<br>Category 4 and Category 3 Combined | Drop Down box. |
| NEW JERSEY: | Private Passenger Types:<br>Anti-theft Category: Drop down options:<br>_ No Anti-theft device (default)<br>_ Category 1 (Anti-theft devices)<br>_ Category 2 (Anti-theft devices)<br>_ Category 3 (Anti-theft or Vehicle Recovery Devices)<br>_ Category 4 (Anti-theft or Vehicle Recovery Devices)<br>_ Category 3 & 4 Combined | Drop down box |
| NEW YORK: | Private Passenger Types:<br>Anti-theft Category: Drop down options:<br>_ No Anti-theft device (default)<br>_ Alarm Only<br>_ Active Disabling<br>_ Passive Disabling<br>_ Non-Qualifying Device (All Others) | Drop down box |
| | Full Window Glass Coverage –. Yes or No.<br>default to NO | Check box. |
| RHODE ISLAND: | All vehicle types:<br>Anti-theft Category: Drop down options:<br>_ No Anti-theft device (default)<br>_ Alarm Only – Category 1<br>_ Active Disabling Devices – Category 2<br>_ Passive Disabling Devices – Category 3<br>_ Vehicle Recovery System Device – Category 4<br>_ Category 4 and Category 1 Combined<br>_ Category 4 and Category 2 Combined<br>_ Category 4 and Category 3 Combined | Drop down box |
| WASHINGTON | Private Passenger Types:<br>Glass Buyback – (default to No.)<br>Available choices are Yes or No. | Check box |
| | Private Passenger Types:<br>Anti-theft Category: Drop down options: | Drop down box |

| | | |
|---|---|---|
| | _ No Anti-theft device (default)<br>_ Alarm Only<br>_ Active Disabling<br>_ Passive Disabling<br>_ Non-Qualifying Device (All Others) | |

Prompt Text Help
(CMP_MAN_RATE_Q1) - IS PREMIUM TO BE OVERRIDDEN?
(CMP_MAN_PREM_Q1) - MANUAL PREMIUM:
(GLASS_BB_Q1) – GLASS BUYBACK
(FULL_GLASS_Q1) - FULL GLASS COVERAGE
(100_GLASSDED_Q1) - $100 GLASS DEDUCTIBLE
(FULL_WINDOW_Q1) - FULL WINDOW GLASS COVERAGE
(ANTI_THEFT_Q1) - ANTI-THEFT CATEGORY

*Specified Causes of Loss:*

Initial Display

The initial display for Specified COL Option is "blank" drop down box.
(1/4/00 – changed question to read: SPECIFIED COL OPTS:
The initial display (if manual premium override was selected) will be " Is Premium to be overridden?" and answer defaulted to No. "Manual Premium:" and a blank input box.
STATE SPECIFIC:
Massachusetts - $100 Glass deductible – check box defaults to NO.

Prompt Type / Length

Spec. COL Option – drop down box.
'Is Premium…' question's prompt type are Radio buttons.
'Manual Premium' prompt type is a free form input text box – 5 byte length.

STATE SPECIFIC:
Massachusetts - check box

Protection

Unprotected

Available Inputs

For the Spec. COL Option: the available answers are Specified Causes, Fire, Fire/Theft, Fire/Theft/Windstorm, or Limited Specified Causes.
For Is premium to be manually overridden? the available inputs are No or Yes.
If Yes, the for the premium input box the available answers are numeric – 1 through 99999.
STATE SPECIFIC:

Massachusetts - $100 Glass deductible – available answers of YES or NO.

Changes Allowed
Yes

Required / Optional
Spec COL Option – one of the answers must be selected.
The answer to "Is premium…'question is required. The answer to the 'Manual Premium' is required if the first question is answered Yes.

Functional Notes
The two questions referring to manual premium override will only appear if operator answered Yes to 'manually override premiums' under the Additional Vehicle Information.

For Mass, we will not be allowing Option 1 – Fire/Theft/CAC. This requires a manual premium to be input. Only fire or fire/theft are available for Mass.

Prompt Text Help
(SPC_MAN_RATE_Q1) - IS PREMIUM TO BE OVERRIDDEN?
(SPC_MAN_PREM_Q1) - MANUAL PREMIUM:
(100_GLASSDED_Q1) - $100 GLASS DEDUCTIBLE:
(SPECOL_OPTS_Q1) - SPECIFIED COL OPTS:

*Collision:*

Initial Display
The initial display (if manual premium override was selected) will be " Is Premium to be overridden?" and answer defaulted to No. "Manual Premium:" and a blank input box.
See below for state specifics.

Prompt Type / Length
1st question's prompt type are Radio buttons.
2nd question's prompt type is a free form input text box – 5 byte length.

Protection
Unprotected

Available Inputs
For Is premium to be manually overridden? the available inputs are No or Yes.
If Yes, the for the premium input box the available answers are numeric – 1 through 99999.
See below for state specifics.

Changes Allowed

Yes

Required / Optional

The answer to the 1st question is required. The answer to the second question is required if the first question is answered Yes.

Functional Notes

The first two prompts will only appear if operator answered Yes to manually override premiums under the Additional Vehicle Information.

For state specific questions and answers – see table below.`

| STATE SPECIFICS | COLLISION Questions & Answers | PROMPT |
|---|---|---|
| CALIFORNIA: | All vehicles that do not have UM on them: 'Collision deductible to be Waived' Available choices are Yes or No. | Check box. Default to No. |
| MASSACHUSETTS | Collision Deductible to be Waived – Available choices are Yes or No | Check Box Default to Yes. |
| | Limited Collision Coverage – Available choices are Yes or No | Check Box Default to No. |

Note: If waiver of collision is answered Yes than Limited collision can not be answered Yes and vise versa.

| | | |
|---|---|---|
| MICHIGAN: | Collision Option: Drop down options:<br>Regular (default)<br>Limited<br>Broadened | Drop down box |
| NEW JERSEY: | Private Passenger Types: (Chg ques to SAFETY OPT DISCOUNT:) Safety Feature Discount Drop Down Options:<br>No Safety Features (default)<br>1 Safety Feature<br>2 Safety Features<br>3 or more Safety Features | Drop down box |

| STATE SPECIFICS | COLLISION Questions & Answers | PROMPT |
|---|---|---|
| NEW YORK: | Private Passenger Types: | Check box |

| | | |
|---|---|---|
| | Full Coverage for Window Glass –.Available choices are Yes or No. | defaults to No |

Prompt Text Help
(COL_MAN_RATE_Q1) - IS PREMIUM TO BE OVERRIDDEN?
(COL_MAN_PREM_Q1) - MANUAL PREMIUM:
(MA_DEDWAIVED_Q1) - COLLISION DEDUCTIBLE TO BE WAIVED
(DED_WAIVED_Q1) - COLLISION DEDUCTIBLE TO BE WAIVED
(LIMITED_COL_Q1) - LIMITED COLLISION COVERAGE
(COLL_OPTS_Q1) - COLLISION OPTIONS
(SAF_FEA_OPTS_Q1) - SAFETY OPT DISCOUNT
(FULL_GLASS_Q1) - FULL GLASS COVERAGE Towing:

Initial Display

The initial display (if manual premium override was selected) will be " Is Premium to be overridden?" and answer defaulted to No. "Manual Premium:" and a blank input box.

Prompt Type / Length

1st question's prompt type are Radio buttons.
2nd question's prompt type is a free form input text box – 5 byte length.

Protection

Unprotected

Available Inputs

For Is premium to be manually overridden? the available inputs are No or Yes.
If Yes, the for the premium input box the available answers are numeric – 1 through 99999.

Changes Allowed

Yes

Required / Optional

The answer to the 1st question is required. The answer to the second question is required if the first question is answered Yes.

Functional Notes

The first two prompts will only appear if operator answered Yes to manually override premiums under the Additional Vehicle Information.

Prompt Text Help (TOW_MAN_RATE_Q1) - IS PREMIUM TO BE OVERRIDDEN?
(TOW_MAN_PREM_Q1) - MANUAL PREMIUM:

*Rental Reimbursement :*

Initial Display

If MIX & TRANSIT class code;

Screen will display the question, 'Transportation expense option' with a blank drop down box.

Prompt Type / Length

The prompt type is a drop down – with a length of 12 bytes

Protection

Unprotected

Available Inputs

The available answers are;

1.) $500 / $3500
2.) $1000 / $7,000.
3.) $1500 / $10,500
4.) $2000 / $14,000

Changes Allowed

Yes

Required / Optional

Answer is Required.

Functional Notes

If Rental Reimbursement is checked off on the vehicle schedule screen and the vehicle type is a mix & transit (4th and 5th digit of the class code = 71, 72, 73, 74 or 79 ) than this prompt will come up under the Vehicle detail screen and will require that it be filled in.

The appropriate forms will be produced.

ISSUE:
If an option 5 is allowed which is the operator gets to put in any Limit per day/ Maximum combination, than a "Percent Factor' would need to be captured: It allows 4 byte input – checking to see if needed in Rating. It is used for rating but not sure if Select uses.

Prompt Text Help
(TRANS_EX_OPT_Q1) - TRANSPORTATION EXPENSE OPTION:

*Audio Visual Equipment:*

Initial Display

Cost New of Audio Visual equipment – initial displays as blank.

Prompt Type / Length

Free form input text box – 5 byte length.

Protection

Unprotected

Available Inputs

The available answers are numeric – 1 through 99999.

Changes Allowed

Yes

Required / Optional

The premium is required.

Functional Notes

If Audio Visual equipment is checked off on the vehicle schedule screen than this prompt will come up under the Vehicle detail screen and will require that the cost new of the equipment be filled in.

Prompt Text Help (AUDIO_VIS_Q1) - COST NEW OF AUDIO VISUAL EQUIPMENT:

PAGE BUTTONS

Pricing: (Alt-)

The PRICING button displays and is active at all times. Clicking PRICING saves the data keyed or changed data and moves the operator to the Pricing screen.

Return to Vehicle Schedule (Alt-S):

The RETURN TO VEHICLE SCHEDULE button displays and is active at all times. Clicking RETURN TO VEHICLE SCHEDULE saves the data keyed or changed data and moves the operator to the vehicle schedule screen.

SCREEN TABBING ORDER

Initial Cursor Position

The screen should appear with the cursor focused on the first vehicle detail question cell.

Default Button on ENTER
Pricing is the default for Enter on this page.

Tab Sequence Throughout Screen

ISSUES

ISSUE ITEM
Rental Reimbursement – Mix & Transit:
If an option 5 is allowed which would allow the operator to put in any Limit per day/ Maximum Per Vehicle combination, than a "Percent Factor' would need to be captured. It is used for rating but not sure if Select uses.

AUTO QUOTE - DRIVER LIST SCREEN
PAGE PROMPTS / FIELDS

*Driver's List Grid:*

Initial Display

Grid will display with one blank row.

Prompt Type / Length

Grid as shown below.

| | State | License | Date of Birth | First | Last | Middle | Sex | SSN | MVR ordered |
|---|---|---|---|---|---|---|---|---|---|
| | | | | | | | | | |

State – 2 byte field.
License – 18 byte field
Date of birth – MM/DD/YYYY (DB2 date field)
First Name- 20 byte field
Last Name – 20 byte field
Middle Name – 15 byte field
Sex – 1 byte field
SSN – 9 byte field
MVR ordered – 3 byte field Protection All information and rows are unprotected in the Grid.

Available Inputs

State – All applicable states codes.
License – alpha – numeric input
Date of birth – MM/DD/YYYY (valid date)
First Name- text field
Last Name – text field
Middle Name – text field
Sex – 'M' or 'F'
SSN – text field
MVR ordered – Yes or No Changes Allowed Yes changes are allowed.

Required / Optional

State, license number and last name are required fields.

Functional Notes

The operator should be able to TAB for field to field in the grid.
To select a driver the operator will need to click on the 'nub' for that row. Then they will need to click on the button labeled 'Delete Selected Driver' if they want to delete that driver or click on "Request Selected MVR' to order the mvr for that driver.

For the MVR ORDERED field, after the request to order a mvr is made, this field will be filled with a YES. If the MVR is not ordered, this field will be filled with NO.

Prompt Text Help

PAGE BUTTONS

Add Another Driver: ( ALT + A)
The ADD ANOTHER DRIVER button is used to add another driver to the drivers list. When this button is clicked on anther row will be added to the GRID.

Delete Selected Driver: (ALT + D)
The DELETE SELECTED DRIVER button is used to delete a selected driver from the drivers list.

Request Selected MVR: (ALT + R)
The REQUEST SELECTED MVR button is used to order a mvr for a selected driver on the drivers list.

By clicking on this button the MVR ORDERED field will be filled with the word YES.

Request ALL MVRS: (ALT + M)
The REQUEST ALL MVRS button is used to order mvrs for all drivers on the drivers list.

By clicking on this button the MVR ORDERED field will be filled with the word YES.

Continue (ALT + C):
The CONTINUE button should display and be active at all times. If CONTINUE is clicked or entered on, then any data that was keyed, changed or defaulted should be saved. The operator is brought back to the pricing screen when this button is clicked.

SCREEN TABBING ORDER

Initial Cursor Position
The cursor should start focused on the CONTINUE button. If the TAB key is pressed it should move to the first row of the grid starting with the STATE field.

Default Button on ENTER
The CONTINUE button should be used as the default for ENTER.

Tab Sequence Throughout Screen

ADDITIONAL POSSIBLE FEATURES

At a high level, it is planned to attempt to display MVR data on-line. There may also be the option to request MVR's both in the Batch mode (as currently received) or On-line (if available in that state.). Approximately 40 states have On-line MVR capabilities. We may want the ability to request MVR's by Batch since this can be less expensive then ordering On-line mvrs.

More will follow as this process is analyzed.

For day one, we were not able to capture the date the mvr was requested for each driver. We would have only been able to capture one date for the entire transaction. We felt that this would be to confusing for the operator if drivers were added at different dates.

The invention claimed is:

1. A method for providing remote access to insurance applications via an insurance data processing application with a web-based user interface, comprising:

receiving a first request from a first user to use the web-based user interface to access a plurality of insurance applications comprising at least one legacy insurance application for administering an insurance policy;

when the first request has the authorization to access the legacy insurance application, employing a legacy application wrapper to display a Web-based GUI screen for the legacy insurance application, wherein the screen displays a listing of actions and additional screens that are accessible for the legacy insurance application;

verifying that the first request includes a first authorization to use the web-based user interface;

upon successful verification of the first authorization, granting the first request to use the web-based user interface;

prompting a selection to establish a connection for the first request to use the web-based user interface if the first request represents the first time that the web-based user interface is used, and downloading files to a source of the first request;

receiving a second request from the first user to access a particular one of the plurality of insurance applications via the web-based user interface;

verifying that the second request includes a second authorization to the particular insurance application;

if the second authorization is successfully verified, granting the second request to access the particular insurance application of the plurality of insurance applications, including providing a search screen that can perform a search of insurance accounts;

receiving a search command from the search screen;

performing the account search based on the search command;

listing results of the account search on the search screen; and providing options to select one of the search results and to create a new account name; and if the second authorization cannot be verified, displaying a notice denying access to the particular insurance application of the plurality of insurance applications and providing an option to refer the particular insurance application to a second user that has the authorization to access the particular insurance application.

2. The method of claim 1, wherein the particular insurance application comprises a commercial-lines insurance policy.

3. The method of claim 1, wherein the plurality of insurance applications resides in at least one mainframe data processing system.

4. The method of claim 1, wherein granting the first request to use the web-based user interface comprises:

displaying a welcome screen customized for the first request based on identity of the first request as derived from verifying the first authorization.

5. The method of claim 4, wherein the welcome screen includes at least one marketing message.

6. The method of claim 4, wherein the welcome screen includes options to print out forms, to establish an insurance account or issue an insurance policy, and to exit the web-based user interface.

7. The method of claim 1, wherein granting the second request to access the particular insurance application comprises:

providing options to add a new insurance policy, to modify a quote on an insurance policy of record, to refer a quote on an insurance policy of record, to issue an insurance policy of record, and to purge a quote on an insurance policy of record; and receiving a selection of one of the options.

8. The method of claim 7, wherein receiving a selection of one of the options comprises:

receiving a selection to modify the quote on the insurance policy of record; and displaying a first screen showing a first directory of available screens for the quote on the insurance policy of record.

9. The method of claim 8, wherein the first directory of available screens for the quote on insurance policy of record includes a direct link to each of the available screens.

10. The method of claim 8, wherein receiving a selection of one of the options further comprises:

displaying on the first screen a second directory of available screens for the quote on the insurance policy of record.

11. The method of claim 10, wherein the second directory includes a direct link to at least an action available in one of the available screens for the quote on the insurance policy of record.

12. The method of claim 7, wherein receiving a selection of one of the options comprises:

receiving a selection to issue the insurance policy of record; and displaying a first screen showing a first directory of available screens for the issue of the insurance policy of record.

13. The method of claim 12, wherein the first directory of available screens for the insurance policy issue includes a direct link to at least one of the available screens for the issue of the insurance policy of record.

14. The method of claim 12, wherein receiving a selection of one of the options further comprises:

displaying on the first screen a second directory of available screens for the issue of the insurance policy of record.

15. The method of claim 14, wherein the second directory includes at least a direct link to an action available in one of the available screens for the issue of the insurance policy of record.

16. The method of claim 1, wherein the wrapper comprises a rule engine executing a plurality of business rule sets, and each business rule set enables the wrapper to interface with one legacy insurance application.

17. The method of claim 1, wherein the wrapper presents a unified web-based GUI for a plurality of legacy insurance applications, and wherein communication between legacy applications is handled by the wrapper through a messaging protocol.

18. The method of claim 17, wherein the plurality of business rule sets are stored in an information management system, wherein the information management system provides the business rule sets to the wrapper.

19. The method of claim 1, further comprising recording the list of screens within the legacy insurance application that the first user has accessed.

20. The method of claim 17, further comprising displaying a link within the Web-based GUI screen for displaying a screen of one or more direct links to screens of the legacy insurance application that the first user has accessed.

21. The method of claim 1, further comprising dynamic display of a next display based on previous insurance related content in a prior display.

22. The method of claim 1, wherein the wrapper comprises a rule engine executing rules based on a question and answer flow, the wrapper providing a dynamic display of insurance related content based on results of the rule execution engine.

23. The method of claim 1, where the wrapper comprises a rule engine executing rules based on a question and answer flow, the wrapper providing a dynamic display of insurance related content in a next display based on insurance related answers to questions provided in a prior display.

24. The method of claim 23, wherein the dynamic display of insurance related content in the next display includes rate information.

* * * * *